US008582567B2

(12) United States Patent
Kurapati et al.

(10) Patent No.: US 8,582,567 B2
(45) Date of Patent: Nov. 12, 2013

(54) SYSTEM AND METHOD FOR PROVIDING NETWORK LEVEL AND NODAL LEVEL VULNERABILITY PROTECTION IN VOIP NETWORKS

(75) Inventors: Srikrishna Kurapati, Richardson, TX (US); Sachin Purushottam Joglekar, Richardson, TX (US); Venkatesan Iyengar Prasanna, Dallas, TX (US); Satyam Tyagi, Richardson, TX (US); Guru Thodime, Richardson, TX (US); Pravin Khandelwal, Richardson, TX (US); Chandrasekhar Manchenella, Richardson, TX (US); Mukesh Kumar Singh, Hyderabad (IN); Raghavendra Venkata Thodime, Richardson, TX (US)

(73) Assignee: Avaya Inc., Basking Ridge, NJ (US)

( * ) Notice: Subject to any disclaimer, the term of this patent is extended or adjusted under 35 U.S.C. 154(b) by 1809 days.

(21) Appl. No.: 11/502,244

(22) Filed: Aug. 9, 2006

(65) Prior Publication Data

US 2007/0121596 A1    May 31, 2007

Related U.S. Application Data

(60) Provisional application No. 60/706,950, filed on Aug. 9, 2005.

(51) Int. Cl.
*H04L 12/66* (2006.01)
(52) U.S. Cl.
USPC .......................................... 370/356; 370/352
(58) Field of Classification Search
USPC ................................................ 370/352–356
See application file for complete search history.

(56) References Cited

U.S. PATENT DOCUMENTS

| | | | |
|---|---|---|---|
| 5,497,371 A | 3/1996 | Ellis et al. | |
| 5,581,610 A | 12/1996 | Hooshiari | |
| 5,751,964 A | 5/1998 | Ordanic et al. | |
| 6,137,782 A | 10/2000 | Sharon et al. | |
| 6,363,065 B1 | 3/2002 | Thornton et al. | |
| 6,498,791 B2 | 12/2002 | Pickett et al. | |
| 6,501,763 B1 | 12/2002 | Bhagavath et al. | |
| 6,574,765 B2 | 6/2003 | Sasaki et al. | |
| 6,598,183 B1 | 7/2003 | Grieco et al. | |

(Continued)

OTHER PUBLICATIONS

Hidden Markov Model Toolkit, http://htk.eng.cam.ac.uk/; Sep. 9, 2005; accessed though www.archive.org on Jul. 9, 2007.

(Continued)

*Primary Examiner* — Luat Phung
*Assistant Examiner* — Najeebuddin Ansari
(74) *Attorney, Agent, or Firm* — Sheridan Ross P.C.

(57) ABSTRACT

The present invention provides a system, method and apparatus for providing network level and nodal level vulnerability protection in VoIP networks by receiving a communication, filtering the received communication using three or more stages selected from the group comprising a media protection and filtering plane, a policy based filtering plane, a signature based filtering plane, a protocol anomaly detection and filtering plane and a behavioral learning based filtering plane, and either allowing or denying the received communication based the filtering step. The stages are applicable to one or more protocols including SIP, IMS, UMA, H.248, H.323, RTP, CSTA/XML or a combination thereof. In addition, the stages can be implemented within a single device or are distributed across a network (e.g., SIP network, a UMA network, an IMS network or a combination thereof).

18 Claims, 77 Drawing Sheets

(56) References Cited

U.S. PATENT DOCUMENTS

| | | | |
|---|---|---|---|
| 6,633,835 B1 | 10/2003 | Moran et al. |
| 6,665,293 B2 | 12/2003 | Thornton et al. |
| 6,757,823 B1 | 6/2004 | Rao et al. |
| 6,769,016 B2 | 7/2004 | Rothwell et al. |
| 6,781,955 B2 | 8/2004 | Leung |
| 6,791,955 B1 | 9/2004 | Kikuchi et al. |
| 6,816,455 B2 | 11/2004 | Goldberg et al. |
| 6,842,449 B2 | 1/2005 | Hardjono |
| 7,046,680 B1 | 5/2006 | McDysan et al. |
| 7,092,357 B1 | 8/2006 | Ye |
| 7,107,061 B1 | 9/2006 | Tontiruttananon et al. |
| 7,181,010 B2 | 2/2007 | Russ et al. |
| 7,380,011 B2 | 5/2008 | Li et al. |
| 7,385,957 B2 | 6/2008 | O'Neill |
| 7,508,767 B2 | 3/2009 | Shinomiya |
| 7,643,626 B2 | 1/2010 | Haase et al. |
| 7,681,101 B2 | 3/2010 | Oran et al. |
| 7,720,462 B2 | 5/2010 | Chu |
| 7,880,738 B2 | 2/2011 | Abagyan et al. |
| 8,027,251 B2 | 9/2011 | Ormazabal et al. |
| 8,341,724 B1 | 12/2012 | Burns et al. |
| 2002/0083175 A1 | 6/2002 | Afek et al. |
| 2002/0099854 A1 | 7/2002 | Jorgensen |
| 2002/0129236 A1 | 9/2002 | Nuutinen |
| 2003/0009694 A1 | 1/2003 | Wenocur et al. |
| 2003/0009699 A1* | 1/2003 | Gupta et al. ............... 713/201 |
| 2003/0021296 A1 | 1/2003 | Wee et al. |
| 2003/0067903 A1 | 4/2003 | Jorgensen |
| 2003/0110286 A1 | 6/2003 | Antal et al. |
| 2003/0125087 A1 | 7/2003 | Shimizu |
| 2004/0042470 A1 | 3/2004 | Cooper et al. |
| 2004/0083299 A1 | 4/2004 | Dietz et al. |
| 2004/0086093 A1 | 5/2004 | Schranz |
| 2004/0161086 A1* | 8/2004 | Buntin et al. ............... 379/189 |
| 2004/0203799 A1 | 10/2004 | Siegel |
| 2004/0260560 A1 | 12/2004 | Holloway et al. |
| 2005/0015488 A1 | 1/2005 | Bayyapu |
| 2005/0053052 A1 | 3/2005 | Ree et al. |
| 2005/0132060 A1* | 6/2005 | Mo et al. ............... 709/227 |
| 2005/0201363 A1* | 9/2005 | Gilchrist et al. ............... 370/352 |
| 2005/0232193 A1 | 10/2005 | Jorgensen |
| 2005/0249214 A1 | 11/2005 | Peng |
| 2005/0259667 A1* | 11/2005 | Vinokurov et al. ............... 370/401 |
| 2006/0028980 A1* | 2/2006 | Wright ............... 370/229 |
| 2006/0036727 A1 | 2/2006 | Kurapati et al. |
| 2006/0224750 A1 | 10/2006 | Davies et al. |
| 2006/0288411 A1* | 12/2006 | Garg et al. ............... 726/22 |
| 2007/0076853 A1 | 4/2007 | Kurapati et al. |
| 2007/0150276 A1* | 6/2007 | Srivastava et al. ............... 704/246 |
| 2007/0204060 A1 | 8/2007 | Higuchi et al. |
| 2008/0016334 A1 | 1/2008 | Kurapati et al. |
| 2008/0016515 A1 | 1/2008 | Naim et al. |
| 2008/0229382 A1 | 9/2008 | Vitalos |
| 2009/0094671 A1 | 4/2009 | Kurapati et al. |
| 2009/0144820 A1 | 6/2009 | Kurapati et al. |
| 2011/0173697 A1 | 7/2011 | Kurapati et al. |

OTHER PUBLICATIONS http://www.bell-labs.com/project/tts/voices.html; Sep. 11, 2005; accessed though www.archive.org on Jul. 9, 2007.
http://www.dli2.nsf.gov/; Nov. 28, 2003.
http://www.ipodder.org/; Sep. 4, 2005; accessed though www.archive.org on Jul. 9, 2007.
http://www.microsoft.com/reader/developers/downloads/tts.asp; Sep. 8, 2005; accessed though www.archive.org on Jul. 9, 2007.
http://www.naturalvoices.att.com/; Sep. 13, 2005; accessed though www.archive.org on Jul. 9, 2007.
Tyson, Jeff and Valdes, Robert, "How VoIP Works" http://computer.howstuffworks.com/ip-telephony.htm; Sep. 23, 2006; accessed though www.archive.org on Jul. 9, 2007.
Commercial Libraries, Data Compression—Speech, http://datacompression.info/Speech.shtml, accessed May 2005.
Data Compression Download Source Codes and Papers. http://www.data-compression.com/download.shtml, accessed May 2005.
Hidden Markov Model Toolkit, http://htk.eng.cam.ac.uk/.
http://www.bell-labs.com/project/tts/voices.html.
http://www.dli2.nsf.gov/.
http://www.ipodder.org/.
http://www.microsoft.com/reader/developers/downloads/tts.asp.
http://www.naturalvoices.att.com/.
ITU-T. Recommendation G.191, Software Tool Library 2000 User's Manual. ITU, Geneva, Dec. 2000.
ITU-T. Recommendation G.711, Pulse code molulation (PCM) of voice frequencies, vol. Fascicle III.4 of Blue Book, pp. 175-184. ITU, Geneva, 1989.
ITU-T. Recommendation G.729, Coding of Speech at 8 kbps using Conjugate-Structure Algebraic-Code-Excited Linear-Prediction (CS-ACELP). ITU, Geneva, Mar. 1996.
Speech Compression, http://www.data-compression.com/speech.shtml, accessed May 2005.
Stein, L. D. and Stewart, J. N., "The World Wide Web Security FAQ, Version 3.1.2, Feb. 4, 2002," http://www.w3.org/Security/Faq/.
Tyson, Jeff and Valdes, Robert, "How VoIP Works" http://computer.howstuffworks.com/ip-telephony.htm.
US Congress, CAN-SPAM Act of 2003, http://www.spamlaws.com/federal/108s877.shtml.
International Search Report and Written Opinion of the International Searching Authority for PCT/US2006/035903 dated Apr. 23, 2007.
International Search Report and Written Opinion of the International Searching Authority for PCT/US2006/031499 dated May 24, 2007.
International Search Report and Written Opinion for PCT/US2007/073290 dated Apr. 15, 2008.
International Search Report and Written Opinion for PCT/US2007/073298 dated Aug. 21, 2008.
International Search Report and Written Opinion for PCT/US2007/014871 dated Sep. 11, 2008.
Final Action for U.S. Appl. No. 12/189,151, mailed Jan. 4, 2013, 22 pages.
Final Action for U.S. Appl. No. 11/521,427, mailed Dec. 21, 2012, 32 pages.
Official Action for U.S. Appl. No. 12/189,151, mailed Dec. 29, 2011.
Official Action for U.S. Appl. No. 11/521,427, mailed Jan. 24, 2011, 18 pages.
Final Official Action for U.S. Appl. No. 11/521,427, mailed Jul. 19, 2011, 20 pages.
Advisory Action for U.S. Appl. No. 11/521,427, mailed Sep. 27, 2011, 5 pages.
Official Action for U.S. Appl. No. 11/521,427, mailed Jun. 22, 2012, 34 pages.

* cited by examiner

| Source Port | Destination IP | Destination Port | Protocols | Content | Action |
|---|---|---|---|---|---|
| ANY | SIP SERVER | 5060, 5061 | TCP, UDP, TLS | \x4f\x50\x54\x49\x4f\x4e\x53\x20\x73\x69\x70\x3a\x68\x61\x63 | DROP, LOG |
| | | | | "\x6b\x20\x53\x49\x50\x2f\x32\x2e\x30\x0a\x56\x69\x61\x3a\x20" | |
| | | | | "\x53\x49\x50\x2f\x32\x2e\x30\x2f\x55\x44\x50\x20\x63\x70\x63" | |
| | | | | "\x31\x2d\x6d\x61\x72\x73\x31\x2d\x33\x2d\x30\x2d\x63\x75\x73" | |
| | | | | "\x74\x32\x2\x35\x2e\x6d\x69\x64\x64\x2e\x63\x61\x62\x6c\x65" | |
| | | | | "\x2e\x6e\x74\x6c\x2e\x63\x6f\x6d\x3a\x35\x35\x31\x31\x38\x3b" | |
| | | | | "\x72\x70\x6f\x72\x74\x0d\x0a\x56\x69\x61\x20\x53\x49\x50\x50\x50" | |
| | | | | "\x2f\x32\x2e\x30\x2f\x55\x44\x50\x20\x68\x61\x63\x6b\x3a\x39" | |
| | | | | "\x0a\x46\x72\x6f\x6d\x3a\x20\x73\x69\x70\x3a\x68\x61\x63\x6b" | |
| | | | | "\x3b\x74\x61\x67\x3d\x36\x31\x35\x61\x65\x37\x37\x30\x0a\x54" | |
| | | | | "\x6f\x3a\x20\x73\x69\x70\x3a\x68\x61\x63\x6b\x0a\x43\x61\x6c" | |
| | | | | "\x6c\x2d\x49\x44\x3a\x20\x31\x36\x33\x33\x34\x37\x34\x35" | |
| | | | | "\x32\x3a\x20\x68\x61\x63\x6b\x0a\x43\x53\x65\x71\x3a\x20\x61" | |
| | | | | "\x61\x61\x61\x61\x61\x61\x61\x61\x61\x61\x61\x61\x61\x61\x61" | |
| | | | | "\x61\x61\x61\x61\x61\x61\x61\x61\x61\x61\x61\x61\x61\x61\x61" | |
| | | | | "\x61\x61\x61\x61\x61\x61\x61\x61\x61\x61\x61\x61\x61\x61\x61" | |
| | | | | "\x61\x61\x61\x61\x61\x61\x61\x61\x61\x61\x61\x61\x61\x61\x61" | |
| | | | | "\x61\x61\x61\x61\x61\x61\x61\x61\x61\x61\x61\x61\x61\x61\x61" | |
| | | | | "\x61\x61\x61\x61\x61\x61\x61\x61\x61\x61\x61\x61\x61\x61\x61" | |
| | | | | "\x61\x61\x61\x61\x61\x61\x61\x61\x61\x61\x61\x61\x61\x61\x61" | |
| | | | | "\x61\x61\x61\x61\x61\x61\x61\x61\x61\x61\x61\x61\x61\x61\x61" | |
| | | | | "\x04\x28\x0a\x43\x6f\x6e\x74\x61\x63\x74\x3a\x20\x68\x61\x63" | |
| | | | | "\x6b\x3a\x39\x0a\x43\x6f\x6e\x74\x65\x6e\x74\x2d\x4c\x65\x6e" | |
| | | | | "\x67\x74\x68\x3a\x20\x30\x0a\x4d\x61\x78\x2d\x46\x6f\x72\x77" | |
| | | | | "\x61\x72\x64\x73\x20\x37\x30\x0a\x55\x74\x68\x65\x72\x2d\x41" | |
| | | | | "\x67\x65\x6e\x74\x3a\x20\x65\x74\x68\x65\x72\x65\x61\x6c\x20" | |
| | | | | "\x63\x72\x61\x73\x68\x0a | |

FIG. 5

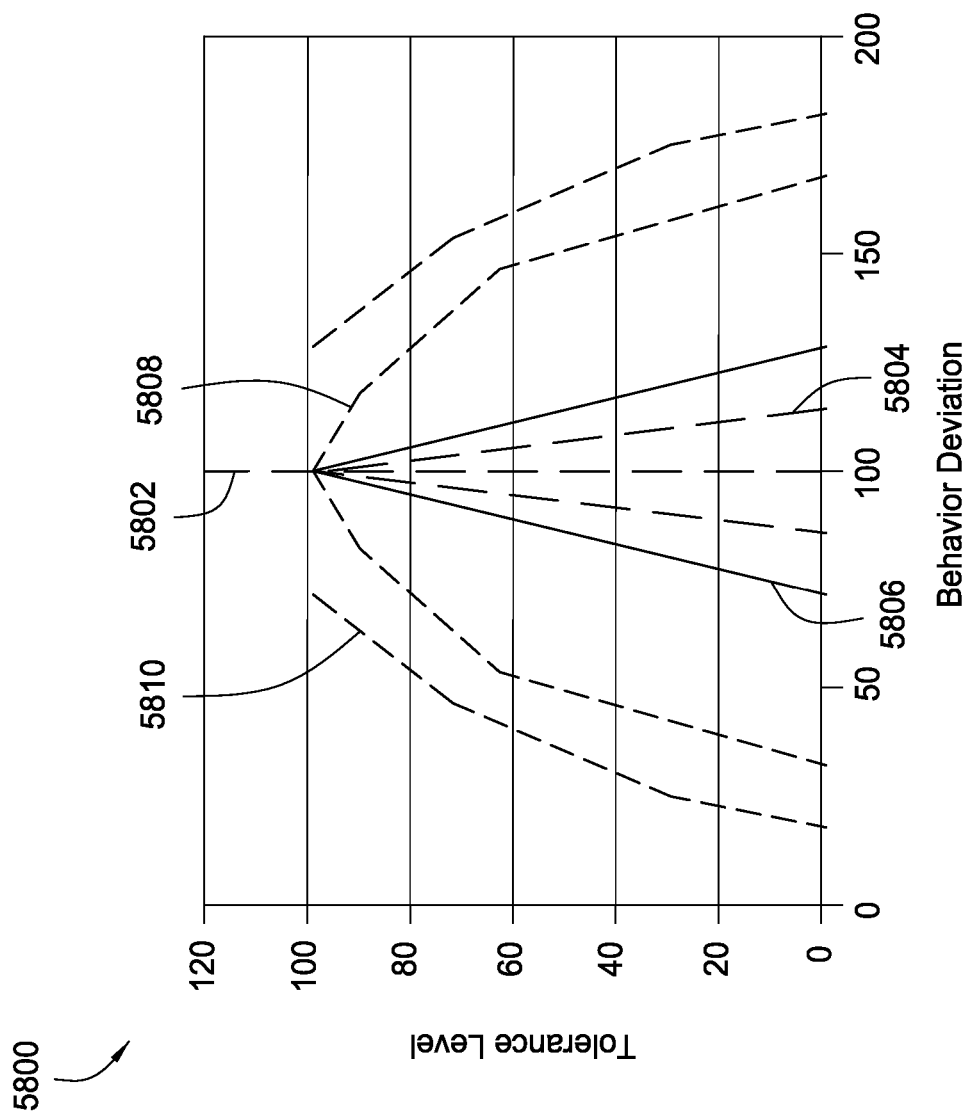

SYSTEM AND METHOD FOR PROVIDING NETWORK LEVEL AND NODAL LEVEL VULNERABILITY PROTECTION IN VOIP NETWORKS

PRIORITY CLAIM

This patent application is a non-provisional application of U.S. provisional patent application 60/706,950 filed on Aug. 9, 2005 and entitled "A System, Method and Apparatus for Providing Security in a Voice Over Internet Protocol Communication System," which is hereby incorporated by reference in its entirety.

FIELD OF THE INVENTION

The present invention relates generally to the field of communications and, more particularly, to a system and method for providing network level and nodal level vulnerability protection in VoIP networks.

BACKGROUND OF THE INVENTION

Voice over Internet Protocol ("VoIP") is the technology of choice in voice communications, whether as green-field deployment or as upgrade to existing Time Division Multiplex ("TDM") networks, because of its demonstrated efficiencies and potential for productivity improvements. Security measures to ward off the new and unique threats arising from VoIP have largely been ignored in the race to get VoIP technologies to both wired and wireless environments. Voice Spam, Voice Mail Spam, stealth Denial of Service ("DoS") (low frequency but constant calls to the same number) are all examples of heretofore unknown problems that can completely disable any or all user devices and services, as well as the entire VoIP system itself. As has happened with email, once IP telephone calls can originate from anyplace in the world, at a near zero cost per call, such threats could impact anyone, anywhere.

Dealing with both internal and external threats to secure data networks from DoS, Distributed DoS ("DDoS"), and SPAM is well known to the data world. In voice networks, however, these same threats have significantly amplified impacts because the telephone and its related services are personal, real-time, and interactive. Imagine a phone ringing regularly in the middle of the night because of a spammer, or all phones in an enterprise ringing constantly due to a DoS attack, or entire voice mail systems being completely filled overnight with SPAM (and then each individual having to clear out their voice mailbox manually in the morning).

Meanwhile, the deployment of VoIP in enterprises, wireline carrier and wireless carrier networks is exploding. Extensive VoIP deployment is imminent in wireless networks as well (e.g., Unlicensed Mobile Access ("UMA") networks). "Dual Mode" mobile phones are now providing voice services using VoIP over WiFi when available, and cellular elsewhere. These Dual Mode phones combine the better in-building coverage and reduced cost of WiFi hotspots with the broad geographic reach of cellular. Further, as the mobile phones are upgraded to the IP Multimedia Subsystem ("IMS") standard, VoIP shall be ubiquitously used even over the wide area cellular networks.

The newest and soon to be ubiquitous VoIP, Video & Multimedia standard is the Session Initiation Protocol ("SIP"). In addition to SIP-based desk phones, SIP-based soft-phones are being incorporated into personal computers ("PCs"), Laptops, personal data assistants ("PDAs"), and Smart-phones (IMS). All of these VoIP communications systems, SIP, IMA and UMA, are all vulnerable to inappropriate VoIP signaling and/or media streams that can attack an individual or an entire enterprise. Current security management products for VoIP, although necessary and effective for what they do, cannot provide the needed functionality to stop VoIP specific attacks like Stealth DoS, Stealth DDoS, and Voice/Voice Mail Spam.

Stealth DoS attacks can include repeated but low-frequency calls to the same number. Unseen by Firewalls, just one or two calls a minute are enough to take an endpoint out-of-service. Much more troublesome are DDoS attacks. The first difficulty is determining that a DDoS attack is actually underway; the second is pinpointing the many sources. Both DoS and DDoS get much more difficult when the attacker hides by "spoofing" their IP address or caller ID, or if they use "zombies" to launch their attacks. Zombies are devices that have been taken over by the attacker, usually without end user knowledge. Targeted Stealth DoS and DDoS attacks can easily make it impossible for an enterprise to conduct business. The impacts to the enterprise could range from a few phones out of services, up to and including being completely out of business for some period of time. If that enterprise instead of owning/operating its own IP PBX were using hosted IP Centrex services provided by an Internet Telephony Service Provider ("ITSP"), the impact to the serving ITSP as well could be far beyond having to pay penalties for violating the SLA.

There is also the emerging problem of Voice and Voice Mail Spam. Because the incremental cost of launching such attacks approaches zero with VoIP, the situation could become as it is today where the majority of email traffic is spam. Actually, compared to email, Voice Spam is much more costly for both individuals and the enterprise, since it has to be dealt with in real-time, either by actually answering the unwanted call (which may not even be a call at all), or by sifting through all of one's voice mails to see which if any are indeed real. It even gets trickier because legitimate telemarketers are shifting to VoIP (Do Not Call lists are unenforceable in a VoIP), and since some individuals respond positively to such telemarketing, what is defined as Spam for one person may be acceptable to another. Further compounding the impact on both individuals and corporations, Voice Mail storage is costly and limited. A fairly simple attack scenario could be used to fill up the entire Voice Mail system of an enterprise so that every single employee would have to clear out their Voice Mail boxes before they could receive any legitimate ones, not to mention whatever messages callers were unable to leave in the meantime because the Voice Mail box capacity had been maxed out.

Certainly, repeated episodes of DoS, DDoS or Voice Spam, or perhaps even merely continued fears of such attacks by customers, trading partners and employees, could easily cause a dramatic reduction in an organization's ability to conduct business. In this circumstance, telecom vendors should expect most enterprises and consumers to take their business elsewhere. In some jurisdictions, local, state and federal government customers may even be forced by law to move to a new provider. Alternatively, and with equally devastating impacts, entire blocks of VoIP phones could be attacked, so that large subnets could effectively be rendered useless. Again, the subsequent business impact and loss of competitive positioning to impacted enterprise as well as the underlying VoIP vendors would be severe.

Accordingly, there is a need for a system, method and apparatus for providing security in VoIP communication systems (e.g., SIP, IMS, UMA, etc.) and is capable of preventing the unauthorized use of the VoIP network, protecting the privacy of the VoIP users, protecting the VoIP network infrastructure assets and VoIP endpoints from various VoIP specific DoS attacks ranging from simple, brute force Flood DoS attacks to highly sophisticated, zombie, spoofing and malicious user driven DDoS, Stealth DoS, Blended attacks, Day-zero attacks and VoIP SPAM.

SUMMARY OF THE INVENTION

The present invention provides a comprehensive security system for protection of real-time IP applications, such as VoIP, Video & Multimedia, in VoIP communication systems (e.g., SIP, IMS, UMA, etc.). The present invention is capable of preventing the unauthorized use of the VoIP network, protecting the privacy of the VoIP users, protecting the VoIP network infrastructure assets and VoIP endpoints from various VoIP specific DoS attacks ranging from simple, brute force Flood DoS attacks to highly sophisticated, zombie, spoofing and malicious user driven Distributed DoS, Stealth DoS, Blended attacks, Day-zero attacks and VoIP SPAM (Voice and Voice Mail). Security against such attacks is provided by a comprehensive suite of VoIP application specific security techniques including VoIP Protocol anomaly detection & filtering and VoIP end-points.

The present invention provides security for VoIP endpoints, services and infrastructure. Such endpoints include IP phones ("hard phones"), softphones (e.g., on a laptop), wireless "smart" phones, and Wi-Fi phones (including dual-mode cellular). The present invention protects users of VoIP services from malicious or other attacks, which could arise from anywhere in the world, at anytime. The problem exists for any enterprise or ITSP that has deployed VoIP (IP PBX or softswitch).

The present invention establishes baseline behavior based on VoIP characteristics, call control and communication protocols (SIP, IMS, UMA, etc.). Without a good baseline, anomaly detection while avoiding false positives is very difficult. Also, accurate anomaly detection to avoid false positives is essential for scalability. In addition, the present invention is carrier-grade, and even during attack it has an integrated capability to allow critical calls (such as 911 and GETS).

The present invention provides a method for protecting one or more communications devices by receiving a communication, filtering the received communication using three or more stages selected from the group comprising a media protection and filtering plane, a policy based filtering plane, a signature based filtering plane, a protocol anomaly detection and filtering plane and a behavioral learning based filtering plane, and either allowing or denying the received communication based the filtering step. The stages are applicable to one or more protocols including SIP, IMS, UMA, H.248, H.323, RTP, CSTA/XML or a combination thereof. In addition, the stages can be implemented within a single device or are distributed across a network (e.g., SIP network, a UMA network, an IMS network or a combination thereof). The method can be implemented using a computer program in which the steps are performed by one or more code segments.

In addition, the present invention provides a system for protecting one or more communications devices that includes one or more signaling subsystems and an intelligence subsystem communicably connected to the one or more signaling subsystems. The signaling subsystem receives a communication, filters the received communication using three or more stages selected from the group comprising a media protection and filtering plane, a policy based filtering plane, a signature based filtering plane, a protocol anomaly detection and filtering plane and a behavioral learning based filtering plane, and either allows or denies the received communication based the filtering step.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 5 illustrates an example of signature based filtering in accordance with the present invention;

FIG. 10 illustrates a device using "gray area" analysis in accordance with the present invention;

FIG. 58 is a graph illustrating multiple trust based tolerance levels that may be used with the methods of FIGS. 51 and 52 in accordance with the present invention;

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to Voice over Internet Protocol ("VoIP") communications, but it will be understood that the concepts of the present invention are applicable to any packet-based data or voice communication system using Session Initiation Protocol ("SIP"), IP Multimedia Subsystem ("IMS"), Unlicensed Mobile Access ("UMA") or similar protocols.

The present invention provides a comprehensive security system for protection of real-time IP applications, such as VoIP, Video & Multimedia, in VoIP communication systems (e.g., SIP, IMS, UMA, etc.). The present invention is capable of preventing the unauthorized use of the VoIP network, protecting the privacy of the VoIP users, protecting the VoIP network infrastructure assets and VoIP endpoints from various VoIP specific Denial of Service ("DoS") attacks ranging from simple, brute force Flood DoS attacks to highly sophisticated, zombie, spoofing and malicious user driven Distributed DoS ("DDoS"), Stealth DoS, Blended attacks, Day-zero attacks and VoIP SPAM (Voice and Voice Mail). Security against such attacks is provided by a comprehensive suite of VoIP application specific security techniques including VoIP Protocol anomaly detection & filtering and VoIP end-points.

The present invention provides security for VoIP endpoints, services and infrastructure. Such endpoints include IP phones ("hard phones"), softphones (e.g., on a laptop), wireless "smart" phones, and Wi-Fi phones (including dual-mode cellular). The present invention protects users of VoIP services from malicious or other attacks, which could arise from anywhere in the world, at anytime. The problem exists for any enterprise or Internet Telephony Service Provider ("ITSP") that has deployed VoIP (IP PBX or softswitch).

The present invention establishes baseline behavior based on VoIP characteristics, call control and communication protocols (SIP, IMS, UMA, etc.). Without a good baseline, anomaly detection while avoiding false positives is very difficult. Also, accurate anomaly detection to avoid false positives is essential for scalability. In addition, the present invention is carrier-grade, and even during attack it has an integrated capability to allow critical calls (such as 911 and GETS).

Figure 1:
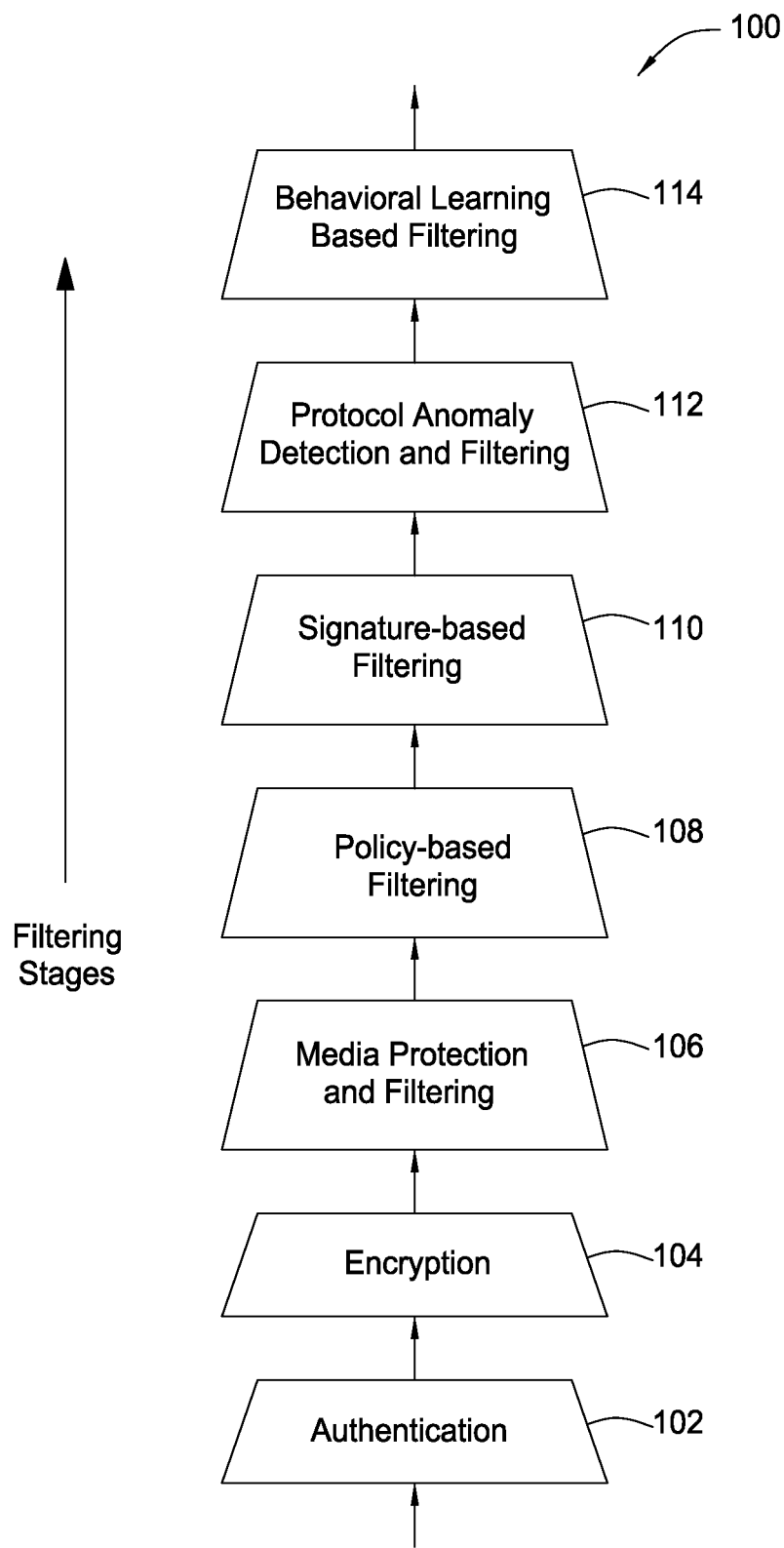
FIG. 1 illustrates the various filtering planes in accordance with the present invention.

Now referring to FIG. 1, the various filtering stages 100 of the present invention are shown. The present invention uses various filtering stages 100 to provide a comprehensive security system that protects VoIP infrastructure from attacks, prevents unauthorized usage, protects end-user privacy, protects end-users from attacks and handles voice SPAM. The filtering stages 100 may include authentication 102, encryption 104, media protection and filtering 106, policy-based filtering 108, signature-based filtering 110, protocol anomaly detection and filtering 112, and behavioral learning-based filtering 114. These filtering stages 100 are applicable to SIP, IMS, UMA, H.248, H.323, Real Time Transport Protocol ("RTP"), CSTA/XML and other protocols. Note that the filtering stages 100 can be used individually or in any combination to provide the desired security. Moreover, the present invention uses intelligent features, such as log/event correlation, VoIP vulnerability, discovery and security dashboard.

Figure 2B:
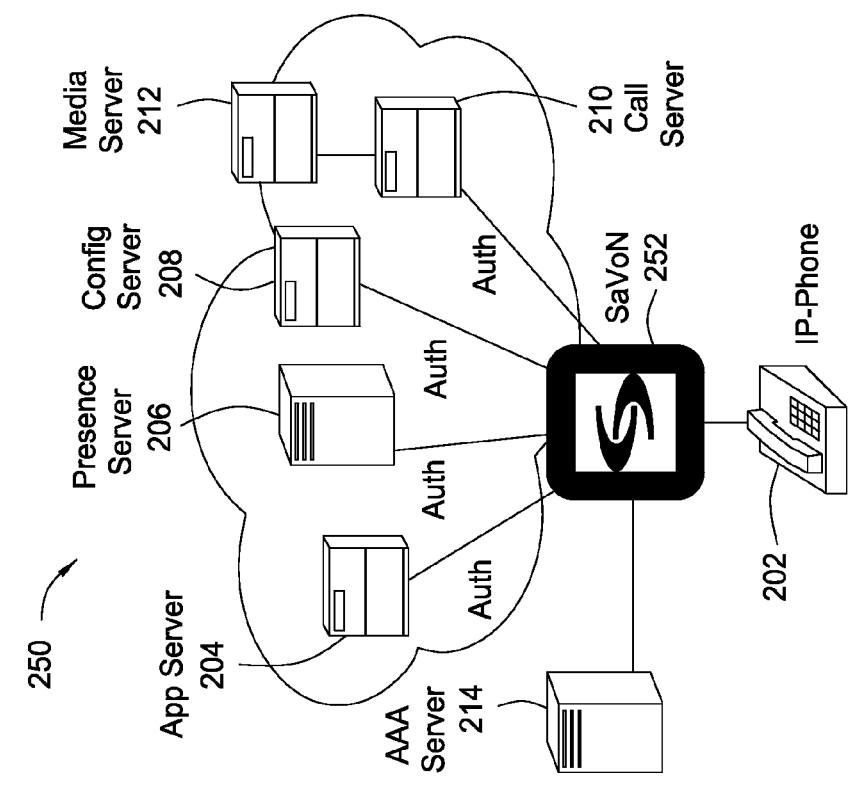
FIG. 2B illustrates a device using an authentication filtering plane in accordance with the present invention.
Figure 2A:
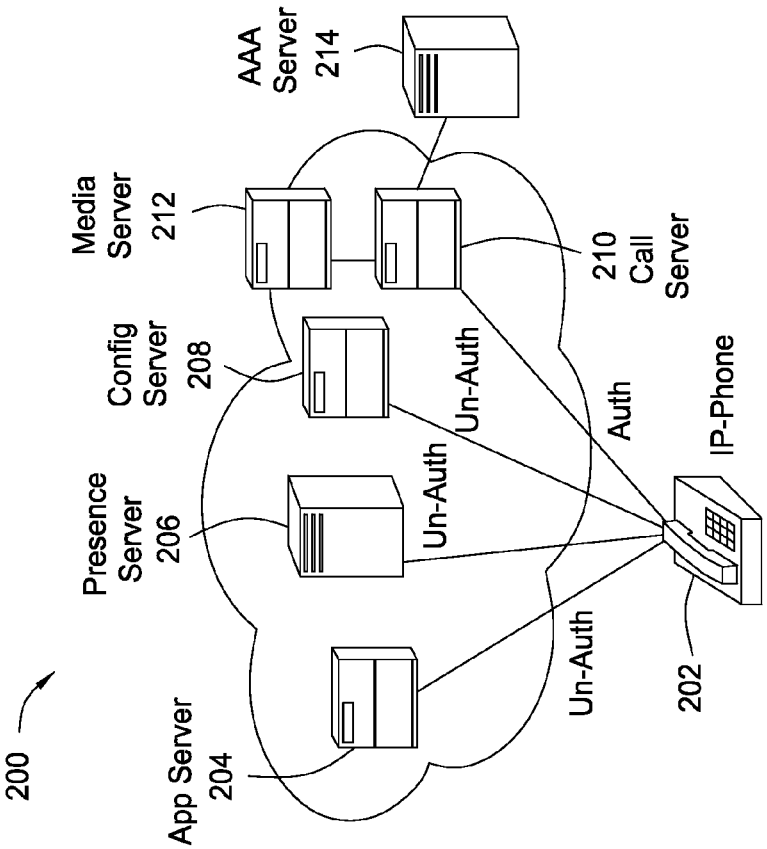
FIG. 2A illustrates authentication in accordance with the prior art.

The authentication 102 and encryption 104 filtering stages or planes are provided by the protocols and architecture of the network in which the present invention is being used. For example, FIG. 2A illustrates a prior art system 200 and FIG. 2B illustrates a system 250 using the authentication filtering plane 102 in which communication between all VoIP elements are authenticated in accordance with one embodiment of the present invention. More specifically, FIG. 2A shows: (a) unauthenticated communications between the IP Phone 202 and Application Server 204, Presence Server 206 and Configuration Server 208; and (b) authenticated communications between the IP Phone 202 and Call Server 210, which in turn communicates with Media Server 212 and Access, Authorization, and Accounting ("AAA") Server 214. In contrast, FIG. 2B shows the IP Phone 202 communicating with a device 252 employing the authentication filtering plane 102 of the present invention. The device 252 employing the authentication filtering plane 102 communicates with the AAA Server 214 to enable authenticated communications with Application Server 204, Presence Server 206, Configuration Server 208, and Call Server 210, which in turn communicates with Media Server 212. The authentication filtering plane 102 provides support for basic digest authentication, shared secret, certificates, Key Escrow, Online Certificate Status Protocol ("OCSP"), Extensible Authentication Protocol-Subscriber Identity Module ("EAP-SIM"), Global System for Mobile Communications-Subscriber Identity Module ("GSM-SIM"), etc.

Figure 3B:
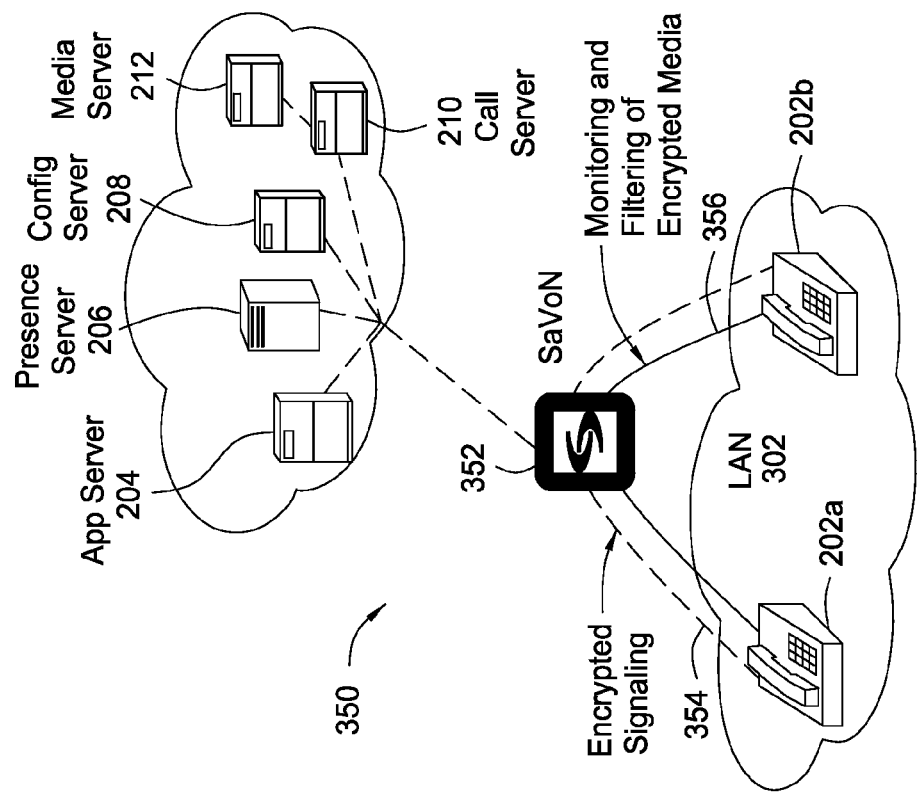
FIG. 3B illustrates a device using the encryption filtering plane in accordance with the present invention.
Figure 3A:
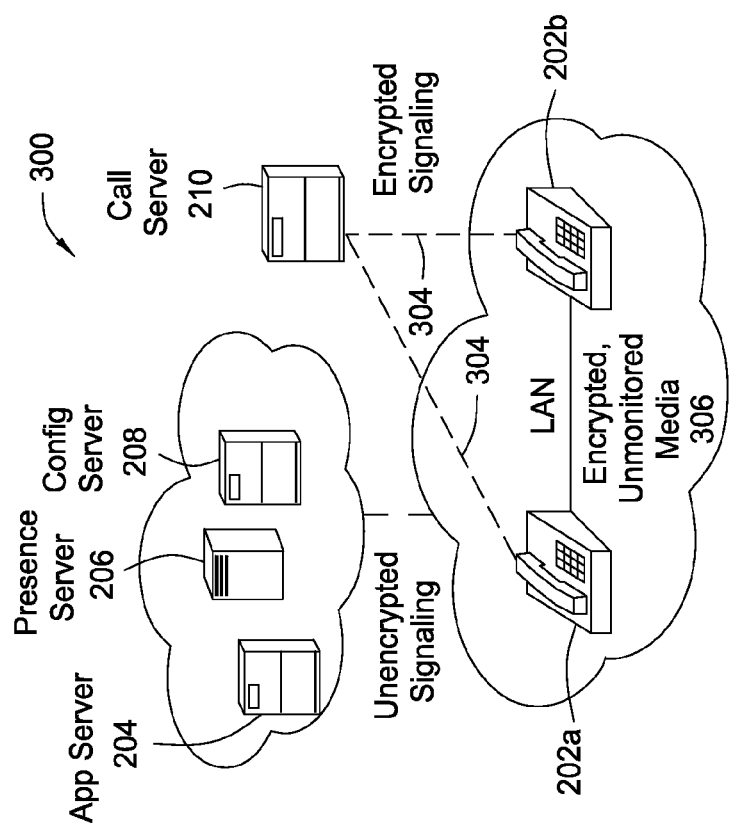
FIG. 3A illustrates encryption in accordance with the prior art.

Likewise, FIG. 3A illustrates a prior art system 300 and FIG. 3B illustrates a system 350 using the encryption filtering plane 104 in which signaling and media privacy encryption are enabled on communications between all elements in accordance with one embodiment of the present invention. More specifically, FIG. 3A shows IP Phones 202a and 202b that communicate with one another within a Local Area Network ("LAN") 302. Call Server 210 provides encrypted signaling 304 for IP Phones 202a and 202b. The media or communications 306 between the IP Phones 202a and 202b are encrypted, but are not monitored. Application Server 204, Presence Server 206 and Configuration Server 208 provide unencrypted signaling 308 to IP Phones 202a and 202b. In contrast, FIG. 3B shows the IP Phones 202a and 202b communicating with a device 352 employing the encryption filtering plane 104 of the present invention. The device 352 employing the encryption filtering plane 104 provides encrypted signaling 354 and monitoring and filtering of encrypted media 356 between the IP Phones 202a and 202b and between the IP Phones 202 and devices outside the LAN 302 (e.g., Application Server 204, Presence Server 206, Configuration Server 208, Call Server 210 and Media Server 212). Support is also provided for media encryption key escrow (decrypt, analyze and block, if necessary).

Figure 4:
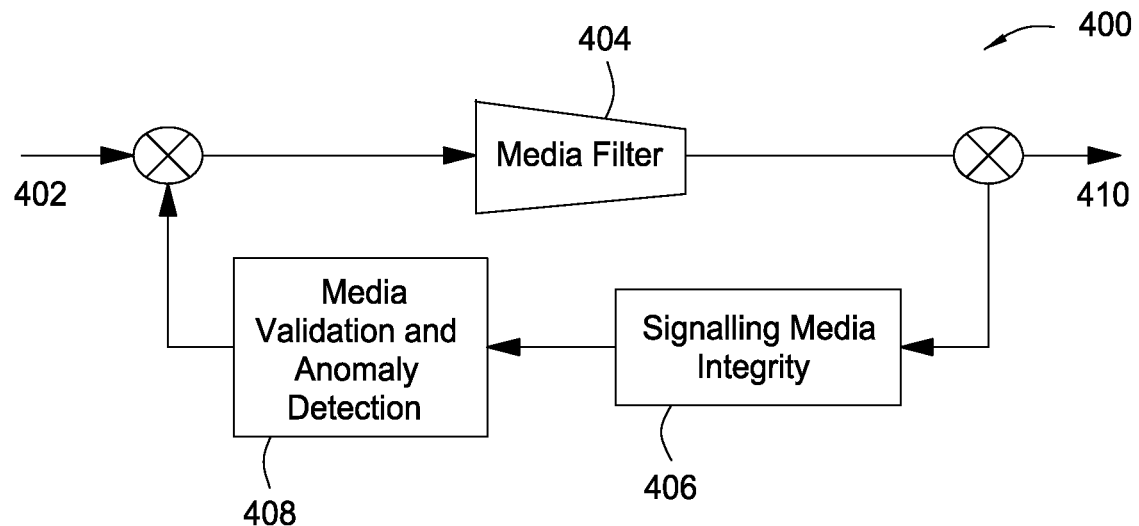
FIG. 4 illustrates a device using the media/user protection and filtering plane in accordance with the present invention.

The media protection and filtering plane 106, also referred to as the media/user plane, provides protection and filtering using bandwidth usage policing (codec violation), media quality degradation (timestamp manipulation and packetization time violation), signaling or media/user plane integrity anomalies (no media for active session, unidirectional media, packet size discrepancy, media flow after session termination), media classification filters and blocking rogue media/user plane injection. FIG. 4 illustrates a functional representation of a device 400 using the media protection and filtering plane 106 in accordance with one embodiment of the present invention. Incoming traffic 402 passes through a media filter 404 that uses feedback based on signaling media integrity 406 and media validation and anomaly detection 408 to provide monitored and filtered media 410.

The policy based filtering plane 108 basically blocks unwanted media at unwanted times. The subscriber can control the treatment of personal calls and the administrator can control system critical policies. More specifically, the policy based filtering plane 108 provides protection and filtering using traffic rate limiting policies, system-wide time-of-day based treatment policies, end-user-specific and end-user-controlled white list and black list, hierarchical policy structure for call treatment (e.g., network, group and subscriber/end-user, priority of end-user preferences over system preferences, etc.), and end-user self-service options and administrative control of portal access (e.g., end-user based, personal time-of-day caller treatment preferences and end-users can activate/deactivate options granted to them, etc.). For example, the policies could be:

| Time of Day | Call Source | Call Destination | Caller Category | Call Treatment |
|---|---|---|---|---|
| All | Any | Sipserver | Any | Rate limit 100 cps |
| All | Spammerdomain | Any | Spammer | Block and log |
| Working Hours | !@mycomany | joe@mycompany.com | Unknown | Voice Mail |

The signature based filtering plane 110 uses signature based detection to identify known attack signatures (e.g., IPS functionality to protect VoIP resources and hot updates of attack signatures across all network nodes, etc.) and detect download of malicious tools that may generate threats to VoIP service (e.g., vomit and updates of tool signature). For example, buffer overflow for H.323 and SIP, and US-CERT Advisory CA-2004-01. Another example is shown in FIG. 5 where an attack signature includes data about the source port 500, destination IP 502, destination port 504, protocols 506, content 508 and actions 510. Other data can be used. In addition, the signature based filtering plane 110 provides real-time signature database updates.

Figure 6:
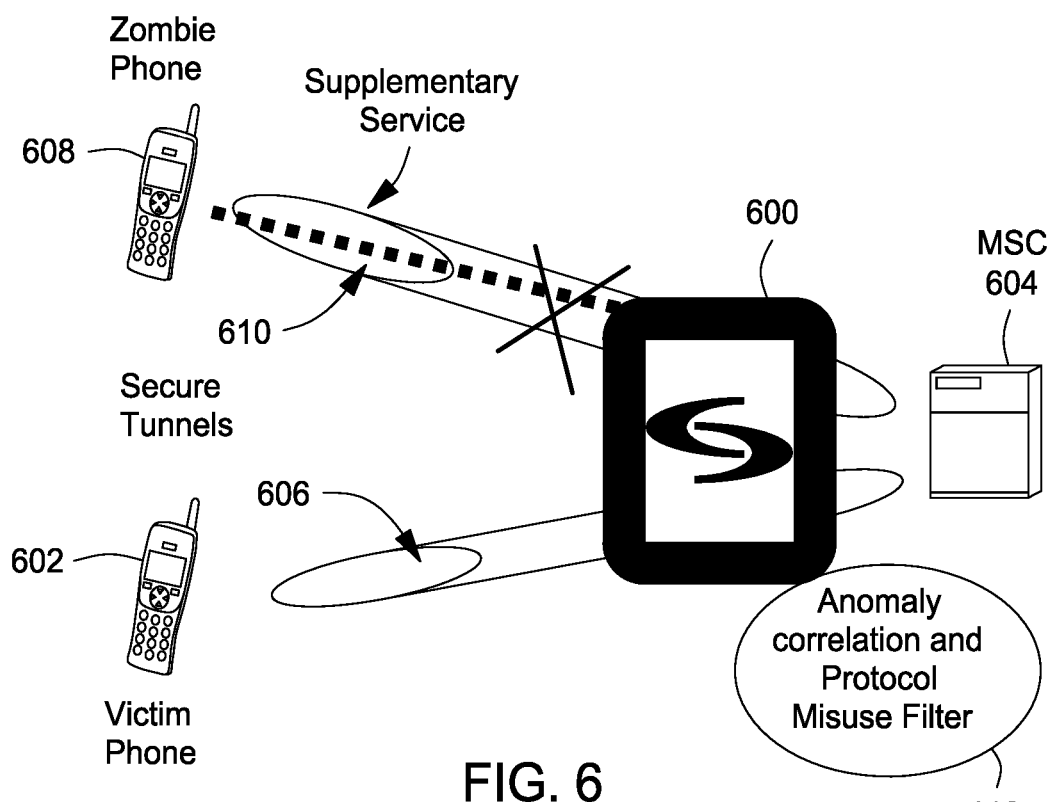
FIG. 6 illustrates a device using the protocol anomaly detection and filtering plane in accordance with the present invention.
Figure 7:
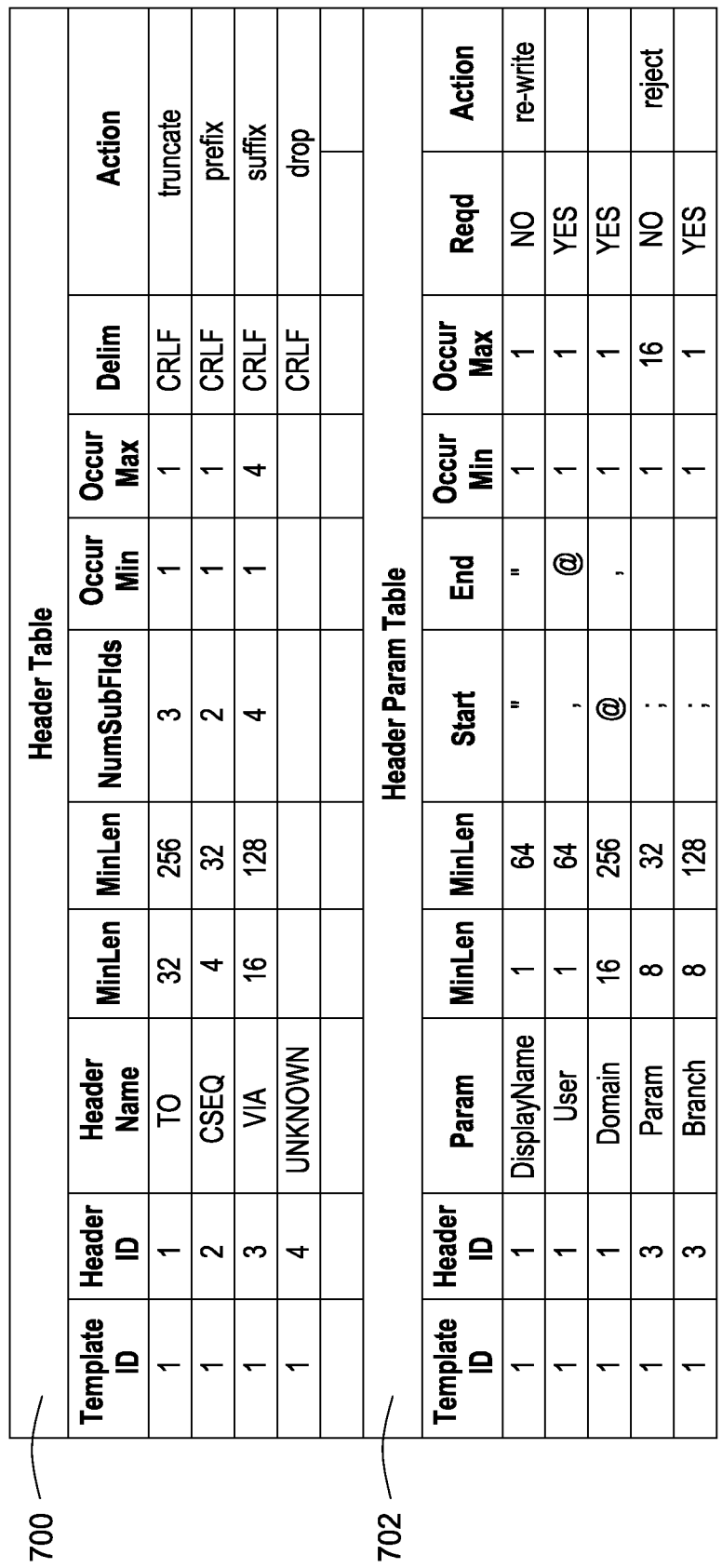
FIG. 7 illustrates an example of a protocol scrubbing template in accordance with the present invention.

The protocol anomaly detection and filtering plane 112 provides malicious formatting detection, protects against protocol message exploitations and rewrites/drops non-compliant messages. More specifically, the protocol anomaly detection and filtering plane 112 uses protocol misuse policies (e.g., enforcing anomalous protocol message sequencing templates and detecting compliant but abnormal use of protocol, etc.), protocol message scrubbing policies (e.g., generic policies, protocol compliance checking, detecting presence of abnormal header fields and abnormal characters from device types, rewriting protocol headers and blocking/quarantining suspicious messages) and device specific policies based on know vulnerabilities for call servers and endpoints. FIG. 6 illustrates a functional representation of a device 600 using the protocol anomaly detection and filtering plane 112 in accordance with one embodiment of the present invention. A Victim Phone 602 communicates with a Mobile Switching Center ("MSC") 604 via device 600 using a secure tunnel 606. The device 600 detects a Zombie Phone 608 attempting to obtain supplementary services from MSC 604 via a secure tunnel 610 and prevents the connection to the MSC 604. FIG. 7 illustrates an example of a protocol scrubbing template including a header table 700 and a header parameter table 702. The header table 700 may include various data fields, such as Template ID 704, Header ID 706, Header Name 708, Minimum Length 710, Maximum Length 712, Number of Sub Fields 714, Occur Minimum 716, Occur Maximum 718, Delimiter 720 and Action 722. The header parameter table 702 may also include various data fields, such as Template ID 724, Header ID 726, Parameter 728, Minimum Length 730, Maximum Length 732, Start 734, End 736, Occur Minimum 738, Occur Maximum 740, Required 742 and Action 744. Note that the templates can be downloaded and updated in real-time.

Figure 8:
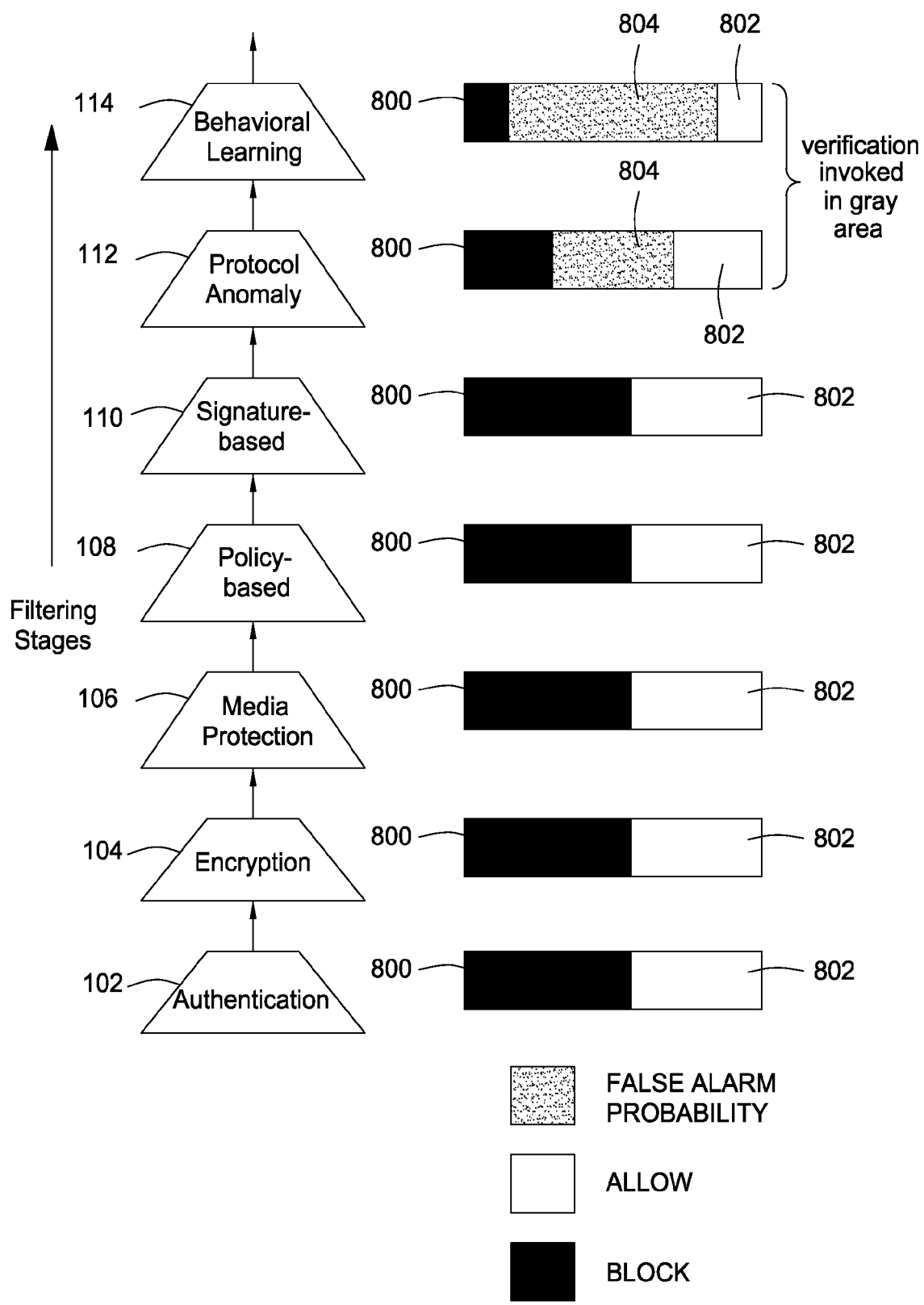
FIGS. 8 and 9 and 10 illustrate a "gray area" analysis in accordance with the present invention.
Figure 9:
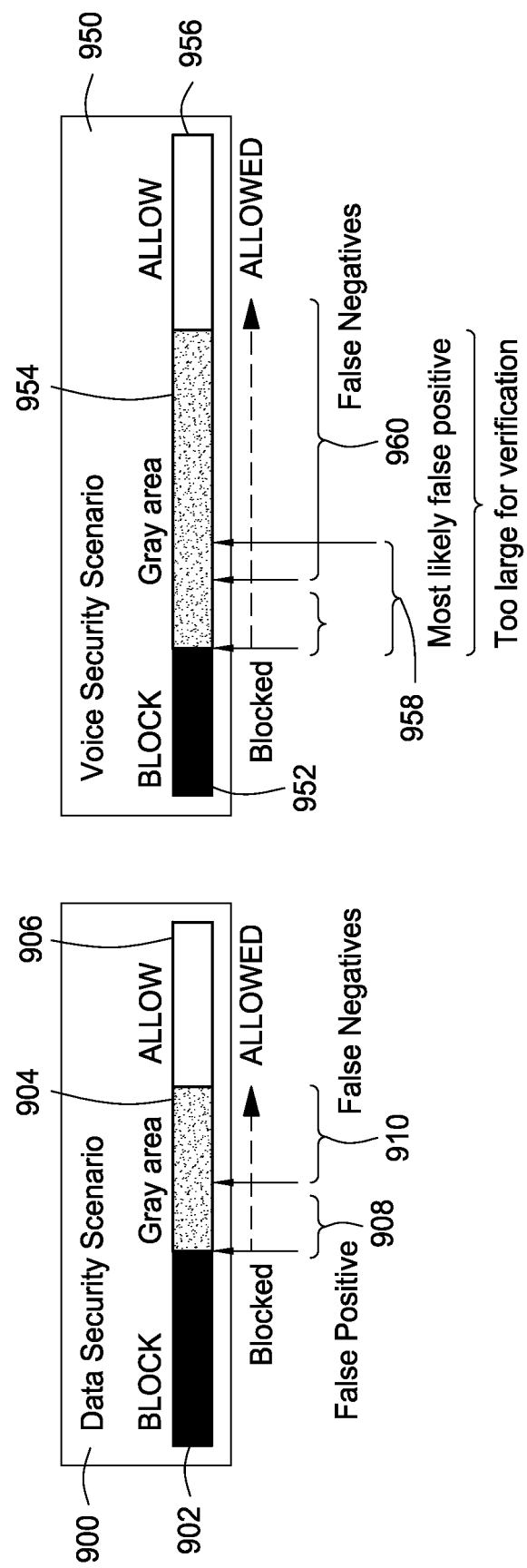

The behavioral learning based filtering plane 114 uses a "grey area" or false alarm probability analysis to protect the system. The behavioral learning based filtering plane 114 provides real time learned behavior at the system level, group level and user level. As a result, the present invention is able to detect anomalies based on learned parameters and resolve probable false alarms into a correct decision to allow the message or block the message. As shown in FIG. 8, the gray area or probability of a false alarm 804 increases in the higher level filter stages. Incoming messages are either blocked 800 or allowed to pass 802 through the lower level planes (authentication plane 102, encryption plane 104, media protection and filtering plane 106, policy based filtering plane 108 and signature based filtering plane 110) with almost no probability of a false alarm 804. At the higher level planes (protocol anomaly detection and filtering plane 112 and behavioral learning based filtering plane 114), the present invention analyzes this gray area 804 using behavioral learning based on statistical models and the detailed usage characteristics of all network assets (e.g., infrastructure elements MSC, Unlicensed Network Controller ("UNC") General Packet Radio Service ("GRPS") gateway, Serving GPRS Support Node ("SGSN"), Gateway GPRS Support Node ("GGSN"), AAA, UMA DB, Home Location Register ("HLR") as well as each End User ("EU")). The statistical models are fine tuned over time and any anomalous behavior triggers the verification process that definitively identifies positives. Many parameters are used as part of the behavioral learning to detect and prevent the attacks at various at levels:

System level
    System capacity usage (minimum, maximum, average).
    System capacity growth rate (minimum, maximum, average).
    System session initiation rate (minimum, maximum, average).
Group level based pubic IP address—which is used for modeling the group behavior based on the group, group may be some thing like:
    Public places—like malls, airports, etc.
        Large number endpoints may be present in this group.
        Most of the time new end points will be enter the UMA network, and leave and may not return normally.
    Work places—office
        Large number endpoints may be present in this group.
        Most of the time end points will be entering and leaving the UMA network, and will be returning in regular intervals.
    Home—
        Very few end points will be present.
        Rarely new end points will be entering in to these groups.
Domain level
User level or Endpoint
    Call reception and origination parameters
    Caller Trust Scores
        Call duration, frequency and preferences for call treatment
        Successful calls originated by the user to other subscribers
        Successful calls by other subscribers to this user
    User Credibility Score
        Based on user's feedback (*SPAM/*TRUST) and caller's current trust score
    User device protocol message fingerprint
        Device specific message structures and content formats User device location parameters
    Learn normal device contact information
  User device boot time behavior
    Learn normal boot message sequence As shown in FIG. 9, data communications 900 have a fairly even distribution of messages that can be blocked 902 without error, have a probability of being a false alarm 904 and can be allowed 906 without error. The false alarm 904 is either a false positive 908 (an important or valid call is blocked) or a false negative 910 (a unwanted call is delivered). In contrast, VoIP communications 950 have a smaller number of messages that can be blocked 952 or allowed 956 without error, and a much larger probability of being a false alarm 954. The false alarm 954 is either a false positive 958 (an important or valid call is blocked) or a false negative 960 (a unwanted call is delivered). The larger gray 954 for VoIP communications is a result of human behavior and a lower tolerance for the gray area. In addition, Stealth DoS attacks can impact VoIP service and degrade voice quality. In other words, it is a lot easier to disrupt VoIP service and significantly harder to protect against DoS attacks. Ideally, the gray area analysis of the present invention should provide no false positives and minimize false negatives. Behavioral learning facilitates sieving of the gray area to identify most likely false negative candidates that can then be subjected to a verification process.

Figure 10:
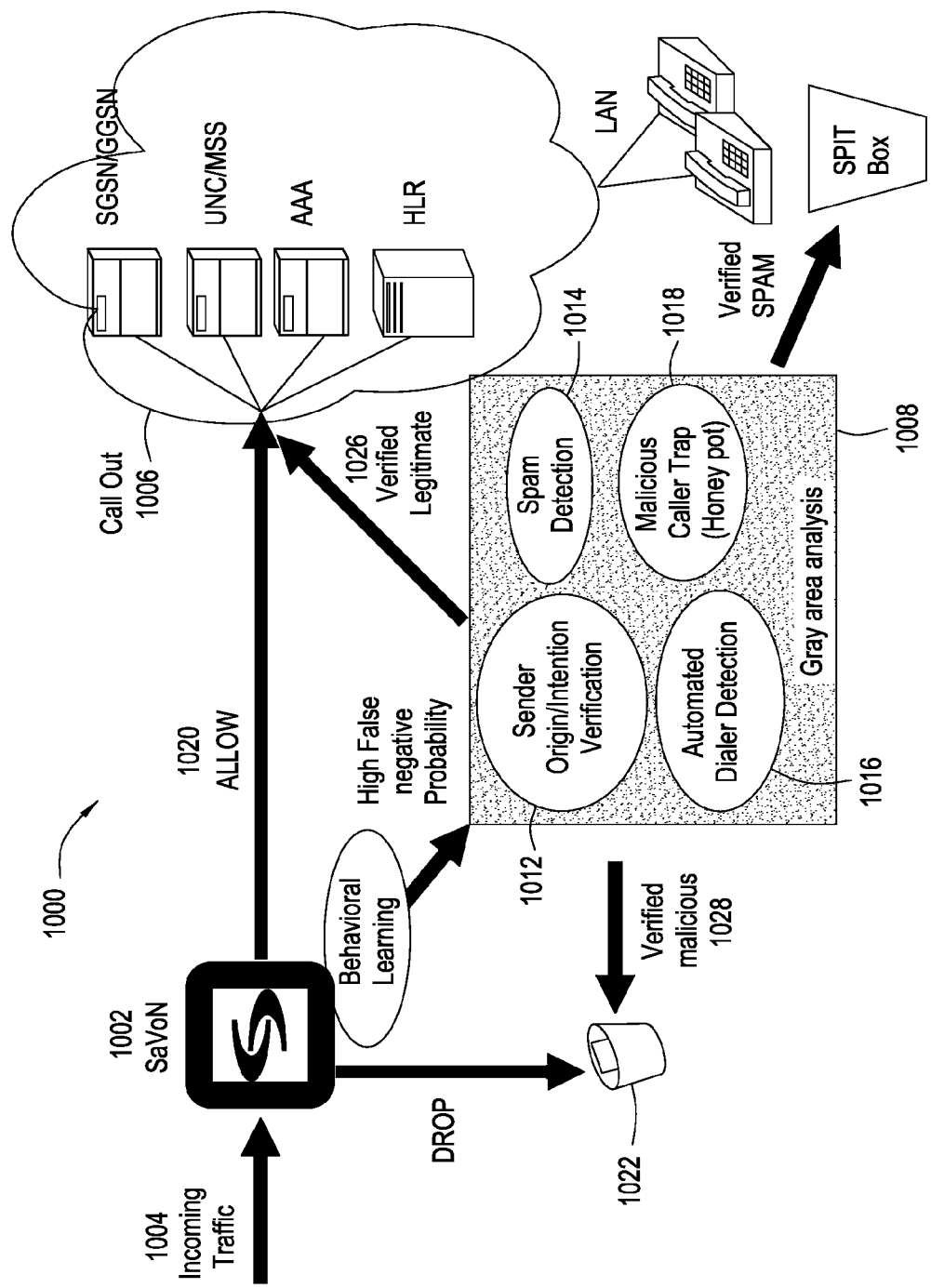

For example, FIG. 10 depicts a block diagram of a system 1000 for classifying voice communications (grey area analysis) in accordance with one embodiment of the present invention. The system 1000 includes a firewall or filter 1002 that receives VoIP calls (Call IN) 1004, processes them and then transmits those VoIP calls (Call OUT) 1006 that pass various rules, parameters or criteria. The system 1000 also includes various detection, filter, monitoring and reporting subsystems that perform a gray area analysis 1008 based on behavioral learning 1010. The gray area analysis 1008 may include sender origin/intention verification 1012, spam detection 1014, automated dialer detection 1016, malicious caller trap 1018 and other processes or modules. Additional information regarding the classification of communications is described in U.S. Patent Application Ser. No. 60/717,065 filed Sep. 14, 2005 entitled "System, Method and Apparatus for Classifying Communications in a Communications System", which is incorporated herein by reference. Using gray area analysis 1008, the system 1000 allows calls 1020, drops calls 1022 or further investigates calls that have a high false negative probability 1024. The calls that have a high false negative probability 1024 will either be processed as verified legitimate calls 1026 and allowed (Call OUT 1006) or verified malicious calls 1028 and dropped (Drop Call 1022).

Figure 11:
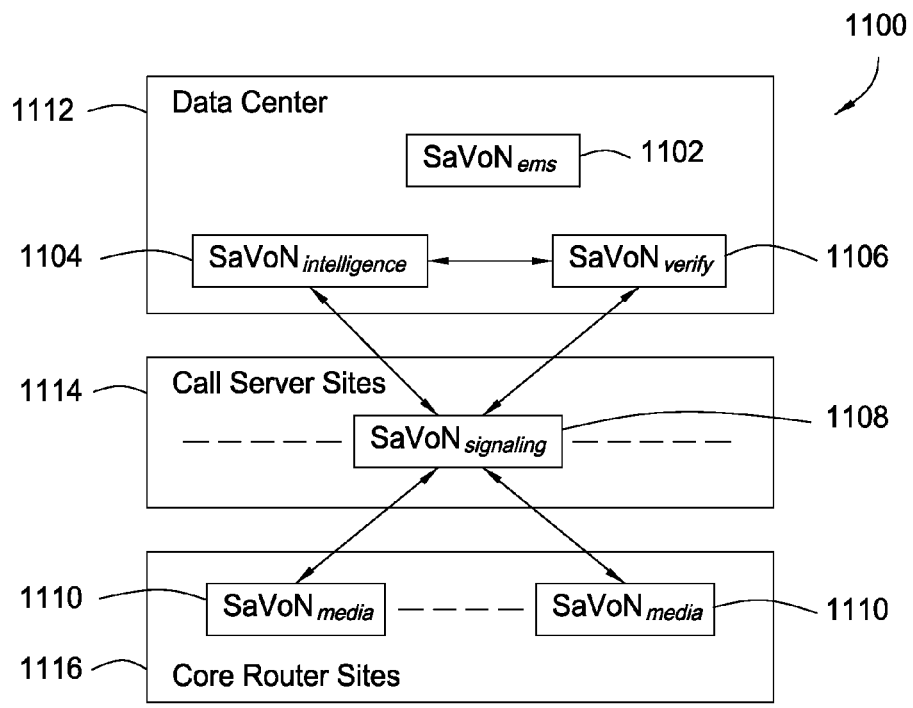
FIG. 11 illustrates a deployment architecture in accordance with the present invention.

The present invention can be implemented in a single node or distributed through out a communications system. As shown in FIG. 11, a full implementation 1100 will include various subsystems: Element Management System ("EMS") 1102, Intelligence 1104, Verify 1106, Signaling 1108 and Media 1110. EMS 1102, Intelligence 1104 and Verify 1106 typically reside in one or more data centers 1112. Signaling 1108 typically resides in call server sites 1114 and Media 1110 typically resides in core router sites 1116. This architecture 1100 is distributed, appliance-based, carrier-class and scalable. As a result, the present invention provides network wide intelligence, hardware accelerators for high performance, redundancy and failover and support for millions of VoIP endpoints. Notably, some implementations will not require all of these subsystems. The following table gives high level responsibilities for each of these subsystems:

| Subsystem | Network positioning | Responsibility |
|---|---|---|
| Signaling ("Ss") 1108 | Ss will be positioned in path between network and call server (e.g., on SES, Connection Management ("CM"), Media Gateway ("MGW"), etc.). All traffic originating from call server and going to network as well as originating from network and going to call server passes through Ss | Act as a proxy for non-suspected traffic<br>Act as a back-to-back agent for suspected traffic<br>Detecting protocol message sequence (e.g., Transport Layer Security ("TLS")/Open Secure Socket Layer ("SSL"), etc.) anomalies<br>Protecting secured call server and endpoints from DoS and DDoS attacks<br>Real-time SPAM filtering<br>Protocol scrubbing<br>Detecting and blocking messages with spoofed headers<br>Detecting and treating machine dialed calls as per configuration<br>Applying time-of-day based policies<br>Generating alerts for repetitive anomalies<br>Third party SIP phone interworking<br>Forwarding device for events and logs to Si<br>Receive and enforce instructions from Si |
| Media ("Sm") 1110 | Sm will be positioned at the Access Poiint of Presence ("POP") router. (e.g., CMTS for Cable or DSLAM for DSL). Router will be configured to mirror all traffic received on certain ports to send to Sm. Sm will not be in path, instead it will be a passive monitor. | Detecting RTP, signaling and media anomalies passively<br>Detecting protocol/boot sequence anomalies<br>Capturing, Buffering, Normalizing, and Generating presence and location notifications<br>Monitoring media quality<br>Generating alerts and report anomalies<br>Policy enforcement<br>Phone feature anomaly prevention<br>Non-repudiation<br>Media mirroring/forking capability |
| Intelligence ("Si") 1104 | Si will be present in the Network Operations Center ("NOC"). | Intelligent system that monitors entire VoIP network<br>Collecting events and logs from the other subsystems and other network elements<br>Aggregating and normalizing logs<br>Analyzing and correlating near real-time and offline logs for anomaly detection or incidence examination<br>Detect hidden and blended attacks<br>Generating commands for attack mitigation and propagate remediation<br>for preventative action to Ss and Sm<br>Reducing false alarms by analyzing logs<br>Updating trust scores and credibilities<br>Behavioral learning engine<br>Administrator and Operator reporting |
| EMS ("Sems") 1102 | Sems will be present in the NOC. | Propagating configuration information to other subsystems<br>Providing web services for integration of Operations, Administration, Maintenance and Provisioning ("OAMP") platform<br>Maintaining high availability for configuration data<br>Presentation of reports, alerts, alarms, events, and counters. |

| Subsystem | Network positioning | Responsibility |
|---|---|---|
| Verify ("Sv") 1106 | Sv will be present in the NOC. | Maintaining high availability for trust score data<br>Used to tune tolerance towards misbehavior<br>Merge the trust based on call behavior<br>Keeps track of bad VoIP domains<br>Propagate caller trust to partner VoIP networks |

The present invention is interoperable with messaging servers, media servers, AAA servers, VoIP Proxy/Call agent, media gateways, signaling gateways, Virtual Private Network ("VPN") gateways, Network Address Translation ("NAT"), data firewalls, presence servers and session border controllers. For example, the present invention collects events and logs from voice/multimedia elements (call servers, VoIP proxies, media servers, voicemail servers, voice trunking gateways/Public Switched Telephony Network ("PSTN") gateways, session boarder controllers, presence servers, Instant Messaging ("IM") servers, signaling gateways and media gateways) and data elements (VPN gateways, data firewalls, NAT devices)

Figure 12:
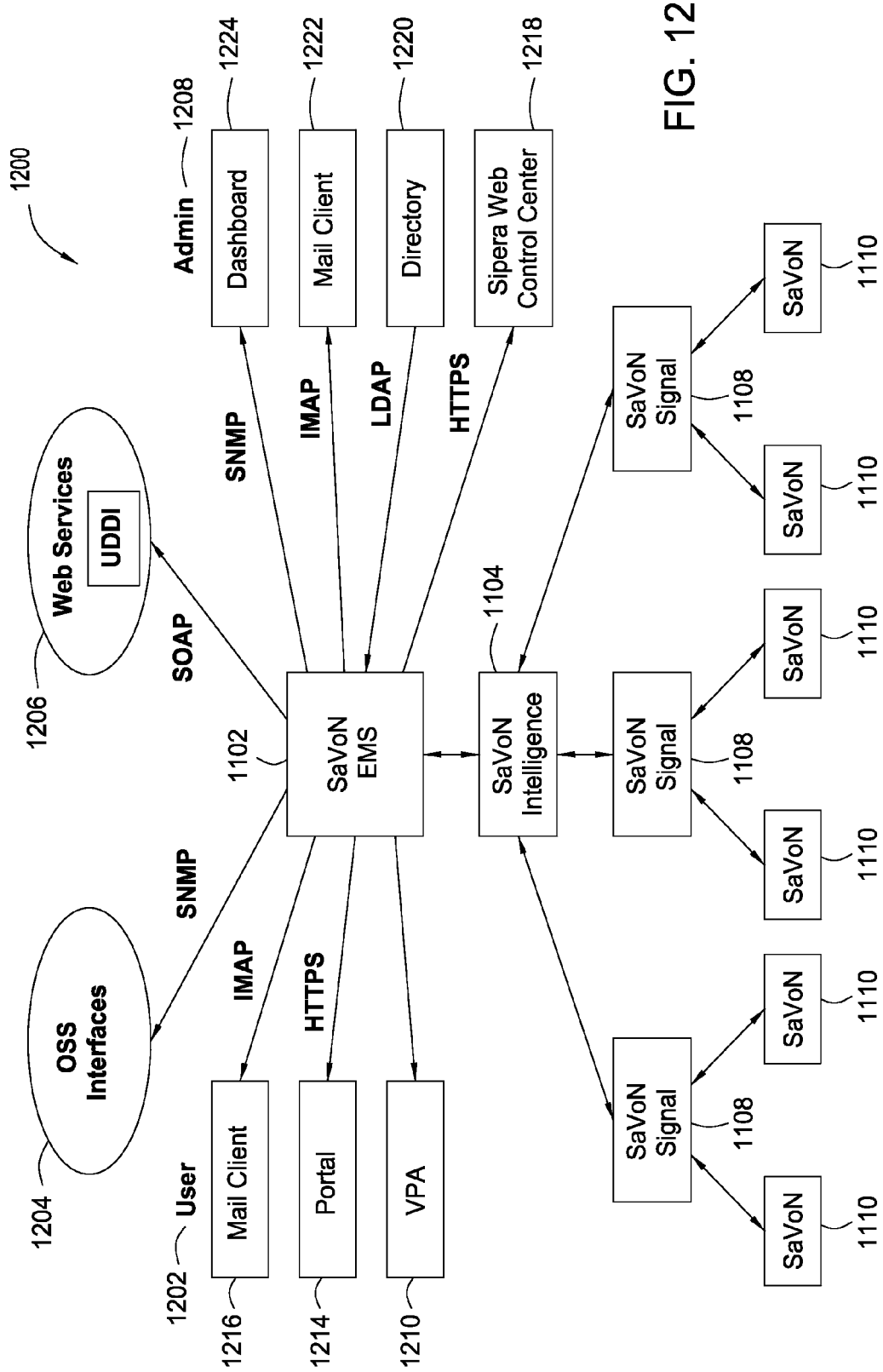
FIG. 12 illustrates the various interfaces of the present invention.

FIG. 12 illustrates various interfaces 1200 in accordance with the present invention. The Sems 1102 interfaces with various user services 1202, Operations Support System ("OSS") Interfaces 1204 via Simple Network Management Protocol ("SNMP"), Web Services UDDI 1206 via SOAP, administration services 1208 and Si 1104. The user services 1202 include Virtual Private Assistant ("VPA") 1210, Secure Portal 1214 via Hypertext Transfer Protocol Security ("HTTPS") and Mail Client 1216 via IMAP. The administration services 1208 include Control Center 1218 via HTTPS, Directory 1220 via Lightweight Directory Access Protocol ("LDAP"), Mail Client 1222 via IMAP and Dashboard 1224 via SNMP. Si 1104 interfaces with one or more Ss 1108, which in turn interface with one or more Sm 1110.

Figure 13:
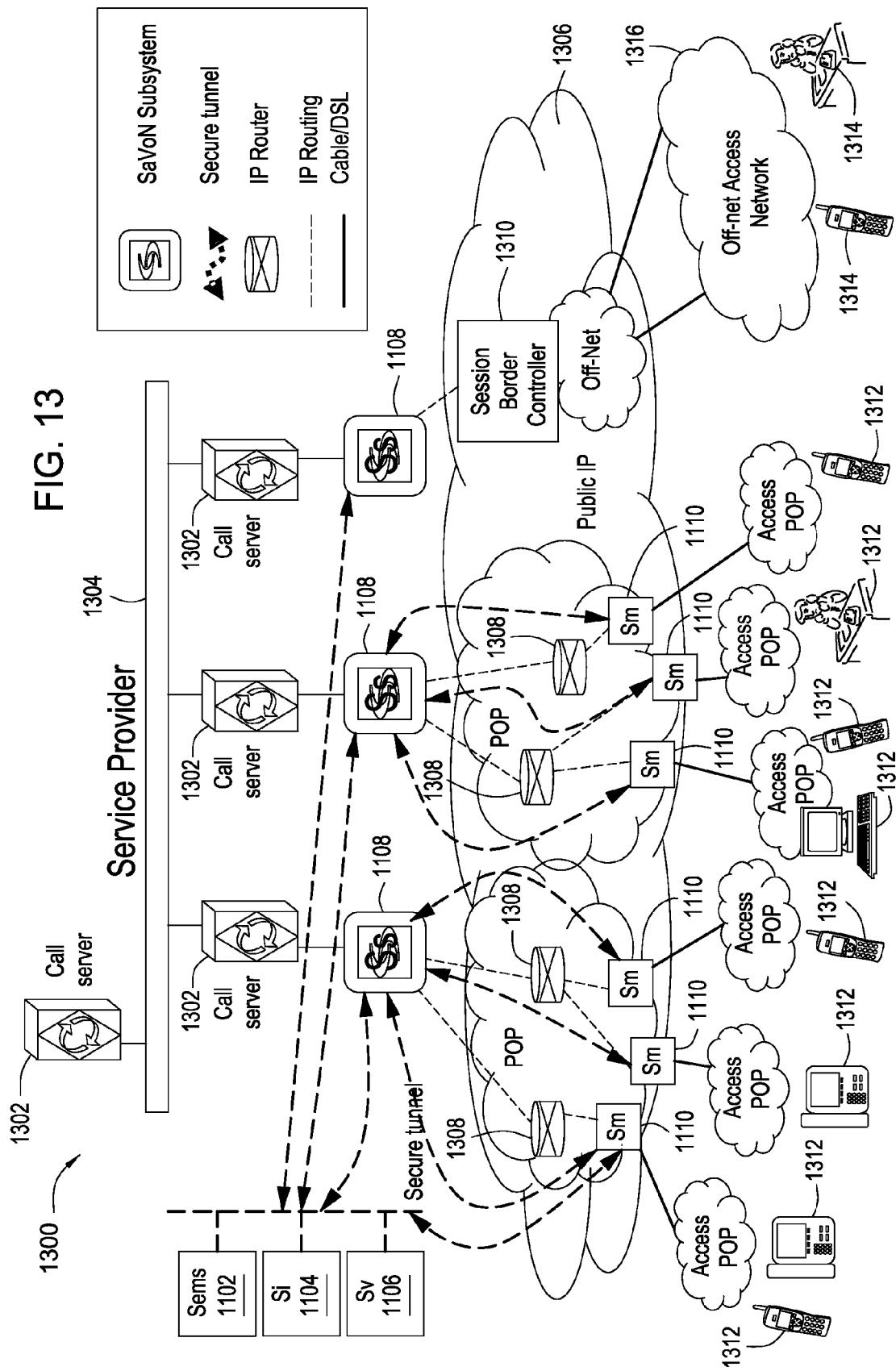
FIG. 13 illustrates a reference network architecture in accordance with the present invention.

FIG. 13 illustrates a reference network architecture 1300 showing the deployment of the present invention's subsystems in accordance with the present invention. Each node 1108 and 1110 has two network interfaces, one on network side (solid lines from top), and one on the call server side (solid lines from bottom). There may be a separate management interface (dotted lines) for each node 1108 and 1110. Call servers 1302 provide an interface between the Service Provider Network 1304 and the Public IP Network 1306. Ss 1108 are deployed as a gateway to provide the security and monitoring between the call servers 1302 and the IP routers 1308 and the session border controller 1310 in the Public IP Network 1306. Ss 1108 are also connected to Sems 1102, Si 1104 and Sv 1106 via secure tunnels (dotted lines). Sm 1110 provides the security and monitoring interface between the IP routers 1308 and the various end user devices 1312. Sm 1110 are also connected to Ss 1108 via secure tunnels (dotted lines). The Ss 1108 cluster supports fail-close. During initialization, the Ss 1108 needs a boot up ini file containing subsystem id that is used during boot up to query configuration information from Sems 1102. A load balancer node will have a DNS resolvable IP address. Consequently, it receives all initial INVITE traffic. Each Ss 1108 node is connected to a common bus by a fail-close switch which closes the circuit if Ss 1108 software component fails. The Session Border Controller 1310 is connected to various user devices 1314 via Off-net Access Network 1316.

Figure 14:
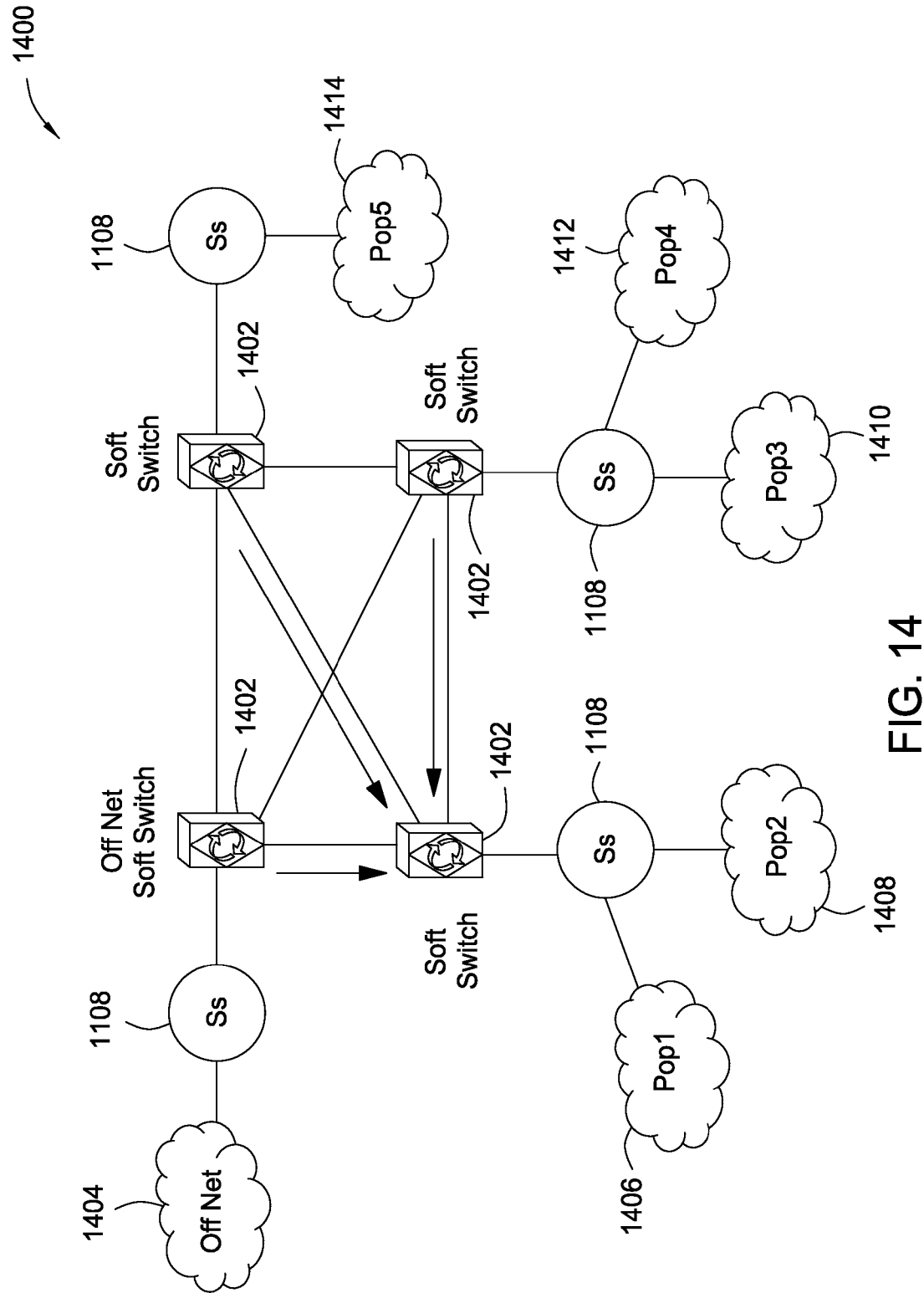
FIG. 14 illustrates a carrier network deployment scenario in accordance with the present invention.

FIG. 14 illustrates a service provider network deployment scenario 1400 in accordance with the present invention. The Ss 1108 is deployed as a gateway for each call server 1402 (e.g., a soft switch). Consequently, all SIP signaling traffic from network to call server 1402 and vice versa passes through Ss 1108. The Ss 1108 provides fail-close architecture to make it transparent in case of a failure. As shown, Ss 1108 is connected to Off Net 1404, Pop1 1406, Pop2 1408, Pop3 1410, Pop4 1412 and Pop5 1414.

Figure 15:
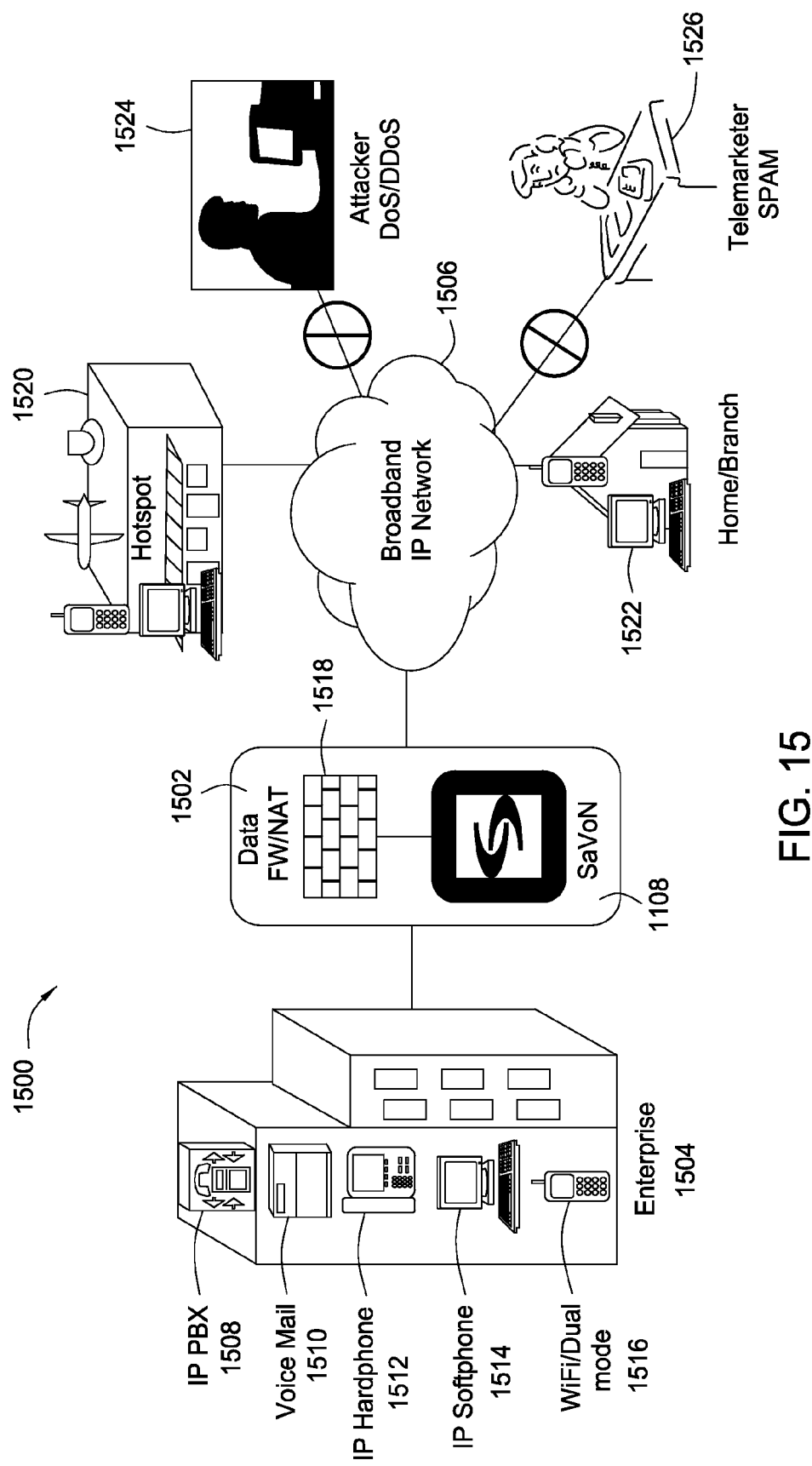
FIG. 15 illustrates an enterprise network deployment scenario in accordance with the present invention.

FIG. 15 illustrates an enterprise network deployment scenario 1500 in accordance with the present invention. The Ss 1108 is deployed in enterprise Demilitarized Zone ("DMZ") 1502 positioned between enterprise 1504 and Broadband IP Network 1506. Enterprise 1504 may include IP PBX 1508, Voice Mail 1510, IP Hardphones 1512, IP Softphones 1514 and WiFi/Dual Mode Phones 1516. Data firewall device 1518 will route all SIP traffic to Ss 1108 for security filtering to allow permitted communications with hotspot 1520 and home or branch offices 1522, but deny communications with attackers 1524 and telemarketers/SPAM 1526.

The protocols and vulnerabilities of devices within and enterprise network are as follows:

| First Device | Second Device | Protocol | Vulnerability of First Device |
|---|---|---|---|
| Application Server | IP Phone | HTTP/XM | Web Scripting Compromised App |
| Configuration Server | IP Phone | BOOTP<br>TFTP<br>HTTP<br>TELNET | Request Flood |
| Presence Server | IP Phone | SIP | UNSUBSCRIBE<br>NOTIFY<br>AMPLIFICATION |
| IP Phone | Call Server | SIP<br>H.323<br>MGCP<br>SCCP<br>UMA | Boot Seq<br>Zombie<br>Softphone<br>Stealth DoS |
| Call Server | Application Server | TAPI/JTAPI<br>CSTA/XML<br>HTTP/CCXML<br>HTTP/XML<br>SIP<br>INAP/CAMEL<br>MAP | Spoofed/Zombie Service Req<br>Spoofed Session Terminations<br>Session Hijack<br>DEREGISTER |
| Call Server | Media Gateway | MGCP<br>H.248<br>H.323<br>SIP | (see above) |
| Media Gateway | PSTN | PRI<br>CAS<br>GR303 | Trunk Exhaustion<br>E911 Attack<br>AUDIT ENDPT SWEEP<br>DLCX/CRCX<br>RSIP Flood |
| Call Server | Signaling Gateway | SIP-T<br>SIGTRAN<br>RICC | (see above) |
| Signaling Gateway | SS7 | ISUP | Circuit Outage<br>Signaling Link Outage<br>SCP Modification<br>Source Spoofing from ISDN Compromised CLEC Devices |
| Voice Mail Server | Call Server | SIP<br>SCCP<br>H.323 | VM Flooding<br>Unsolicited Voicemails<br>Unauthorized Access |
| Media Server | Call Server | SIP<br>MGCP<br>H.248 | Rogue Media<br>Snooping<br>Media Hijack<br>Quality Degradation |
| Application Server | Media Server | VXML<br>SALT<br>MRCP | (see above) |

More specifically, VoIP has the following vulnerabilities:
- Endpoint vulnerabilities
  - Feature richness
    - Web browsing capabilities
    - Contact information integration
    - Scripting capabilities
  - Boot sequence vulnerabilities
    - Tftp vulnerabilities
    - Configuration vulnerabilities
    - DNS vulnerabilities
  - Portability can be exploited
    - Hard to enforce security policies
    - Easy to get compromised
  - Soft phone ubiquity
    - Built into operating system
    - Vulnerable to VoIP aware worms on operating system
  - Thin server behavior
    - Ready to receive calls on well known port
    - Dos at low call rate (Stealth DoS)
- Protocol vulnerabilities
  - Rich signaling can be exploited
    - Capability to send scripts in the message
    - Peer to peer support
  - Protocols are clear text
    - Mostly unencrypted
    - Easy to tap and replay
    - Make it easy for script-kiddies
  - Weak authentication
    - Hop by Hop
    - Susceptible to Man-in-the-Middle attacks
- Media vulnerabilities
  - Weak signaling-media integrity
  - Easy to tap and replay
  - Easy to cause voice quality degradation
  - Hard to enforce encryption A TLS/ClientHello attack has the following characteristics:
  Required Knowledge: Server's IP
  Attack: Establish TCP, Flood server with Client Hello with strong cipher suites, requiring lots of computation on server.
  Effect: Denial of Service to real clients, may even lead to server crash
  Difficulty: Easy
  Attackers: Spoofed/Zombie, Mis-configured device, Network/Server resets A SIP attack has the following characteristics:
  Required Knowledge: Server's IP
  Attack: Send a flood of REGISTER with different contacts.
  Effect: Denial of Service as server slowly floods and unable to process legitimate registrations
  Difficulty: Easy
  Attackers: Any compromised UA with ability to REGISTER with SIP server How is this attack possible with Digest authentication? Attacker has a valid relationship with the SIP server, i.e. shared password for digest authentication thus allowing him to send one request validly, but he can send many. As per 3261 the Request URI does not need to match the digest URI unlike HTTP (due to forwarding this can change at proxies, which can't be challenged in the first place). There are no requirements for the user part of From URI to match the digest user and spoofing Contact header which is not part of the digest (other headers are perfectly valid). How is this attack possible with TLS certificates to authenticate clients, how can attacker get by the certificate authentication? Attacker has a valid relationship with the SIP server, i.e. TLS certificate authenticated connection, thus allowing him to send one request validly, but he can send many. In most implementations TLS layer does not share identity established with certificates of the user (i.e., checking user part of "From URI" with the certificate authenticated identity).

A VoIP Services attack has the following characteristics:
  Required Knowledge: IP of Server, ability to sniff or predict INVITE
  Attack: Respond to INVITE observed with own contact, hijack the call (using call forwarding service)
  Effect: Denial Of Service, victim does not receive call, and pretending to be victim
  Difficulty: Easy to Medium
  Attackers: Any compromised UA with valid relationship with server How is this attack possible with Digest authentications? Responses are not challenged. How this attack possible with TLS certificates to authenticate clients, how can attacker get by the certificate authentication? Attacker has a valid relationship with the SIP server, i.e. TLS certificate authenticated connection, thus allowing him to send one request. But he can spoof others. TLS layer and SIP Layer do not verify identity established with certificates of the user message-by-message. (i.e. checking user part of "From URI" with the certificate authenticated identity).

A H.248 attack has the following characteristics:
  Required Knowledge: IP of MGC, H.248 Identity of victim
  Attack: Send a ServiceChange message towards MGC, with the ServiceChangeReason being 904, which means that termination is malfunctioning. Using "Root" as the termination ID to represent the whole MG.
  Effect: Denial Of Service (Victim put out of service)
  Difficulty: Easy
  Attackers: Anyone whose H.248 messages MGC will accept.

How is this attack possible with IPSec tunnels with MG, how can attacker get by the certificate authentication? Attacker has a valid IPSec Tunnel with MGC allowing him to send valid request for himself. But he can spoof other MG. Attacker could be hiding behind IPSec tunnel. IPSec layer and H.248 layer do not verify identities message-by-message. The IPSec layer may not be sending the authenticated user identity to the H.248 layer to validate with the H.248 identity. In some implementations, it is permissible to have both IPSec and non IPSec MG. Hence an IPSec MG identity may be spoofed by sending messages through regular IP.

A presence vulnerability attack has the following characteristics:
  Required Knowledge: AOR of Victim (Public knowledge)
  Attack: Victim subscribes to own watcher info. Attacker sends tons of watcher info for victim. (May generate up to N squared data for victim see note)
  Effect: Denial Of Service (Flood the victim)
  Difficulty: Easy
  Attackers: Anyone who can subscribe for presence of victim (even if later victim rejects it).

Note: "In fact, if the server generates a watcherinfo notification when the subscription is created, and another when it is terminated, there will be an amplification by a factor of two. The amplification would actually be substantial if the server generates full state in each watcherinfo notification. Indeed, the amount of data sent to T would be the square of the data generated by the attacker! Each of the N subscriptions generated by the attacker would result in a watcherinfo NOTIFY being sent to T, each of which would report on up to N watchers."

How is this attack possible with Digest authentications? Attacker has a valid relationship with the presence server, i.e. shared password for digest authentication thus allowing him to send one request validly. But he can send many. As per 3261, the Request URI does not need to match the digest URI unlike HTTP (as due to forwarding this can change at proxies, which can't be challenged in the first place). There are no requirements for user part of From URI to match digest user and spoofing Contact header which is not part of the digest anyway. (Other headers are perfectly valid). How this attack possible with TLS certificates to authenticate clients, how can attacker get by the certificate authentication? Attacker has a valid relationship with the presence server, i.e. TLS certificate authenticated connection, thus allowing him to send one request validly. But he can send many. In most implementations TLS layer does not share identity established with certificates of the user (i.e. checking user part of "From URI" with the certificate authenticated identity).

A blended attack has the following characteristics:
Required Knowledge: IP of victim phone running telnet server
Attack: Telnet to victim's phone carry out attack on others. (Using phone diag features to launch attacks)
Effect: Take control of victim's phone
Difficulty: Easy
Attackers: Anyone with a PC in the enterprise network.

Figure 16:
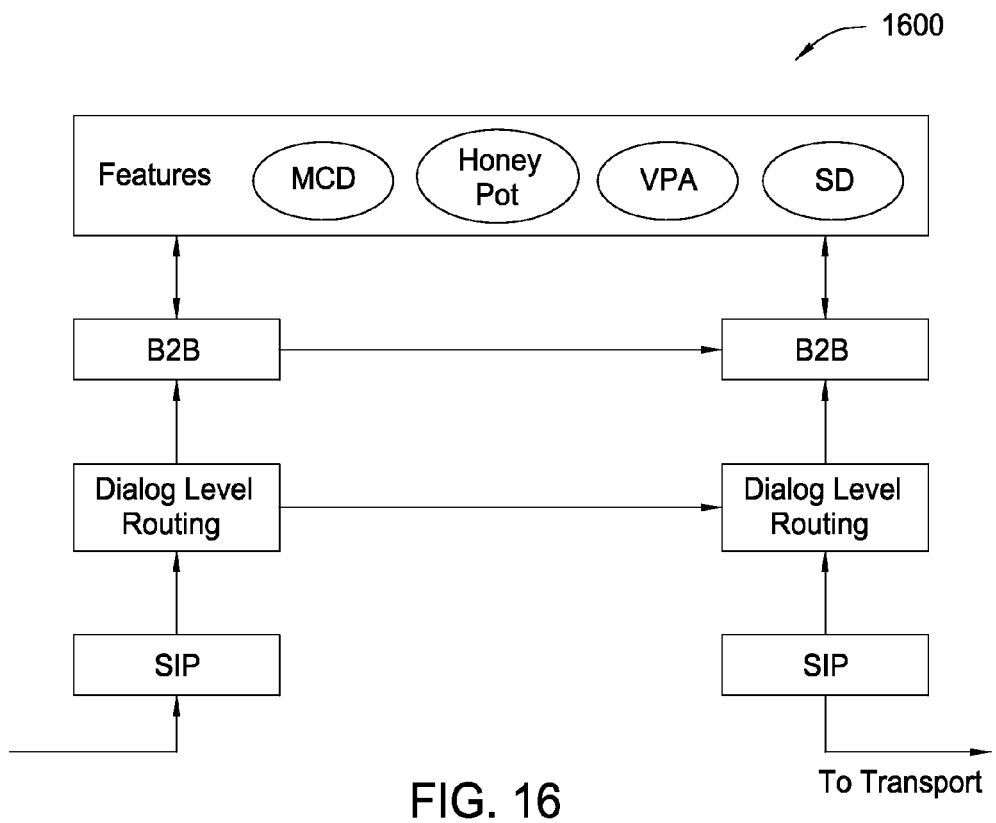
FIG. 16 illustrates the Ss Layer Architecture in accordance with the present invention.

FIG. 16 illustrates the layer architecture 1600 of the Ss 1108 in accordance with the present invention. The Ss 1108 is the primary SIP call processing and SIP signaling protection subsystem in present invention. Ss 1108 is positioned at each Call Server (e.g., a soft switch) serving one or more Points of Presence ("POPs") in the network. Ss 1108 acts as a gateway for the Call Server being in path for all network traffic going towards the Call Server and coming from the Call Server. Under normal conditions Ss 1108 acts as a SIP proxy. However, for suspected traffic streams, it may act as a SIP back to back ("B2B") agent in order to prevent any potential attacks on network entities protected by the present invention.

Figure 17:
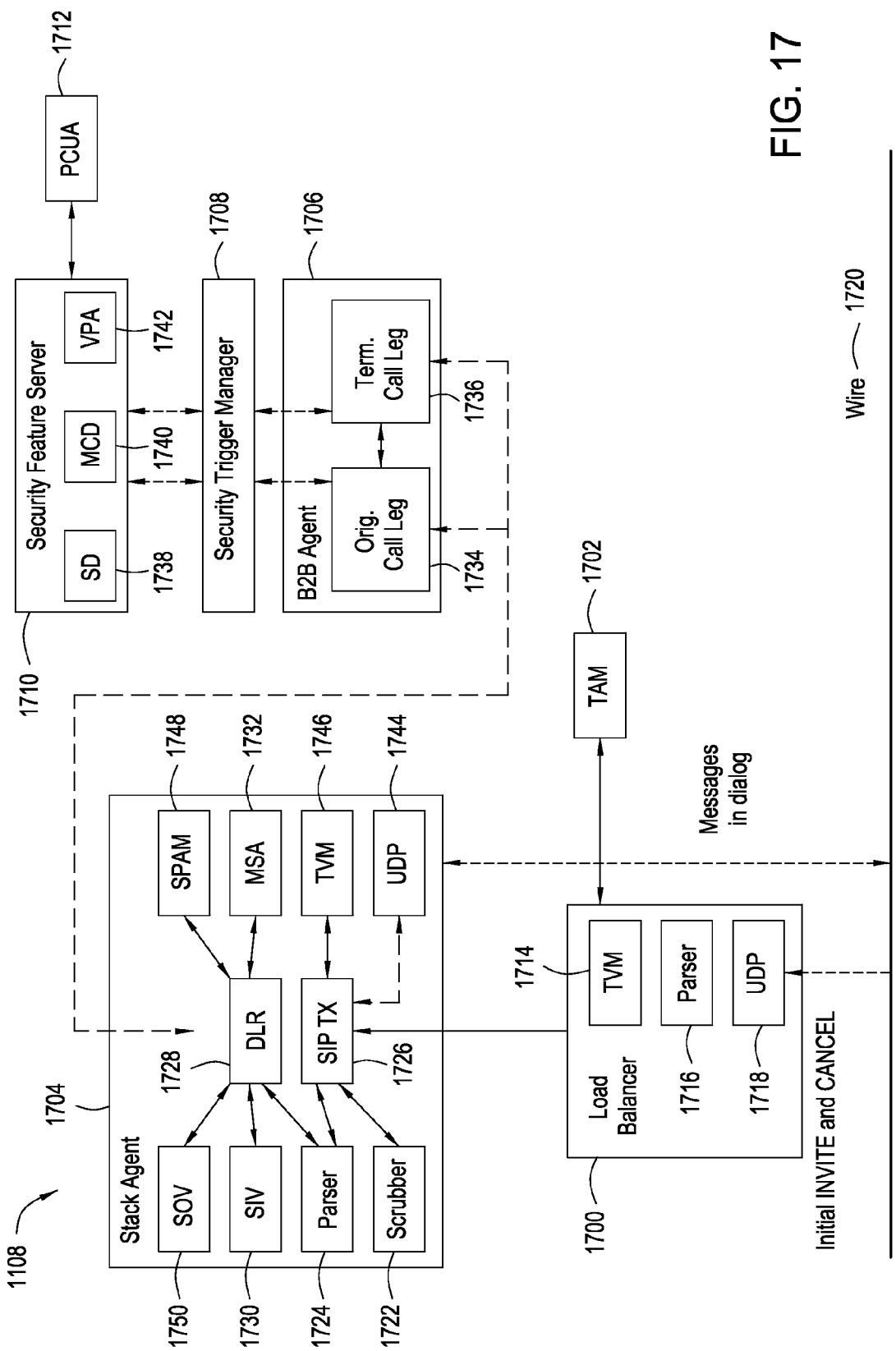
FIG. 17 illustrates the Ss Modules in accordance with the present invention.

Now referring to FIG. 17, the various modules of the Ss 1108 are illustrated. The Ss 1108 application consists of following processes: Load Balancer 1700, Traffic Acceleration Monitor ("TAM") 1702, Stack Agent 1704, B2B Agent 1706, Security Trigger Manager 1708, Security Feature Server 1710 and Prompt and Collect User Agent ("PCUA") 1712. The Load Balancer 1700 include Traffic Velocity Monitor ("TVM") 1714, Parser 1716 and UDP 1718. The Load Balancer 1700 will have a published IP address where all initial INVITE and CANCEL traffic from the network will be received. Load Balancer 1700 will apply load balancing algorithm to distribute initial INVITEs among available Stack Agents 1704, whereas CANCEL messages will be broadcasted to all Stack Agents 1704. The Stack Agent 1704 that had received the initial INVITE will process the corresponding CANCEL message, and others will discard it. All other messages in the dialog will be directly received by the Stack Agent 1704 handling the call. Load Balancer 1700 will use parser library to lazy parse the messages and will use TVM 1714 library to detect flood D/DoS attacks. TVM 1714 will send per-call notifications to TAM 1702 for stealth D/DoS attack detection. TVM 1714 will also send suspected flood attack notification to TAM 1702 if flood attack threshold is crossed. TAM 1702 will aggregate such notifications from multiple TVMs 1714 and will generate alert if aggregate threshold is crossed. Thresholds are maintained per secured entity.

The TAM 1702 will receive per-call notifications (one per initial INVITE) from TVM 1714, buffer it for the sampling period, consolidate at the end of each sampling period, and apply stealth D/DoS detection algorithm. It will also aggregate suspected flood attack notifications from multiple TVMs 1714 and will detect flood D/DoS attack. Upon detection of an attack it will send security feature invocation request to TVM 1714 in order to filter out attack traffic. Additionally, it will generate incidence reports (alerts) for Si for network-wide event analysis and correlation. TAM 1702 will receive administrator commands to override automatic response or to force invoke response on suspected traffic streams.

The Stack Agent 1704 will receive initial INVITE and CANCEL messages from Load balancer 1700 and other messages in dialog from wire 1720. Messages received from Load balancer 1700 will already have lazy parser 1716 applied to them. For such messages, Stack Agent 1704 will use Protocol Scrubber 1722 library to drop/re-write wrongly/maliciously formatted messages and will initiate SIP transaction management (Ref.: RFC 3261). The Protocol Scrubber 1722 supports different scrubber rule template for each message type, supports hot updates for scrubber templates and maintains scrubbing failure statistics per message. For messages received from wire 1720, Stack Agent 1704 will use parser 1724 library to lazy parse the messages and from thereon will treat them similar to how it treats messages received from Load balancer 1700. SIP Transactions Manager 1726 will use TVM 1714 library to block flood D/DoS attack traffic aimed directly at Stack Agent 1704 or to invoke security features on such traffic. If parsing, scrubbing, and TVM 1714 filtering passes the message, SIP Transactions Manager 1726 will forward it to Dialog Level Routing ("DLR") 1728 thread. DLR 1728 will use Sender Intention Validation ("SIV") 1730 library to block all initial INVITE messages that are sent without an intention of setting up a legitimate dialog, indicative of potential flood D/DoS attack of INVITE messages. DLR 1728 will also use Message Sequence Analyzer ("MSA") 1732 library to detect anomalies in protocol message sequencing which indicate potential attacks, for example, maliciously tearing down calls using forged CANCEL and BYE messages. If any of the messages from or to a particular SIP entity is suspected DLR 1728 will forward the initial INVITE message from or to that entity to B2B Agent 1706. B2B Agent 1706 will invoke security features to block malicious traffic. Stack Agent 1704 also includes UDP 1744, TVM 1746, SPAM 1748 and Session Origin Verification/Validation ("SOV") 1750.

Calls to or from suspected/under attack SIP entities will be anchored by B2B Agent 1706. Main purpose of anchoring suspected calls in B2B Agent 1706 is to be able to connect suspected call to a dummy User Agent ("PCUA") for identifying legitimate traffic and blocking attack traffic by invoking security features (Spoof Detection, Machine Call Detection). B2B Agent 1706 will maintain two basic call state machines, one on originating call leg 1734 and one on terminating call leg 1736 to be able to control the entire call including dropping in the middle of the call is necessary. The Security Feature Server 1710 will provide an interface for B2B Agent 1706 to invoke security features Spoof Detection ("SD") 1738, Machine Caller Detection ("MCD") 1740 and Virtual Private Assistant ("VPA") 1742. It will interface with Security Trigger Manager 1708 in B2B Agent 1706 to accept feature invocation requests and send feature responses.

Figure 18:
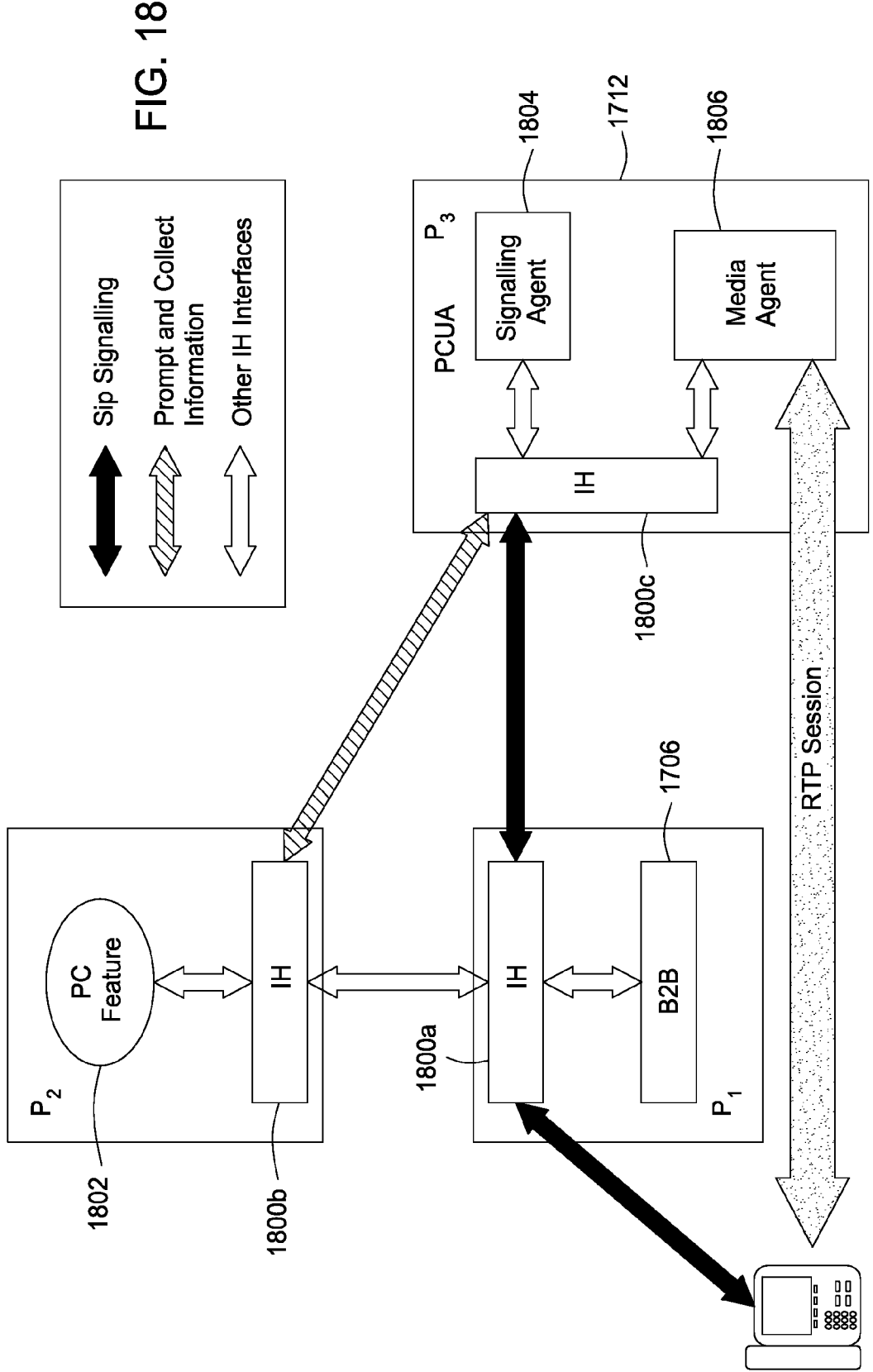
FIG. 18 illustrates the modules and interfacing for the PCUA in accordance with the present invention.

The PCUA 1712 is a proprietary SIP User Agent used by B2B Agent 1706 to terminate suspected calls, identifying legitimate calls, and blocking attack calls. PCUA 1712 will have abilities to play custom prompts, play in-band ring back tones, and collect and forward DTMF digits. The modules ($P_1$, $P_2$ and $P_3$) and interfacing for the PCUA 1712 are shown in FIG. 18. The Interface Handler ("IH") 1800 is a broker for intraprocess and interprocess communications. The Prompt and Collect Feature ("PC Feature") 1802 requests PCUA 1712 for digit collection, analyzes the collected responses from PCUA 1712 and takes actions accordingly and randomly picks the digits for collection. The currently MCD functionality is also integrated with this feature. The PCUA Signaling Agent 1804 receives sip signaling messages from B2B 1706, receives digit collection info messages from PC Feature 1802, maintains sip dialog level state machine for every call and requests Media Agent 1806 to perform one of the following tasks: prompt a message and collect the digits until timeout, do the continuous ringback until further disconnection request, or just prompt a message. In addition the Signaling Agent 1804 sends the collected info back to PC Feature 1802 in the case of a collection, and disconnects the call on disconnect (BYE/CANCEL) from B2B 1706. In the case of just a prompt case, it has to actively disconnect the call.

The Media Agent 1806 creates and binds all available fds for Media, at the beginning itself and never closes any fds, maintains prompt info for all active connections (calls). Writing and reading RTP is done in a single thread and Control operations like maintaining connection and prompt info, communication with signaling agent is done in a separate thread. The write and read Thread wakes up for every 20 ms, writes for all active connections and reads from all active connections, if there is a outstanding packet at fd. In addition, the Media Agent 1806 prompts Info for every connection that contains list of files to be played in order, current Iterator in the list of files that points to current file being played, and a file ptr that points to the next block of bytes that are yet to be played. For an active connection, when it writes 160 bytes of data, it updates the above ptrs and iterators accordingly. In the case of a Prompt and Collect scenario, once it finishes playing all files it starts the timeout timer. It responds back to signaling agent on collecting the specified number of digits or on timeout. In the case of a ringback scenario, it will keep on playing the same file again and again until disconnect (DLCL) request from signaling agent. In the case of just prompting, it plays the file once and closes the connection. For the Prompt and Collect case, feature sends PCUA Signaling Agent 1804 the files to be played in order, digits to be collected, timeout for collecting digits and Call_Id of the call that this information has to be related to. When PCUA Signaling Agent 1804 gets this info, it stores this info and if a call with the given Call_Id already exists, then starts sending request to Media Agent 1806, Otherwise waits for INVITE with the same Call_Id from B2B 1706. For Ringback case, no info from feature is needed, it looks for the special header (for now: PlayBack) in INVITE which looks like with timeout=−1 (PlayBack: <file to be played> <timeout>). If such header exists it sends request to Media Agent 1806 with file and timeout set to −1. For just prompt case, no info from feature and PlayBack Header with timeout=0. If such header exists it sends request to Media Agent 1806 with file and timeout set to −1. It actively disconnects once prompting is done.

Figure 19:
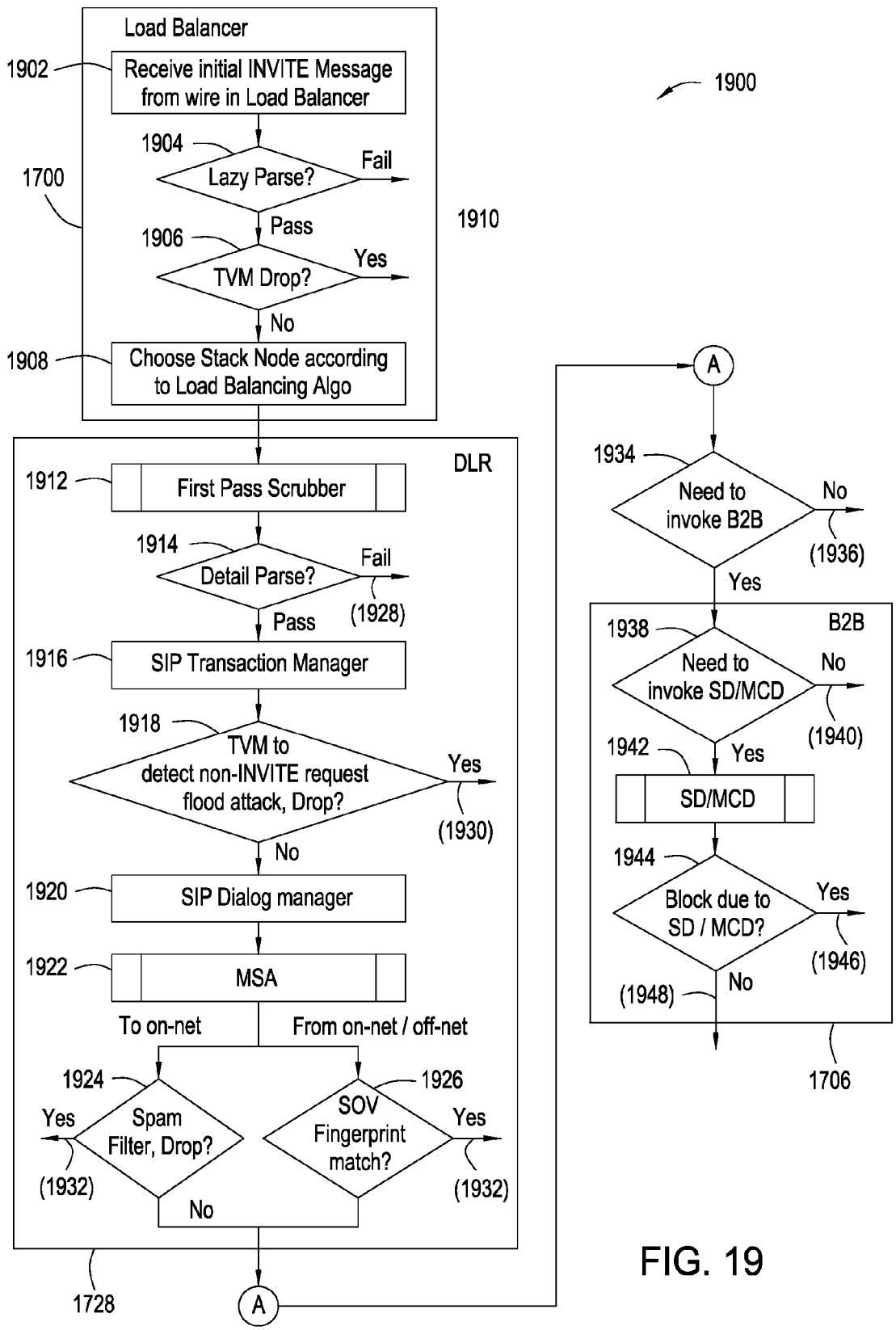
FIG. 19 illustrates a flow diagram for the Ss in accordance with the present invention.

FIG. 19 illustrates a flow diagram 1900 for the Ss 1108 in accordance with the present invention. Ss 1108 functional requirements are broadly classified into two categories: Call processing requirements and Feature Requirements. With respect to call processing requirements, the Ss 1108 is responsible for monitoring all SIP signaling traffic going to and coming from protected Call Server. Unless a particular traffic stream is suspected, it acts as a SIP proxy. For suspected traffic streams it acts as a back-to-back SIP agent terminating all call traffic received on one side and re-originating on the other side. All suspected traffic is processed in the penalty node in clustered architecture.

The Load Balancer 1700 accepts all initial INVITE and CANCEL messages from wire in block 1902. Under non-attack conditions, as determined by decision blocks 1904 and 1906, applies load balancing algorithm in block 1908 to ensure fair distribution of traffic among stack nodes. Under attack conditions, as determined by decision blocks 1904 and 1906, sends suspected traffic to penalty box node (1910) and distributes non-suspected traffic to other stack nodes (block 1908). The Load Balancer 1700 supports hot update of load balancing algorithm, discards all unacceptable non-SIP messages, uses parser library to do lazy parsing (decision block 1904) of raw SIP message, uses TVM 1714 library (decision block 1906) to detect initial INVITE and CANCEL flood D/DoS attacks on secured entity (endpoint/call server) and interacts with TAM 1702 process through TVM 1714 library to detect stealth D/DoS attacks on secured entity (endpoint/call server).

The message is passed from the Load Balancer 1700 to DLR 1728 where a first pass scrubber is used in block 1912. Protocol Scrubber 1722 re-writes, truncates, pads, or reject wrongly formatted messages (1928). The SIP Message Parsing (decision block 1914) enforces RFC 3261 compliance on raw messages, uses efficient storage mechanism to store parsed message (contiguous memory block with offsets), supports lazy and on-demand of raw message, parses each header as one raw line for lazy parsing and parses only requested headers and subfields. In block 1916, SIP Transaction Manager accepts initial INVITE and CANCEL messages from the Load Balancer 1700, accepts all messages in currently active dialogs (except initial INVITE and CANCEL) from wire 1720, complies to IETF RFC 3261, manages SIP Transactions (Ref.: RFC 3261) and reports each SIP message received to TVM 1714 (through API). TVM 1714 detects response flood D/DoS attacks and non-INVITE request flood D/DoS attacks on secured entity in decision block 1918. All responses not related to any transaction are dropped (1930). In block 1920, SIP Dialog Manager maintains knowledge about which calls are in proxy mode and which calls are in B2B mode, uses SIV 1730 to detect spoofed initial INVITE messages (assuming attack model in which attacker only has spoofing capabilities and no other capabilities like sniffing), uses MSA 1732 to analyze the message in block 1922, uses Spam Filter 1748 to apply spam policies based on trust score of the Sender/Sender group and black/white list preferences (decision block 1924), and uses fingerprint checker (SOV 1750) to inspect the message and perform call origin validation (decision block 1926). Messages that fail to pass Spam Filter 1748 and SOV 1750 are dropped (1932).

A determination is made in decision block 1934 to invoke B2B Agent 1706. The message is allowed (1936) if the B2B Agent 1706 is not invoked. B2B Agent 1706 anchors signaling by creating two call legs, one on originating side 1734 and one on terminating side 1736 and uses Security Trigger Manager 1708 to invoke SD 1738 and MCD 1740 features depending on feature invocation criteria. If SD 1738 or MCD 1740 needs to be invoked, as determine in decision block 1938, those features are invoked in block 1942; otherwise, the message is allowed (1940). If the message should be blocked, as determined in decision block 1944, the message is blocked (1946); otherwise, the message is allowed (1948).

Figure 20:
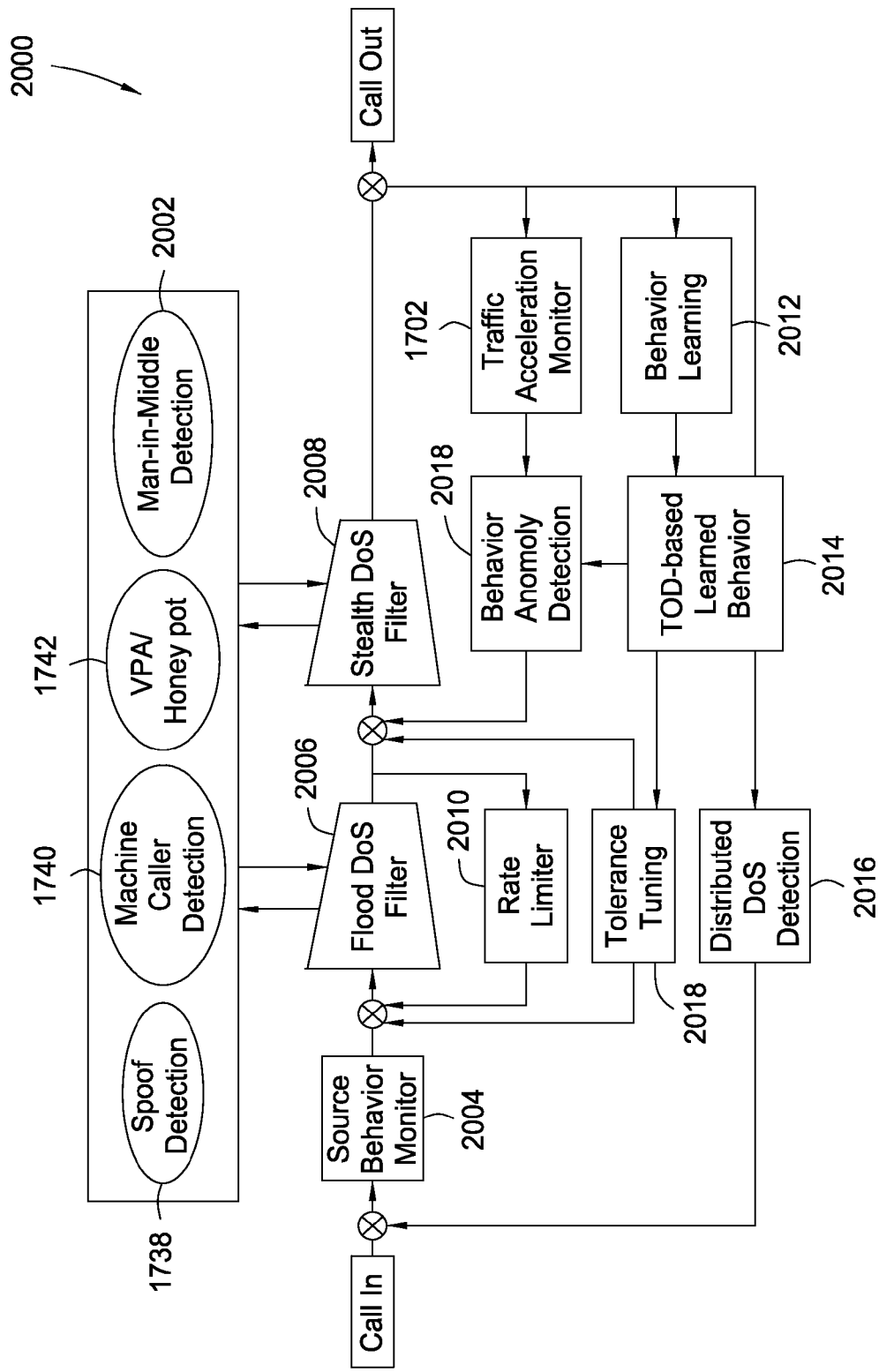
FIG. 20 illustrates a Denial of Service Protection Subsystem in accordance with the present invention.

FIG. 20 illustrates a Denial of Service Protection Subsystem 2000 in accordance with the present invention. The present invention invokes Security Features (Spoof Detection 1738, MCD 1740, VPA 1742 and Man-in-the-Middle Detection 2002) if required to mitigate D/DoS attack by employing offline learning algorithm (Behavior Learning 2012 and TOD-based Learned Behavior 2014) to learn call statistics for different timeslots of the day for each secured entity including endpoints and call servers. Learning statistics should become current if no attack has been detected in the timeslot. The system detects DoS attacks based on protocol message exploitation (TAM 1702 and Behavior Anomaly Detection 2018), detects persistence of abnormal call volume (Flood DoS Filter 2006, Stealth DoS Filter 2008 and Distributed DoS Detection 2016), employs pure rate-limiting (Rate Limiter 2010) if needed, detects and services legitimate calls during DoS attack, generates alerts upon detection of attack, monitors Source behavior 2004, detects and prevents resource exhaustion of call server (tolerance tuning 2018), detects Call-walking, and protects against maliciously formatted messages aimed at exploiting a vulnerability in secured entity.

Figure 21:
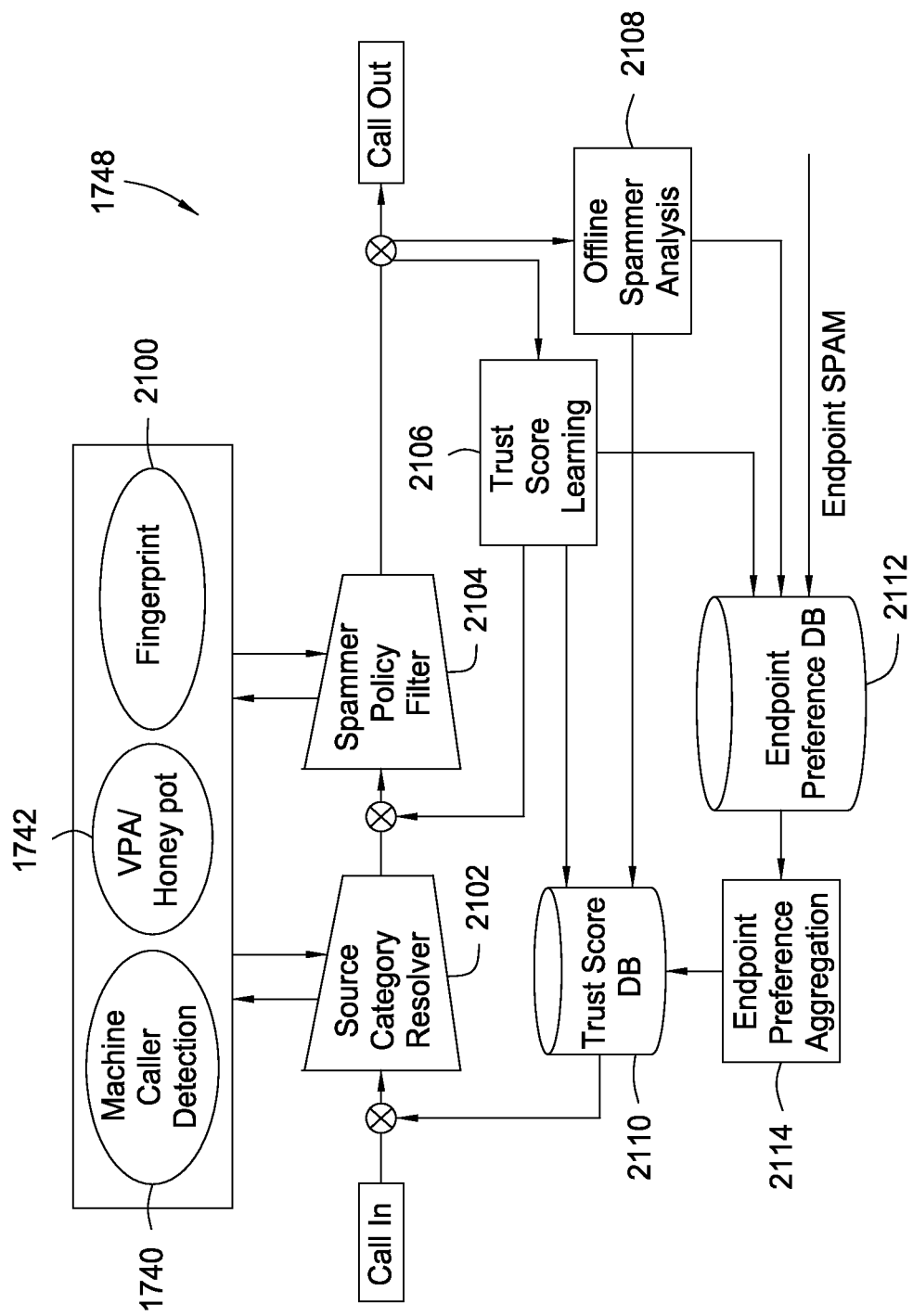
FIG. 21 illustrates a SPAM Filter Subsystem in accordance with the present invention.

FIG. 21 illustrates a SPAM Filter Subsystem 1748 in accordance with the present invention. The present invention invokes Security Features (MCD 1740, VPA 1742 and fingerprint detection 2100) based on determination of a Source Category Resolver 2102 and a Spammer Policy Filter 2104. The subsystem learns trust scores 2106 and provides offline spammer analysis 2108. The subsystem also maintains a trust score database 2110, endpoint preference database 2112 and endpoint preference aggregation 2114.

Figure 22:
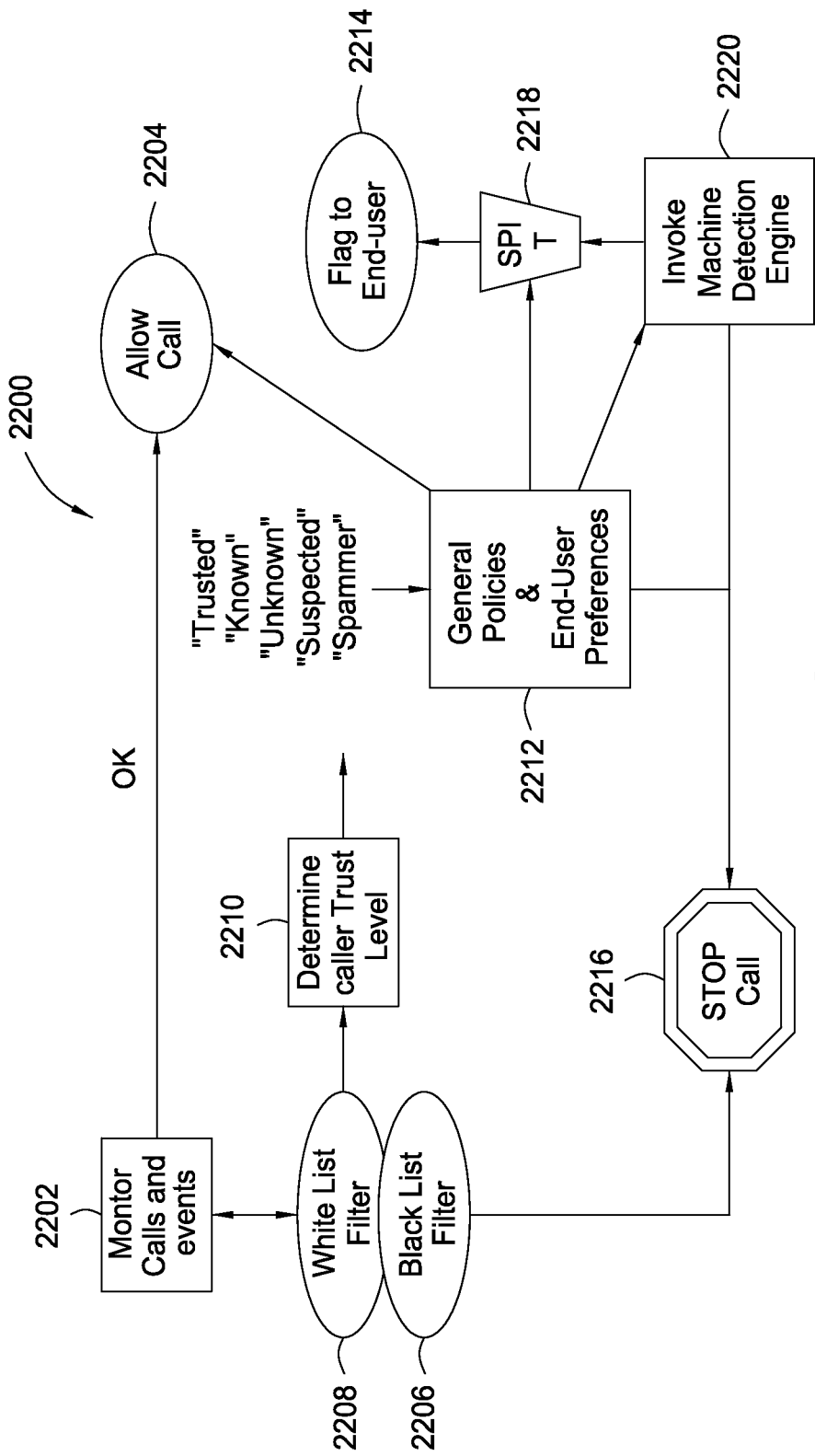
FIG. 22 illustrates the processing flow of the SPAM filter in accordance with the present invention.

FIG. 22 illustrates the processing flow 2200 of the SPAM filter 1748 in accordance with the present invention. The SPAM filter 1748 monitors calls and events 2202 and allows calls 2204 that are determined to be OK. The SPAM filter 1748 maintains Black 2206 and White 2208 lists per subscriber, maintains Black lists per group and maintains global Black list and non-blockable global list, and maintains spam policies per subscriber/group based on time of day. As part of the spam policies, the actions allowed are ALLOW/DENY/VM/MCD/VPA. The Black/White lists will be checked for the caller while applying spam policies for incoming INVITE message. If the caller is found in the Black lists 2206, the call is stopped 2216. If the caller is not found in Black/White lists 2206/2208, the trust score of the caller is determined 2210 while applying the spam policy. Based on current time of day, the configured spam policies of subscriber 2212 are applied for incoming call from Call Server. The SPAM Filter provides a *SPAM & *TRUST feature to the subscribers to push a caller into Black 2206 and White 2208 list respectively. Policies 2212, black 2206 and white 2208 lists are updated by the subscriber using web. Once the caller is categorized (see below), the call is either allowed 2204, stopped 2216, categorized as SPAM (SPIT) 2218 or the MCD is invoked 2220. Moreover, the SPAM filter 1748 raises alerts 2214 if abnormally high number of spam calls and machine calls are detected for a caller.

The User Level Callers list will be maintained for each user and the list remains unchanged unless the user explicitly modifies it. The White List 2208 includes trusted callers and the user adds to the list through a GUI or by dialing *BUDDY. The Black List 2206 includes Spammers and the user adds to the list through a GUI or by dialing *SPAM. The Group Level Callers list also includes a Black List of Spammers in which the administrator adds through a GUI. Similarly, the Enterprise Level Callers list includes a Black List of Spammers in which the administrator adds through a GUI. The Enterprise Level Callers list also includes Non Blocking lists containing a list of domains in which the user cannot move any caller from this domain into his black list. Callers are categorized based on the trust score acquired by caller (on a scale of 0-100):

| | |
|---|---|
| Spammer: | very low trust score (0-20) |
| Suspect Spammer: | low trust score (20-40) |
| Unknown Caller: | medium trust score (40-60) |
| Known Caller: | high trust score (60-80) |
| Trust Caller: | very high trust score (80-100) |

The trust score is calculated 2210 based on the following heuristics in order of priority:
Admin configuration
Decrease the trust score accordingly
Admin should have highest credibility factor and is fixed
*SPAM, *BUDDY
Decrease or increase the trust score respectively
Consider the user's credibility factor
User configuration
Decrease or increase the trust score accordingly
Consider the user's credibility factor
Equation: where 0<α<Max Increment, TS(n)=trust score, CR(u)=credibility of user $$TS(n)=TS(n-1)+\alpha*(CR(u)/100)*TS(n-1)/100,$$
Increase $$TS(n)=TS(n-1)-\alpha*(CR(u)/100)*(100-TS(n-1))/100,$$
Decrease If TS(n)>99, TS(n)=99
If TS(n)<1, TS(n)=1,
TS(0)=50.

The following parameters for incoming and outgoing call patterns are used to detect anomalies in which the caller's trust score is decreased and good behavior in which the caller's trust score is increased. The subsystem designation listed with the parameter indicates where the parameter comes from.

1. No media
2. Calling-to-called party media flow (more media flow from calling party to called party than the opposite direction): Sm
3. Called-to-calling party media flow (more media flow from called party to calling party than the opposite direction): Sm
4. User answers the call: Ss T_ANSWER
5. User hangs up first: Ss T_DISCONNECTED/O_DISCONNECTED
6. Caller hangs up first:
7. Unknown caller: Sv
8. Known caller: Sv
9. Suspect caller: Sv
10. Suspected domain: Sv
11. Unauthenticated caller
12. Same call duration: Ss (call duration)
13. Very small call duration: Ss (call duration)
14. Call blocked: Ss (Spam Module)
15. Machine call blocked: Ss (Spam Module)
16. Call failures from a caller due to protocol errors such as ACK timeout: Ss (Caller Intention Verification Feature)
17. Call failures from a caller due to non-existent extensions (Response 404): Ss (Call Walking Feature)
18. Call in odd hours: Ss (Time of call)
19. Ss (Voicemail calls, O_INVITE/T_INVITE, Time of call)
20. Huge voice mail call duration: Ss
21. Initial prompt from called party and then media flow from calling party to called party
22. Voice mail: (20,5)
23. Rate of calls to voice mail server from a caller (aggregate)

24. Different user calls a caller
25. Same user calls a caller
26. Caller calls a different user
27. Caller calls same user
28. Percentage of calls to a caller
29. Percentage of calls from a caller to a user
30. High frequency of incoming calls from same caller (to different users)
31. Time gap between current and previous incoming call to a user from the same caller Anomalies are detected when a specified series of parameters sequentially exceed defined threshold values. A caller's trust score is decreased when any of the following anomalies are detected. Note that the numbers in the parentheses correspond to the numbered parameters listed above.

(28,4,13,2,5): Percentage of calls from a caller to a user, User answers the call, Very small call duration, Calling-to-called party media flow, User hangs up first—(consider percentage of calls from a caller, otherwise can't distinguish the case where a legitimate caller calls to leave a short message)

(7/9/10, 18, 21): Unknown caller/Suspect caller/Suspect domain, Call in odd hours, Voice mail—(voice mail parameter can be determined using initial prompt, then media in other direction and caller hanging up first)

(7/9/10, 19): Unknown caller/Suspect caller/Suspect domain, Huge voice mail call duration (7/9/10, 28, 12, 21): Unknown caller/Suspect caller/Suspect domain, Percentage of calls from a caller to a user, Same call duration, Voice mail (7/9/10, 28, 21): Unknown caller/Suspect caller/Suspect domain, Percentage of calls from a caller to a user, Voice mail (7/9/10 or 8,29/24, 17): Unknown caller/Suspect caller/Suspect domain or Known caller, High frequency of incoming calls from same caller/Caller calls different user, Call failures from a caller due to non-existent extensions (Response 404) (Call walking)

(29, 4, 13, 3): High frequency of incoming calls from same caller, User answers the call, Very small call duration, Called-to-calling party media flow (more media flow from called party to calling party than the opposite direction), (prank call)

(27, 22): Percentage of calls from a caller to a user, Call failures from a caller due to protocol errors such as ACK timeout (prank call, Invite and 200 OK, no ACK and this is most probably done by some script)

(22): Rate of calls to voice mail server from a caller (aggregate)

(14): Call blocked (15): Machine call blocked

Similarly, good behavior is detected when a specified series of parameters sequentially exceed defined threshold values. A caller's trust score is increased when any of the following good behaviors are detected. Note that the numbers in the parentheses correspond to the numbered parameters listed above.

23: Different user calls a caller—increase trust score

24/27: Same user calls the caller/Percentage of calls to a caller—increase trust score (25, 4, not 12): Caller calls different user, User answers the call, not Small call duration—increase trust score (26, 30, 4, not 12): Caller calls same user, Time gap between current and previous incoming call to a user from the same caller, User answers the call, not Small call durations—increase trust score (high frequency covers the scenario which considers the time gap between calls)

Figure 23:
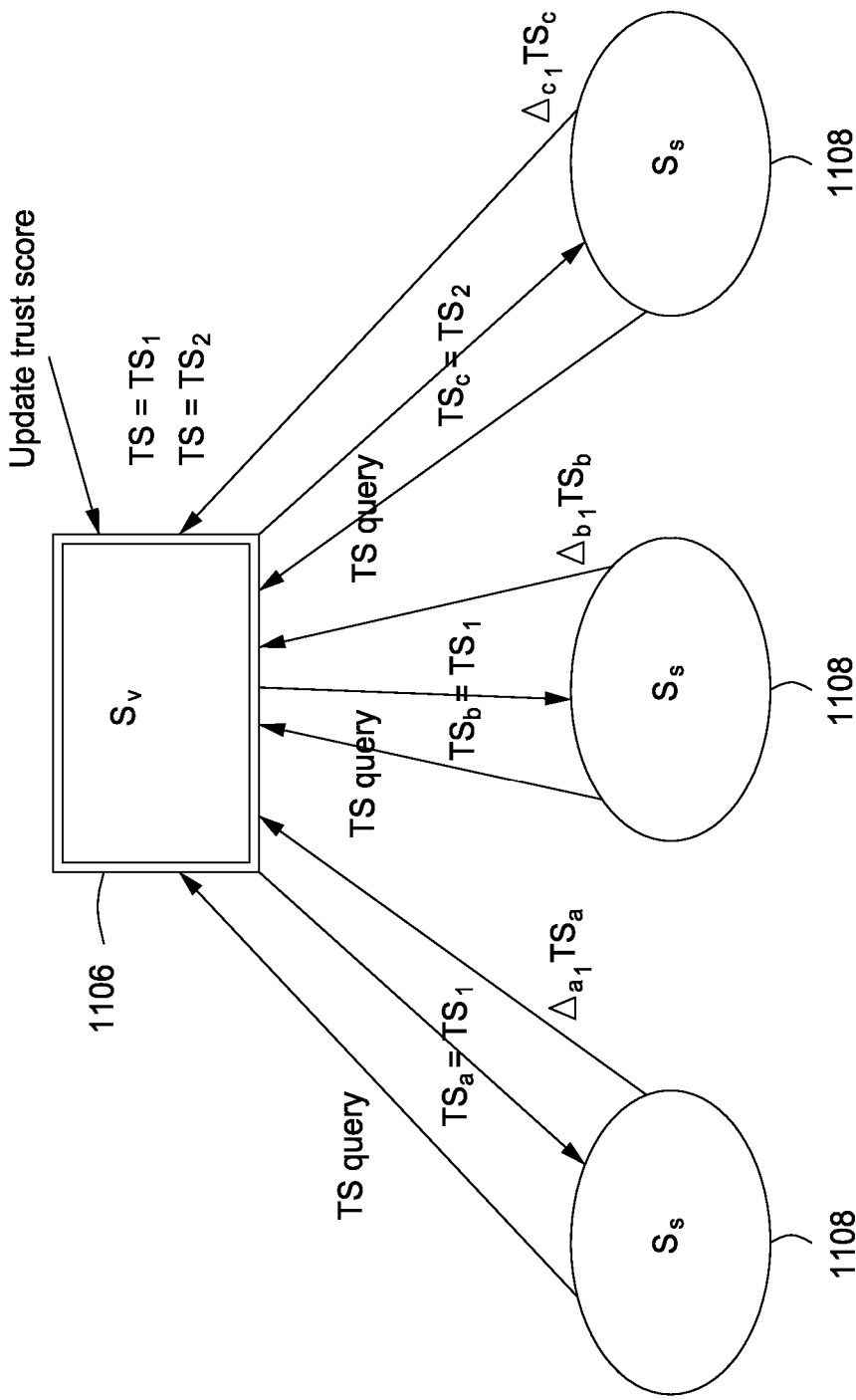
FIG. 23 illustrates how a caller's trust score can be merged and updated in Sv based on trust scores from a number of Ss in accordance with the present invention.

As shown in FIG. 23, a caller's trust score can be merged and updated in Sv 1106 based on trust scores from a number of Ss 1108. As a result, a caller's trust score can be adjusted based on that caller's behavior across a network as opposed to a single called party or Ss.

$TS$=current trust score of the caller $TS = TS + wa*\Delta a + wb*\Delta b + wc*\Delta c$ $Wa = 1 - (|TS - TSa|/TS)$ A credibility score is calculated based on the *SPAM/*TRUST features and/or user configuration. For *SPAM, the credibility score is based on the trust score of the caller, whom the user is specifying. If already the trust score is high, then the credibility should be reduced and vice versa. The Equation is:

$CR(n) = CR(n-1) + \alpha CR*(((TS(\text{init}) - TS(\text{caller}))/100)*CR(n-1)/100$ $CR(n)$=credibility of user, $TS(\text{init})$=baseline trustscore, $0 < \alpha <$ Max Increment For *TRUST, the Equation is:

Equation: $CR(n) = CR(n-1) + \alpha CR*(((TS(\text{caller}) - TS(\text{init}))/100)*CR(n-1)/100$ $CR(n)$=credibility of user, $TS(\text{init})$=baseline trustscore.

The various Callers lists can be periodically flushed of unwanted callers information using LRC (Least Recently Called) mechanism, which can be time based and/or capacity based. The time based equation is based on the trust score and age. If the callers trust score is in the range of medium to high: Decrease the trust score (until the caller becomes unknown caller) if no call has been made within some period of time (as the time goes on, the caller might not be of same trust level). If the callers trust score is in the range of low to medium: Increase the trust score if there is no activity from his side. Slowly, the trust score increases and he becomes unknown caller. The capacity based equation simple removes the least recently called callers from the list.

The Spam filter 1748 also provides legitimate call service assurance by accurately distinguishes between attack traffic and legitimate traffic, processes suspected traffic in the penalty box node, identifies and blocks all traffic with spoofed protocol headers and identifies and blocks all traffic generated by machine dialers by challenging the Sender to enter key code.

The Spam filter 1748 can be enabled or disabled (default) at the system level. Disabled means Spam filter 1748 is not needed for any subscriber. Enabled means Spam filter 1748 is needed for subscribers who have opted-in. The default is opt-out. Forced enable means Spam filter 1748 is needed for ALL subscribers. The default is opt-in. The system supports opt-in/opt-out option at subscriber level. This option is available only when the admin has enabled Spam filter 1748 at system level. If the default is opt-out, then provide opt-in option for subscriber and vice versa. The system applies the default SPAM policy if Spam filter 1748 is enabled at system level, subscriber has opted-in (when default is opt-out) or default is opt-in and subscriber hasn't defined any policy. The system allows maximum N or J % of subscribers if Spam filter 1748 is enabled at system level and default is opt-out, whichever is less, to opt-in for Spam filter 1748. This requirement can be removed if the system is architected to support Spam filter 1748 for all subscribers. A separate thread on the DLR node maintains subscriber related information with hash maps using stored procedures: sp_get_subscriber_groups, sp_get_subscriber_spamtods and sp_get_subscriber_bwlist. The opt-in and opt-out lists are locally maintained at each node. When a call comes for the subscriber the spam filter 1748 is checked to see if it is enabled: on an INV from call server, DlrDao sends a CallSubscriberInfoReqMsg to SubInfoMgr thread and parks the call in Park_For_SbscrInfo state. If the To Uri is not from our domain, then it's a call to off-net domain, so don't invoke SpamFilter. Otherwise, check in the opt-in and opt-out list for the subscriber. If found in opt-out list, then just forward the call to the subscriber (send CallSubscriberInfoRespMsg with false). If found in opt-in list, then apply the subscriber defined spam policy (send CallSubscriberInfoRespMsg with true). If not found in opt-in/opt-out lists, then it's a case of mobile subscriber, so fetch the information from Sems:

- send SemsSubscriberinfoReqMsg to semsserver;
- sends CallSubscriberInfoResp or NoResp to dlr based on resp from semsserver;
- DLR on recving CallSubscriberInfoRespMsg, calls applySpamFilter with the response data;
- On *SPAM/*TRUST from phone, DlrDao sends a NewBWEntryMsg to SubInfoMgr thread and parks the call in Park_For_NewBW state;
- SubInfoMgr thread on recving request: sends SemsNewBWMsg to semsserver. Sends SemsNewBWMsg or SemsNewBWNAck to dlr based on resp from semsserver; and
- DLR on recving NewBWEntryAckMsg, plays the appropriate message by invoking PCUA.

Various data structures are listed below:

```
GroupInfoMap: (hashmap) for groups.
OptInOrOptOutInfoMap : (hashmap) for subscribers
   char* subscriberUri;      // Key
   EntityInfo* mpEntityInfo; // Value: NULL means opted out
class EntityInfo
{
   SubscriberLastCallerInfo* mpLastCallerInfo; // NULL for groups
   EntityInfo* mpGroupInfo;
   list<SpamTodInfo> spamTodInfoList;    // list of tods used in
spampolicies of the subscriber
   SpamPolicyInfo* currSpamPolicy;
   time_t expiryTime;
   set<SubCallerInfo> callerInfoSet; // BlackWhite list
}
class SubscriberLastCallerInfo
{
   char* mpLastCallerUri;
   time_t mLastCallTime;
} Class SubCallerInfo
{
   char* callerUri;
   Category::Type category;
}
Class CallerInfo
{
   char* callerUri;
   int count; // indicates the count of
      // blackwhite lists that contain this callerUri
}
```

Maintain a global set of callerInfo. CallerUri variable in both the classes point to same memory location. And the memory is freed, only when count=0.

```
class SpamPolicyInfo
{
   int spamPolicyId;
   char* spamPolicyName; // Name of spampolicy
   SpamPreference* spamPolicy;
}
Class SpamPreference
{
   enum Type
   {
      BEFOREMCD = 0,
      MACHINECALL,
      NOTMACHINECALL
   };
   SpamAction::Type beforeMcdAction; // General action
   SpamAction::Type machineCallAction; // Machine Caller Action
   SpamAction::Type notMachineCallAction; // Non Machine Caller
Action
}
class SpamTodInfo
{
   int mSpamPolicyId;
   char* todName;
   TodType type; // DAY or DATE
   time_t startDateInSeconds;
   time_t endDateInSeconds;
   time_t startTimeInSeconds;
   time_t endTimeInSeconds;
   char dates[32];
   char days[8];
   char weeks[7];
   char months[13];
   int timeZone;
}
```

This represents the time of day information only if the time of day is being used in a spam policy.

A SPAM Scenario will now be described. Caller caller@unsecured-domain.com calls any of the secured user (nicole@enterprise.com) in the enterprise for first time.

1. Unknown caller: no fingerprint information, no trust score, so we use Ping to recognize the caller
2. Recognizing the caller:
   i. Do ping on From URI, caller@unsecured-domain.com and compare the response with the INVITE
      a. If ping response matches, just perform the user configured action for unknown caller
      b. If ping response doesn't match, then decrease the trust score and treat the call according to user configured suspect caller action, for example, tag the callerid with SUSPECT
3. Then if user dials *SPAM:
   i. If spammer is spoofing From Uri, then do MCD for all future calls till first non-machine call.
   ii. If spammer is not spoofing From Uri, then put the caller in user level black list and decrease the trust score of the caller.
4. If user just accepts the call, then increase the trust score based on call duration.
5. What if a machine caller spoofs another machine caller?
6. What if a human caller spoofs another human caller? Then MCD fails and every time the call is forwarded to end user.
7. If From Uri is spoofed, should the spoofed list be maintained on from URI or contact?

Another SPAM Scenario will now be described. Caller caller@unsecured-domain.com calls nicole@enterprise.com 1. Caller Information: fingerprint, trust score
2. Recognizing the caller
   i. Do fingerprinting with current INVITE
   ii. If failure, ping on From Uri
      a. If ping response matches, append fingerprint and perform user configured known/trust action and also increase the trust score of caller@unsecured-domain.com.

b. If ping response fails, that is, the spammer is spoofing his From URI to be nicole@enterprise.com, then treat the call according to user configured suspect caller action, for example, tag the callerid with SUSPECT and decrease the trust score of caller@unsecured-domain.com.

iii. If success, just perform user configured known/trust action a. If *SPAM by user, then prompt the user and if user says NO, then suspect buddy phone is compromised and do MCD for all future calls. Put caller@unsecured-domain.com in the nicole's black list and decrease the trust score.

b. If no action by user, then increase the trust score of caller@unsecured-domain.com based on the call duration.

Some other scenarios include a phone in a highly trusted domain is compromised and automated scripts deliver a fixed message. In such a case, the call is handled by 2.iii.a above. A Spammer spoofs URI from a user's buddy list and delivers the message himself. In this case, the call is handled by 2.ii.b. above. A Caller with high trust score moves to a different location or uses a different phone. These cases are handled by 2.i.a. above. A Spammer calls periodically and leaves a VM. In this case, compare with the learned behavior of VM calls to the user and if abnormal, then decrease the trust score for each voice mail delivered by spammer.

Figure 24:
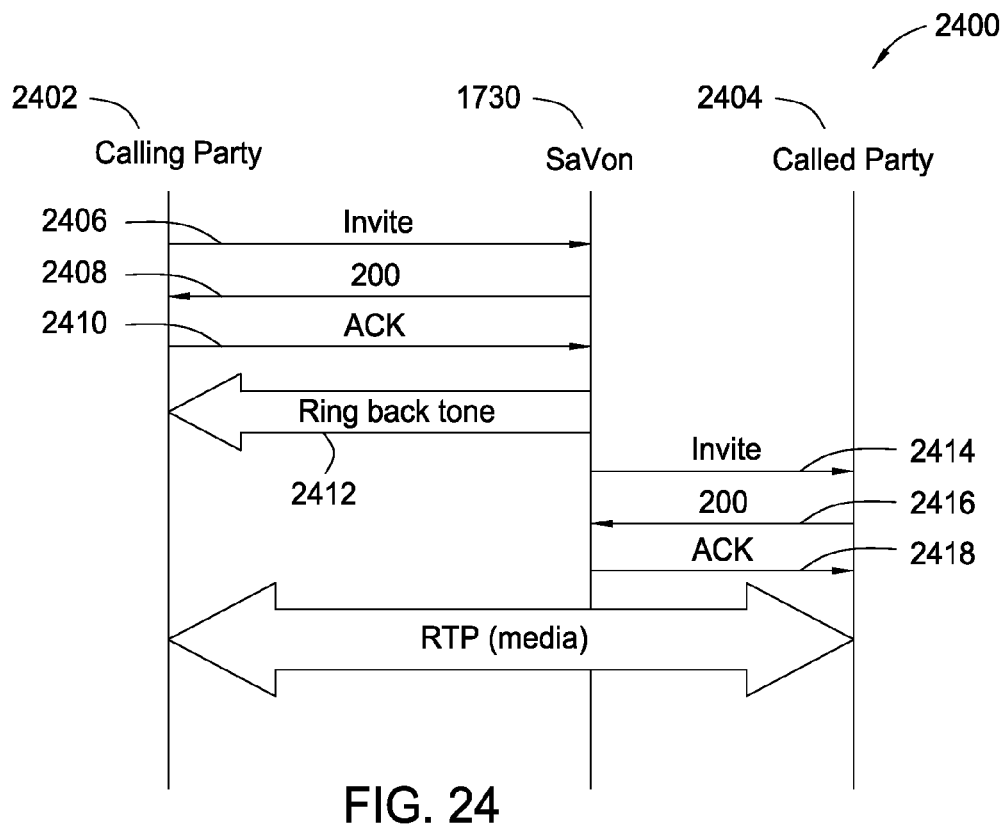
FIG. 24 illustrates the SIV Call Flow in accordance with the present invention.

The Sender Intention Validation ("SIV") 1730 verifies whether the calling party intends to set us a dialog or not and forwards the call only after the call dialog is set up. The SIV 1730 sets up intermediate dialog on behalf of the called party and forwards the successful dialog to the called party. FIG. 24 illustrates the SIV Call Flow 2400 in accordance with the present invention. An initial INVITE message 2406 is received from the Calling Party 2402. The SIV 1730 calculates hash on SIP message header fields and a secret value, appends necessary SDP information to the hash to get a tag, inserts the tag in the To header field of the 200 OK SIP message 2408 as a response to the initial INVITE message 2406 from the Sender 2402 (DLR sends this 200 OK as a challenge to the Sender), receives the SIP ACK message 2410 from DLR and verifies the hash in the To header tag, drops and logs the ACK message 2410 if hash is not verified and creates session context in the CONNECTED state from the ACK header fields and appended SDP parameters in the To tag. If the hash is verified, a ringback tone 2412 is provided and an INVITE message 2414 is sent to the Called Party 2404, a 200 OK SIP message 2416 is received and a SIP ACK message 2418 is sent to the Called Party 2404.

Figure 25A:
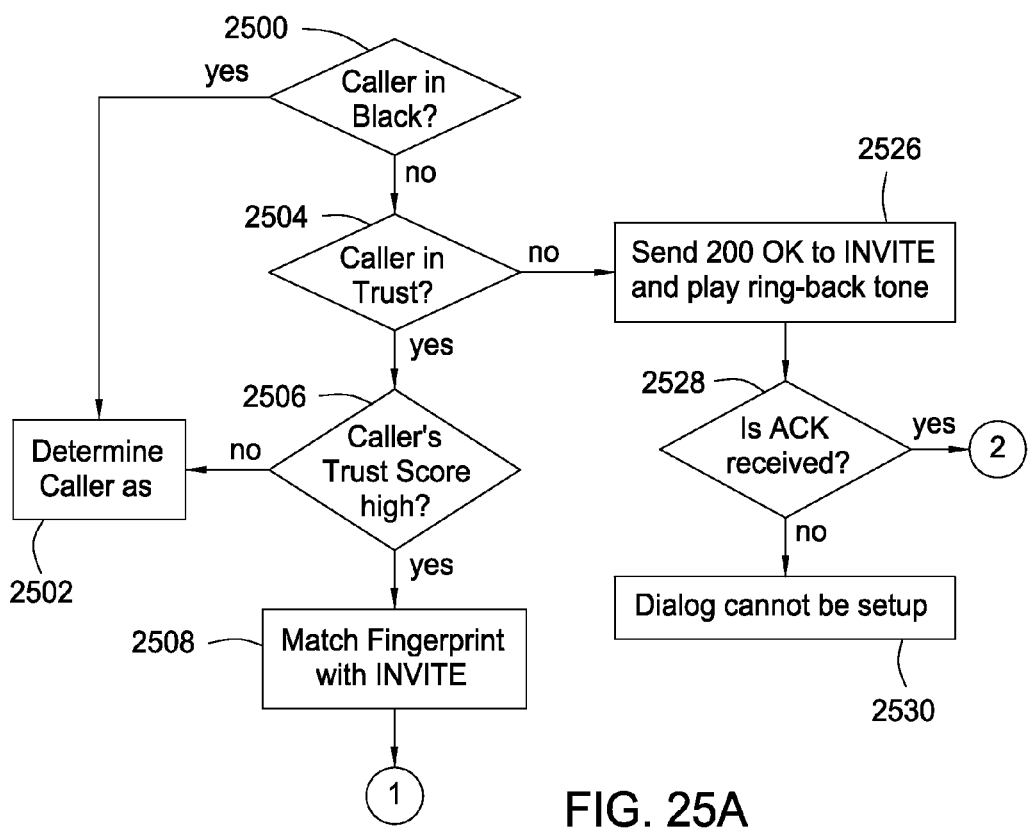
FIGS. 25A, 25B and 25C illustrate the SOV process in accordance with the present invention.
Figure 25B:
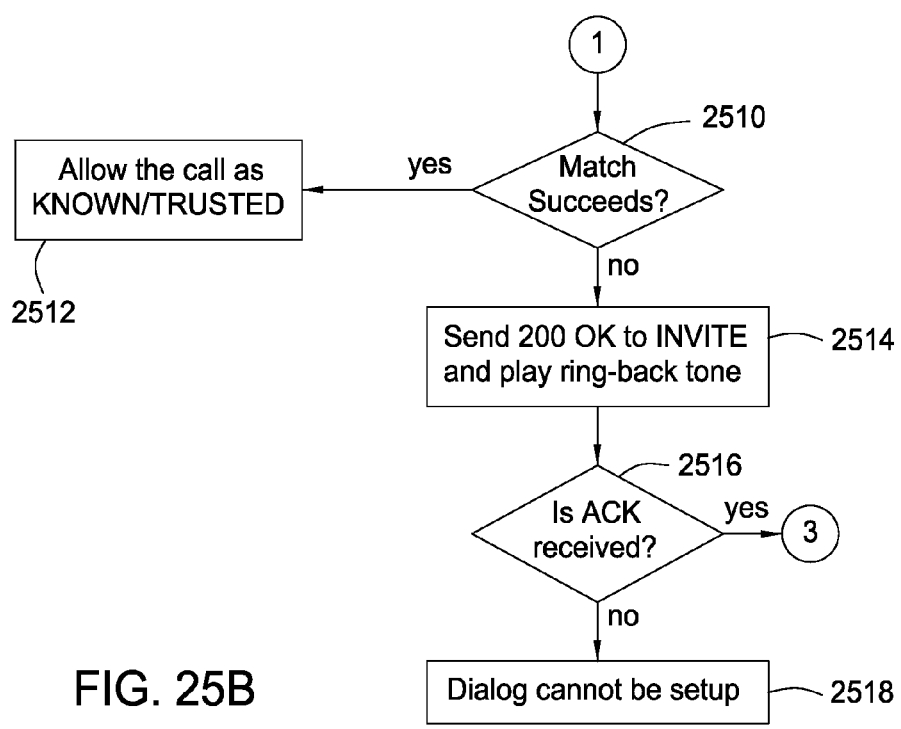
Figure 25C:
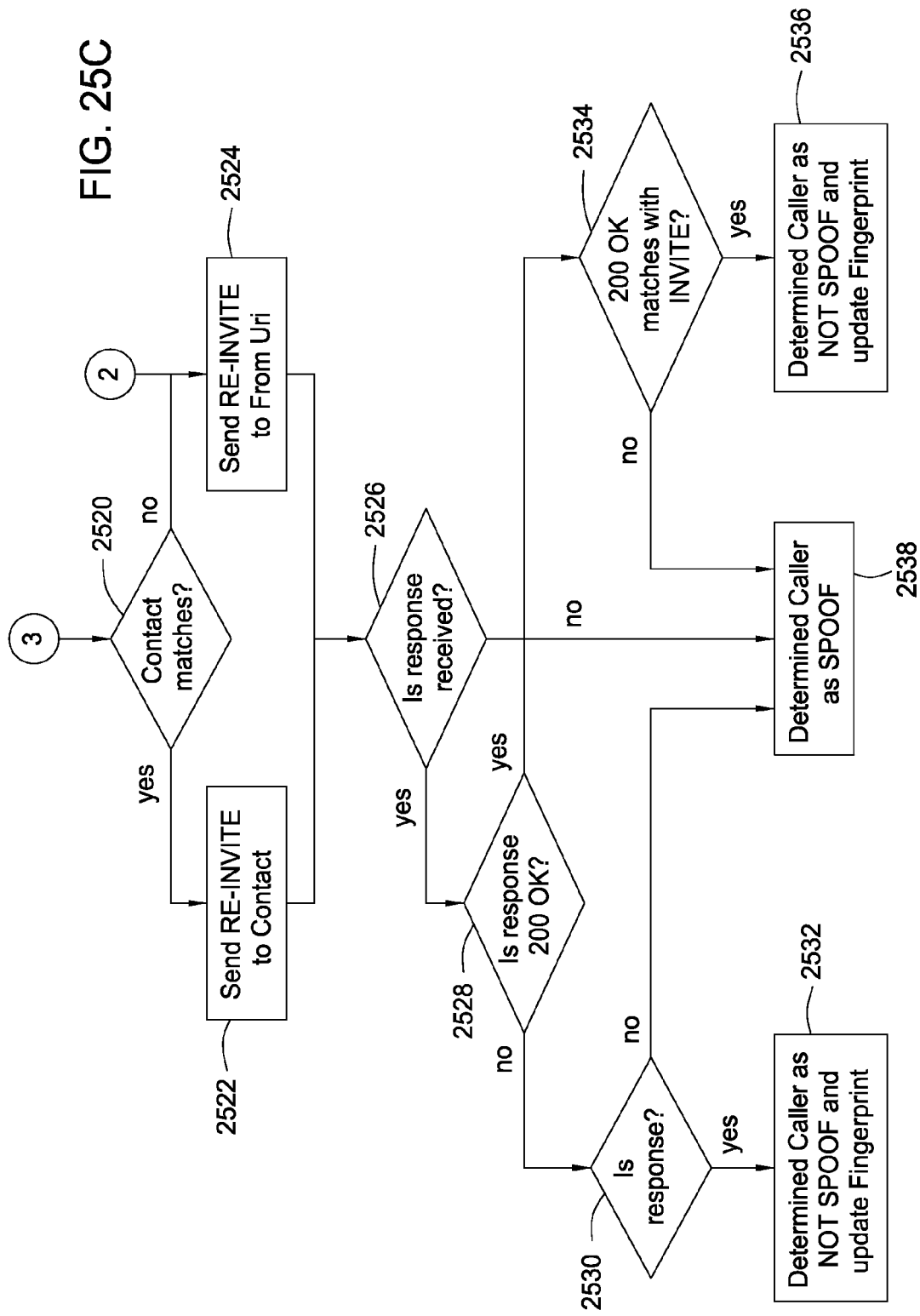

When a caller tries to spoof From URI (to indicate he is someone else), the Session Origin Validation ("SOV") 1750 maintains fingerprint information of previously seen callers and matches the fingerprint information with the incoming INVITE message to determine if it is a legitimate caller or spoofed caller. FIGS. 25A, 25B and 25C illustrate the SOV process in accordance with the present invention. If a previous fingerprint is unavailable or the fingerprint match fails and the contact header field matches, then RE-INVITE message is sent to the contact. If fingerprint match fails and the contact header field does not match, then RE-INVITE message is sent to the FROM URI. If 491 response is received, then the caller is determined as not spoof. If 200 OK response is received and it matches with the initial INVITE, then the caller is determined as not spoof and the fingerprint of the caller is updated. Otherwise, the caller is determined as SPOOF.

More specifically, if the Caller is in the Black List, as determined in decision block 2500, the Caller is determined to be SPOOF in block 2502. If the Caller is in Trust, as determined in decision block 2504 and the Caller's Trust Score is not high, as determined in decision block 2506, the Caller is determined to be SPOOF in block 2502. If, however, the Caller's Trust Score is high, as determined in decision block 2506, the INVITE is compared to stored fingerprints in block 2508. If the match succeeds, as determined in decision block 2510, the call is allowed because the Caller is known/trusted in block 2512. If the match does not succeed, as determined in decision block 2510, a 200 OK message is sent to INVITE and a ringback tone is played in block 2514. If an ACK is not received, as determined in decision block 2516, the dialog cannot be set up in block 2518. If the ACK is received, as determined in decision block 2516, and the contact matches, as determined in decision block 2520, a RE-INVITE message is sent to Contact in block 2522. If the contact does not match, as determined in decision block 2520, a RE-INVITE is sent from URI in block 2524. If the Caller is not in Trust, as determined in decision block 2504, a 200 OK message is sent and a ringback tone is played in block 2526. If an ACK is not received, as determined in decision block 2528, the dialog cannot be set up in block 2530. If the ACK is received, as determined in decision block 2528, a RE-INVITE message is sent from URI in block 2524. After the RE-INVITE message has been sent, if a response is received, as determined in decision block 2526, and the response is not 200 OK, as determined in decision block 2528 and the response is valid, as determined in decision block 2530, the Caller is determined as NOT SPOOF and the fingerprint is updated in block 2532. If the response is 200 OK, as determined in decision block 2528, and the 200 OK matches with INVITE, as determined in decision block 2534, the Caller is determined as NOT SPOOF and the fingerprint is updated in block 2536. If the response is not received, as determined in decision block 2526, or the response is not valid, as determined in decision block 2530, or the 200 OK does not match with INVITE, as determined in decision block 2534, the Caller is determined as SPOOF in block 2538.

The relevant Fingerprint fields are From, Zeroth Order, First Order and Second Order. The From field is the field spammer will try to spoof (to indicate he is someone else). Assuming fingerprint available (buddy list) or doing ping for unknown caller we can compare several parameters to increase our suspicion level:

Zeroth Order
    Via List only up to last proxy
First Order (Used for attacks when spammer is not sitting behind the same NAT/B2B/Proxy)
    General
        Sum of Call Independent Header Size, Number of headers, Order of headers
    Contact
        Where attacker wants to receive requests in dialog
        Maybe Changed By B2B
    Via List/Record route
        List of Proxies, order, number names in the path
        Is appended to by proxies along the path
Second Order (To identify SIP stack/UA manufacturer)
    First order detailed comparison
    Consider parameters in all headers
    SDP (not really SIP Header)
        Media Capabilities, Size, Values, Attributes
        IP Maybe changed by NAT/Firewall Traversal
    Request Uri
        Scheme (sip/sips/tel)

From
   tag length, uri, display name
CallId
   Length, IPAddress/Domain
Cseq
   New Request may start with same number
Max Forwards
   Usually fixed on phone
   Decremented at each proxy
User-Agent
   May contain phone type manufacturer
Allow
   Contains method supported indicator/order
   Hashing on white spacing and structure of message which may be able to identify stack.

VoIP headers are more difficult to spoof than e-mail because there are no responses coming back for the e-mail. A SIP transaction consists of requests (INVITE, etc.), responses (180, 200, etc.). The responses are routed back based on the Via header field at the top of the Via list. If Via is spoofed then the transaction would not complete. A SIP dialog may consist of several transactions. All new transaction requests are sent to the Contact header field. If spoofed, the dialog will fail. It is difficult for a spammer to spoof these fields. As a result it is easy for the system to detect whether or not these fields are spoofed.

Spammers can launch other VoIP attacks. For example, if a Spammer is sitting behind NAT, as the user he is trying to impersonate, the real Contact information may be lost. If a Spammer is sitting in the same domain or behind same B2BUA, as the user he is trying to impersonate, the real Contact and Via information will be lost (B2BUA has two dialogs for each call leg). Another possibility is compromising the user's phone. Yet another possibility is Man-in-the-Middle attacks or Hijacking attacks in which case the attacker can intercept and modify packets. These attacks are more complicated and less likely to be profitable for spammers who want to send spam to millions and millions of user because sniffing and hijacking millions of sessions will be expensive and sitting in enterprises may be difficult since the phones in enterprises may be authenticated and such activity maybe caught.

Figure 26:
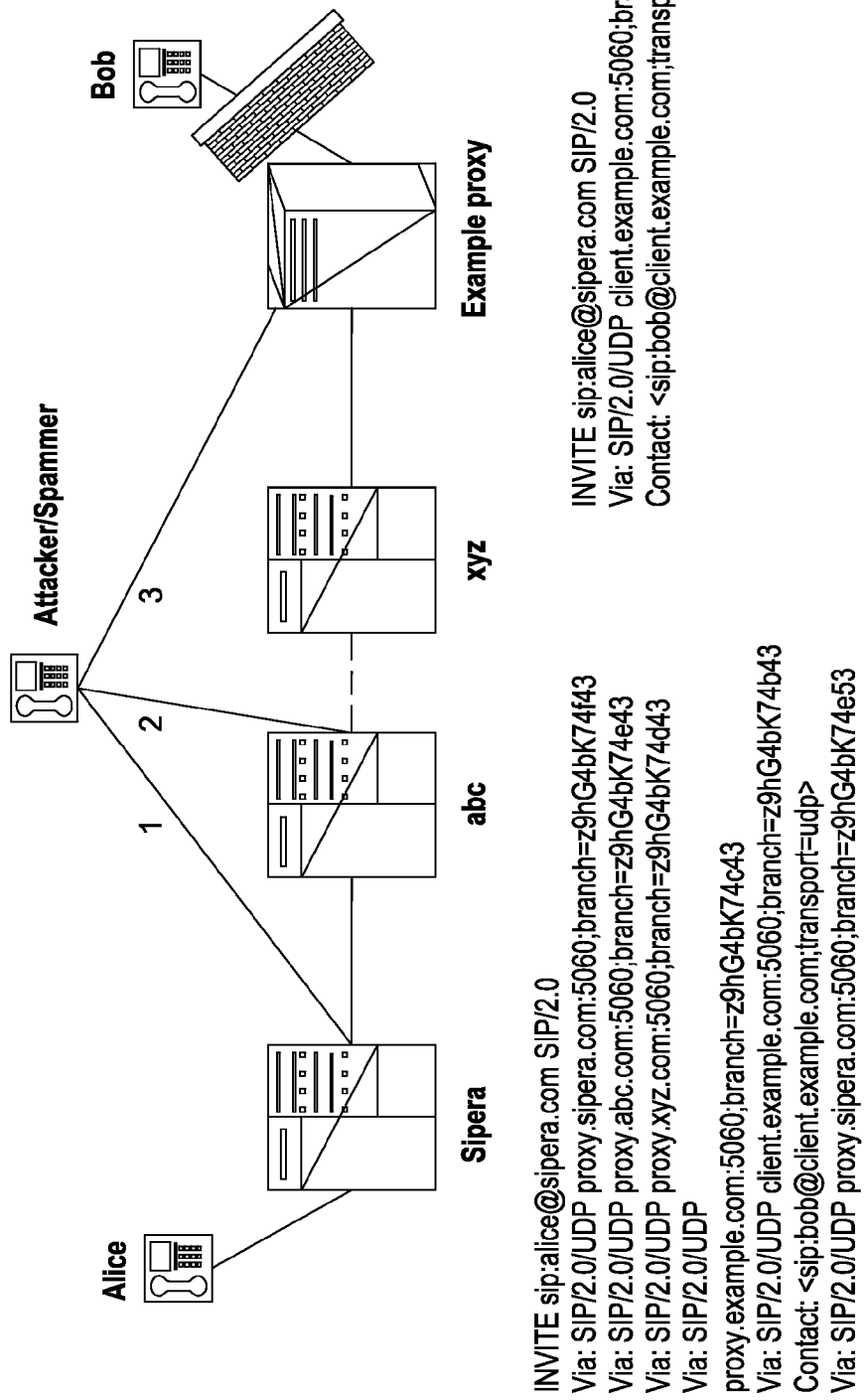
FIG. 26 illustrates several Spammer attack scenarios.

Now referring to FIG. 26, several Spammer attack scenarios are illustrated. In the case of proxy scenarios, the Via and Contact can be verified and validated to identify attacker as these are not changed by proxy (i.e., first order is sufficient). This is the same for B2B scenario 1 and 2. In case 3 for B2B or NAT, where Via and/or Contact information may be lost, Second order is also required. When a ping is done for unknown caller, a user can configure MCD or PING filtering. When a ping is done for known/trusted caller ping can be done based on fingerprint suspicion level. A ping is done before updating TRUST score. If ping failed and caller was determined to be valid (possibly the user moved/multiple phones), the fingerprint can be appended and compared on subsequent calls from same caller. OPTIONS is sent to the From field of INVITE request. Response is compared with original INVITE. Since OPTIONS does not have all fields in INVITE the certainty may be less, it can be done at any time as this is independent of dialog (maybe blocked by firewall though). This is done mainly to From Header as significance of Contact is not beyond the dialog. Send the 200 OK to INVITE and start playing in-band ring back tone. If only Via List doesn't match, then send REINVITE to the contact URI of INVITE. If Via List and contact both don't match fingerprint, then send REINVITE to from-uri of INVITE. If we get response other than 200, INVITE is with high probability a spoofed one. If we get 200 OK then we do fingerprint with this response. If fingerprint fails then INVITE is with high probability a spoofed one (Some phones are unable to distinguish INVITE and REINVITE). If determined a spoofed one, actions are taken based on user configuration. This method's advantage is most of the spoofed calls can be suspected within the dialog as soon as we see response. The difficulty with this method is machine calls may have clippings. The system is scalable for Domain/Proxy IP address, User Level Focus, LRU, Normal Size and Hashing. With respect to the Domain/Proxy IP address, initially data is kept for domain/last proxy IP address, Via list (excluding last entry), Most spammer scenario 1,2 can be caught by this information, and when scenario 3 spammers start occurring in a particular domain, the granularity for the domain can be increased. With respect to User Level Focus, for users initially we keep first order and Too Many False positives start using second order. The LRU is fixed on number of records (configurable number). With respect to Normal Size, Via List (few 100 bytes), other headers combined (few 100 bytes), SDP (few 100 bytes) and Total ~2 KB. With respect to Hashing, since we don't really need the values but only need with some probability if certain values match, this is a good way to reduce our storage. A modified form of Bloom Filters (other algorithms) can be used. The size of a fingerprint is reduced from 2 KB to 100 B. For example, for 10K Users, 2K domains, 1 M Callers Finger Print Memory Requirement:

With no hashed compression:
      Storage required: 1 M*2 KB=2 GB
      Domain level granularity with (100 domains under suspicion each with 100 callers)—Storage required: 2K*2 KB+100*100*2 KB=24 MB
   With hashed compression
      Storage required: 1 M*100 B=100 MB
      Domain level granularity with (100 domains under suspicion each with 100 callers)—Storage Required: 2K*100 B+100*100*100 B=1.2 MB.

The design of the fingerprint will now be discussed. The fingerprints are represented by connectivity matrix:

Conn[i][j]=connectedToProxy:
   where: i represents the proxy id
      j represents the connection number
      connectedToProxy represents the proxy id which is connected to proxy with id i For example, conn[2][0]=5, means proxy 2 is connected to proxy 5. Hash map <char* or hash value of proxy, index into conn array>.

Figure 27:
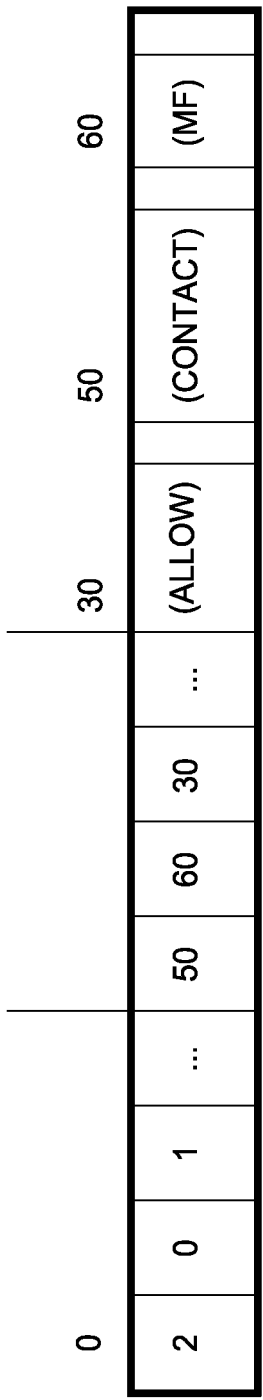
FIG. 27 illustrates fpval[ ] in accordance with the present invention.

Search: (when an INVITE is received)
      Get each entry in via list (except the last entry)
      Search in hash map and get the index into conn array
      Search next entry in hash map and get its index and search in connection list of previous step
   Insert: (For a new caller or when fingerprint changes)
      Get two successive entries from via list starting from the beginning (except the last entry)
      Search in hash map
         If both of them are present, then check for the connection between them
         If only one of them is present, then insert the other one and establish the connection between them
         Otherwise, insert both of them into hash map and conn array and establish the connection between them Periodically, dump the conn array and hash map data into a file. Assuming, 1000 proxies and 10 connections per proxy:

Conn[1024][10]: 10000*2=20000 bytes
   Hash map: 1000*(4+2)=6000 bytes (if hash is used)

enum {CONTACT=0, MF, ALLOW, SUPPORTED, ... }
fpval[ ]: (See FIG. 27)
NumOfHdrs=number of headers that FP module is keeping track of.
TotalNumOfHdrs=fpval[0]: total headers in SIP msg
Order header: fpval[1] to fpval[TotalNumOfHdrs]
Offset header: fpval[TotalNumOfHdrs+1] to fpval[TotalNumOfHdrs+numOfHdrs]
FP data: from fpval[TotalNumOfHdrs+numOfHdrs+1] and in the same order as Order header
Offset=fpval[fpval[0]+TotalNumOfHdrs]
fpval[offset] gives the fingerprint value for that header (ALLOW in this case)
Fingerprint match:
Check the total number of hdrs in sip_msg with fpVal[0]
Check the order

```
for i = 1 to TotalNumOfHdrs
    hdr = get_sip_msg_hdr(fpval[i])
    If (hdr != fpval[i])
        FP match failed and break;
    If (fpval[i] < MAX_FP_HEADERS && fpVal[i] > FP_HEADER_START )
        Offset = fpval[TotalNumOfHdrs + fpval[i]]
        If (fpval[offset] == hashvalue(extractedHeader)) then success
```

Number of comparisons:
    For Order check: TotalNumOfHeaders
    For Value check: 2*numOfHdrs
    For success condition: TotalNumOfHeaders+numOfHdrs
    For failure condition: on avg (TotalNumOfHeaders+numOfHdrs)/2
    Good when the number of failures are comparatively equal to the successes
Generating the fingerprint:
Sort the header indices from sip msg and store in Order hdr
Extract the values from sip msg and start storing in FP data part of array in the same order as Order header. Also fill the Offset header.
Memory:
For each fingerprint
    8 headers
        50+8 bytes for header info (Order and Offset)
        32 bytes for FP data
For each caller,
    fpval[128]: 128 bytes
For 1 million callers and 2 fingerprints per caller: 256 MB
multimap<caller,fpval>
Periodically dump caller URI and fpval[ ] to file
While matching fingerprint, generate the whole information and do bitwise AND to match. For this, we can add Presence header and remove Offset header from previously defined header field.
    Logic:
    For each hdr in SIP msg (in order)
        If hdr==hdrEnum (hdr we keep track of)
            Set appropriate bit in Presence header part
            Insert the value into the data part
            Set appropriate bit in Order header part
    If (constructed fpval & store fpval) then success else fail
    Number of comparisons: TotalNumOfHdrs+1
    Good when the number of successes are more compared to failures
Optimization in case of more failures compared to success: to consider Order check separately Memory:
For each fingerprint
    8 headers
        4+4 bytes for header info (Presence & Order)
        32 bytes for FP data
For each caller,
    fpval[128]: 128 bytes
For 1 million callers and 2 fingerprints per caller: 256 MB
multimap<caller,fpval>
Periodically dump caller URI and fpval[ ] to file.

The TVM 1714 maintains counts of each message received by each secured entity, detects INVITE flood, CANCEL flood, non-INVITE request flood, and response flood on secured endpoint, detects more than threshold number of new requests sent to call server, reports detection of flood attack to TAM 1702, adds security headers in the SIP messages corresponding to which feature needs to be invoked (SD/MCD) and detects call-walking (attempt to gather information about presence of SIP endpoints by application-level scanning the network) from a source.

The TAM 1702 distinguishes four streams: On-net to Call server (Traffic received from on-net and to be forwarded to the Call server); Off-net to Call server (Traffic received from off-net and to be forwarded to the Call server); Call server to on-net (Traffic received from the Call server and to be forwarded on-net); and Call server to off-net (Traffic received from the Call server and to be forwarded off-net). The TAM 1702 also monitors capacity usage of call server, monitors capacity usage growth rate of call server, uses configured values to apply stealth D/DoS detection algorithm on the traffic streams, issues commands to TVM 1714 to invoke response against the suspected traffic stream, accepts feedback from security features (SD/MCD) to measure success of filtering invoked, changes the response if current response is measured to be useless against ongoing attack, generates alerts upon detection of stealth D/DoS attack on secured entity (alert is sent to Intelligence subsystem), and generates alerts upon notification from TVM 1714 about detection of flood D/DoS attack on secured entity.

The Message Sequence Analyzer ("MSA") loads anomaly chain definitions and event definitions from configuration database, accepts SIP message event notifications from DLR (API call), and maps each event definition to SIP message contents by extracting appropriate fields from the message. When an event is reported, the MSA determines which anomaly chains to activate. The MSA also maintains records for activated chains per dialog and next expected event, deactivates all chains whose next event different than the one that is reported, deactivates all entries whose timeout has occurred, ignores reported event if it has occurred too early, sets a timer if next event in the chain is timeout event, cleans up all stale entries from the per-dialog tables (stale entries are those whose next event occurrence timeout has expired) and increments corresponding anomaly counter when chain is satisfied.

The various events are listed below:

|  | From n/w To any | From n/w To B2B | From B2B To any | From B2B To CS | From CS To any | From CS To B2B | From B2B To n/w |
| --- | --- | --- | --- | --- | --- | --- | --- |
| INVITE | X |  | X |  | X |  | X |
| ACK | X |  |  |  |  |  |  |
| BYE | X |  | X |  | X |  |  |
| CANCEL | X |  |  |  |  |  |  |
| OPTIONS |  |  |  |  |  |  |  |
| REGISTER |  |  |  |  |  |  |  |
| 1xx (Provisional) |  |  |  |  |  |  |  |

-continued

| | From n/w To any | From n/w To B2B | From B2B To any | From B2B To CS | From CS To any | From CS To B2B | From B2B To n/w |
|---|---|---|---|---|---|---|---|
| 200 OK (Success) | X | | X | | X | | |
| 3xx (Redirection) | | X | | | | | |
| 4xx (Failure) | | X | | | | | |

The various Application Program Interfaces are:

| Module | Interface | Used by |
|---|---|---|
| Scrubber | int scrub(int passNumber, SipMessage* msg) | DLR |
| TVM | int applyDoSFilter(SipMessage* msg) | Load Balancer, SIP Transaction Controller |
| SIV | int calculateHashedTag(SipMessage *msg, char *totag) int verifyAck(SipMessage *Ack, SipMessage *invite) | DLR |
| MSA | int processEvent(MSAEvent *evt) | DLR |
| SPAM | int applySpamFilter(SipMessage *invite, double trustscore) | DLR |
| Fingerprint | double checkFingerPrint(FingerPrint *fp, SipMessage *msg, std::list<Field> reqVector, std::list<Field>& resultVector) | DLR |
| Parser | Int lazyParse(char *msg, SipMessage *parsedMsg) int parse(SipMessage *msg, std::list<Hdr> reqVector) | Load Balancer, SIP Stack |

All messages between threads, processes, and subsystems are passed using Interface Handler.

| Process | Events/msgs | From | To |
|---|---|---|---|
| LoadBalancer | Sip Raw Msg tam Event | Transport TAM | Main Thread TVM |
| TAM | tvm Event | TVM | tcpRecv Thread |
| DLR | SipEvent TSRespEvent Si, Sm, Su Event | LoadBalancer TSM Ih | Main Thread Main Thread Main Thread |
| TSM | TSReqEvent Sv Event | AnyModule Ih | Main Thread Main Thread |
| B2B | SipEvent FeatureEvent | DLR FeatureSvr | CC Thread ftrClnt |
| FeatureSvr | FeatureEvent | B2B | featuresvr Thread |

Figure 28:
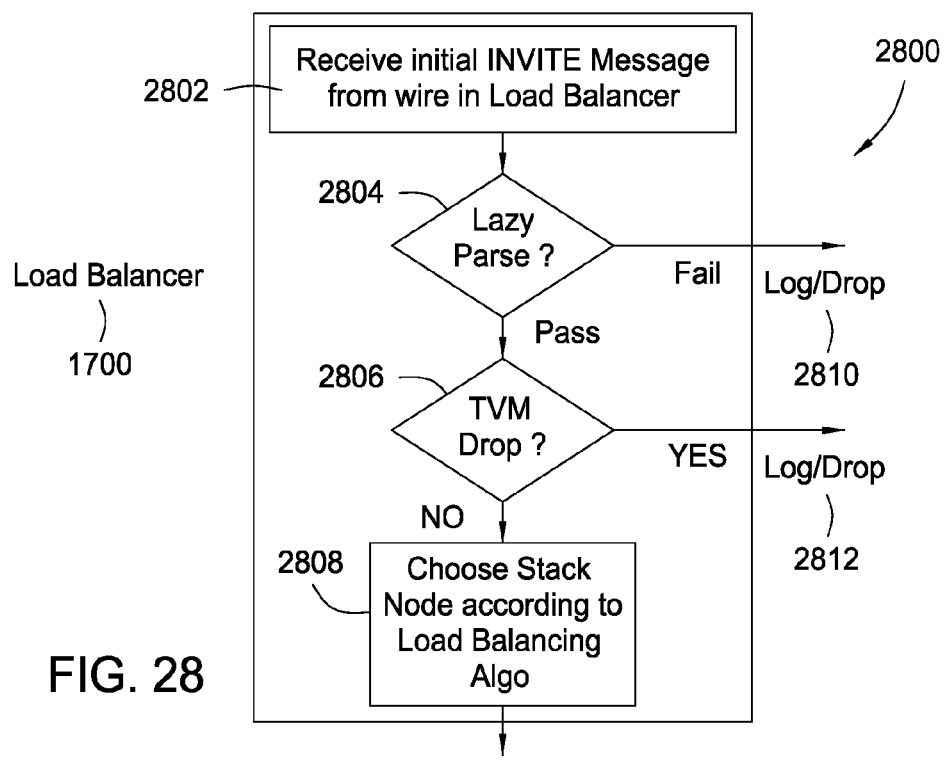
FIG. 28 illustrates a Load Balancer Flow Diagram in accordance with the present invention.

Now referring to FIG. 28, a Load Balancer Flow Diagram 2800 in accordance with the present invention is shown. Under a normal load distribution, the TVM 1714 in the Load Balancer 1700 will be listening to the Sip published port (like 5060) in block 2802. For the calls (initial INVITEs) from/to the network, TVM 1714 based on the Source and destination updates TVM 1714 stats and adds security headers to the INVITE message. Based on the load distribution algorithm, the Load Balancer 1700 will forward the message to stack node based on the security headers and the direction of the call in block 2808. Calls that fail the lazy parse in decision block 2804 will be dropped of forwarded to the penalty box (2810) (a stack node designated as the penalty box node). All the TVM 1714 suspected calls in decision block 2806 will be dropped or forwarded to the penalty box (2812). Under normal conditions all the calls are uniformly distributed. CANCEL may come to the Load balancing node. TVM 1714 will update the CANCEL stats, and it will forward the CANCEL to all the stack nodes that handle the calls in that direction.

Figure 29:
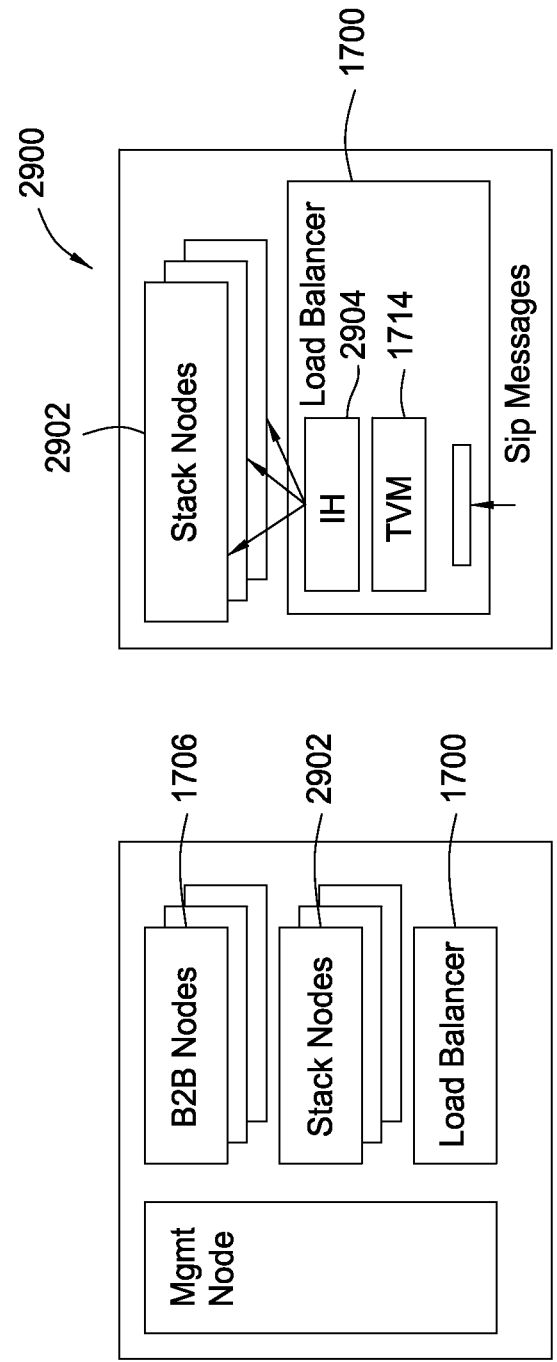
FIG. 29 illustrates a Load Balancer Overview Architecture in accordance with the present invention.

Referring now to FIG. 29, a Load Balancer Overview Architecture 2900 in accordance with the present invention is shown. As Part of the IH registration IH in the Stack nodes 2902 will connect to the Load Balancer IH 2904. Load Balancer 1700 will be configured with Load balancing rules, default will be uniformly distributed and under attack, one of the nodes will be designated as penalty box, and all TVM 1714 suspected calls will be forwarded to that node whereas rest of the calls will be uniformly distributed.

Figure 30:
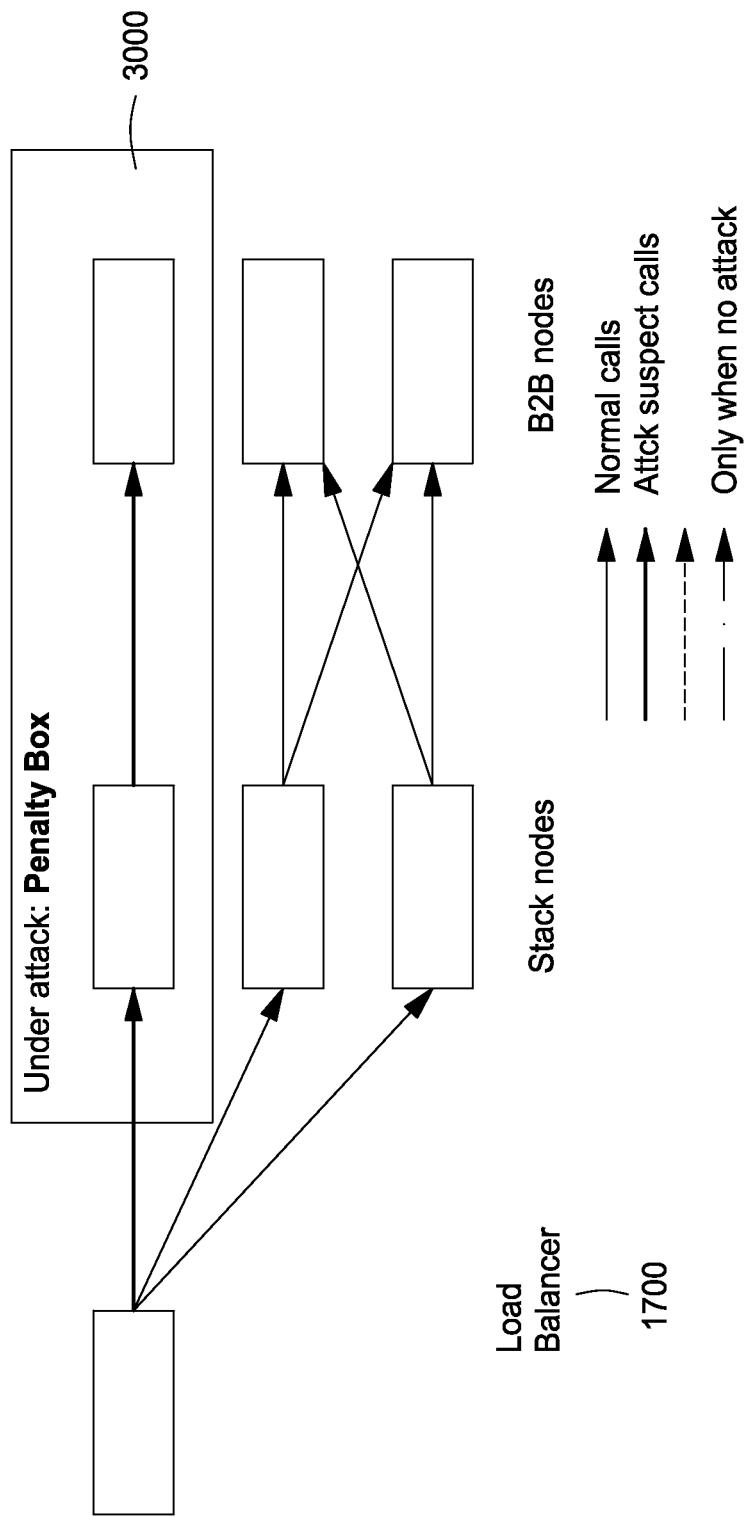
FIG. 30 illustrates a Load Balancer Under Attack in accordance with the present invention.

Referring now to FIG. 30, a Load Balancer Under Attack is shown. Under attack load distribution, TVM 1714 in Load Balancer 1700 will add attack header, to the INVITE message, Load Balancer 1700 will use the attack and security header to forward the call to the penalty box 3000. Under attack load balancer node should have enough processing power to handle incoming INVITEs.

```
LoadBalancer ( ) {
    Connect to the sip port;
    Create a tcp server port to receive the stack connections.
    While(1) {
        Msg = getMsg( )
        ret = tvm(msg)
        send (ret, msg)
    }
}
send(attack_mode, msg){
    switch (attack_mode) {
    case NOATTACK :
        if (msgType == CANCEL) send to all the stacks
        else send to any stack based on the distribution algorithm
    case ATTACK_NOT_SUSPECT:
        if (msgType == CANCEL) send to all the stacks except penalty box one
        else send to any stack except penalty box one based on the distribution
    algorithm
    case ATTACK_SUSPECT:
        send to stack for penalty box
    }
}
```

The configured data for the Load Balancer 1700 includes a Stack Configuration, SIP IP addr/port number and Load balancer IH server port number. The Stack Configuration: Role (Penalty box, Not penalty box) is shown below.

| Stack | Penalty Box |
|---|---|
| Stack1 | True |
| Stack2 | False |
| Stack3 | false |

Figure 31:
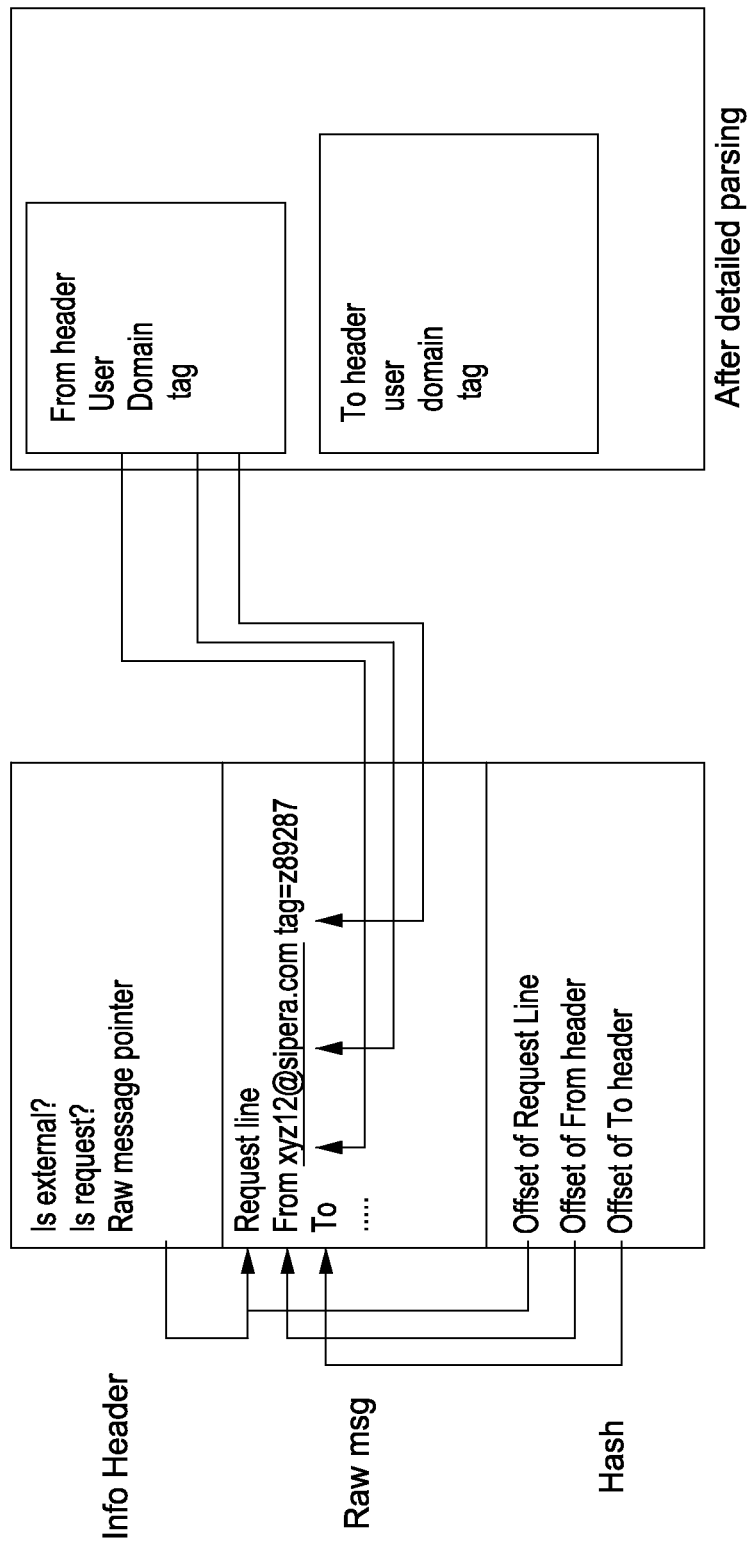
FIG. 31 illustrates a Parsed SIP message Structure in accordance with the present invention.

The Parsed SIP message Structure for the Message Parser is shown in FIG. 31.

Figure 32:
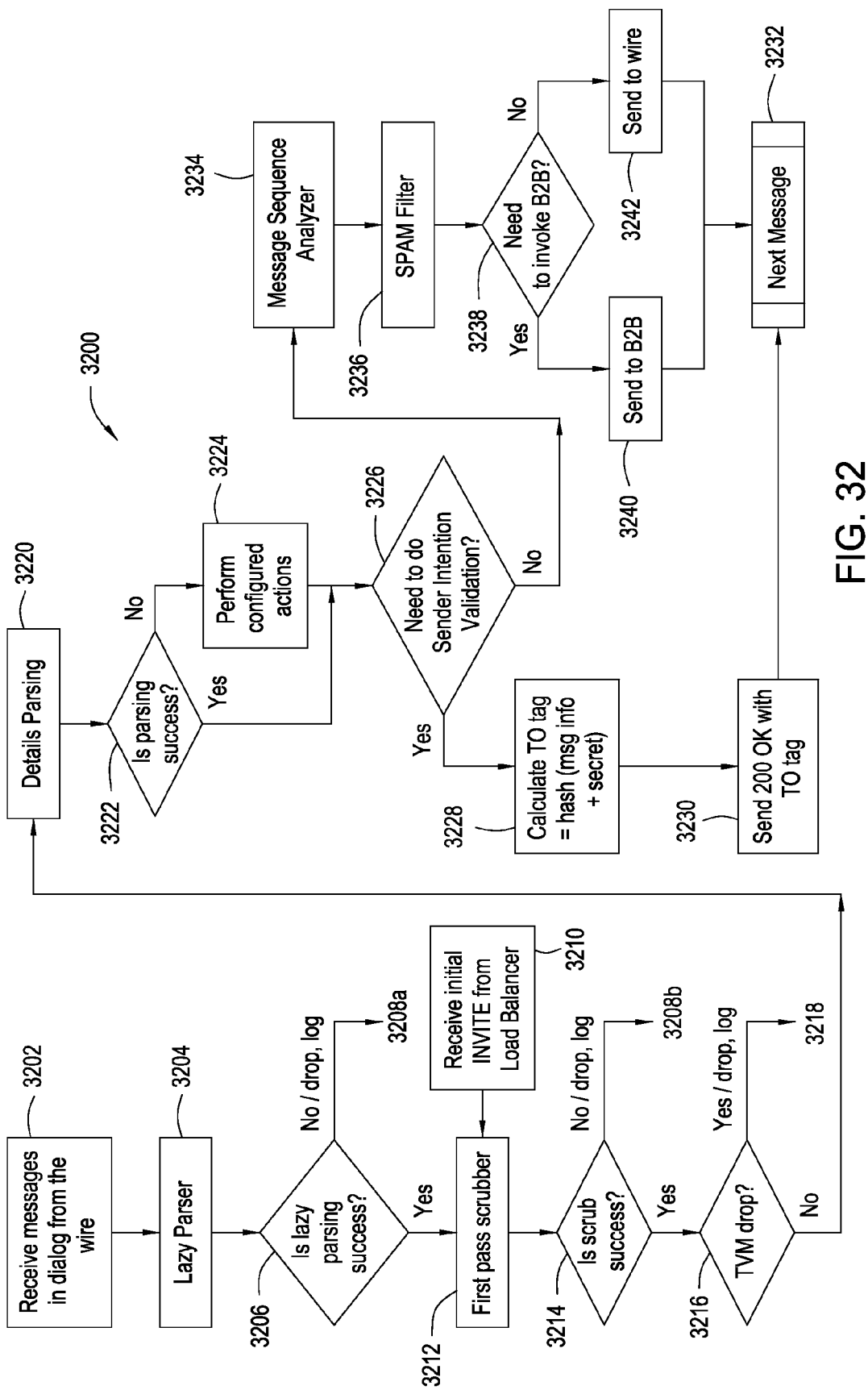
FIG. 32 illustrates a DLR Flow Diagram in accordance with the present invention.

FIG. 32 illustrates a DLR Flow Diagram 3200 in accordance with the present invention. The functional requirements of the DLR are as follows:
  SIP Proxy: DLR will process SIP signaling traffic as a SIP proxy.
  Back-to-back: DLR will forward suspect SIP signaling messages to B2B user agent.
  Scrub Rules: DLR will enforce configured scrubbing rules Blocking Malicious Messages: DLR will use Protocol Scrubber to drop maliciously formatted SIP messages.

Re-write Messages: DLR will re-write, truncate, attach prefix to, attach suffix to SIP message Message Parsing: DLR receives legitimate initial INVITE and CANCEL messages from Load Balancer 1700, and further messages in the dialog directly from wire. DLR will parse all messages received from wire using parser.

Sender Intention Validation ("SIV") 1730: TVM 1714 in Load Balancer 1700 will detect flood D/DoS attack and will request DLR to perform spoof detection on suspected initial INVITE messages. DLR will use SIV 1730 to perform spoof detection on initial INVITE message and to block spoofed messages.

Message Sequence Anomaly Detection: For messages coming from the network, DLR will notify MSA about each message received and will decide on proxy or B2B mode depending on response from MSA.

SPAM Filtering: For calls being terminated on subscriber secured endpoints, DLR will use Spam filter 1748 to apply time of day based spam policies to treat calls accordingly. Call treatment includes sending to voice mail, doing machine call detection, and doing call origin validation Log: Log scrub failures with information: failed rule, source of message, destination of message, timestamp Alerts: Generate alert if number of scrubbing failures cross configured threshold For example, messages are received in dialog from the wire in block 3202 and lazy parsed in block 3204. If the lazy parsing is not successful, as determined in decision block 3206, the message is dropped and logged at 3208a. If the message is parsed successfully, as determined in decision block 3206, or an initial INVITE is received from the Load Balancer 1700 in block 3210, a first pass scrubber is used in block 3212. If the scrubbing is not successful, as determined in decision block 3214, the message is dropped and logged at 3208b. If the message is scrubbed successfully, as determined in decision block 3214, and the TVM 1746 does not drop the message, as determined in decision block 3216, detailed parsing is performed in block 3220. If the TVM 1746 drops the message, as determined in decision block 3216, the message is dropped and logged in block 3218. If the detailed parsing is not successful, as determined in decision block 3222, configured actions are performed in block 3224. Thereafter, or if the detailed parsing is successful, as determined in decision block 3222, and SIV is necessary, as determined in decision block 3226, TO tag=hash(msg info+secret) is calculated in block 3228, a 200 OK message with TO tag is sent in block 3230 and the next message is received for processing in block 3232. If, however, SIV does not need to be performed, as determined in decision block 3226, the message is processed by MSA 1732 in block 3234 and the SPAM filter 1748 in block 3236. If B2B 1706 needs to be invoked, as determined in decision block 3238, the message is sent to B2B 1706 in block 3240 and the next message is received for processing in block 3232. If B2B 1706 does not need to be invoked, as determined in decision block 3238, the message is sent to wire 1720 in block 3242 and the next message is received for processing in block 3232.

Figure 33:
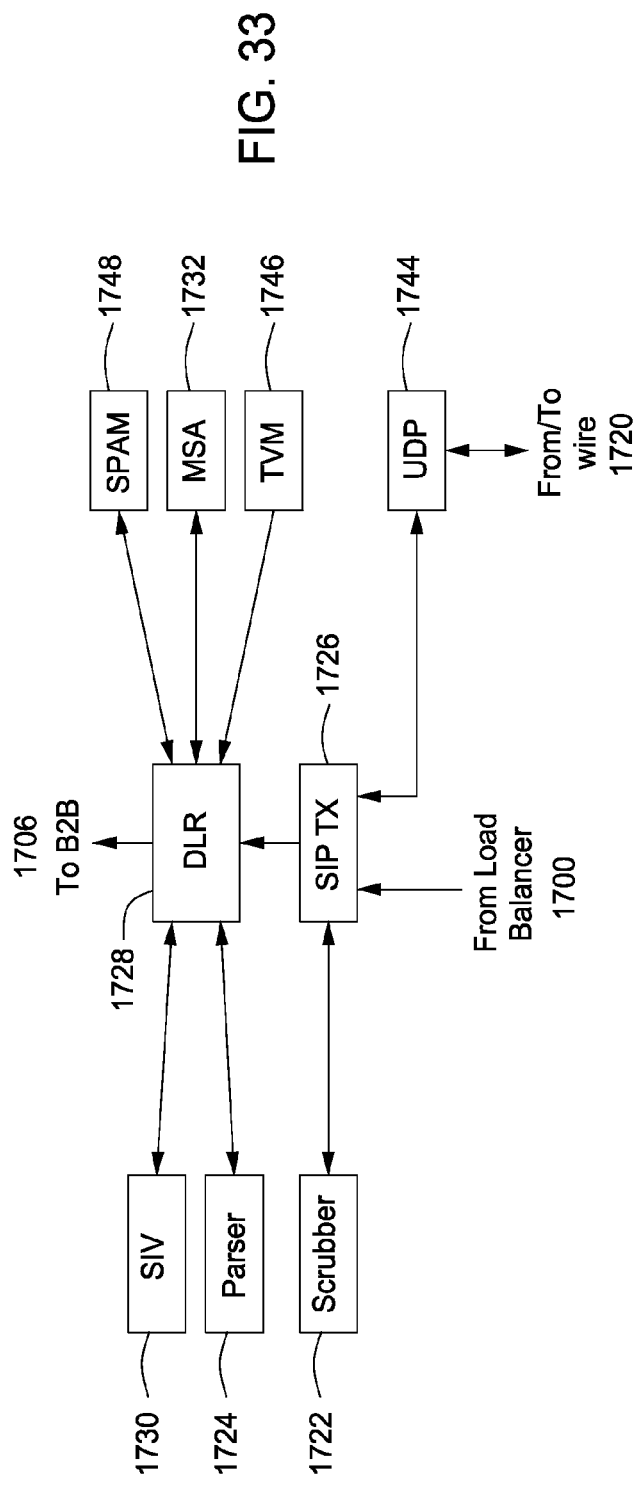
FIG. 33 illustrates DLR Modules in accordance with the present invention.

FIG. 33 illustrates DLR Modules in accordance with the present invention. This configuration was previously described in reference to FIG. 17. The configured data for the DLR 1728 is an address and port of call server: Calls from the network will be forwarded to this address. With respect to call termination and origination, the B2B Agent 1706 will terminate all calls forwarded to it by DLR 1728, will invoke necessary security features, and will originate another call on the terminating side if allowed by the feature.

Figure 34:
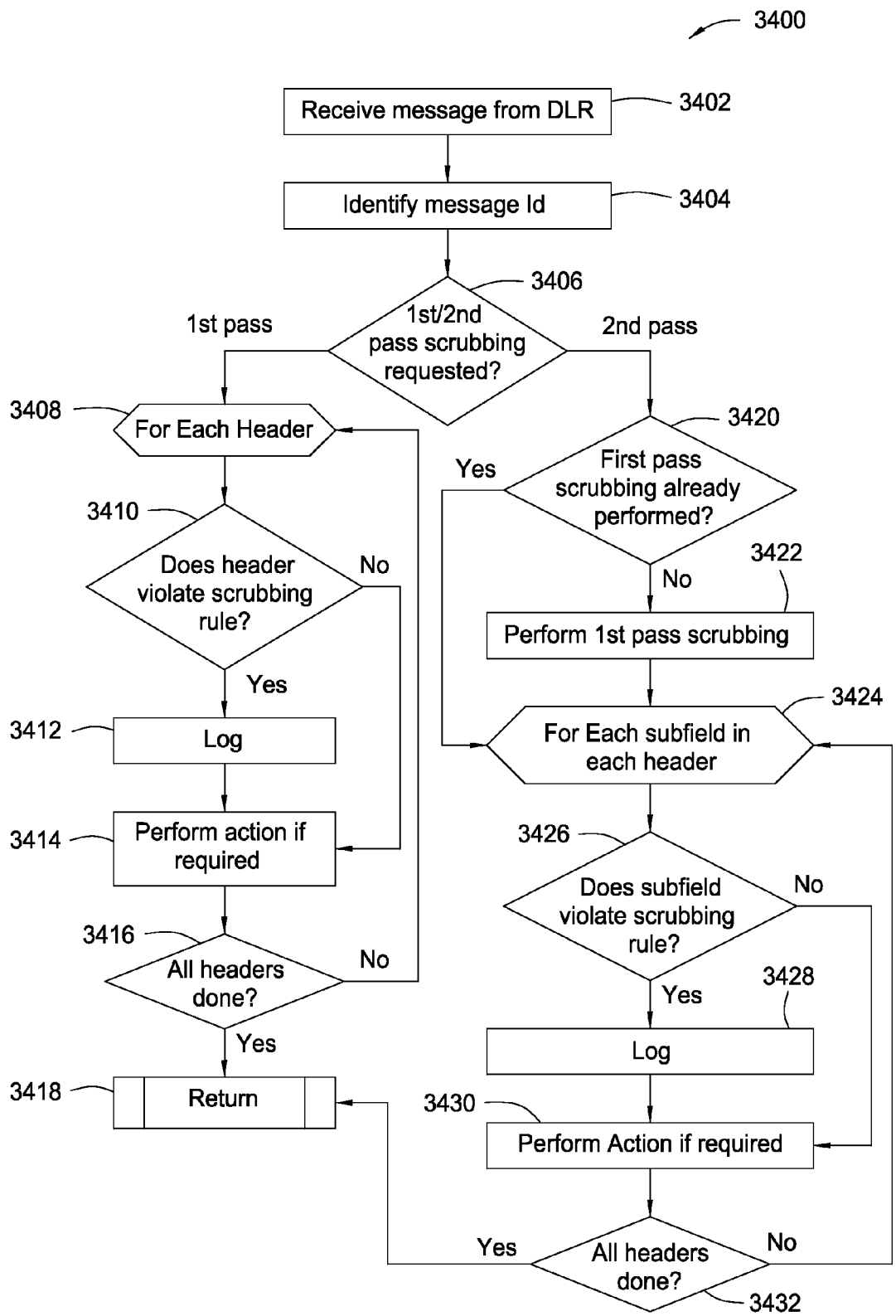
FIG. 34 illustrates a Protocol Scrubber Flow Diagram in accordance with the present invention.

FIG. 34 illustrates a Protocol Scrubber Flow Diagram 3400 in accordance with the present invention. The functional requirements of the Protocol Scrubber 1722 are: (1) Check presence of mandatory headers; (2) Check length of each header; (3) Check ordering of headers; (4) Check occurrence counts of headers; (5) Check header delimiters; (6) Check number of subfields in the header; (7) Check length of each subfield in each header; (8) Check presence of required subfields; (9) Check subfield delimiters; (10) Check occurrence counts of subfields; (11) Re-write, truncate, add suffix to, add prefix to the header or subfield; and (12) Reject the message and log the failure.

With respect to the configured data: Actions can be one of [re-write, truncate, add suffix, add prefix, reject].

| Headers Table | | | | | | | | | |
|---|---|---|---|---|---|---|---|---|---|
| Template | | | Min | Max | NumSub | Occurance | | | |
| Id | HdrId | HdrName | Len | Len | Flds | Min | Max | Delimeter | Action |
| 1 | 1 | TO | 32 | 256 | 3 | 1 | 1 | CRLF | |
| 1 | 2 | CSEQ | 4 | 32 | 2 | 1 | 1 | CRLF | |
| 1 | 3 | VIA | 16 | 128 | 4 | 1 | 4 | CRLF | |

| Header_properties table | | | | | | | | | | |
|---|---|---|---|---|---|---|---|---|---|---|
| Template | | SubFld | SubFld | SubFld | SubFld | Delimeter | | Occurance | | |
| Id | HdrId | Name | MinLen | MaxLen | Index | Start | End | Min | Max | Reqd | Action |
| 1 | 1 | Display Name | 1 | 64 | 1 | " | " | 1 | 1 | NO | |
| 1 | 1 | User | 1 | 64 | 2 | , | @ | 1 | 1 | YES | |
| 1 | 1 | Domain | 16 | 256 | 3 | @ | , | 1 | 1 | YES | |
| 1 | 3 | Param | 8 | 32 | 2 | ; | | 1 | 16 | NO | |
| 1 | 3 | Branch | 8 | 128 | 3 | ; | | 1 | 1 | YES | |

| Messages table | | |
|---|---|---|
| MsgId | MessageType | MessageTitle |
| 1 | Request | INVITE |
| 2 | Response | 200 OK |

| Message_headers table | | |
|---|---|---|
| MsgId | HdrId | Reqd |
| 1 | 1 | YES |
| 1 | 2 | YES |

With respect to dynamic data, the memory structures include a message array and a headers array.

Message array (index is message id)

| | |
|---|---|
| 1 | → List of HdrId, Reqd flag, and pointer to Hdr properties |
| 2 | |
| 3 | |
| 4 | |
| . | |
| . | |

Headers array (index is header id)

| | |
|---|---|
| 1 | → Hdr Name |
| 2 | Min Len |
| . | Max Len |
| . | Num Sub fields |
| | Delimiter |
| | Pointer to sub field properties → Map of subfield properties |

The Protocol scrubber will maintain per rule statistics which will contain following information: Rule Id, Number of times applied and Number of times failed.

For example, the message is received from the DLR 1728 in block 3402 and the message Id is identified in block 3404. If a first pass scrubbing is requested, as determined in decision block 3406, for each header 3408, if the header violates a scrubbing rule, as determined in decision block 3410, the incident is logged in block 3412. Thereafter, or if the header does not violate a scrubbing rule, as determined in decision block 3410, an action is performed if required in block 3414. If all headers are done, as determined in decision block 3416, the process returns in block 3418. If, however, not all the headers are done, as determined in decision block 3416, the process loops back to process the next header in block 3408 and continues as previously described. If, however, a second pass scrubbing is requested, as determined in decision block 3406, and if the first pass scrubbing has not already been performed, as determined in decision block 3420, the first pass scrubbing in performed in block 3422 (blocks 3408-3416). Thereafter, or if the first pass scrubbing has already been performed, as determined in decision block 3420, for each header 3424, if the header violates a scrubbing rule, as determined in decision block 3426, the incident is logged in block 3428. Thereafter, or if the header does not violate a scrubbing rule, as determined in decision block 3426, an action is performed if required in block 3430. If all headers are done, as determined in decision block 3432, the process returns in block 3418. If, however, not all the headers are done, as determined in decision block 3432, the process loops back to process the next header in block 3424 and continues as previously described.

Figure 35:
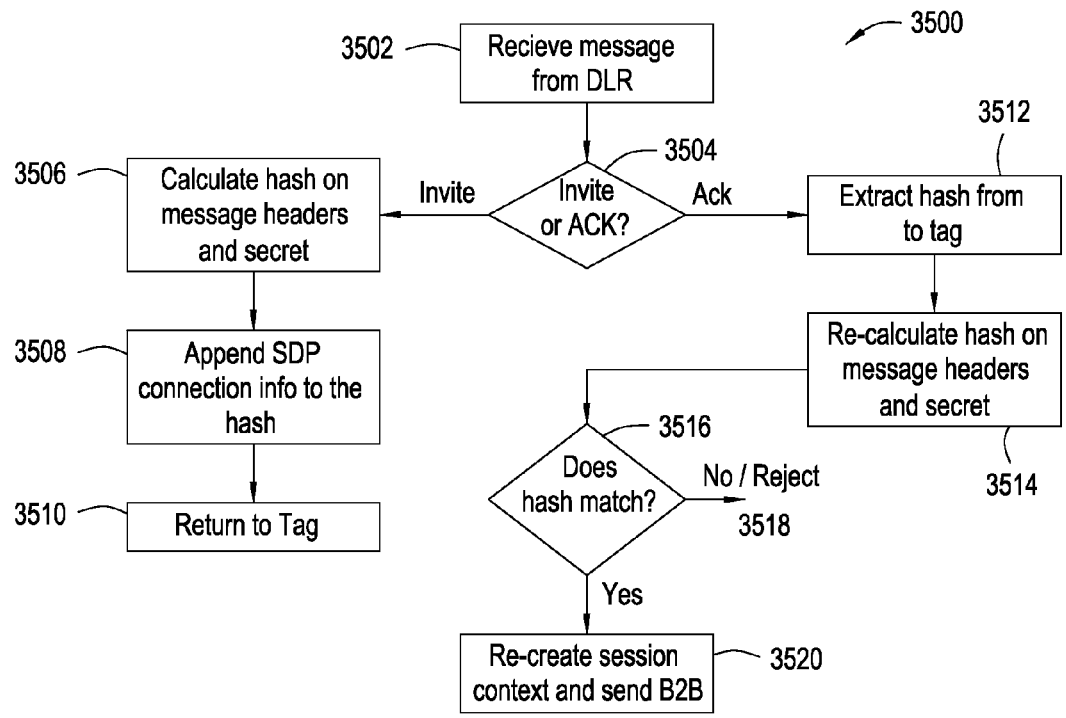
FIG. 35 illustrates a SIV Flow Diagram in accordance with the present invention.

FIG. 35 illustrates a Sender Intention Validation ("SIV") Process 3500 in accordance with the present invention. The functional requirements include:

Field extraction: SIV 1730 will use on-demand parser to extract required fields from a SIP message. The fields will be chosen such that they are common between am INVITE and an ACK message.

Hash: SIV 1730 will use hash function to calculate hash on the concatenation of extracted fields and a secret SDP information: SIV 1730 will extract and append required SDP information from the initial INVITE message to the hash Calculate To tag: SIV 1730 will return a value that will be used as TO tag in the 200 OK response. The total tag length will be up to the configured value.

Verification: When an ACK message is reported, SIV 1730 will extract fields from the ACK message and concatenate it with the secret used when calculating hash on INVITE. It will re-calculate the hash and compare with the TO tag in the ACK message except the SDP info part in the tag.

Reflection attack avoidance: SIV 1730 algorithm includes sending a verification message to the purported originator. Under flood attack conditions DLR will use SIV 1730 to create and send one such verification message for each message received. SIV 1730 will ensure that such verification messages will not result in an attack on the intended receiver of those verification messages. SIV 1730 will instruct DLR of such excessive rate of verification messages sent to a single entity.

The configured data includes Hash secret, maximum tag length and alert threshold. The Hash secret is used in the hash calculation. This secret will be a string of ASCII characters and will be confidential to an Ss 1108. The maximum length of tag value to be returned in the To header field. The Alert threshold is a number of spoofed INVITE messages detected in a given time period. An alert is generated if this threshold is crossed. The dynamic data includes statistics: Number of spoofed initial-INVITEs detected in a configured time period.

For example, the message is received from the DLR 1728 in block 3502. If the message is INVITE, as determined in decision block 3504, a hash on msg headers and secret is calculated in block 3506, SDP connection information is appended to the hash in block 3508 and the process returns TO tag in block 3510. If, however, the message is ACK, as determined in decision block 3504, hash is extracted from TO tag in block 3512 and the hash is recalculated on msg headers and secret in block 3514. If the hash does not match, as determined in decision block 3516, the message is rejected in block 3518. If, however, the hash does match, as determined in decision block 3516, the session context is recreated and the message is sent to B2B 1706 in block 3520.

Figure 36:
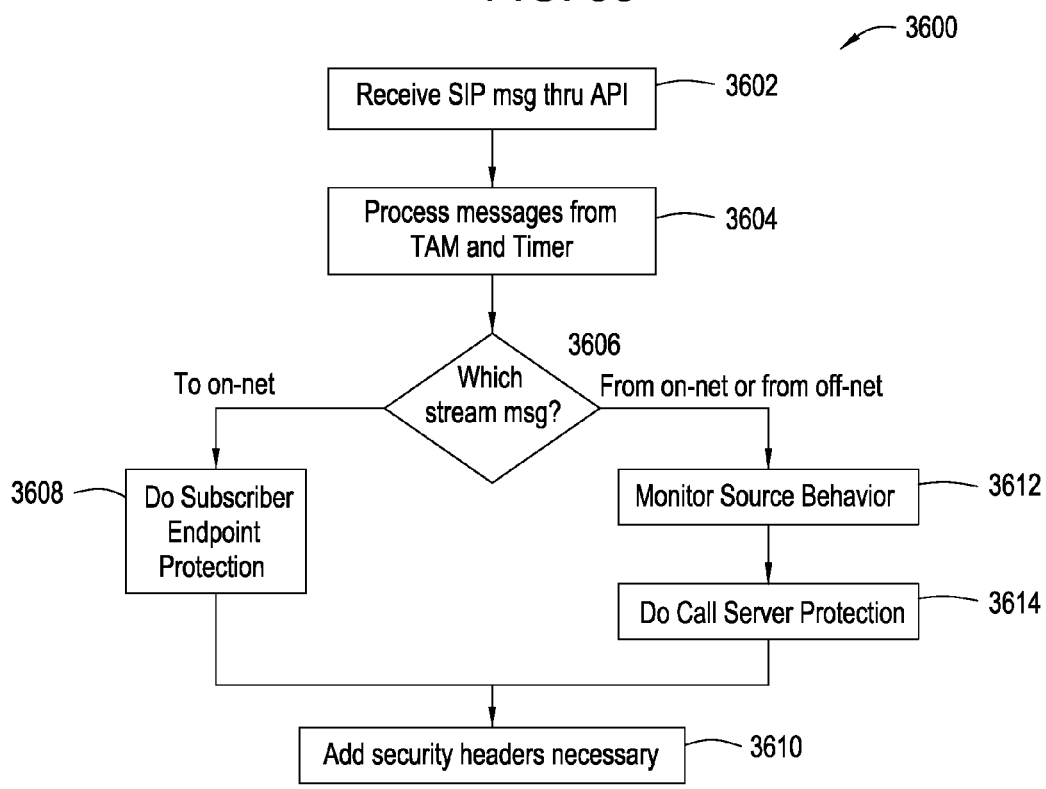
FIG. 36 illustrates a TVM Flow Diagram in accordance with the present invention.

FIG. 36 illustrates a TVM Process 3600 in accordance with the present invention. The TVM 1714 functional requirements include:

Scope: TVM 1714 will be linked with multiple call handling Ss processes. TAM 1702 will divide and distribute flood and scanning detection thresholds among all TVM 1714 instances. TVM 1714 will suspect flood D/DoS attacks on subscriber endpoints and scanning attempts. TVM 1714 will monitor traffic going to each subscriber endpoint, and traffic coming from each subscriber and non-subscriber endpoint to detect possible flood attacks/scanning attempts. TVM 1714 will monitor all SIP messages including requests and responses. Flood thresholds will be enforced on individual message counts and as well as aggregate message counts.

Traffic Classification: TVM 1714 will classify the traffic into four streams: on-net to call server (Traffic received from on-net and to be forwarded to the call server); off-net to call server (Traffic received from off-net and to be forwarded to the call server); call server to on-net (Traffic received from the call server and to be forwarded on-net); call server to off-net (Traffic received from the call server and to be forwarded off-net).

Suspected Flood Attempt Detection: TVM 1714 will suspect flood attack attempt on an endpoint when total number of messages received from or for an endpoint crosses thresholds in terms of number of messages and time period given by TAM 1702. Call server to on-net stream will be monitored to detect suspected flood attack attempt on secured endpoint.

Suspected Scanning Attempt Detection: TVM 1714 will suspect scanning attempt from a subscriber or non-subscriber endpoint when total number of messages received from that endpoint crosses thresholds in terms of number of probe messages and time period given by TAM 1702. On-net to Call Server and off-net to Call Server streams will be monitored to detect suspected scanning attempt from an endpoint.

Received Call Notifications: TVM 1714 will receive message notifications from Load Balancer 1700 and SIP transaction controller. The notification will be through API and will contain following information: SIP message reference, Stream Id (Any-to-call-server/Call-server-to-on-net), and Leg Id (Originating/Terminating).

Message to TAM 1702 (Per-call notification): TVM 1714 will send a notification to TAM 1702 for each call initiation (initial-INVITE) and call hangup (BYE). Such notification will contain following information: Stream Id (On-net-to-call-server/Off-net-to-call-server/Call-server-to-on-net/Call-server-to-off-net); Message Id (INVITE/BYE); Leg Id (Originating/Terminating); Sender URI (Calling Party); and Receiver URI (Called Party). TAM 1702 will use these notifications to detect stealth attack on subscriber endpoints and to monitor capacity usage of the call server.

Message to TAM 1702 (Suspected flood/scanning attempt): Configured flood attack detection and scanning detection thresholds will be distributed among instances of TVM 1714 linked with Load Balancer node, and DLR on all stack nodes. In a clustered Ss environment, attack traffic may get distributed across multiple nodes. Consequently, TVM 1714 on each node will detect its part of flood attack/scanning attempt and will report back suspected flood attack/scanning attempt to TAM 1702 in case such measured values cross respective local thresholds. Suspect flood attack notification will contain following information: Leg Id (Originating—Identified suspected attack source/Terminating—Identified possible attack destination); Message type (Request/Response); Local suspected flood attack threshold; Sip request method/response code (Flood of which SIP message is detected, if flood is of only one message; or special id for aggregate flood); Measured traffic volume indicator; and Endpoint Identifier.

Suspect scanning notification will contain following information: Measured probe count; Local threshold; Probe message name; and Suspected scanner id.

Security Feature Invocation: TVM 1714 will invoke security features (SD/MCD) on traffic streams requested by TAM 1702 by adding security headers to the Sip message. TVM 1714 will also block traffic originated from an endpoint upon TAM 1702 request.

For example, a SIP message is received through API in block 3602 and messages are processed from TAM 1702 and Timer in block 3604. If the message stream is to on-network, as determined in decision block 3606, subscriber endpoint protection is performed in block 3608 and necessary security headers are added in block 3610. If, however, the message stream is from on-network or from off-network, as determined in decision block 3606, source behavior is monitored in block 3612, call server protection is performed in block 3614 and necessary security headers are added in block 3610.

Figure 37:
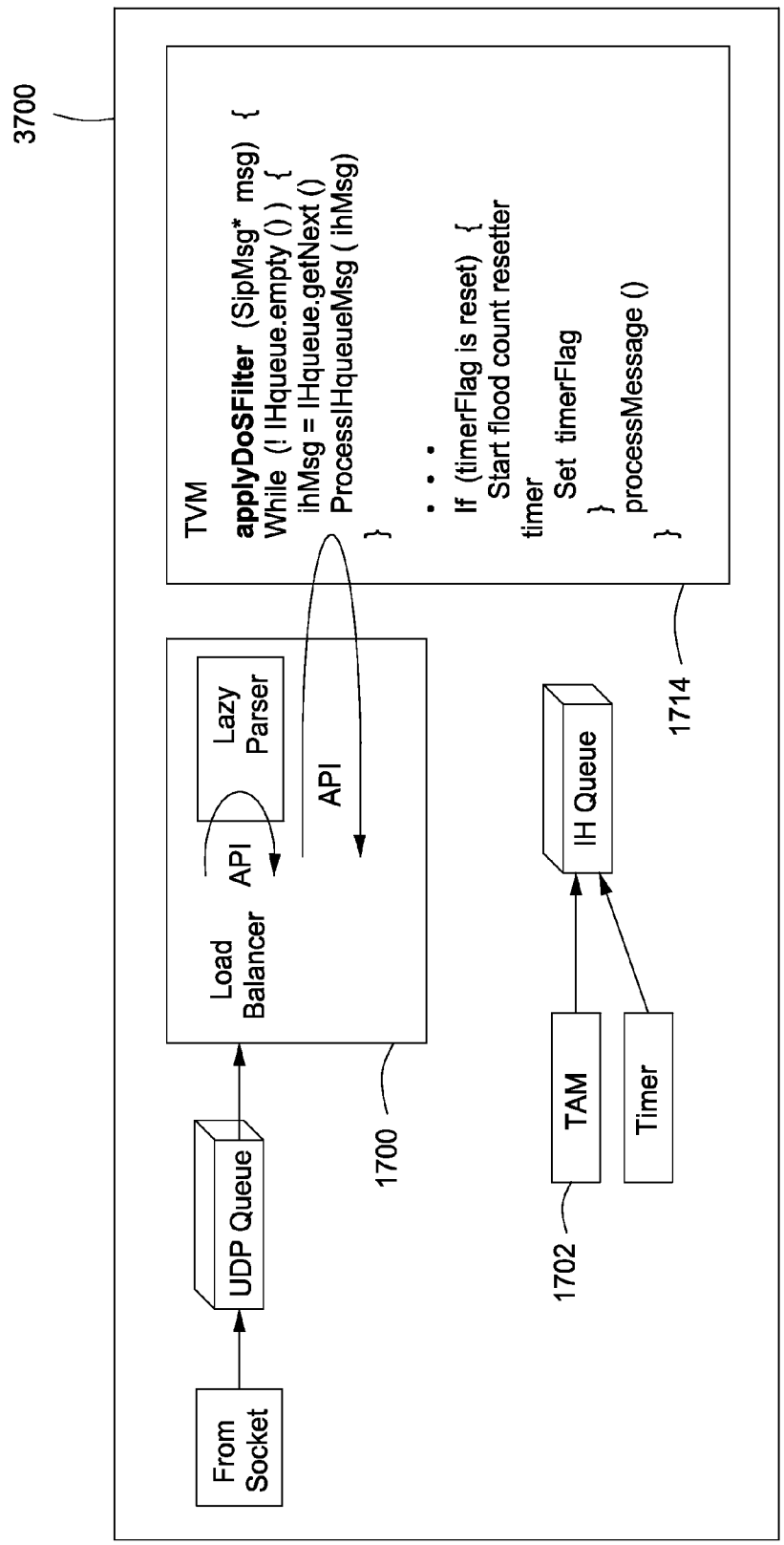
FIG. 37 illustrates a TVM Basic Architecture in accordance with the present invention.

FIG. 37 illustrates a TVM 1714 Basic Architecture 3700 in accordance with the present invention. The pseudo code for the TVM 1714 is as follows:

```
applyDoSFilter (SipMsg* msg){
    While (!IHqueue.empty( )) {
        ihMsg = IHqueue.getNext( )
        processIHqueueMsg(ihMsg)
    }
    ....
    If (timerFlag is reset) {
        Start flood count resetter timer
        Set timerFlag
    }
    processMessage( )
}
processIHqueueMsg(ihMsg) {
    switch (msgType) {
        case Timer:
            reset timerFlag
        case TAM:
            .....
    }
}
processMessage(SipMsg* msg) {
    If (msg is on-net to call-server/b2b OR off-net to call-server/b2b) {
        // do source behavior monitoring
            // Identify source of message
            // Identify message type
            // Increment count for the message for the source
        // do call server protection
            // maintain current capacity usage watermark
            // maintain capacity usage growth rate
    }
    If (msg is call-server/b2b to on-net) {
        // do subscriber endpoint protection
            // Identify subscriber endpoint id
            // Identify message type
            // Increment count for the message for the subscriber id
    }
    If new call {
        // send per-call notification to TAM
    }
}
```

The TVM 1714 configured data is as follows:

| Parameter | Remarks | Effect | Default value |
|---|---|---|---|
| Flood sampling period | TVM 1714 will increment message count for messages received for and from an endpoint. This count will be reset at the end of each flood sampling period. | Increasing flood sampling period will make the system more tolerant towards flood attacks and decreasing it will make it less tolerant. | 500 milliseconds |
| Flood threshold in terms of number of messages | At the end of flood sampling period if number of messages are over the flood threshold, flood attack is detected and alert is generated by TVM 1714 | Increasing Flood threshold will make the system more tolerant towards flood attacks and decreasing it will make it less tolerant. | 10 |
| Flood multiplicity factor | Message count will be incremented by this much value for each message received. At the end of each flood sampling period, this count will be decremented. Flood multiplicity factor removes oscillations in the flood attack detection status when attack is continuing and message count is reset every sampling period. Resetting message count will result in the message count oscillating below and above the flood threshold and generation of multiple alerts for one attack instance. | Decreasing multiplicity factor will make the flood detection more oscillatory meaning | 5 (Positive) |
| Scanning time period | Number of total endpoints contacted by a source endpoint will be counted for scanning time period and reset at the end of each period | Increasing scanning time period will detect scanning at slower speed | 60 seconds |
| Scanning threshold | If number of endpoints contacted by a source endpoint in scanning time period crosses this scanning threshold TVM 1714 detects scanning from that source endpoint. Alert will be generated | Increasing scanning threshold will means scanner has to contact more number of endpoints in the scanning time period and vice versa | 6 |

Flood and Scanning Detection Parameters

The TVM 1714 dynamic data includes secured endpoint information and no-secured entity information. The secured endpoint information includes: Secured endpoint Identifier ("URI"), Current message counts received for and from each secured endpoint, current feature invoked for traffic originated from the endpoint, current feature invoked for traffic terminated on the endpoint. The non-secured entity information includes: Non-secured endpoint Identifier ("URI"), Current message counts received for and from each secured endpoint, current feature invoked for traffic originated from the endpoint.

Figure 38:
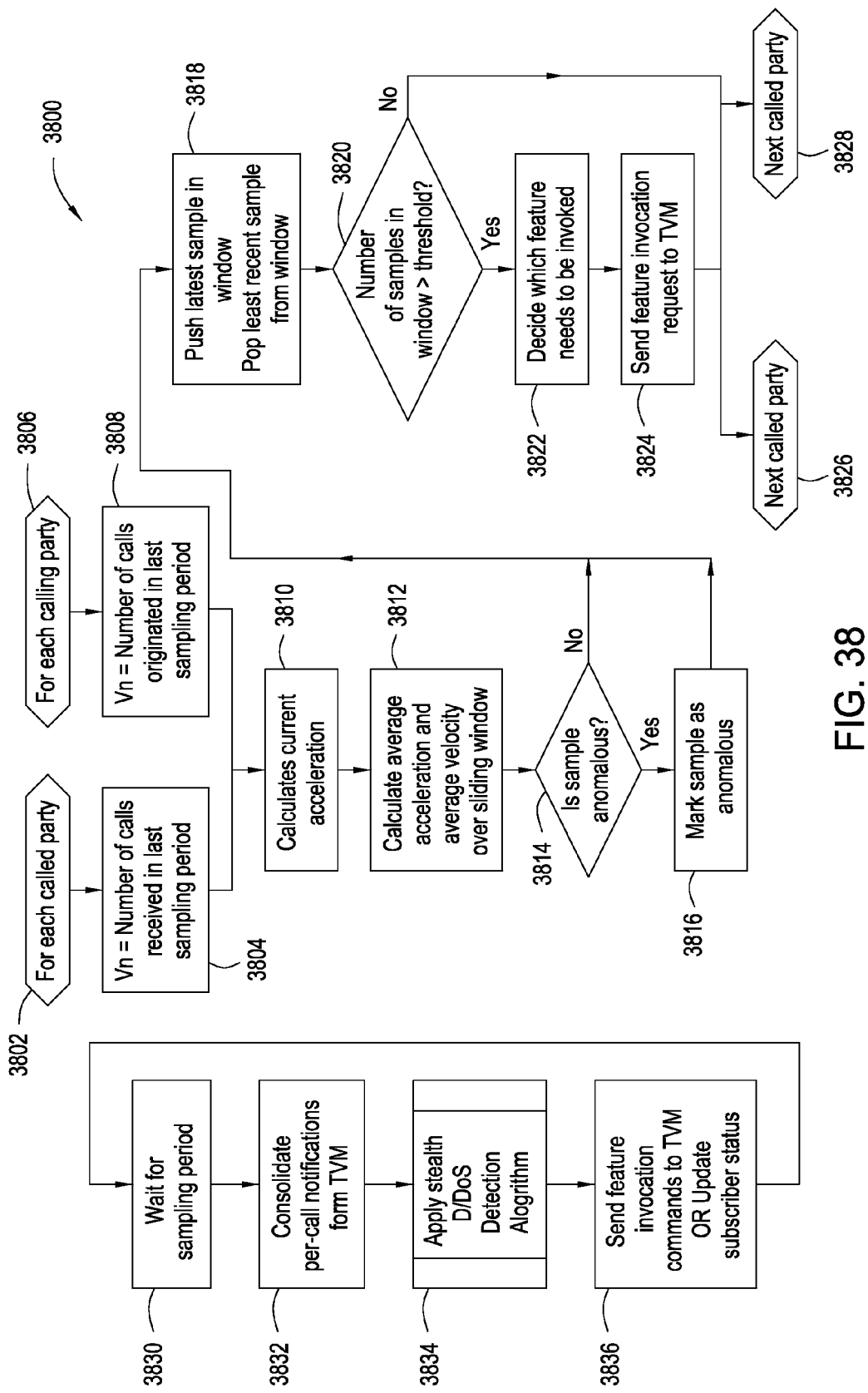
FIG. 38 illustrates a TAM Flow Diagram in accordance with the present invention.

FIG. 38 illustrates a TAM Flow Diagram 3800 in accordance with the present invention. The functional requirements include:

Endpoint behavior learning: Endpoint behavior learning will be done offline using call logs. At the end of each timeslot normal call originating and call receiving patterns will be learned from call logs.

Learning call server usage: In order to detect abnormal usage of secured call server, call server capacity usage will be learned for each call server by performing offline call log analysis at the end of each time slot. Average capacity usage will be used as a baseline. Following parameters will be learned for each call server protected: Average number of sessions initiation requests received per unit time by the call server; and Average number of simultaneous sessions anchored per unit time at the call server.

Profile distribution: At the end of each timeslot, updated learned profiles will be propagated to Ss where the subscriber is served.

Profile aggregation: Profiles will be aggregated based on common characteristics. For example, all subscriber phones which do not generally receive calls during night time can be grouped under a common profile and be monitored against this common profile.

Stealth Attack Detection: During detection, behavior of endpoints will be compared with common aggregated profiles. Configured tolerance limits will be used.

Trust score based sensitivity: Sv will calculate trust scores for on-net as well as off-net callers and domains. Stealth attack detection algorithm will use this trust score to tune the tolerance towards misbehavior. For example, it can be more tolerant if a calling party with high trust score shows abnormal behavior compared to abnormal behavior by a calling party with a low trust score.

Source behavior monitoring: On-net to call server and off-net to call server traffic streams are monitored for abnormal source behavior to detect stealth and flood D/DoS attacks originated from either on-net or off-net endpoints. However, for off-net endpoints stealth attack detection is based on acceptable patterns of calls originated from them that will be configured at individual endpoint level and/or call group level.

DoS Observation Cache: TAM 1702 will monitor traffic originating from un-secured entities and traffic originating from and terminating on secured entities only if they are currently receiving or originating traffic. TVM 1714 will create an observation cache and will continue monitoring each active entity for the configured amount of time after the session between the two or more entities ends. DoS observation cache in TAM 1702 will contain endpoint identifiers ("URI") and sliding window samples for traffic originated from and terminated on the endpoints.

Flood statistics aggregation: TVM 1714 will be present on all Load Balancer 1700 and DLR nodes in the Ss cluster. Threshold for flood attack detection will distributed among all TVMs 1714 and each TVM 1714 will send notification to TAM 1702 when its individual threshold is crossed. TAM 1702 will aggregate TVM 1714 attack notifications and will compare it against the aggregate threshold. TAM 1702 will generate flood attack alert.

Scanning statistics aggregation: Threshold for scanning detection will distributed among all TVMs 1714. TVMs 1714 present in Load Balancer 1700 and DLR nodes will send notifications if individual scanning threshold is crossed. TAM 1702 will aggregate these notifications and will generate alert if scanning threshold is crossed.

Attack type classification: TAM 1702 will identify the attack type according to following matrix and prevent the identified attack by instructing TVM 1714 to invoke security feature (SD/MCD).

|  | DoS Prevention | DDoS Prevention |
|---|---|---|
| Flood | Block offending source | Block all offending sources |
| Flood Spoofed | Identify and block spoofed source | Identify and block all spoofed sources |
| Flood Zombie | Identify and block offending zombie | Identify and block with Machine Caller Detection |
| Stealth | Identify and Block offending source | Identify and block offending sources |
| Stealth Spoof | Identify and block spoofed source | Identify and block all spoofed sources |
| Stealth Zombie | Identify and block offending zombie | Identify and block with Machine Caller Detection |
| Stealth Human | Identify and block offending source | Identify and block with virtual private assistant (VPA) |
| Flood Human | NA | Identify and block with VPA |

Upon detection of attack on a secured entity TAM 1702 will classify the attack DoS or DDoS depending on how many sources are contacting the secured entity under attack. Number of allowable simultaneous sources is configured according to the endpoint service type (e.g., regular telephone, main enterprise telephone).

Call Server Protection: TVM 1714 will send call initiation (initial INVITE) and call hangup (BYE) notifications to TAM 1702. TAM 1702 will use these notifications to measure the capacity usage (number of simultaneous calls anchored) and number of call initiation attempts for the call server. Such measurements will be used to compare against time of day based learned average capacity usage, average call initiation attempts, and configured thresholds in order to detect anomalies.

Message to TVM 1714: If stealth attack is detected from a source endpoint or on a secured endpoint TAM 1702 will send Feature invocation request to TVM 1714. The request will contain following information: Stream Id (Any-to-call-server/On-net-to-call-server/Off-net-to-call-server); Leg Id (Invoke on originating leg/Invoke on terminating leg); Endpoint Identifier; Feature to be invoked (SD/MCD); and Action (Start invocation/stop invocation).

Offline Attack Detection: Presence of signaling component ("Ss") at each POP in the service provider network enable detection of anomalous traffic streams that otherwise are difficult to detect. Call logs from each Ss are pushed to Intelligence component where they can be aggregated and analyzed for detecting network-wide anomalous streams. For example, consider an attack scenario where large numbers of calls are being made that is routed to attacked call server. However, the attacked call server finds those calls non-routable and sends back error response resulting in call failures. Since the Ss between the attacked call server and the corresponding POP will not see this traffic, it is not possible to detect this attack at that Ss. It may not be possible to detect source misbehavior at the originating Ss boxes due to a distributed nature of the attack. Such an attack can be detected by doing periodic offline analysis of network-wide call log at the Si to detect anomalies. In this example, abnormally high number of call failures for calls made to attacked call server is an anomaly that triggers offline detection.

Response tuning: TAM 1702 will make a best effort to block all attack traffic and service all legitimate traffic by requesting invocation of security features (SD/MCD) on all suspected signaling traffic. However, after a configured amount of time, if it is not able to prevent the attack this way, it request TVM 1714 to invoke pure rate limiter and may not be able to service all legitimate traffic.

Response escalation: Upon detection of an attack on a secured entity an alert will be sent to Si for network-wide analysis. Such analysis may find anomalous streams originated from other parts of the network towards the attacked endpoint. Si may send instructions to respective Ss boxes to suspect and invoke security features on such streams. Consequently, all, attack traffic originated from within the provider network is stopped at source. However, attack traffic coming from off-net will be filtered at the first Ss which encounters such traffic.

Alerts: TAM 1702 will generate alert: When attack status on a secured endpoint or secured call server changes. Alert will contain secured entity Id, source of attack (if identified), attack type (Flood DoS/Flood DDoS/Stealth DoS/Stealth DDoS), attack status (detected/prevented/stopped), and current action taken (SD/MCD). Upon detection of scanning from a particular source. Alert will include scanning source information, and scanning statistics; and when it changes the action taken on the suspected traffic stream (e.g. change from SD invoked to MCD invoked).

Administrator Overriding: TAM 1702 will accept commands from administrator console to stop invoking or to force invoke security features on specific traffic streams. Traffic streams will be identified by traffic between to endpoints, going to an endpoint, or coming from and endpoint.

The basic algorithmic details are as follows:

Calls received by each secured entity are sampled at every sampling interval

Samples computed at each sampling period are not directly used to detect anomalies Samples undergo three levels of normalization to reduce false alarms:

Cumulative sum

Averaging

Sliding Window.

Sliding window size represents number of most recent samples over which a short term profile is created by averaging.

Time over which this window spans=number of samples*sampling period

Short term parameters are compared with learned parameters within the learned deviation boundary to detect anomalous sample.

Number of anomalous samples is maintained for the size of sliding window, i.e. How many anomalous samples are observed out of the last n samples?

Traffic originated from an unsecured endpoint, or traffic terminated on a secured endpoint is suspected more if more number of anomalous samples are observed For each called party 3802, Vn=number of calls received in last sampling period in block 3804. For each calling party 3806, Vn=number of calls originated in last sampling period in block 3808. Thereafter, a current acceleration is calculated in block 3810 and the average acceleration and average velocity over a sliding window are calculated in block 3812. If the sampling is anomalous, as determined in decision block 3814, the sample is marked as anomalous in block 3816. Thereafter, or if the sampling is not anomalous, as determined in decision block 3814, the latest sampled is pushed in the window and the least recent sample is popped from the window in block 3818. If the number of samples in the window is greater than a threshold, as determined in decision block 3820, a feature(s) that needs to be invoked is decided in block 3822 and the feature invocation request is sent to TVM 1714 in block 3824. Thereafter, or if the number of samples is not greater than the threshold, as determined in decision block 3820, the next called party is obtained for analysis in block 3826 or the next calling part is obtained for analysis in block 3828 as the case may be. The process waits for a sampling period in block 3830, consolidates per-call notifications from TVM 1714 in block 3832, applies Stealth D/DoS detection algorithm in block 3834 and sends feature invocation commands to TVM 1714 or updates subscriber status in block 3836, and loops back to block 3830 to repeat the process.

Figure 39:
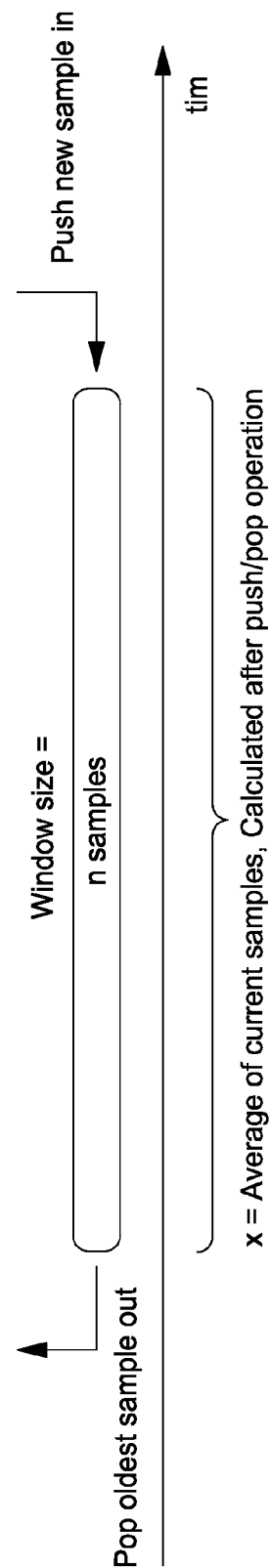
FIG. 39 illustrates a TAM Sliding Window Illustration in accordance with the present invention.

FIG. 39 illustrates a TAM Sliding Window Illustration in accordance with the present invention. The configured data for the TAM 1702 includes importing information about secured entities, configuration for endpoint protection, configuration for call server protection, response configuration and learned parameters (profile for call server, aggregated profiles for endpoints, profiles for endpoints and Stealth DoS detection algorithm configuration). Secured entities information (URI and DoS profiles) will be downloaded from Sems 1102 when Call Server accepts either a registration request or a call from a subscriber endpoint. Updates to this data will be propagated from Sv 1106 to Ss 1108 in the form of trigger notifications. Additionally, learned statistics are merged at the end of each timeslot. These updates from Ss 1108 to the profiles need to be reflected back to Sv 1106 for possible use by other Ss 1108 in case the subscriber moves to another location.

Configuration for Endpoint Protection

| Parameter | Remarks | Effect | Default value |
|---|---|---|---|
| Unblock timeout | Once all attacks stop sources are unblocked after this much time | Increase: Blocked endpoints will remain blocked for a longer period<br>Decrease: Oscillatory attack possible, if attacker knows/learns the timeout another attack may be started as soon as timeout occurs | 300 sec |
| Stealth sampling period | TAM 1702 will consolidate per-call notifications from TVM 1714 at this frequency | Increase: Stealth attack will be detected slower | 1 sec |
| Stealth window size (in num of samples) | Sliding window size in terms of number of samples to consider when calculating short term behavior | Increase: Stealth attack will be detected slower | 90 sec |
| Stealth suspect threshold (as percentage of window size) | If number of anomalous samples in the sliding window cross this threshold, TAM 1702 suspects the corresponding traffic | Decrease: Traffic will be suspected faster | 0.7 sec |
| Off-net originating average acceleration | Default value for off-net callers | Decrease: Less tolerant towards off-net callers, attack will be detected faster, possible increase in false alarm | ? |
| Off-net originating average velocity | Default value for off-net callers | Decrease: Less tolerant towards off-net callers, attack will be detected faster, possible increase in false alarm | ? |
| Off-net inactivity timeout | Stop monitoring off-net callers after this much time of inactivity | Decrease: Oscillatory attack possible, if attacker knows/learns the timeout another attack may be started as soon as timeout occurs | 300 sec |
| Subscriber inactivity timeout | Stop monitoring subscribers after this much time of inactivity | Decrease: Oscillatory attack possible, if attacker knows/learns the timeout another attack may be started as soon as timeout occurs | 300 sec |
| Terminating average acceleration | Subscriber default value | Decrease: Attack will be detected faster, possible increase in false alarm | ? |
| Terminating average velocity | Subscriber default value | Decrease: Attack will be detected faster, possible increase in false alarm | ? |
| Originating average acceleration | Subscriber default value | Decrease: Less tolerant towards misbehavior | ? |
| Originating average velocity | Subscriber default value | Decrease: Less tolerant towards misbehavior | ? |

Configuration for Call Server Protection

| Parameter | Remarks | Effect | Default value |
|---|---|---|---|
| Capacity threshold | Alert is generated when number of simultaneous sessions anchored at call server exceeds this number | Increase: Ss will be more tolerant | 90% of total capacity |
| Total capacity | Total capacity in terms of simultaneous sessions anchored by call server | — | Depends on call server capacity - No default, must be configured explicitly |

Response Configuration:

| Parameter | Remarks | Effect | Default value |
|---|---|---|---|
| Attack Type | SINGLE_SOURCE_FLOOD DISTRIBUTED_FLOOD SINGLE_SOURCE_STEALTH DISTRIBUTED_STEALTH | — | No default - must be explicitly configured |
| Response Id | OPEN_ALL, SD, MCD, RATE_LIMIT, BLOCK_ALL | — | No default - must be explicitly configured |
| Response order | Response invocation order | — | No default - must be explicitly configured |
| Response timeout | Invoke for this much time and if attack is still not prevented go to next response | — | No default - must be explicitly configured |

Learned Parameters: Profile for Call Server

| Parameter | Remarks | Effect | Default value |
|---|---|---|---|
| Call server id | Call server Identifier | — | Must be configured explicitly |
| Day type | Profile for Working/Non-working | — | Must be configured explicitly |
| Timeslot id | Profile for this Timeslot | — | Must be configured explicitly |
| Average used capacity | Learned value | Baseline for detecting attack on call server | Learned - can be configured, no default |
| Average capacity growth rate | Learned value | Baseline for detecting attack on call server | Learned - can be configured, no default |
| Average call arrival rate | Learned value | Baseline for detecting attack on call server | Learned - can be configured, no default |

Aggregated Profiles for Endpoints

| Parameter | Remarks | Effect | Default value |
|---|---|---|---|
| ProfileId | Profile Identifier. All similar profiles are merged into one common profile | — | Must be configured explicitly |
| Day type | Working/Non-working | — | Must be configured explicitly |
| Direction | calls originated/calls terminated | — | Must be configured explicitly |
| Timeslot id | Timeslot | — | Must be configured explicitly |
| Learned average velocity | Learned value | Baseline for detecting attack on endpoint | Learned - can be configured, no default |
| Learned average acceleration | Learned value | Baseline for detecting attack on endpoint | Learned - can be configured, no default |
| Acceleration standard deviation | Learned value | Baseline for detecting attack on endpoint | Learned - can be configured, no default |
| Velocity standard deviation | Learned value | Baseline for detecting attack on endpoint | Learned - can be configured, no default |

Profiles for Endpoints

| Parameter | Remarks | Effect | Default value |
|---|---|---|---|
| EndpointID | Endpoint URI/Identifier | | |
| ProfileId | Aggregated profile id | This aggregated profile will be used as baseline to detect stealth attack | |

Stealth DoS Detection Algorithm Configuration

| Parameter | Remarks | Effect | Default value |
|---|---|---|---|
| Trust score | Sensitivity factors vary according to trust score | — | Must be configured explicitly |
| Oi sensitivity | Used for traffic originated when acceleration is on an increasing trend | Increase: Less tolerable towards source misbehavior | Must be configured explicitly (Range: 0.1-0.9) |
| Ri sensitivity | Used for traffic received when acceleration is on an increasing trend | Increase: Stealth attack on the endpoint will be detected faster | Must be configured explicitly (Range: 0.1-0.9) |
| Od sensitivity | Used for traffic originated when acceleration is on an decreasing trend | Decrease: Source misbehavior will be remembered longer | Must be configured explicitly (Range: 0.1-0.9) |
| Rd sensitivity | Used for traffic received when acceleration is on an decreasing trend | Decrease: Attack will be remembered longer | Must be configured explicitly (Range: 0.1-0.9) |
| Acceleration tolerance | If observed acceleration in a sample crosses learned acceleration times this tolerance value, that sample is marked as anomalous in the sliding window | Increase: More tolerant towards attack | Must be configured explicitly |

| Parameter | Remarks | Effect | Default value |
|---|---|---|---|
| Velocity tolerance | If observed velocity in a sample crosses learned velocity times this tolerance value, that sample is marked as anomalous in the sliding window | Increase: More tolerant towards attack | Must be configured explicitly |

The dynamic data includes secured endpoint information and non-secured entity information. The secured endpoint information includes: secured endpoint Identifier ("URI"), Sliding windows containing samples of acceleration and velocity for calls received for and from each secured endpoint. The non-secured entity information includes: Non-secured endpoint Identifier ("URI"), Sliding window containing samples of acceleration and velocity for calls received from each non-secured endpoint.

Figure 40:
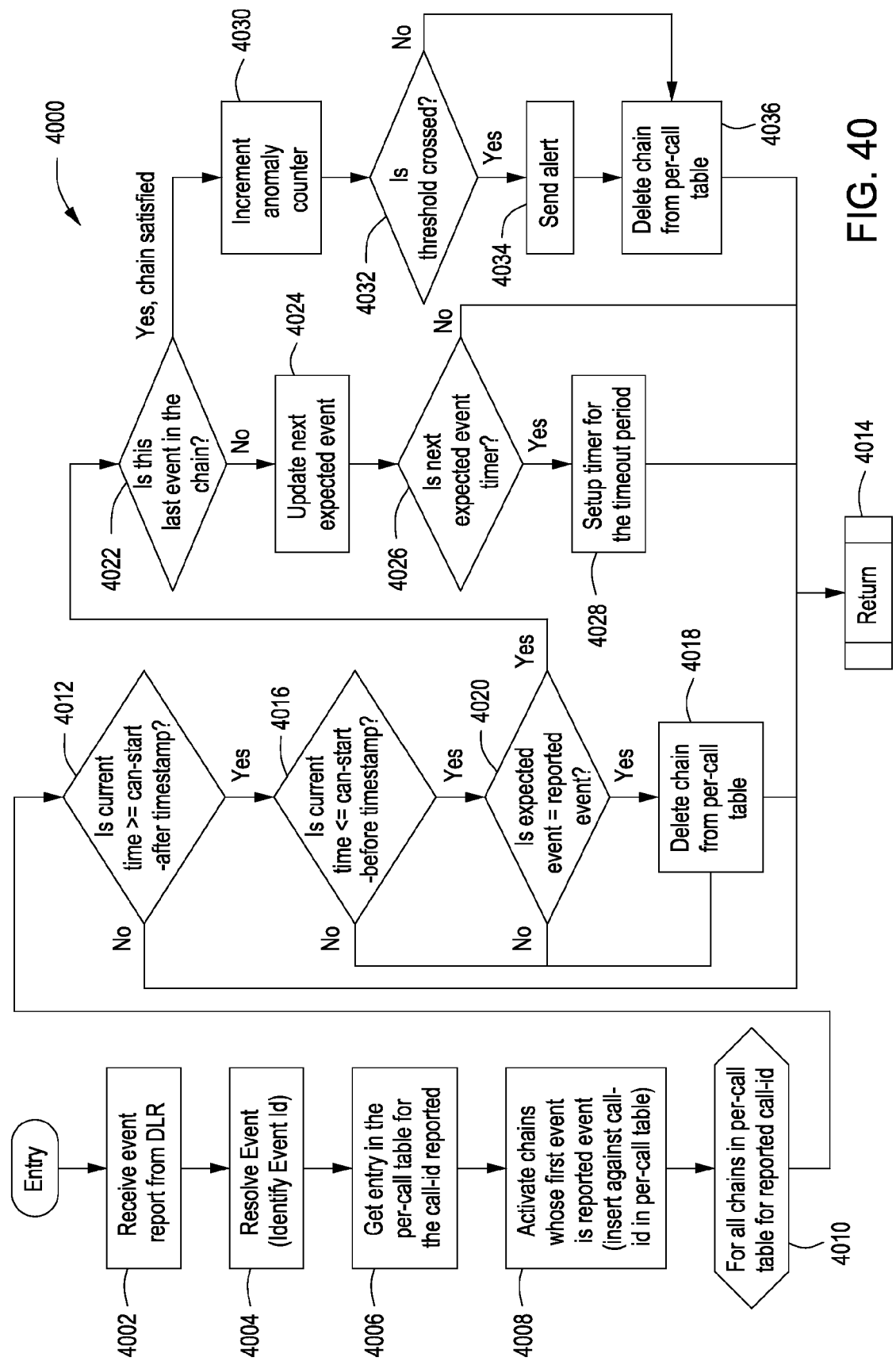
FIG. 40 illustrates a MSA Flow Diagram in accordance with the present invention.

FIG. 40 illustrates a Message Sequence Analyzer ("MSA") Flow Diagram 4000. The MSA functional requirements include:

Message sequence anomaly detection: Detect message sequences that would normally not occur during a legitimate session initiation/negotiation.

Endpoint monitoring: Maintain message sequence anomaly counts for each subscriber served by the Ss Aggregate monitoring: Maintain anomaly counts for the POP served by the Ss.

Domain monitoring: For enterprise solution, MSA will maintain anomaly counters for the secured domain.

Alert generation: Generate alerts when anomaly counter values cross the configured threshold MSA Algorithmic Requirements:
 When a SIP message is reported by the DLR, map the message to an MSA identifiable event by extracting required fields. Refer to in-memory event definitions.
 Lookup the event multi-map entry corresponding to the identified event id to determine which chains to activate
 Insert records for activated chains in the per-call active chains table
 Point to next position in the chain and update the Next-event-can-start-after and Next-event-can-start-before timestamps
 Deactivate appropriate chains by deleting all entries corresponding to the call-id in the reported SIP message from per-call table whose next position pointer points to a different event than the one that is reported
 Delete all entries whose timeout has already occurred
 Ignore the reported event if it has occurred to early
 Clean-up thread will periodically cleanup all stale entries from the per-call tables
 If the next event in the chain is timeout event, set a timer for that much timeout
 If next event in the chain is NULL (i.e. chain is satisfied), increment the corresponding anomaly counter Extendibility: Adding new anomalies will be simpler if one has in depth knowledge of events and sequences of events that are anomalous The MSA configured data includes a storage of events. The following table illustrates how events are configured in the configuration database. Properties format: Field Name=Value, where value can be a string of ASCII characters, or one of keywords [ANY|SAVED|NULL|NOT NULL]. Actions format: One of keywords [SAVE] followed by Field Name.

| EventId | Event Name | From | To | Event Type | Message | Properties | Actions |
|---|---|---|---|---|---|---|---|
| 1 | BYE | Network | Any | SIP REQ | BYE | TransactionId = Any | SAVE TransactionId |
| 2 | BYE | Network | Any | SIP REQ | BYE | TransactionId = SAVED | |
| 3 | INVITE | Network | Any | SIP REQ | INVITE | FromTag = NOT NULL ToTag = NULL | |
| 4 | 200 | Call Server or B2B | Any | SIP RESP | 200 | CSeqMethod = INVITE | |
| 5 | 200 | Network | Any | SIP RESP | 200 | CSeqMethod = BYE | |
| 7 | INVITE | Call Server or B2B | Any | SIP REQ | INVITE | FromTag = NOT NULL ToTag = NULL | |
| 8 | 200 | Network | Any | SIP RESP | 200 | CSeqMethod = INVITE | |
| 10 | INVITE | Network | Any | SIP REQ | INVITE | FromTag = NOT NULL ToTag = NOT NULL | |
| 11 | BYE | Network or B2B or call server | Any | SIP REQ | BYE | | |
| 12 | CANCEL | Network | Any | SIP REQ | CANCEL | | |
| 13 | 200 | Network | Any | SIP RESP | 200 | CSeqMethod = CANCEL | |
| 14 | 487 | Network | Any | SIP RESP | 487 | CSeqMethod = INVITE | |
| 15 | INVITE | Any | Network | SIP REQ | INVITE | | |
| 16 | 200 | Network | Any | SIP RESP | 200 | CSeqMethod = INVITE SDP = NOT NULL | SAVE SDP |

-continued

| EventId | Event Name | From | To | Event Type | Message | Properties | Actions |
|---|---|---|---|---|---|---|---|
| 17 | 200 | Network | Any | SIP RESP | 200 | CSeqMethod = INVITE SDP != SAVED | |
| 18 | Non-200 RESP | Network | Any | SIP RESP | RESP | CSeqMethod = INVITE RespCode != 200 | |
| 19 | ACK | Network | Any | SIP REQ | REQ | | |
| 20 | Error Resp | Network | Any | SIP RESP | RESP | RespCode = 4xx | |

Example Anomaly Event Sequences

| Num. | Attack | Anomaly | MSA Event Sequence (Correlated with call Id) |
|---|---|---|---|
| 1 | Attacker terminates dialog by sending spoofed BYE to Ss | Two BYEs are received for one dialog with different transaction id | BYE from n/w with transaction id x BYE from n/w with transaction id !x 1-2 |
| 2 | Attacker terminates dialog by sending spoofed BYE to Calling party | 200 for BYE is received from calling party without sending a BYE | INVITE from n/w 200 for INVITE from CS or b2b 200 for BYE from n/w 3-4-5 |
| 3 | Attacker terminates dialog by sending spoofed BYE to Called party | 200 for BYE is received from called party without sending a BYE | INVITE from CS or b2b 200 for INVITE from n/w 200 for BYE from n/w 7-8-5 |
| 4 | Attacker terminates dialog by sending spoofed re-Invite with junk SDP to Ss | BYE follows re-Invite within few seconds | INVITE from n/w with not null TO tag BYE from n/w or B2B or CS after x seconds 10-11 |
| 5 | Attacker terminates dialog by sending re-Invite with junk SDP to calling party | 200 for INVITE is received from calling party without sending INVITE or with different transaction Id | INVITE from n/w 200 for INVITE from CS or b2b 200 for INVITE from n/w 3-4-8 |
| 6 | Attacker terminates dialog by sending re-Invite with junk SDP to called party | 200 for INVITE is received from calling party without sending INVITE or with different transaction Id | INVITE from CS or b2b 200 for INVITE from n/w 200 for INVITE from n/w 7-8-8 |
| 7 | Attacker cancels session initiation attempts by sending spoofed CANCEL to Ss | Increased number of sessions cancelled, (Can get Sm feedback to confirm that CANCEL comes from same Access Pop) | INVITE from n/w CANCEL from n/w 3-12 |
| 8 | Attacker cancels session initiation attempts by sending spoofed CANCEL to remote party | 200 for CANCEL and 487 for INVITE is received without sending CANCEL, | INVITE to n/w 200 for CANCEL from n/w 487 for INVITE from n/w 15-12-14 |
| 9 | Attacker sends spoofed 200 for INVITE with different SDP than legitimate 200 to Ss | Two 200 with different SDP contents for one INVITE are received | INVITE to n/w 200 for INVITE from n/w with SDP x 200 for INVITE from n/w with SDP y (! = x) 15-16-17 |
| 10 | Attacker sends spoofed 200 for INVITE to Ss and legitimate response is non-200 | Non-200 response follows 200 response | INVITE to n/w 200 for INVITE from n/w Any response for INVITE from n/w 15-8-18 |
| 11 | Attacker sends spoofed 200 for INVITE to Ss and legitimate response is non-200 | 200 response follows non-200 response | INVITE to n/w Any response for INVITE from n/w 200 for INVITE from n/w 15-18-8 |
| 12 | Attacker sends spoofed 200 for INVITE to remote party | ACK for 200 OK without sending 200 OK | INVITE from n/w ACK for 200 OK from n/w 3-19 |
| 13 | Attacker sends spoofed error response to INVITE to Ss | Two error responses or one 200 and one error response is received for one INVITE | INVITE to n/w Any error response from n/w 200 for INVITE from n/w 15-20-8 INVITE to n/w 200 for INVITE from n/w Any error response from n/w 15-8-20 |

-continued

| Num. | Attack | Anomaly | MSA Event Sequence (Correlated with call Id) |
|---|---|---|---|
| 15 | Attacker sends spoofed error response to INVITE to remote party | ACK for error response without sending error response | INVITE from n/w ACK for any error response from n/w 3-19 |

Storage of Chains—Chain Definitions

| ChainId | EventIndex | EventId | NextCanStartAfter | NextCanStartBefore |
|---|---|---|---|---|
| 1 | 1 | 1 | 0 | 30 |
| 1 | 2 | 2 | 0 | 0 |
| 2 | 1 | 3 | 0 | 180 |
| 2 | 2 | 4 | 0 | MAX |
| 2 | 3 | 5 | 0 | 0 |

Anomaly Counter Thresholds for Generating Alerts

| Chain Id | Anomaly Counter | Alert Threshold | Time Period (seconds) |
|---|---|---|---|
| 1 | Spoofed-Bye-to-Ss-Attack | 20 | 300 |
| 2 | Spoofed-Bye-to-Remote-Party-Attack | 20 | 300 |

The dynamic data includes the following:
Event
  Each event identified by a unique event id
  Has a timeout for the next event (next event must occur within timeout)
  Call Id and other message data
  Can have other data (not yet determined)
Anomalies are configured as sequences of events referred to as event chains
Singleton Event Multi-map used to find chains to activate when event is reported
  Key: Event Id
  Data: Chain Ids whose first event is the key
Per-call table of active chains
  Columns
    ChainId NextPositionPtr NextEventCanStartAfter NextEventCanStartBefore
Clean-up thread to clean stale entries in per-call tables An event report is received from DLR in block 4002, the event is resolved in block 4004, an entry in the per-call table for the reported call-id is obtained in block 4006. Chains are activated whose first event is a reported event (insert against call-id in per-call table) in block 4008. For all chains in the per-call table for the reported call-id in block 4010, if the current time is not greater than or equal to can-start-after timestamp, as determined in decision block 4012, the process returns in block 4014. If, however, the current time is greater than or equal to can-start-after timestamp, as determined in decision block 4012, and the current time is not less than or equal to the can-start-before timestamp, as determined in decision block 4016, the chain is deleted from the per-call table in block 4018 and the process returns in block 4014. If, however, the current time is less than or equal to can-start-before timestamp, as determined in decision block 4016, and the expected event is not equal to the reported event, as determined in decision block 4020, the chain is deleted from the per-call table in block 4018 and the process returns in block 4014. If, however, the expected event is equal to the reported event, as determined in decision block 4020, and this is not the last event in the chain, as determined in decision block 4022, the next expected event is updated in block 4024. If, the next expected event is timer, as determined in decision block 4026, the timer is set up for the time out period in block 4028. Thereafter, or if the next expected event is not the timer, as determined in decision block 4026, the process returns in block 4014. If, however, this is the last event in the chain, as determined in decision block 4022, the anomaly counter is incremented in block 4030. If a threshold is crossed, as determined in decision block 4032, an alert is sent in block 4034. Thereafter, or if the threshold is not crossed, as determined in decision block 4032, the chain is deleted from the per-call table in block 4036 and the process returns in block 4014.

Figure 41:
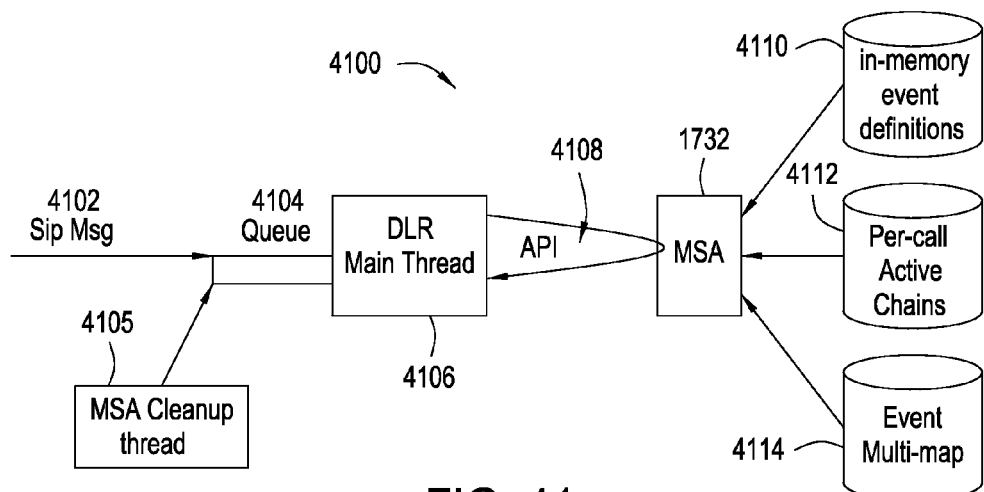
FIG. 41 illustrates a MSA Basic Architecture in accordance with the present invention.

FIG. 41 illustrates a MSA Basic Architecture 4100 in accordance with the present invention. SIP message 4102 enters a queue 4104 for the DLR main thread 4106. The queue 4104 is cleaned up by MSA cleanup thread 4105. DLR main thread 4106 interfaces with MSA 1732 using an application program interface 4108. MSA 1732 processes the messages using in-memory event definitions 4110, per-call active chains 4112 and event multi-map 4114.

Figure 42:
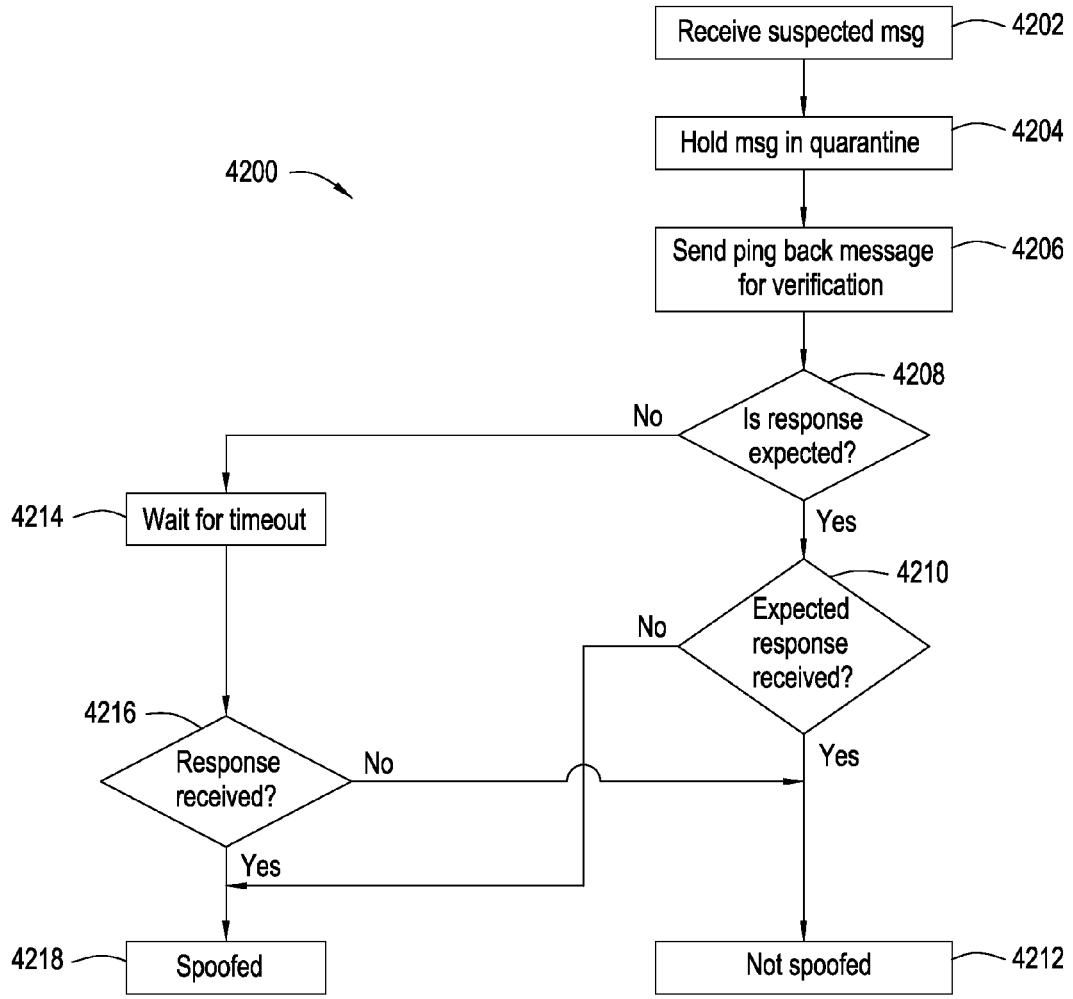
FIG. 42 illustrates a Spoof Detection Flow Diagram in accordance with the present invention.

FIG. 42 illustrates a Spoof Detection ("SD") Flow Diagram 4200 in accordance with the present invention. The SD functional requirements are as follows:

Back-to-back Agent Interface: Spoof Detection feature will register the security triggers with the back to back agent and will receive trigger notifications.

PCUA Interface: SD will connect to Prompt & Collect Agent, if necessary, to play ring back tones for callers who have been verified as legitimate.

Ping-back: SD feature uses SIP ping-back messages as a response to a suspected SIP message received from the network to detect if that message has spoofed headers.

Scope: SD feature will detect spoofed FROM header in following SIP messages: Re-INVITE (INVITE received within ongoing dialog); CANCEL; BYE; 200 OK; Any error response; and Any re-direct response.

Re-INVITE Spoof Detection: SD will hold the suspected Re-INVITE message and send a ping-back Re-INVITE to the FROM URI in the received Re-INVITE. It will decide if the spoofed re-INVITE message was spoofed or not based on the response to the ping-back re-INVITE. (Spoofed if a response other than 491, not spoofed if response is 491)

CANCEL Spoof Detection: CANCEL message is used by the originator of initial INVITE message to cancel the requested session initiation. SD will hold the suspected CANCEL message and will respond with a 200 OK. It will wait for ACK for 200 OK. If ACK is received it will decide that the CANCEL message was spoofed.

BYE Spoof Detection: SD will hold the suspected BYE message and will send a ping-back Re-INVITE message. If a 487 error response is received it will decide that the BYE message was not spoofed. 487 message indicates that there is no dialog on the other end to handle the re-INVITE indicating that the legitimate endpoint had sent the BYE.

200 OK/Error Response/Redirect Response Spoof Detection: SD will hold the suspected 200 OK message and will wait for another response. If another response is received it will decide which of the two responses is legitimate and will process it. It will drop the other response.

Statistics Maintenance: SD will maintain following statistics: Number of spoofed messages detected for each SIP message type; and Top n FROM URIs used by spoofers (n is configured). These statistics will be reset at every configured interval Avoidance of Reflection Attack: Ping-back techniques used for verifying legitimacy of suspected messages involve sending a verification message to the endpoint in the FROM URI of the SIP message. This gives rise to a possibility wherein attacker inserts forged FROM URI of the endpoint/server who he intends to attack and sends large number of such messages to Ss. Once Ss goes into suspect mode for that traffic, it will start sending ping-back messages to the FROM URI. This can result in a Reflection attack on the ping-back destination where Ss is used by the attacker as a traffic reflecting entity. SD will maintain statistics to monitor and rate-limit such ping-back messages to avoid reflection attack.

The SD configured data includes alert thresholds and timeouts. The alert thresholds are for counters: Number of spoofed messages detected per secured entity, and Number of ping-back messages sent to each distinct destination. The timeouts are for resetting these counters. The dynamic data includes states for calls currently being processed.

A suspect message is received in block 4202, the message is held in quarantine in block 4204 and a ping back message is sent for verification in block 4206. If a response is expected, as determined in decision block 4208, and the expected response is received, as determined in decision block 4210, the message is determined to be NOT SPOOFED in block 4212. If, however, the expected response is not received, as determined in decision block 4210, the message is determined to be SPOOFED in block 4218. If, however, a response is not expected, as determined in block 4208, the process waits for time out in block 4214. If a response is received, as determined in decision block 4216, the message is determined to be SPOOFED in block 4218. If, however, the response is not received, as determined in decision block 4216, the message is determined to be NOT SPOOFED in block 4212.

Figure 43:
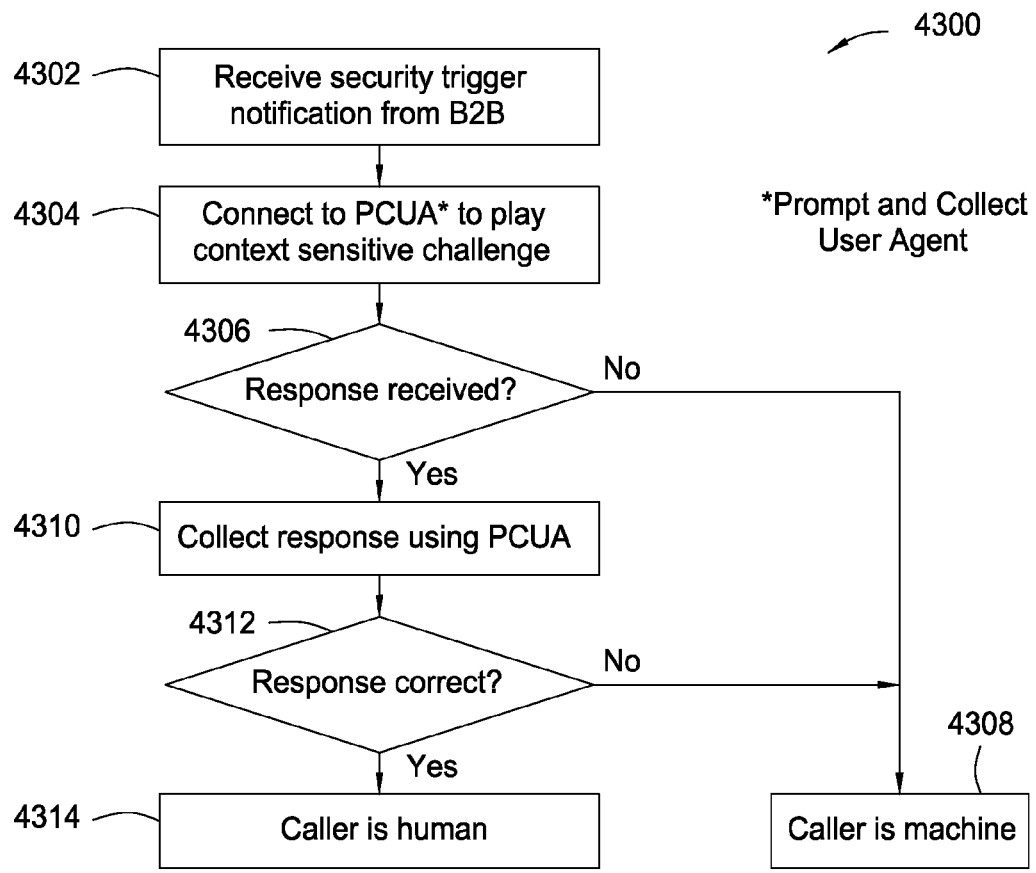
FIG. 43 illustrates a Machine Caller Detection Flow Diagram in accordance with the present invention.

FIG. 43 illustrates a Machine Caller Detection ("MCD") Flow Diagram 4300 in accordance with the present invention. The MCD functional requirements are as follows:

Back-to-back Agent Interface: MCD feature will register the security triggers with the back to back agent and will receive trigger notifications.

PCUA Interface: MCD will connect to Prompt & Collect Agent, if necessary, to play challenge prompt (e.g., please enter your zip code for faster service), and to collect response as DTMF.

Blocking Machine Callers: MCD feature, when invoked, will apply MCD algorithm to block calls whose caller cannot correctly respond to the challenge prompt. It is presumed that this will filter out all machine callers not having speech recognition intelligence.

Context Sensitive Prompt: MCD will use database to choose context sensitive prompt based in location, caller Id, and any circumstantial/environmental conditions (e.g., we understand that there is a power outage in your area, please enter your zip code for faster service).

The configured data includes prompt files, alert thresholds and timeouts. The prompt files are context sensitive prompts stored in mpeg format. The alert thresholds are for a counter for the Number of callers who could not respond correctly to the challenge prompt. The timeouts are for resetting this counter. The dynamic data includes states for calls currently being verified for machine caller presence.

A security trigger notification is received in block 4302 and a connection to PCUA to play a context sensitive challenge is established in block 4304. If a response is not received, as determined in decision block 4306, the caller is determined to be a machine in block 4308. If, however, a response is received, as determined in decision block 4306, the response is collected using PCUA in block 4310. If the response is not correct, as determined in decision block 4312, the caller is determined to be a machine in block 4308. If, however, the response is correct, as determined in decision block 4312, the caller is determined to be human in block 4314.

Interfaces to Other Subsystems

|      | From | To |
| --- | --- | --- |
| Si | FeatureInvocationRequest (secured entity id, traffic stream id) | DoS attack detection alert Message sequence anomaly alert |
| Sm | CodecViolation(ConnId) PacketizationTimeViolation (ConnId, ObservedPacketizationTime) PacketSizeDescrepancy (ConnId, ObservedPktSize) UnidirectionalMedia(ConnId, ObservedDirection) MediaStopsWithoutNotification (ConnId) NoMediaEstablished(ConnId) AbnormalMediaVolume (ConnId | src-dst-info) TrojanMedia(ConnId) SSRC, SeqNo, Timestamp manipulation | CallConnectionInfo (ConnId, SDP Parms, Bitmask for templates) CallClearanceInfo(ConnId) Templates (Abnormal Media Traffic Volume Thresholds, List of report-back contacts) |
| Sems | Initial Config Parms (Heartbeat time, network config) Templates (DoS/Spam vanilla policies, firewall vanilla policies) | Query for subscriber info Query for templates (DoS/Spam/FW) Heartbeats, Failures/Switchovers |
| Sv | Response to query for caller trust score and fingerprint Batch Pull Request | Query for trust score and fingerprints Batch pull response Trust score push on LRU overflow |

Interfacing with Media (Sm): Ss will use Sm to detect signaling and media discrepancies. For example, Ss will record media type (e.g., video/audio) being negotiated in SIP signaling and will request Sm to verify the media type on the corresponding media stream enabling Ss to detect unauthorized media on a particular connection. If the call is anchored at B2B Agent, B2B agent will request Sm to monitor media on the corresponding media stream after connecting the call. On the other hand, if Ss acts as a proxy agent, DLR will request Sm to monitor the media. In both cases, Sm will report back anomalies to the requester. Ss will send call connection info (connection id, SDP parameters, bit mask for templates to be activated on the connection) in the media monitor request. Sm will monitor media for anomalies corresponding to each anomaly template and will report back to Ss.

Figure 44:
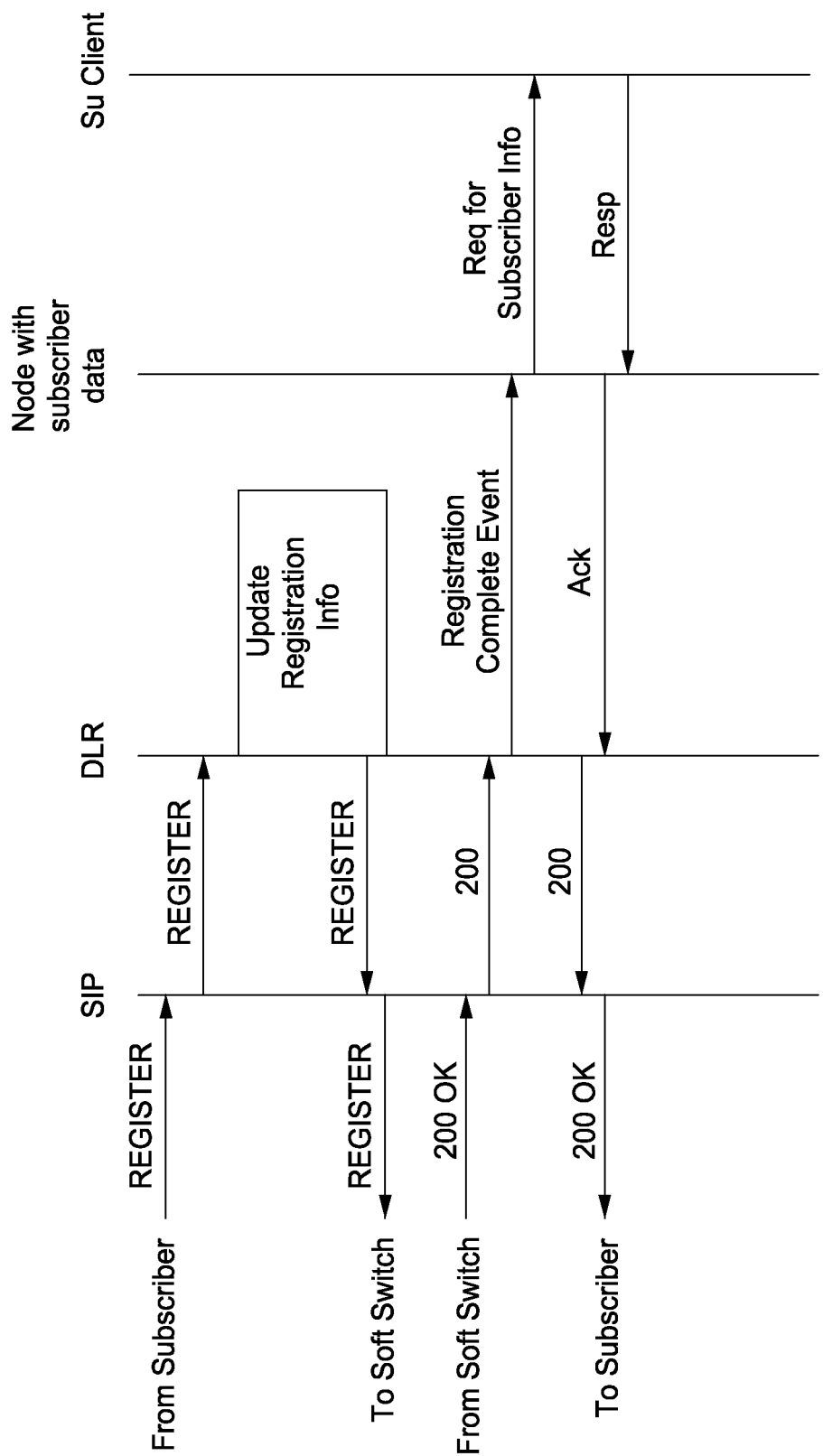
FIG. 44 illustrates a Registration Call Flow in accordance with the present invention.

FIG. 44 illustrates a Registration Call Flow in accordance with the present invention. Ss queries subscriber information from Su/Sems if it is not in its cache and a service request (REGISTER/INVITE) from the subscriber is honored by the call server. This information will contain following information: SPAM policies; DoS Profile; and Subscriber credibility.

Figure 45:
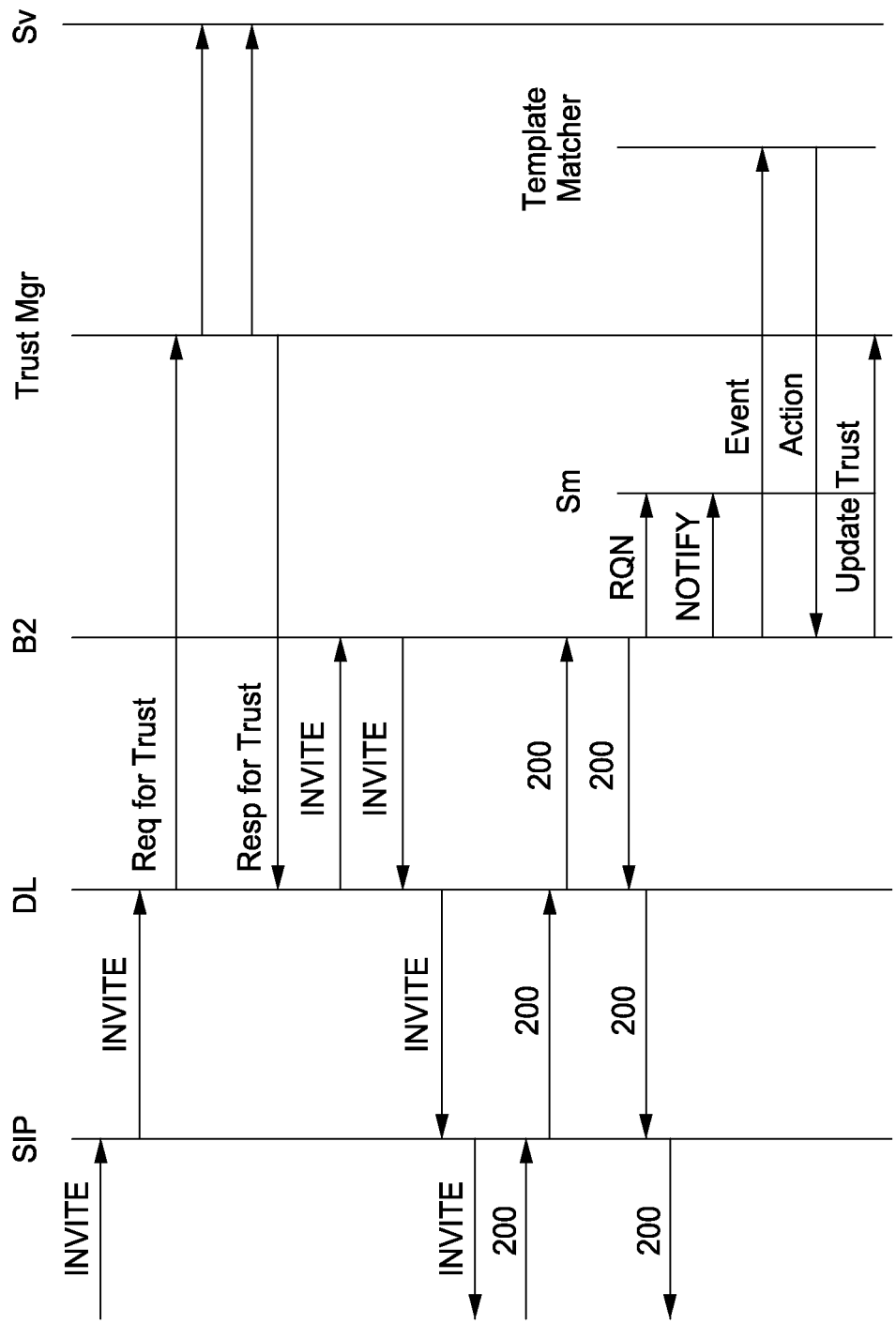
FIG. 45 illustrates an INVITE Call Flow in accordance with the present invention.

FIG. 45 illustrates an INVITE Call Flow in accordance with the present invention. Ss queries subscriber information from Su/Sems if it is not in its cache and a service request (REGISTER/INVITE) from the subscriber is honored by the call server. This information will contain following information: SPAM policies; DoS Profile; and Subscriber credibility.

Figure 46:
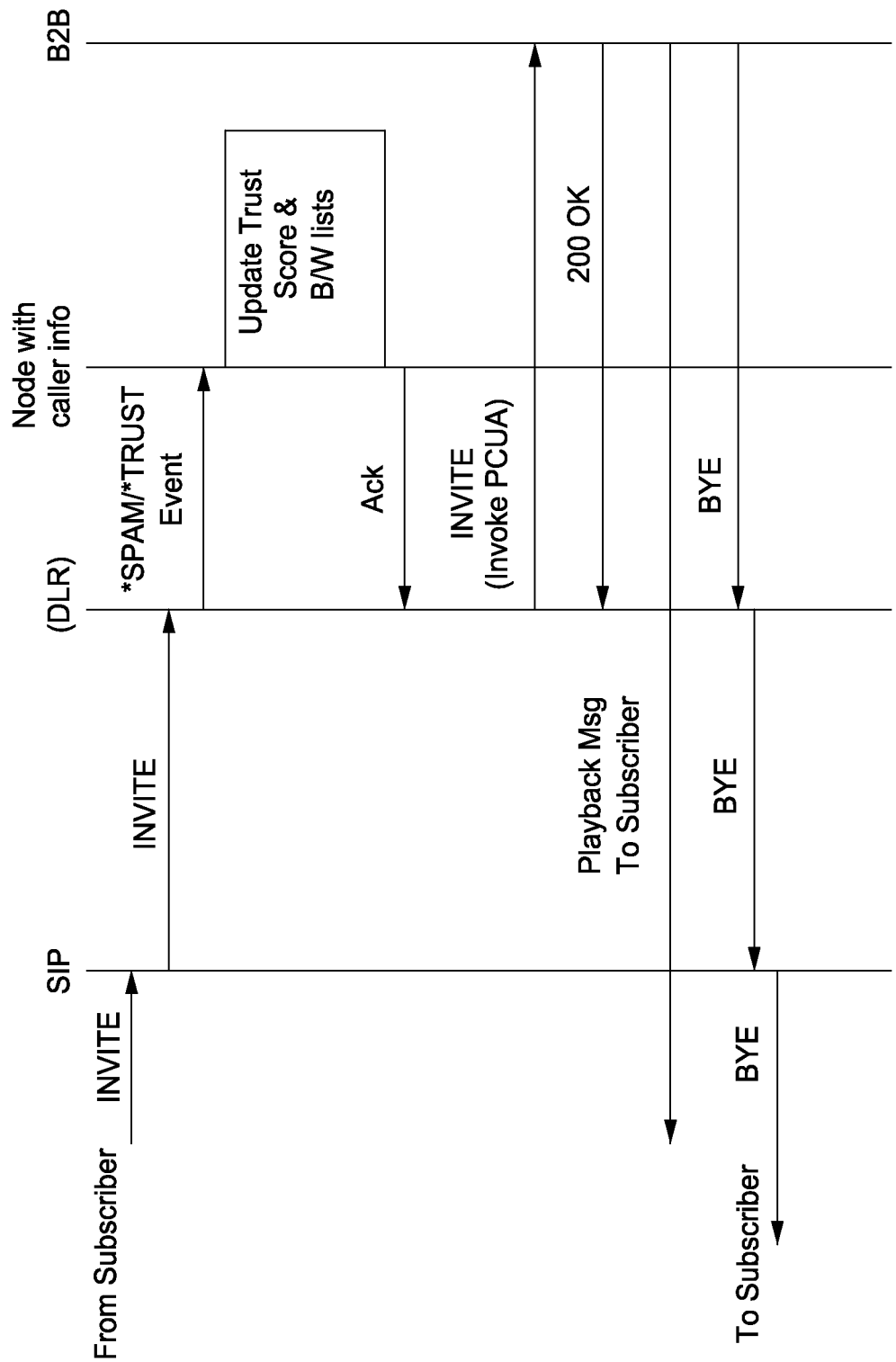
FIG. 46 illustrates a *SPAM/*TRUST Call Flow in accordance with the present invention.

FIG. 46 illustrates a *SPAM/*TRUST Call Flow in accordance with the present invention.

Figure 47:
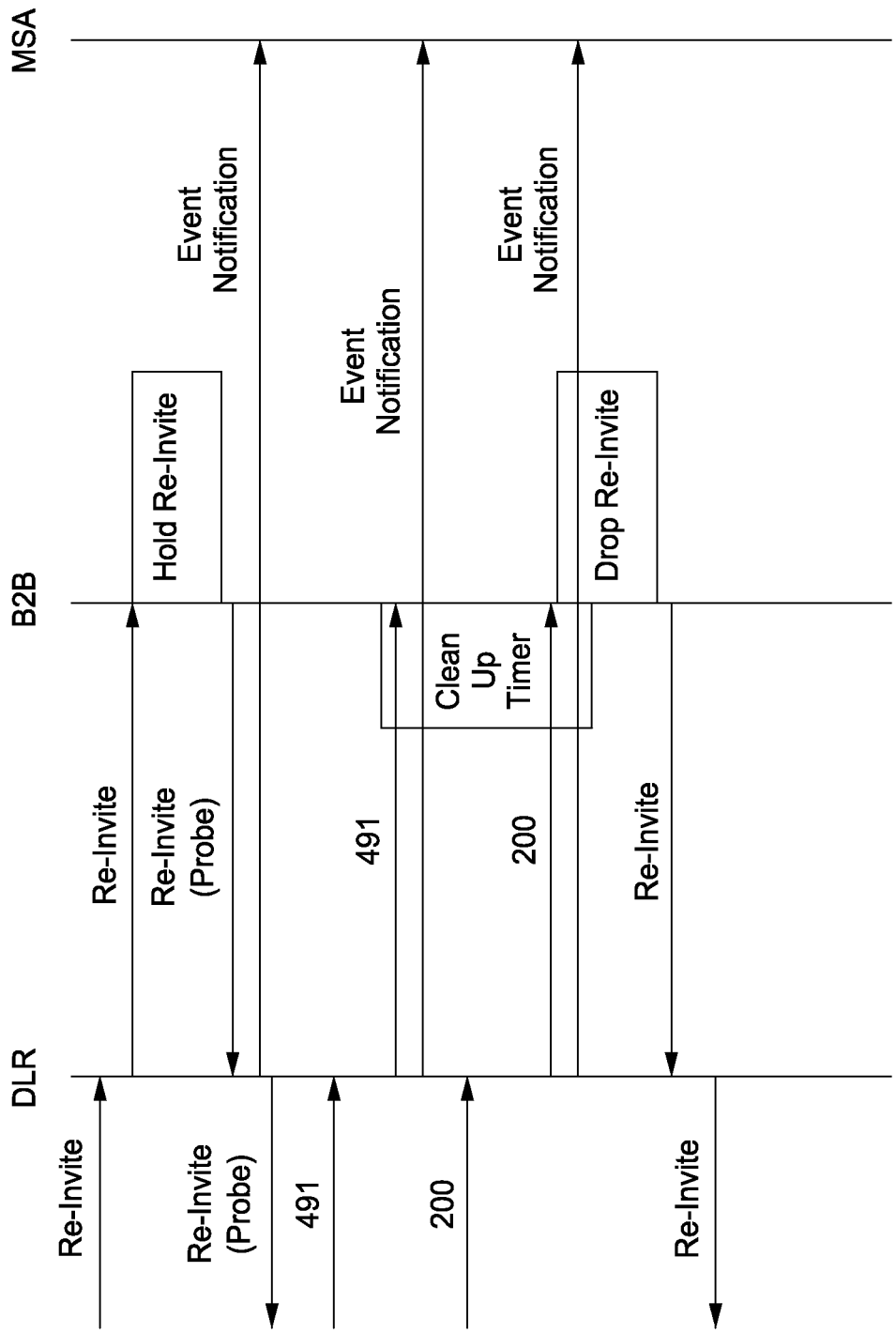
FIG. 47 illustrates a Re-INVITE Spoof Detection Call Flow in accordance with the present invention.

FIG. 47 illustrates a Re-INVITE Spoof Detection Call Flow in accordance with the present invention.

Figure 48:
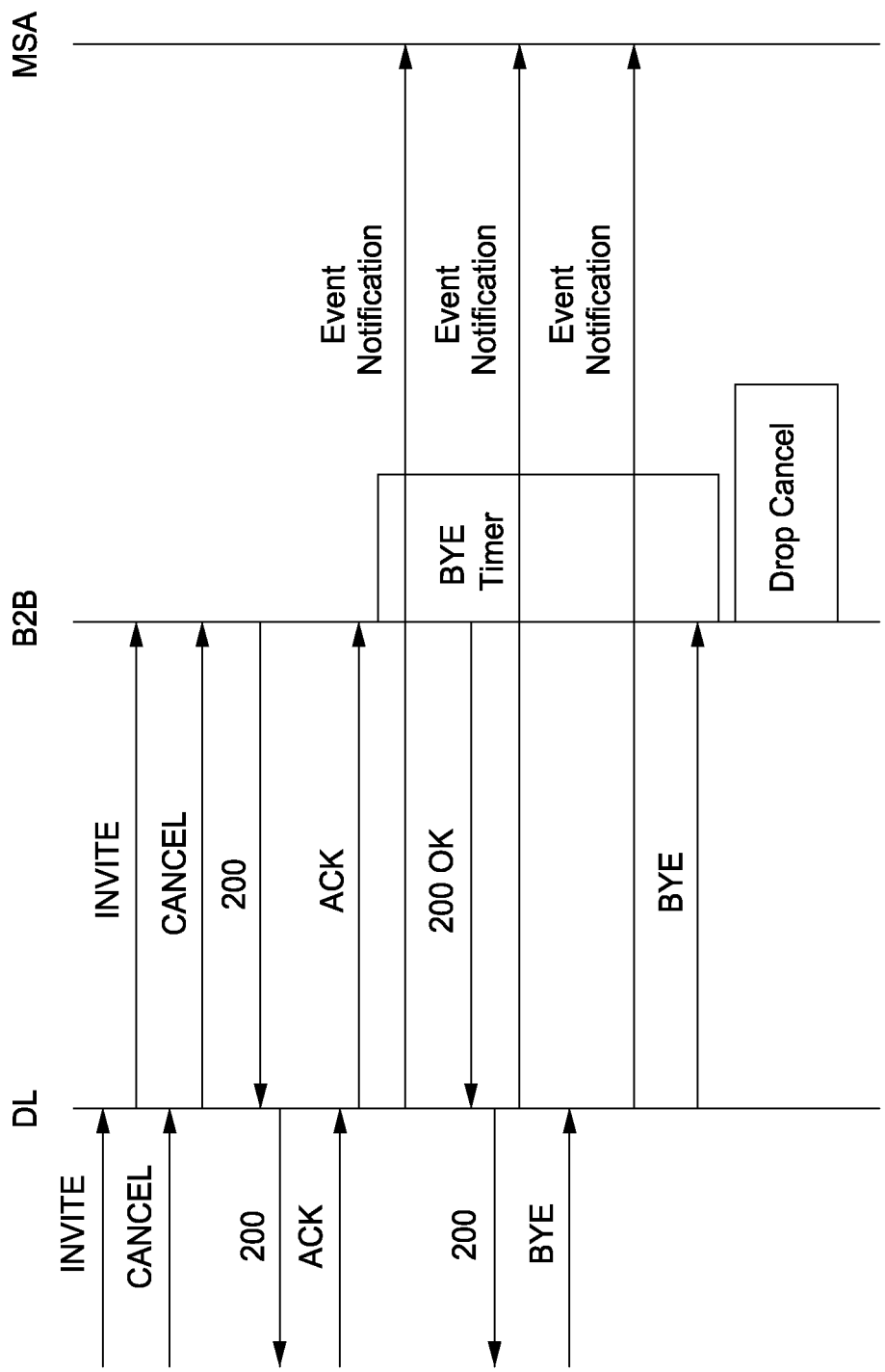
FIG. 48 illustrates a CANCEL Spoof Detection Call Flow in accordance with the present invention.

FIG. 48 illustrates a CANCEL Spoof Detection Call Flow in accordance with the present invention.

Figure 49:
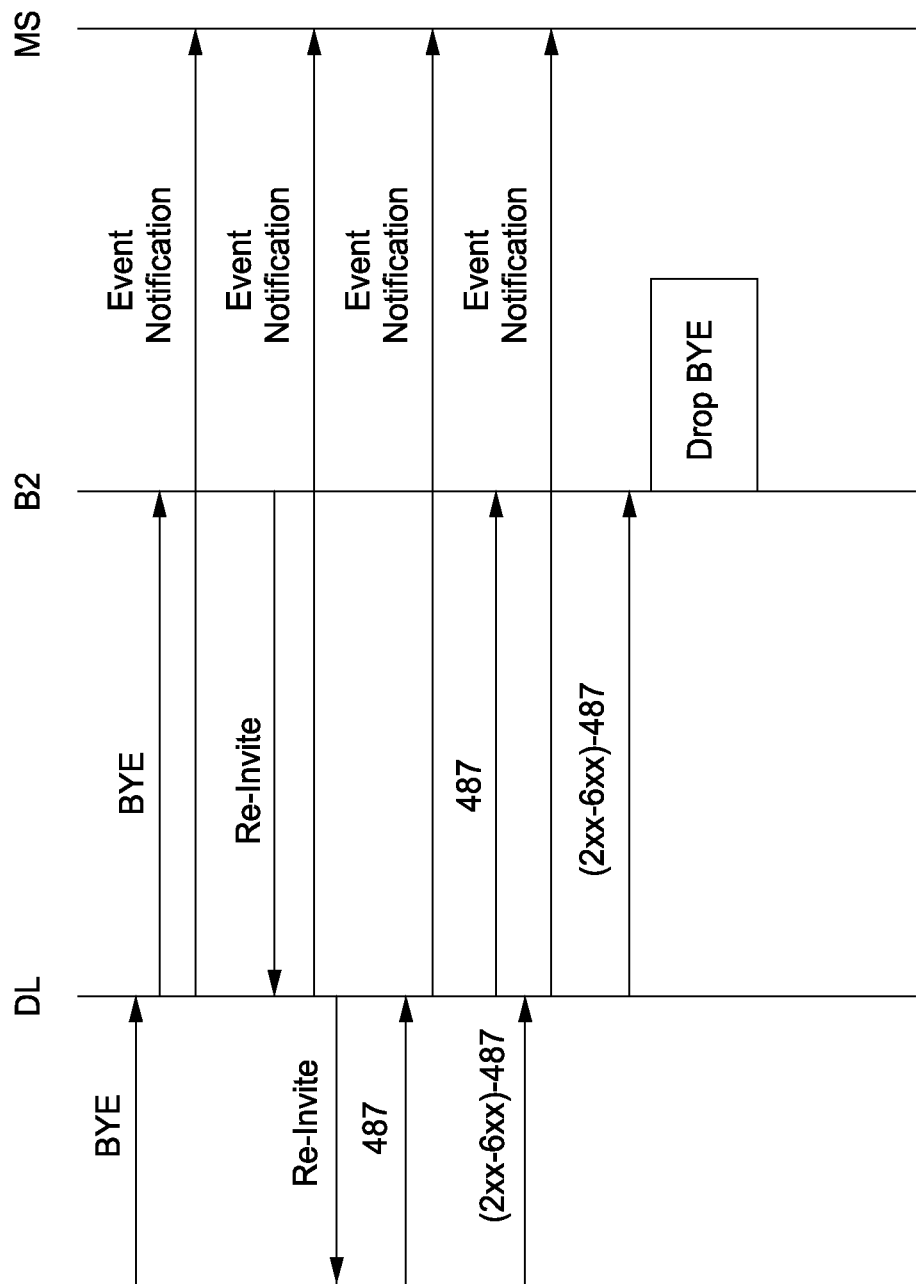
FIG. 49 illustrates a BYE Spoof Detection Call Flow in accordance with the present invention.

FIG. 49 illustrates a BYE Spoof Detection Call Flow in accordance with the present invention.

Figure 50:
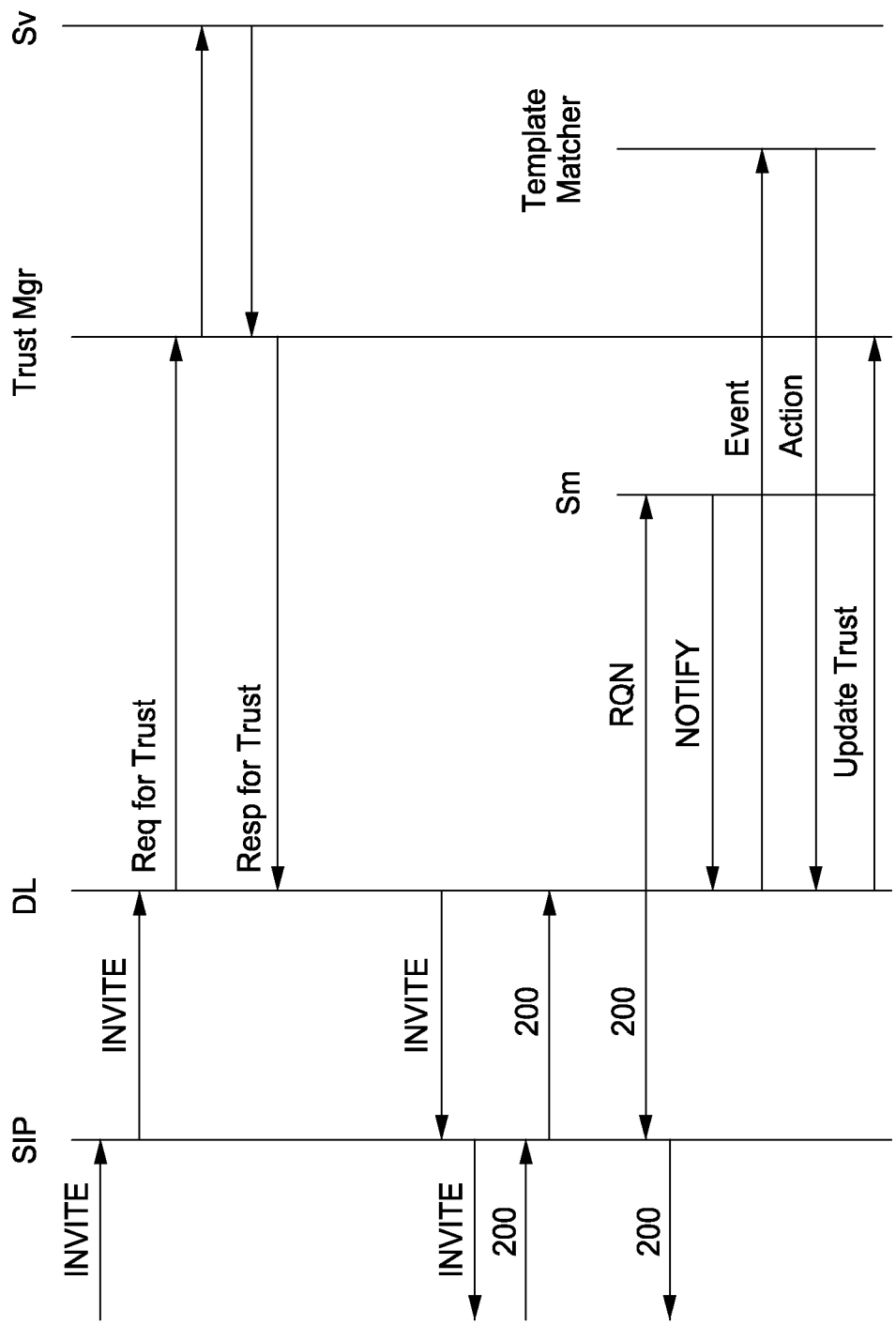
FIG. 50 illustrates an INVITE (Proxy mode) Call Flow in accordance with the present invention.

FIG. 50 illustrates an INVITE (Proxy mode) Call Flow in accordance with the present invention.

Figure 51:
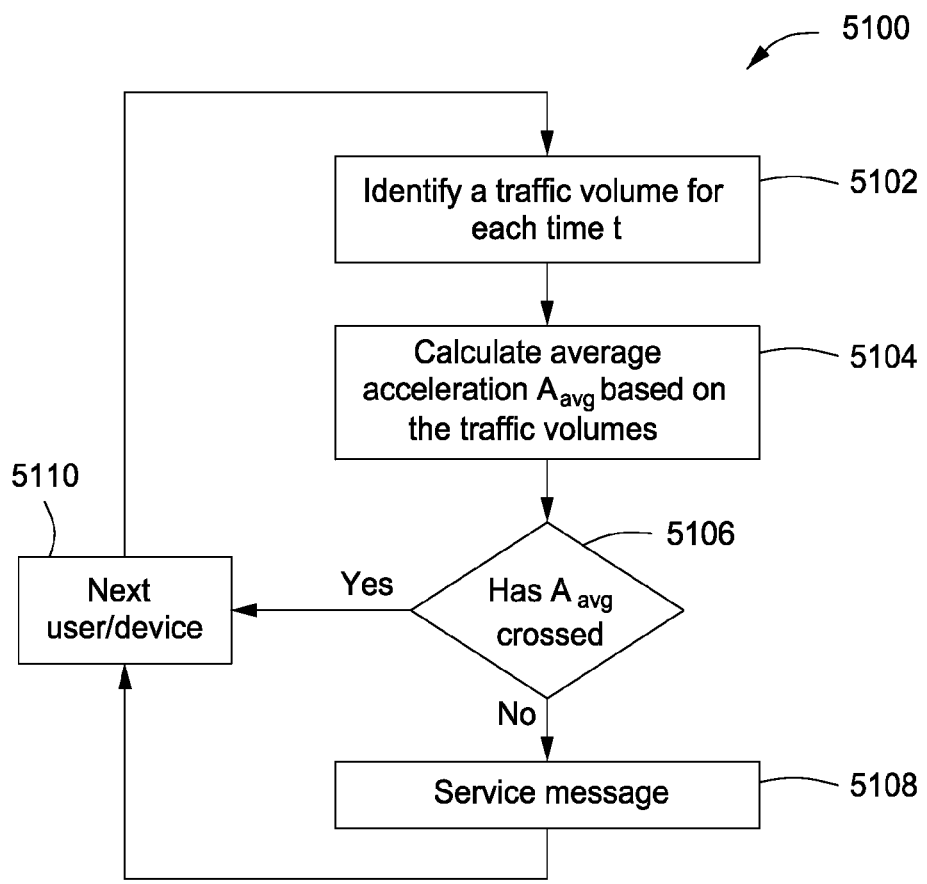
FIG. 51 is a flowchart of one embodiment of a method for detecting a denial of service attack in a communications system in accordance with the present invention.

An example of one embodiment of the present invention used to detect and prevent DoS attacks in a communication system is now described. Referring to FIG. 51, in one embodiment, a method 5100 enables the detection and prevention of DoS type attacks in a communication system. Although some DoS attacks may be detected based on a flood of traffic, other attacks may be based on stealth. Such stealth attacks may be particularly effective against IP-based voice or instant messaging resources, such as VoIP phones or instant messaging programs. For example, unlike traditional data resources, low volume sustained call traffic may be used to create a DoS attack on a VoIP phone. Although the volume of traffic may not be high enough to register as a DoS flood attack, it may prevent use of the phone by, for example, sending frequent packets requesting connection to the phone. As will be described later in greater detail, the method 5100 detects such attacks based on traffic average acceleration, and may be used with systems that include computers, servers, telephones, pagers, personal digital assistants, and other devices susceptible to such DoS attacks.

In step 5102, an amount or volume of traffic is identified at multiple times. In the present example, the method 5100 identifies a traffic volume for each application, user, or device (e.g., a VoIP telephone), although the traffic may be traffic destined for a particular network or a subnet. Each time at which the traffic volume is sampled may be a predefined time following the previous time (e.g., Δt). In step 5104, an average acceleration Aavg is calculated based on the traffic volumes. A more detailed example of these calculations will be provided later.

In step 5106, a determination is made as to whether Aavg has crossed a threshold. For example, a threshold value may be established based on system characteristics (amount of traffic, etc.) and the threshold may be defined to indicate an excessive amount of traffic (from any source or from a particular source or sources, or to one or more destinations). If Aavg has not crossed the threshold, the method 5100 continues to step 5108, where the messages are serviced. For example, if the message is a session initiation protocol ("SIP") INVITE message, then the message would be serviced as is known in the art. After the message is serviced, the method continues to the next user (if the calculations are per user) or device (if the calculations are per device) in step 5110. If Aavg has crossed the threshold, then an attack may be occurring and the method may continue to step 5110 without servicing the message. In some embodiments, the method may also block a source of the traffic or take other action, as will be described later.

Figure 52A:
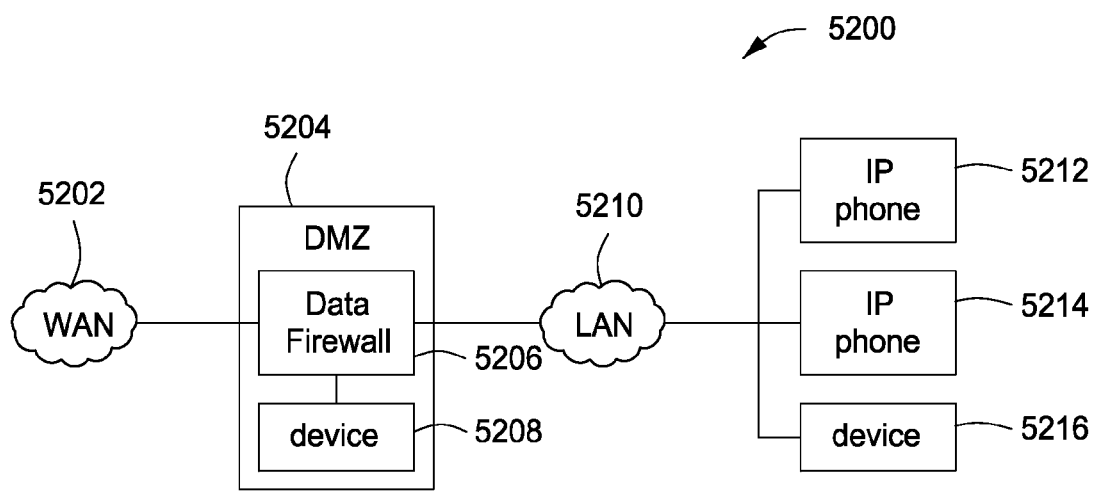
FIG. 52A is a diagram of one embodiment of a communications environment in which the method of FIG. 51 may be executed in accordance with the present invention.

Referring now to FIG. 52A, an exemplary system 5200 illustrates one environment within which the method 5100 of FIG. 51 may be executed. A wide area network ("WAN") 5202 is connected to a local area network (LAN) 5210 via a demilitarized zone ("DMZ") 5204. The DMZ 5204 includes a data firewalling means 5206 and a device 5208. The LAN 5210 is connected to multiple devices, such as IP phones 5212 and 5214, and a device 5216 (e.g., a computer). It is understood that each of the illustrated components of the system 5200 may include other components that are not shown. For example, the LAN 5210 may include servers, routers, PBXs, voicemail systems, interactive voice response ("IVR") systems, etc. Instructions for executing various steps or for implementing various functions disclosed in the present description may be stored on and/or executed by many of the components of the system 5200.

Figure 52B:
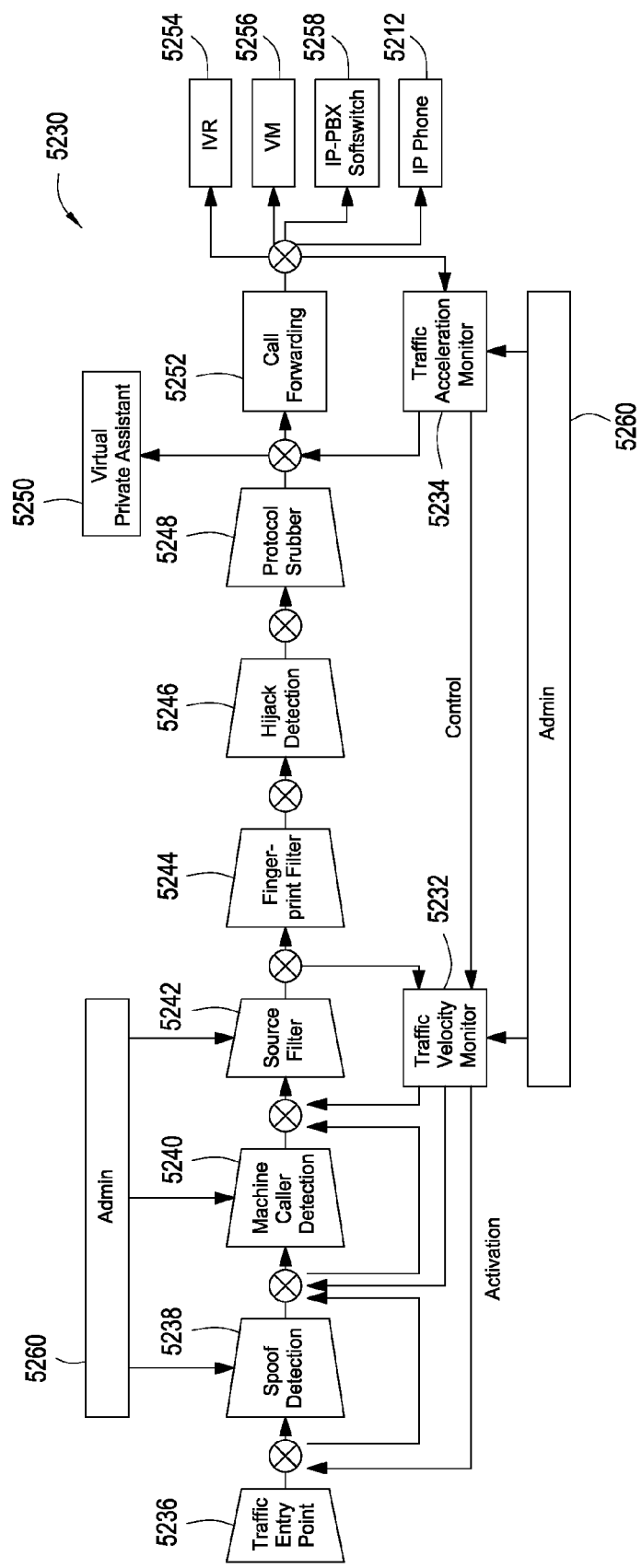
FIG. 52B is a diagram of exemplary components of one embodiment of an architecture that may be implemented within the system of FIG. 52A for detecting and preventing various types of denial of service attacks in accordance with the present invention.

Referring now to FIG. 52B, architecture 5230 includes exemplary components that may be implemented within the system of FIG. 52A for detecting and preventing various types of DoS attacks. As will be described later in greater detail, the various components may be used for detecting or preventing one or more different types of attacks, and some components may be used in conjunction with other components. It is understood that, although the present architecture is implemented within the device 5208 of FIG. 52A, the components may be distributed throughout the system 5200 and may be arranged differently than illustrated in the architecture 5230. Furthermore, various components may be added, removed, combined, or further divided. Additionally, functionality provided by the illustrated components may be achieved using a number of different approaches. Accordingly, the particular architecture illustrated in FIG. 52B is one of many possible architectures that may be used to implement the present disclosure.

Traffic moving within the architecture 5230 is monitored by one or both of a TVM 5232 and a TAM 5234. Both the TVM 5232 and TAM 5234 may monitor both the source of traffic (e.g., from outside the system 5230) and the traffic's destination (e.g., within the system 5230). The monitoring of traffic using the TVM 5232 and TAM 5234 is described in greater detail below with respect to FIG. 53.

Traffic enters the architecture 5230 at an entry point 5236. As can be seen by the arrows indicating data flow through the system 5200, traffic may pass through a spoof detection ("SD") component 5238 and/or a machine caller detection ("MCD") component 5240 before arriving at a source filter ("SF") 5242. Alternatively, the traffic may pass directly from the entry point 5236 to the source filter 5242 if the SD 5238 and MCD 5240 are not active or if some traffic is not being blocked. The source filter 5242, which may or may not provide filtering for a particular source, feeds traffic back into the TVM 5232 as well as into a fingerprint filter 5244. Traffic passes from the fingerprint filter 5244 into a hijack detection component 5246 and from there into a protocol scrubber ("PS") 5248. Traffic from the protocol scrubber 5248 may pass into a virtual private assistant ("VPA") 5250 and a call forwarding component 5252. The call forwarding component 5252 passes traffic into one or more devices or systems, such as an interactive voice response ("IVR") system 5254, a voicemail system ("VM") 5256, an IP-PBX softswitch 5258, and/or an IP phone (such as the IP phone 5212 of FIG. 52A). The call forwarding component also feeds information back into the TAM 5234, which sends information to the VPA 5250 and the TVM 5232. Although the call forwarding component 5252 receives mostly legitimate traffic, passing the traffic back into the TAM 5234 may aid in the detection of stealth attacks. An administration interface 5260 may be used to access and control one or more of the components, such as the TVM 5232, the TAM 5234, the spoof detection component 5238, the machine caller detection component 5240, and the source filter 5242.

With additional reference to Table 1 (below), the architecture 5230 uses the TVM 5232, TAM 5234, and other components to identify the occurrence of DoS attacks and prevent such attacks, including attacks from a single source and attacks from multiple sources (distributed DoS ("DDoS") attacks). Various attacks are illustrated in Table 1 (below) along with the components of the architecture 5230 that may be used to detect and prevent each attack.

TABLE 1

| | DoS (single source) | | DDoS (multiple source) | |
|---|---|---|---|---|
| | Detect | Prevent | Detect | Prevent |
| Flood Zombie | TVM | SF | TVM | MCD |
| Flood Spoofed | TVM | SF | TVM | SD |
| Stealth Zombie | TAM | SF | TAM | MCD |
| Stealth Spoofed | TAM | SF | TAM | SD |
| Stealth Human | TAM | SF | TAM | VPA |
| Malicious Formatting | PS | PS | n/a | n/a |
| Call hijacking/Call shut-down | FF | FF | n/a | n/a |

As described previously, a flood attack uses one or more machines to launch an attack based on overwhelming traffic volume. A zombie attack is launched from one or more compromised machines (e.g., zombies). A spoofed attack falsifies the attack's source to make it appear that the attack is being launched from a different source. A malicious formatting attack exploits vulnerabilities in formatting and protocols. Call hijacking and call shut-down attacks disrupt or gain control of a call by intercepting messages and/or relaying false messages to control or terminate an ongoing communication session. Various combinations of these attacks can be used, as illustrated in Table 1. It is noted that the term "call" includes many message and messaging types in the present disclosure, including voice calls, instant messages, pages, etc.

Turning now to a more detailed description of various components of the architecture 5230, the TVM 5232 and TAM 5234 provide traffic monitoring capabilities (for both source and destination) for many types of attacks, with additional detection capabilities provided by the fingerprint filter 5244 and the protocol scrubber 5248. Generally, the TVM 5232 and TAM 5234 interact with and utilize other components of the architecture 5230 to stop or prevent an attack that they detect.

Figure 53:
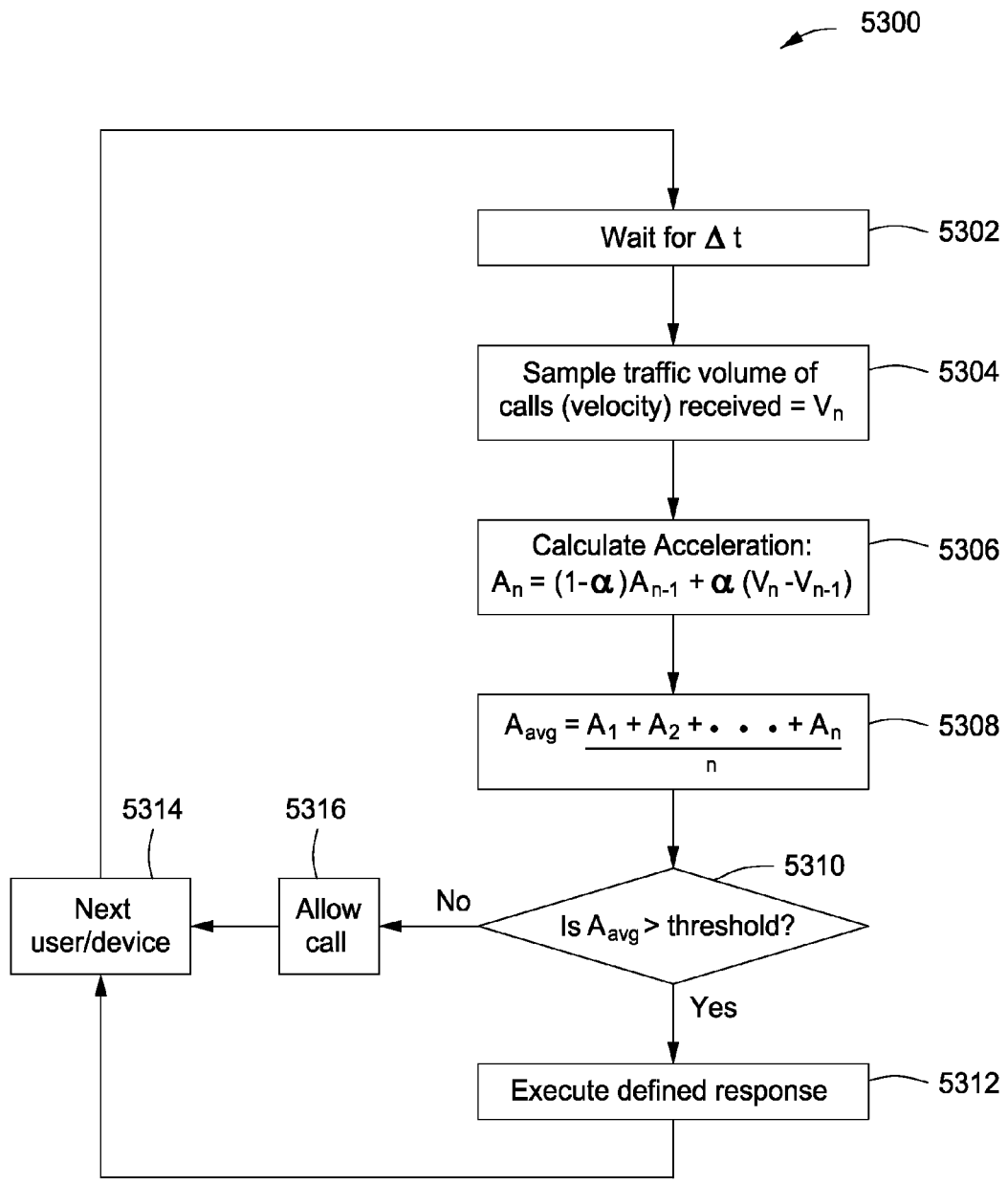
FIG. 53 is a flowchart of a more specific example of the method of FIG. 51 in accordance with the present invention.

Referring to FIG. 53 and with additional reference to FIGS. 54-58, in one embodiment, a method 5300 illustrates how an attack may be detected using functionality provided by the TVM 5232 and TAM 5234 of FIG. 52B. An attack against the IP phone 5212 of FIG. 52A will be used for purposes of illustration, although it is understood that the present example is equally applicable to many of the components of the system 5200. Typically, all traffic may be stopped by a perimeter security device (e.g., the device 5208 of FIG. 52) when it is determined that the traffic volume is above a predefined threshold. Such a response may be invoked to counter the potential denial of service that could result from such a traffic volume. However, blocking all traffic prevents legitimate calls from being serviced and so is generally undesirable. Accordingly, the method 5300 enables the detection and blocking of attacks, while permitting legitimate traffic to be serviced.

Figure 54:
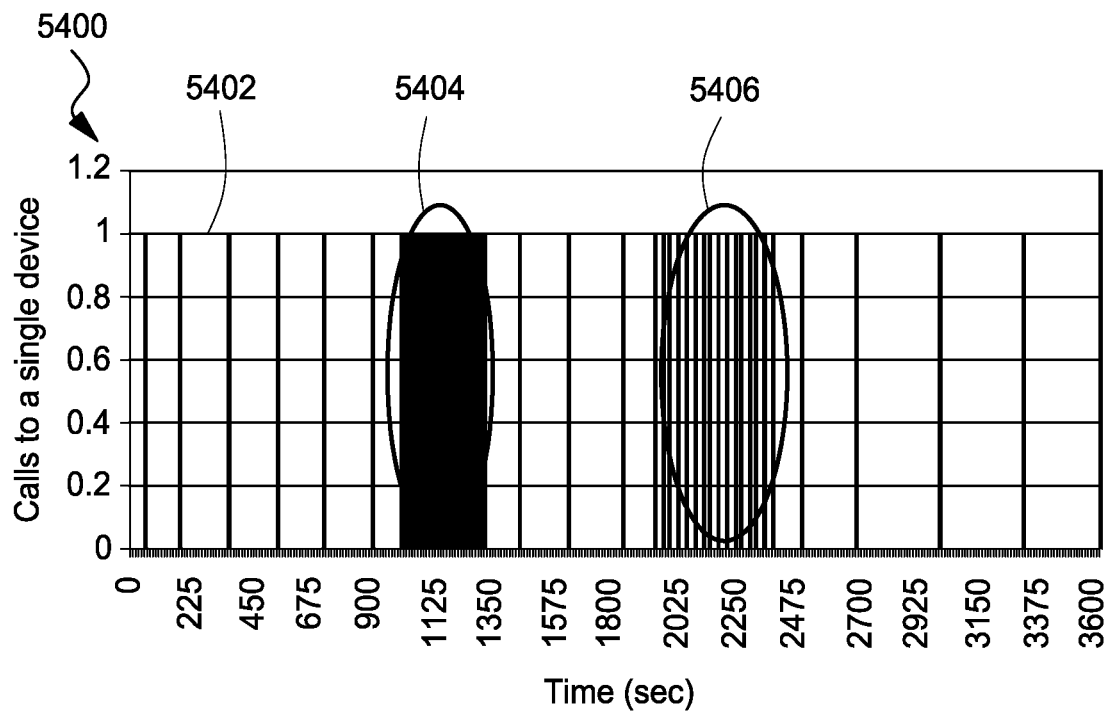
FIG. 54 is a graph of exemplary call statistics in accordance with the present invention.
Figure 55:
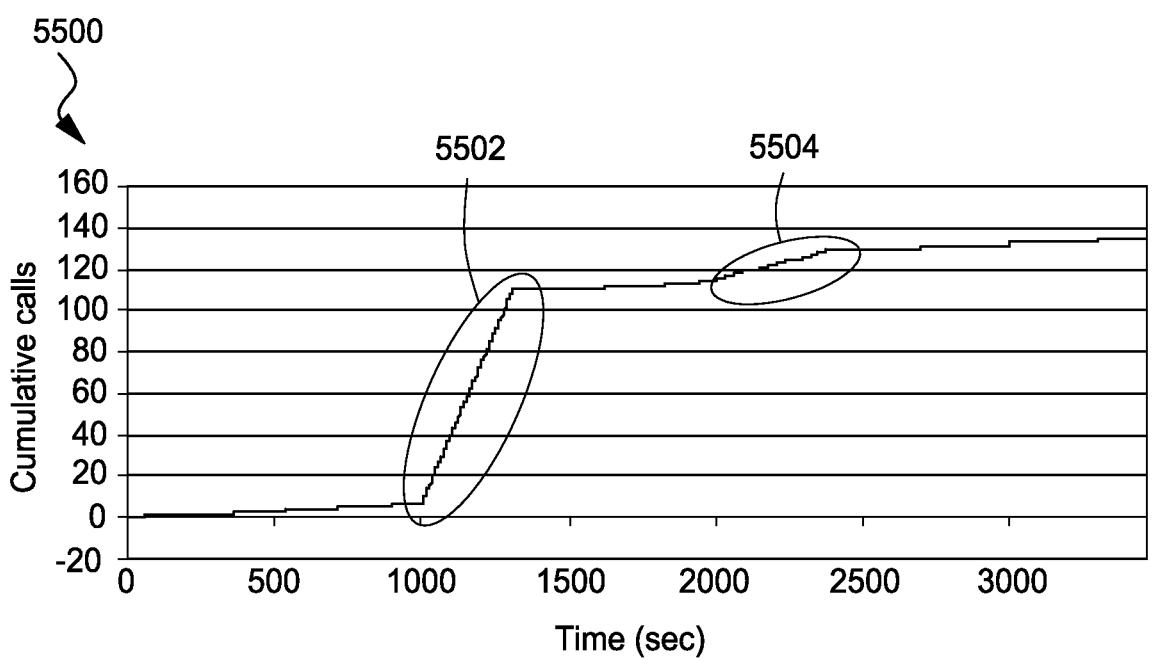
FIG. 55 is a graph of cumulative calls corresponding to the graph of FIG. 65 in accordance with the present invention.

As illustrated in graph 5400 of FIG. 54, call statistics indicate a number of calls directed to the phone 5212 over a period of time (3504 seconds or 58.4 minutes in the present example). Each call is represented by a vertical bar 5402. In the present example, the statistics indicate that one sequence of calls was received within a fairly short period of time (represented by the oval 5404) and occurred with few or no intervening pauses. Another sequence of calls was received later within another relatively short period of time (designated by the oval 5406), but these calls were generally separated by a brief time interval. As illustrated by the cumulative calls in graph 5500 of FIG. 55, the total number of calls jumps sharply in conjunction with the first sequence of calls (as represented by the oval 5502 in FIG. 55) and increases gradually with the second sequence of calls (as represented by the oval 5504).

In step 5302, the method 5300 waits for a predefined period of time Δt, which may be a configurable period of time defined in seconds. In step 5304, a traffic velocity Vn is sampled at the end of Δt by the TVM 5232. The velocity Vn represents an amount of traffic destined for the IP phone 5212 at the nth sampling time.

Figure 56:
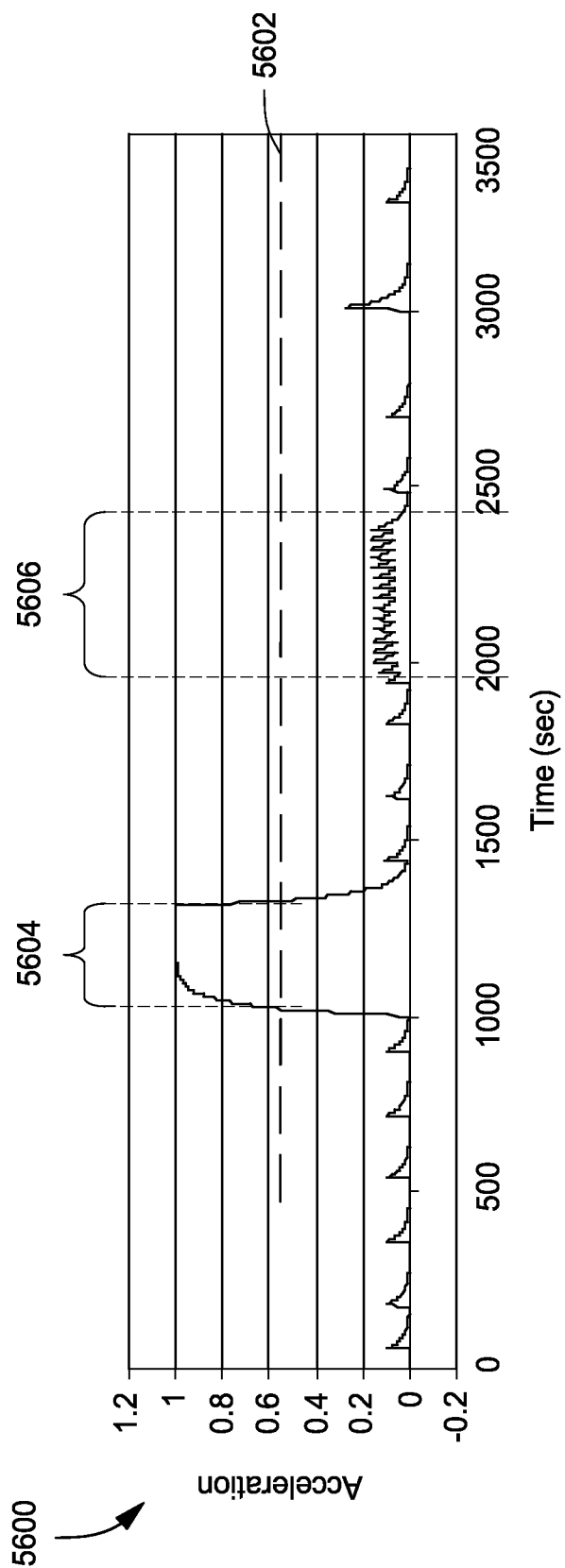
FIG. 56 is a graph of call acceleration corresponding to the graph of FIG. 54 in accordance with the present invention.

In step 5306 and with reference to FIG. 56, acceleration An is calculated for the nth sampling time using the equation:

$$An = (1-\alpha)An-1 + \alpha(Vn-Vn-1)$$

where α is a sensitivity factor that may be used to adjust the sensitivity of An with respect to recent changes in velocity (Vn−Vn−1). As can be seen by the equation, the acceleration is based on the rate of change of the traffic velocity Vn. However, the acceleration An (e.g., absolute acceleration) may not detect low volume sustained call traffic to the phone 5212 because such acceleration may remain below the threshold. As illustrated by graph 5600 of FIG. 56, relatively high volume (e.g., flood type) traffic may cross a threshold 5602 defining the occurrence of a flood type DoS attack. This type of traffic is indicated by reference numeral 5604. As noted below with respect to FIG. 57, when this type of high volume traffic is detected by the architecture 5230, it may be locked down to prevent it from crossing the threshold. However, low volume sustained traffic (represented by reference numeral 5606) may not cross the threshold, and so monitoring An may not be sufficient to identify stealth DoS attacks.

Figure 57:
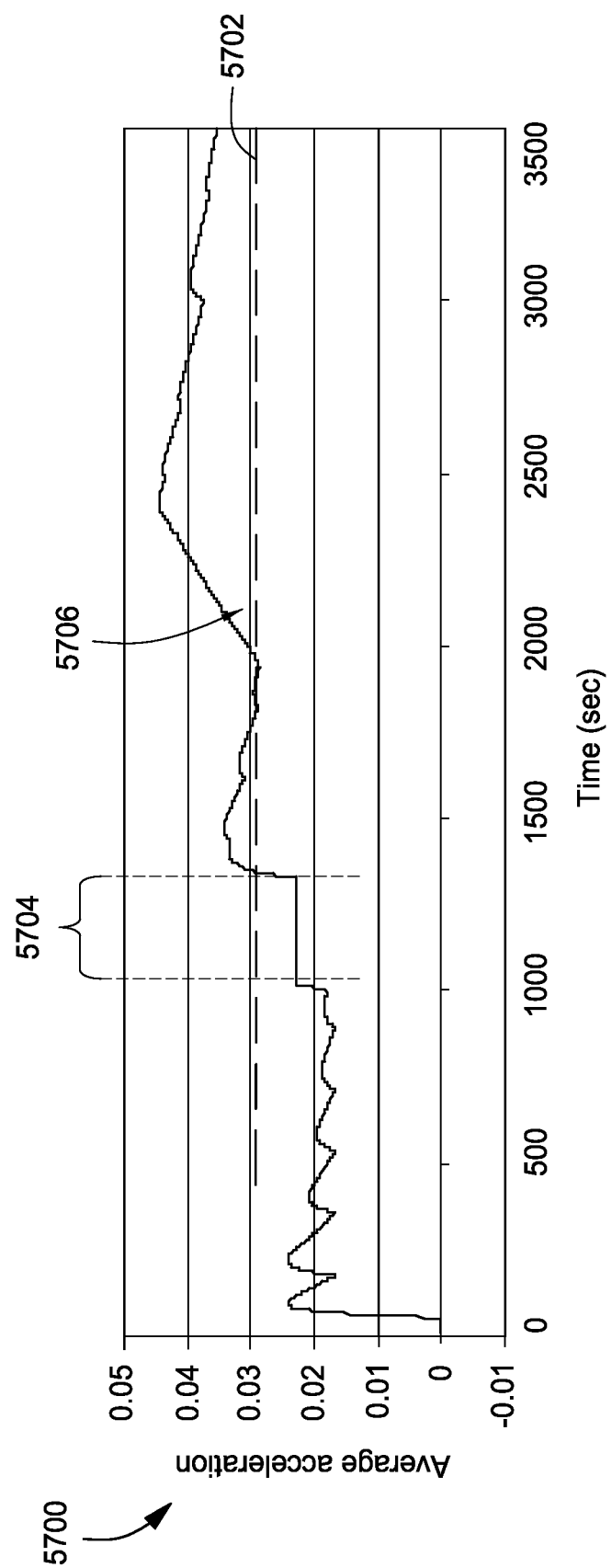
FIG. 57 is a graph of average acceleration corresponding to the graph of FIG. 54 in accordance with the present invention.

In step 5308 and with reference to FIG. 57, an average acceleration Aavg is calculated by the TAM 5234 using the equation:

$$A_{avg} = \frac{A_1 + A_2 + \ldots + A_n}{n}$$

The average acceleration Aavg will increase over time and eventually exceed the threshold unless the attack stops beforehand. As illustrated in graph 5700 of FIG. 57, the call traffic (represented by reference numeral 5704) that exceeded the threshold 5602 in FIG. 56 has been locked down so that it will remain below the threshold and not appear as stealth attack traffic. Other call traffic (e.g., the traffic not specifically identified as 5704 or 5706) remains under the threshold 5702 as the time between calls prevents the traffic's acceleration from reaching the threshold 5702. However, the stealth-type call traffic 5606 (FIG. 56) that remained below the threshold when viewed from a volume perspective has crossed the threshold 5702 at point 5706 as its acceleration has increased. Accordingly, Aavg takes advantage of the ability to analyze the traffic history of the phone 5212 to detect stealth attacks, such as may be represented by the low volume sustained traffic 5406 of FIG. 54.

In step 5310, a determination is made as to whether Aavg has exceeded the threshold (e.g., the threshold 5702). If Aavg has exceeded the threshold 5702, then the method continues to step 5312, where the call is blocked. For example, in the case of a single source attack, traffic from the call source may be added to a blocked list or short-term cache associated with the source filter 5242 (FIG. 52B) by either the TVM 5232 or TAM 5234 until it is determined that the attack has ended. For multiple source attacks, the TVM 5232 or TAM 5234 may be used in conjunction with the spoof detection component 5238 or the MCD 5240, as illustrated in Table 1. The method then proceeds to step 5314 and performs the same analysis for the next user or device. If Aavg has not exceeded the threshold 5702, the method continues to step 5316, where it allows the call (or other service that has been requested), and then continues to step 5314 as previously described.

Referring again to FIG. 52B, the spoof detection component 5238 enables the architecture 5230 to identify attacks from spoofed sources. For example, the source of each call may generally be examined and the average acceleration of calls from a single source or a group of sources may be calculated independently of other calls received at approximately the same time. This allows legitimate calls to pass while suspect calls are blocked. However, an attacker may arrange to bypass such filtering by spoofing the source information or by compromising multiple "zombie" machines to use in a distributed denial of service ("DDoS") attack in order to evenly distribute the attack sources and circumvent the stealth attack detection (as described later with respect to the machine caller detection component 5240).

Spoofing may be accomplished when calling VoIP phones by, for example, injecting false caller identification information into the call stream. Such spoofing may potentially circumvent list-based filtering of callers that an administrator or user may set up. To detect such spoofing, the spoof detector component 5238 may assume that the caller-id is correct and attempt to contact the source of the caller-id for verification. For example, when a call is received with a certain caller-id "x", the system may, before forwarding the call to the called party, verify that "x" is indeed the calling party by sending a special spoof detection message to "x". Spoofing may be detected based on the response that is received from "x". It is understood that such detection may be combined, for example, with the method 5300 of FIG. 53.

Machine caller detection provided by the MCD component 5240 enables the detection and prevention of attacks from machine dialed sources, such as zombie machines, as opposed to human dialed calls or messages. For example, in a VoIP or instant messaging environment, a machine call detection process may be used to identify machine dialed calls and then handle the calls as per user's defined preferences. For example, upon receipt of a SIP INVITE message, the receiving device may respond and require that the calling party enter some type of authentication sequence (e.g., a specific sequence of numbers), respond to a context sensitive challenge (e.g., press a designated number to reach an operator), or perform a simple task (e.g., enter the result of a simple computation or enter the numbers corresponding to a word). The receiving device may then wait for a period of time. At the expiration of the time period, if no answer (or an incorrect answer) has been received from the calling party, the receiving device may take appropriate action (e.g., blocking the calling party, routing the party to voicemail, or hanging up as defined per user preferences). If the proper response is received, then the call or instant message may be allowed.

The source filter 5242 provides a means for sources identified as attack sources to be blocked. For example, a call source may be added to a blocked list or short-term cache associated with the source filter 5242. Such a source filter may include a firewall policy that is implemented to expire within a certain period of time (e.g., DoS cache entries may be deleted when the period ends) or may remain in force until cancelled. The short term cache may be used to hold dynamically identified attack sources and to allow identification of legitimate calling parties.

The fingerprint filter 5244 may employ content analysis functionality to extract abstract information from protocol messages and message flows (e.g., information identifying that a protocol stack always sends 183 or never sends Invite with SDP) to create a fingerprint of each message generated by a protocol implementation. Generally, a protocol specification is flexible enough to accommodate multiple formats, such as differences in whitespace and/or ordering within a message. Accordingly, each implementation may not build messages in exactly the same format even though the implementations conform to the protocol specification. The fingerprint filter 5244 captures and stores subtle differences in message characteristics to protect against mid-session attacks such as call hijacking Message characteristics that are checked by the fingerprint filter may include number and positioning of whitespaces, user agent identity, field values, field sequencing, field value sequencing, field value formatting, and field value lengths. As it is extremely unlikely that a hijacking machine will display the same fingerprint as one of the legitimate machines involved in a session, the fingerprint filter 5244 provides a level of security against hijacking attacks even though no encryption is used.

The hijack detection component 5246 provides non-cryptographic protection against malicious call shut-down and call hijacking, and may be used in conjunction with the fingerprint filter 5244. A third-party attacker may capture initial messages in a session in order to learn the parameters of the session. The parameters may then be used to inject messages to cause tear-down of the session or to otherwise disrupt the session. Such issues are commonly handled by cryptographically authenticating each message to make sure that it is not forged by a third-party. However, in many VoIP deployments, enforcing cryptographic authentication on all calling parties may not be practical due to the lack of widespread support for such cryptographic methods and the complexity involved in configuring and protecting the private keys needed for cryptographic authentication.

The hijack detection component 5246 addresses this by taking advantage of protocol messages. For example, one hijacking attack involves injecting a forged session termination message during session setup. This attack causes premature tearing down of the session, which results in a denial of service to both legitimate parties. The hijack detection component may provide protection from a message, such as a forged BYE, by sending a message within the same dialog and checking the response received from the other end. An attack may be detected because the other end will respond with one type of message if it has sent the BYE, and with another type of message if it has not sent the BYE. A similar process may be used to protect against a forged CANCEL message or other forged messages.

The protocol scrubber 5248 provides protection from maliciously formatted messages by filtering out messages that are unacceptable by protected endpoints (e.g., the IP phone 5212). Such messages include messages that do not comply with communication protocol specifications, messages that have unacceptable formatting, messages having values of unacceptable lengths, messages having unacceptable characters or character sequences, and messages that contain known malicious formatting. As indicated by the placement of the protocol scrubber 5248 within the architecture 5230, this filtering may be applied to all otherwise acceptable messages. Benefits of such filtering may include "zero-day" protection from attacks that are based on sending maliciously formatted messages in order to crash a system and cause a denial of service to users. Note that known malicious formatting may include a protocol acceptable message, but the protocol scrubber 5248 may be configured to filter out the message if a particular user agent is known to be vulnerable to such formatting (e.g., a name longer than 128 characters). The protocol scrubber may also modify a message to make it acceptable based on an endpoint's requirements. Accordingly, protection may be provided at multiple layers of a protocol stack against attacks.

The VPA 5250 may be used to request a call back number for calls. For example, referring to Table 1, if a stealth attack is detected as launched by one or more humans who evenly distribute calls through multiple proxy servers, the VPA may request a call back number to prevent such calls from reaching the protected endpoint (e.g., the IP phone 5212). Such call back numbers may be separately analyzed to take predefined action.

Referring again to FIG. 53, in another embodiment, the method 5300 may be used to allow legitimate traffic while blocking a DoS attack (from, for example, zombie machines). In step 5302, the method 5300 waits for a period of time Δt. A message (e.g., a SIP INVITE message) may be received, at which time the traffic velocity may be calculated in step 5304 as previously described. The traffic volume from a particular source may be tracked, for example, by incrementing a counter for each message received from the source. In steps 53.06, 5308, and 5310, the average acceleration is calculated and a determination is made as to whether the number of calls (as stored in the counter) received from the source is greater than a predefined threshold. If the number of calls exceeds the threshold, the method 5300 adds a policy to a firewall or other security device to block the source in step 5312.

More specifically, after detection of a flood-based DoS attack in step 5310, a dynamic blocked list. (e.g., a DoS cache) may be created to store information about end-points that are identified as sources of the on-going attack. The identification of an endpoint may be based on criteria such as: a trust level of the source, the time between two consecutive transaction initiation attempts from a source, the difference between the number of transaction initiation attempts and the number of transaction termination attempts from a source, and whether any suspected activity has been recorded from that source in the recent past. The behavior of a source during a flood-based DoS attack may be characterized in terms of the above parameters. A source is put into the DoS cache if the time between two successive transaction initiation requests from that source is less than a predetermined threshold, or if the difference between the number of transaction initiation attempts and transaction termination attempts from that source is more than a predetermined threshold.

With additional reference to FIG. 58, the characterization of a source may be modified using a trust level. For example, as illustrated by the graph 5800 of FIG. 58, different allowable deviation amounts may be assigned to different trust levels. Normal behavior is defined by line 5802 (with a behavior deviation of 100 (or 0%)). No trust is defined by lines 5804, which indicate that very little deviation from normal behavior is needed before the tolerance level starts falling. Low trust is defined by the lines 5806, while an identity-based trust level (e.g., sources on a trusted caller list) is defined by lines 5808. Lines 5810 indicate cryptographic trust and are allowed the highest tolerance for deviation. Accordingly, tolerance towards behavior by the source is based on the trust level of that source and is directly proportional to the trust level. This serves to reduce the rate of false positives and minimizes the occurrences of legitimate traffic being blocked as a DoS attack.

A hotel reception desk may be used as an example of an implementation of such a trust level. Although the desk will normally generate a certain amount of outgoing traffic during business hours, this traffic may peak at particular times. For example, during a period of time in the morning, traffic may increase as the desk personnel place wake-up calls to hotel guests. If the system does not expect these calls, it may view it as an attack from a particular source (the desk). Accordingly, a trust level may be assigned to the desk to allow such deviations.

It is understood that trust levels, trusted caller list additions, and similar modifications may be restricted to certain times. For example, the amount of deviation that the hotel reception desk is allowed may be greater in the morning when the traffic is expected to increase, and may be lowered during the day and at night to prevent use of the hotel desk's communication facilities for DoS attacks.

Referring again specifically to FIG. 53, the firewall policy may be implemented to expire within a certain period of time (e.g., the DoS cache entries may be deleted) or may implemented to remain in force until cancelled. If the number of calls does not exceed the threshold (as determined in step 5310), then the method may continue to step 5316 and allow the call. Accordingly, the method 5300 may be used to monitor source behavior in conjunction with anomaly detection. A short term cache may be used to hold dynamically identified attack sources and to allow identification of legitimate calling parties. This enables the method 5300 to service legitimate calls during a flood-based DoS attack.

Figure 59:
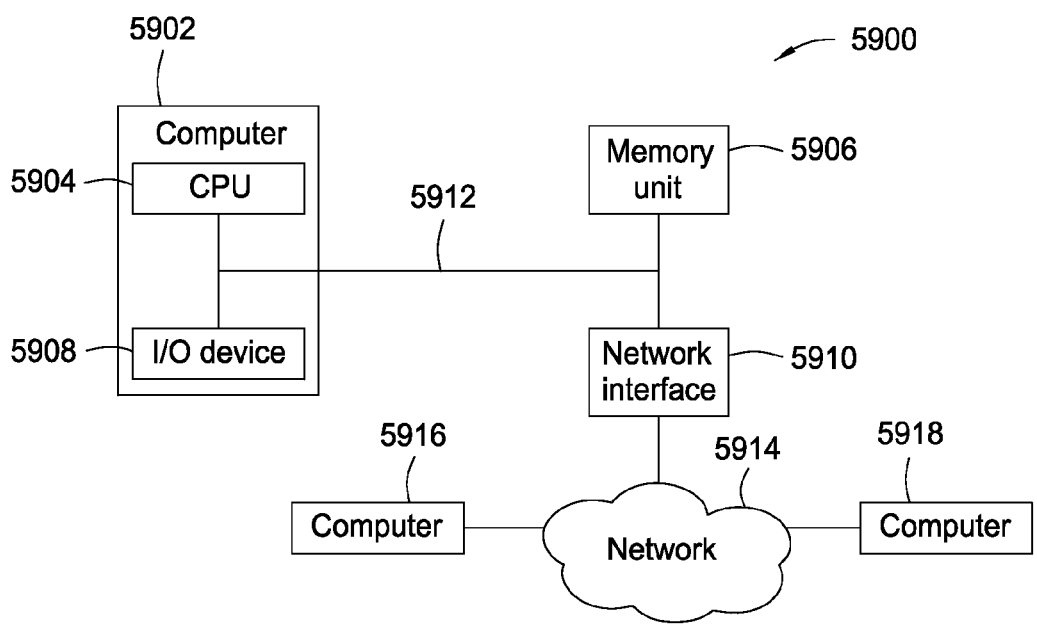
FIG. 59 is a diagram of another exemplary communications environment within which the methods of FIGS. 51 and 52 may be executed in accordance with the present invention.

Referring now to FIG. 59, in another embodiment, an exemplary computer environment 5900 is illustrated. The computer environment includes three computers 5902, 5916, and 5918. For purposes of illustration, the computer 5902 is illustrated in greater detail and may include a central processing unit ("CPU") 5904, a memory unit 5906, an input/output ("I/O") device 5908, and a network interface 5910. The network interface may be, for example, one or more network interface cards ("NICs") that are each associated with a media access control ("MAC") address. The components 5904, 5906, 5908, and 5910 are interconnected by a bus system 5912. It is understood that the computer may be differently configured and that each of the listed components may actually represent several different components. For example, the CPU 5904 may actually represent a multi-processor or a distributed processing system; the memory unit 5906 may include different levels of cache memory, main memory, hard disks, and remote storage locations; and the I/O device 5908 may include monitors, keyboards, and the like.

The computer 5902 may be connected to a network 5914. The network 5914 may be, for example, a subnet of a local area network, a company wide intranet, and/or the Internet. Because the computer 5902 may be connected to the network 5914, certain components may, at times, be shared with the other computers 5916 and 5918. Therefore, a wide range of flexibility is anticipated in the configuration of the computer. Furthermore, it is understood that, in some implementations, the computer 5902 may act as a server to other computers

5916, 5918. Each computer 5902, 5916, 5918 may be identified on the network by an address (e.g., an IP address) and, in some instances, by the MAC address associated with the network interface of the relevant computer.

Instructions for executing various steps or for implementing various functions disclosed in the present description may be stored on any computer readable medium, including shared storage, one or more of the computers, or elsewhere. Users of the computers 5902, 5916, 5918 may communicate using programs such as instant messaging programs. Such programs are also vulnerable to flood and stealth type DoS attacks, and the previously described methods may be used to detect and prevent such attacks occurring via instant messaging.

It is noted that the methods described herein may be applied to many different environments other than the VoIP and instant messaging environments described above. For example, such methods may be used to block call or text messaging attacks against cell phones, pagers, personal digital assistants, and similar devices. Systems supporting any device that may subject to such DoS attacks may benefit from the methods described herein.

Figure 60:
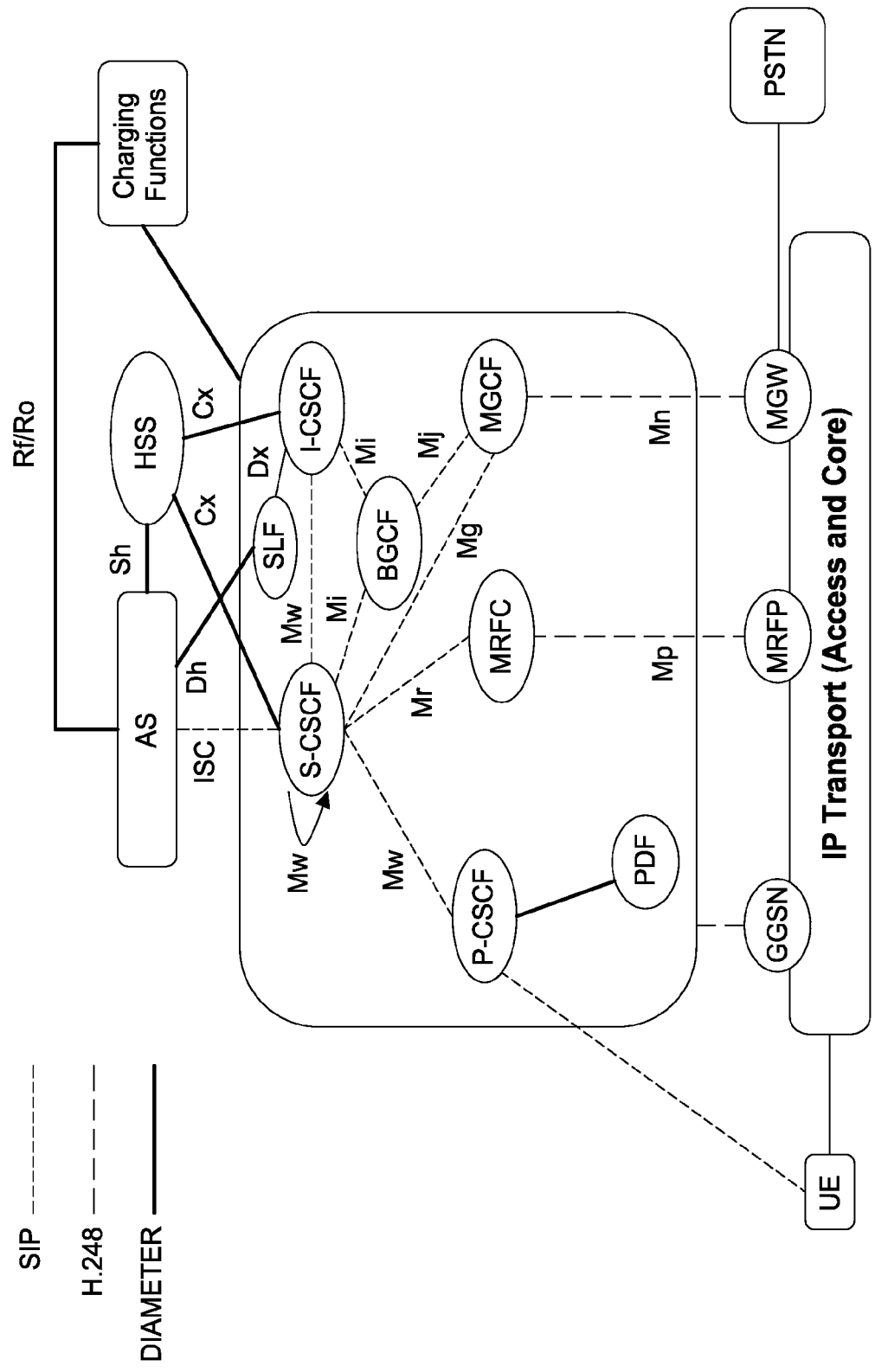
FIG. 60 illustrates an IMS reference architecture.
Figure 61:
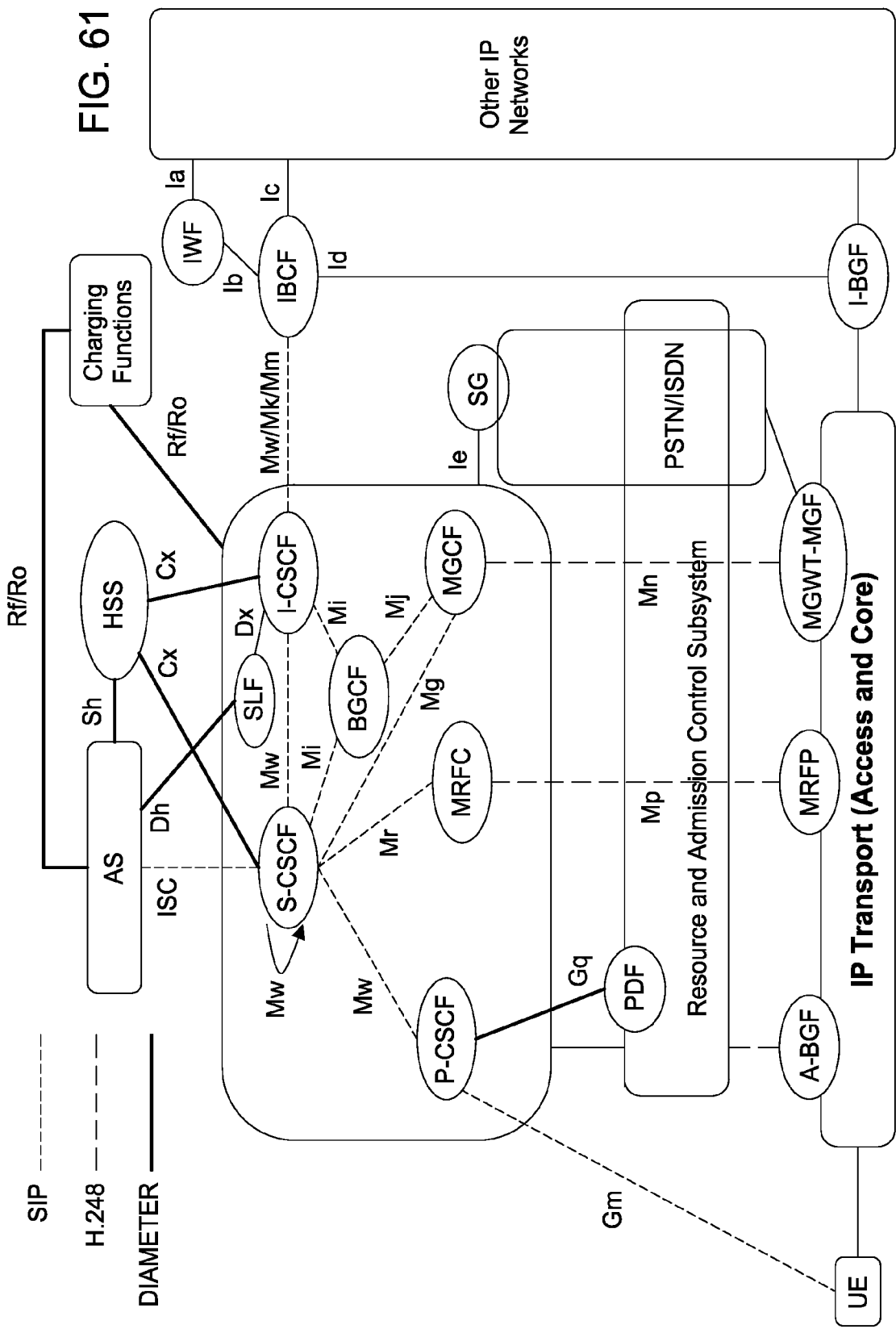
FIG. 61 illustrates a NGN IMS architecture.
Figure 62:
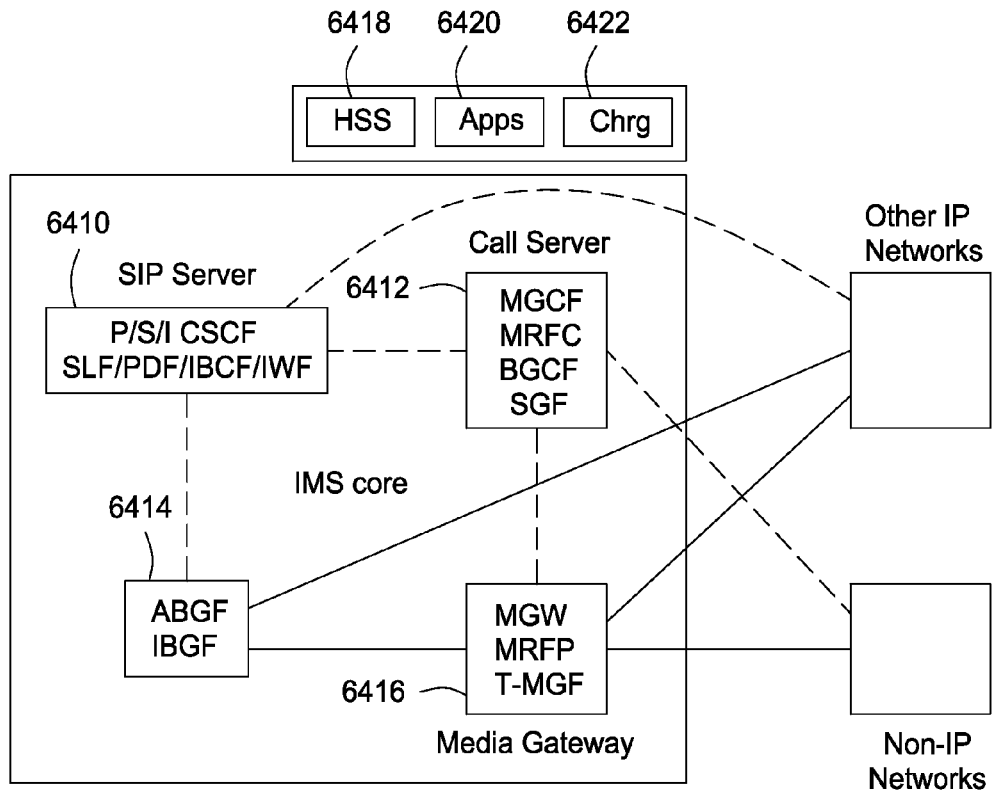
FIG. 62 illustrates an IMS core product realization in accordance with the present invention.

The present invention will now be described in reference to an IMS reference architecture. IMS offers many applications and services, such as Presence, Push-to-talk (as well as, push-to-view, push-to-video), Voice services, IMS Emergency session, Audio/Web/videoconferencing, Rich calls, such as combining video and data, Group chat, Video streaming, Instant messaging, Unified messaging, Multimedia advertising, Interactive voice response, Multiparty gaming and Personal information services, such as calendars and alerts. FIG. 60 illustrates an IMS reference architecture. FIG. 61 illustrates a NGN IMS architecture. FIG. 62 illustrates an IMS core product realization in accordance with the present invention.

IMS & SIP enable a rich feature set of Converged Services, but also opens up the network to IP based vulnerabilities. The IMS & SIP vulnerabilities include OS level vulnerabilities, IP Layer 3 vulnerabilities, IMS Framework related vulnerabilities, protocol vulnerabilities (SIP, RTP, H.248, etc.), Application vulnerabilities (VoIP, Video, PoC, etc.) and VoIP SPAM. For example, some of these vulnerabilities may include:

Compromised mobile phones
    Zombie hard/soft phones
    Modified phone with malicious intent
        Malicious/Malformed/Spoofed signaling attacks
        Malicious/Malformed/Spoofed media attacks
        Spoofed IMS Emergency session attacks
        Presence update attacks
        Initiating Conferencing to block the network resources
UE having direct access to the IMS core network
    Charging fraud—Signaling directly to S-CSCF to avoid charging
Misconfigured/partially configured UEs and/or Network elements
Non-GPRS access such as WLAN or BB can be attacked directly from the internet without a subscription.

Various IMS application level attacks are possible. The attack types may include flood DoS (signaling and media), DDos, Stealth DoS (targets individuals or groups of users), blended attacks (recruit zombies and use them to launch an attack) and SPAM (SPAM over Internet Telephony ("SPIT")). The following table lists the various hacker attack modes:

| Hacker Attack Modes | |
|---|---|
| Mode 1a (WLAN/BB) | Any PC with network connection, without a (I)SIM. |
| Mode 1b (WLAN/BB) | Any PC with network connection without a (I)SIM, but knowing a IMSI range |
| Mode 2 | With valid SIM, hacked program running on top of IPSec |
| Mode 3 (GPRS/Signaling) | With valid SIM, hacked program running on top of GPRS |
| Mode 4 (GPRS/Media) | With valid SIM, hacked program running on top of GPRS |
| Mode 5 | With valid SIM, hacked program using standard MS API |
| Mode 6 | Carrier's authentication info hacked |
| Mode 7 | Attacker present in partner network |

Obtaining a subscription to IMS services poses no real barrier to hackers. An attack on the network could cause network-wide outages including bringing down HSSs, App Servers, SIP servers, Call Servers, Media Gateways and IP-IP Gateways. Attacks towards specific targeted individual users could cause them extreme annoyance and disrupt their service in insidious ways. These attacks require hackers with varying levels of sophistication, but many attacks are possible even by so called "script kiddies".

Figure 63:
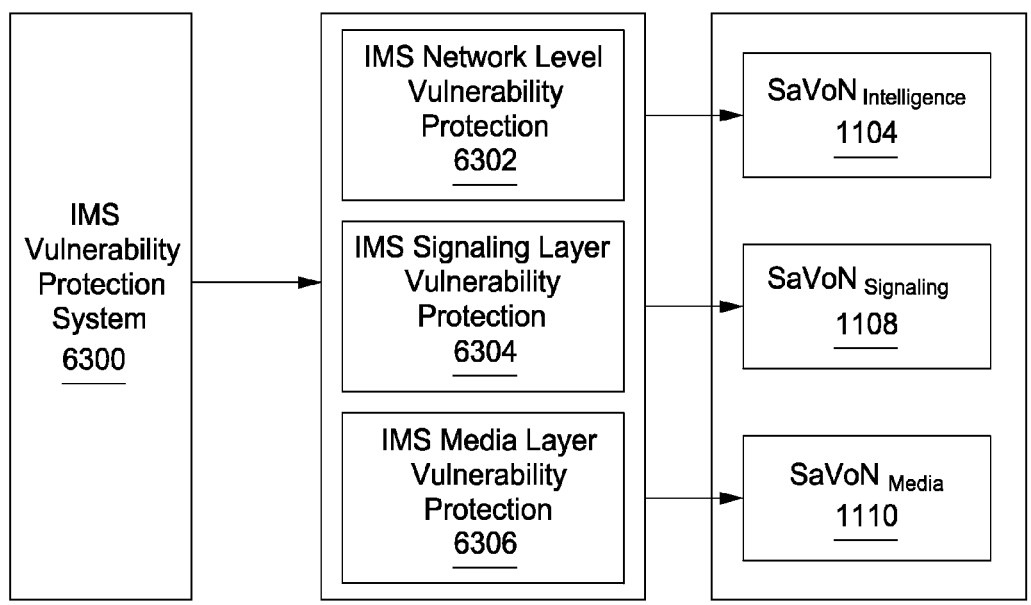
FIG. 63 illustrates an IMS protection system in accordance with the present invention.

FIG. 63 illustrates an IMS protection system 6300 (Si 1104, Ss 1108 and Sm 1110) in accordance with the present invention. The IMS protection system 6300 provides IMS network level vulnerability protection 6302 using Si 1104, IMS signaling level vulnerability protection 6304 using Ss 1108 and IMS media layer vulnerability protection 6306 using Sm 1110. The IMS vulnerability protection system provides IMS Si 1104 provides per subscriber behavioral modeling and learning (Stealth DoS), detect attacks through network level correlation (Distributed DoS) and handles VoIP SPAM. Ss 1108 detects and prevents IMS Signaling layer misuse (IPSEC, TLS, DNS, DHCP, TCP, BootP, SIP, DIAMETER, H.248, etc.), and detects and prevents IMSI spoofing stealth attacks. Sm 1110 detects and prevents UMA Media layer misuse (rogue and orphaned media, RTP, Video and other types of media misuse, etc.), IPSEC and TLS Encryption/Decryption, and Key Escrow.

Figure 64:
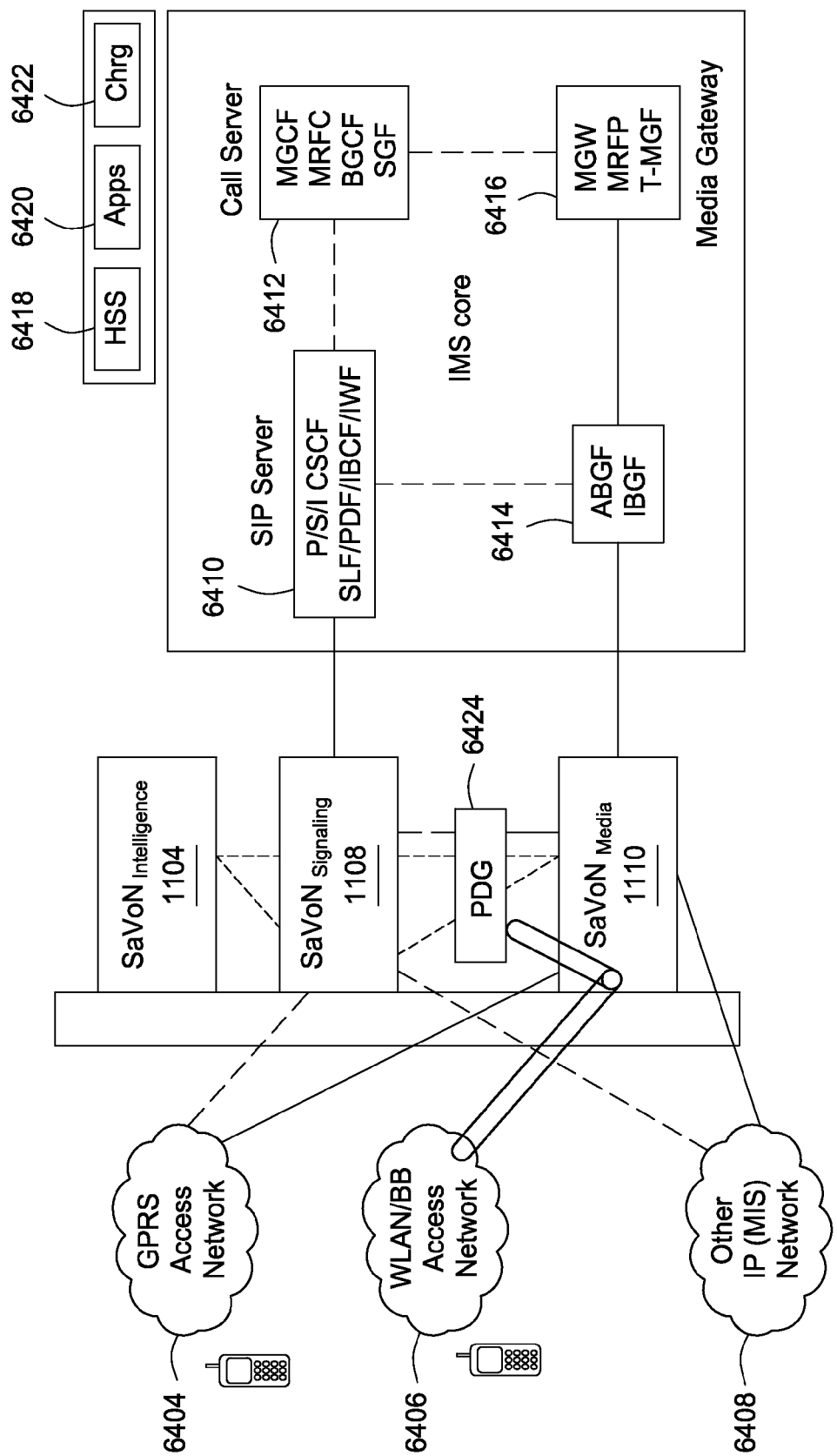
FIG. 64 illustrates the protection system within an IMS network in accordance with the present invention.

FIG. 64 illustrates the protection system within an IMS network 6400 in accordance with the present invention. Si 1104 is connected to Ss 1108 and Sm 1110. Ss 1108 is also connected to Sm 1110. Ss 1108 and Sm 1110 are connected between the IMS core network 6402 and the external networks: GPRS Access Network 6404, WLAN/BB Access Network 6406 and Other IP (IMS) Networks 6408. The IMS core network 6402 includes SIP Server 6410, Call Server 6412, Access Gateway/Border Gateway 6414 and Media Gateway 6416. The IMS core network 6402 is also connected to Home Subscriber Server ("HSS") 6418, Applications 6420 and Charging Gateway 6422. Ss 1108 is connected to GPRS Access Network 6404, Other IP (IMS) Networks 6408, Packet Data Gateway ("PDG") 6424 and SIP Server 6410. Sm 1110 is connected to GPRS Access Network 6404, WLAN/BB Access Network 6406, Other IP (IMS) Networks 6408, Packet Data Gateway ("PDG") 6424 and Access Gateway/Border Gateway 6414.

Figure 65:
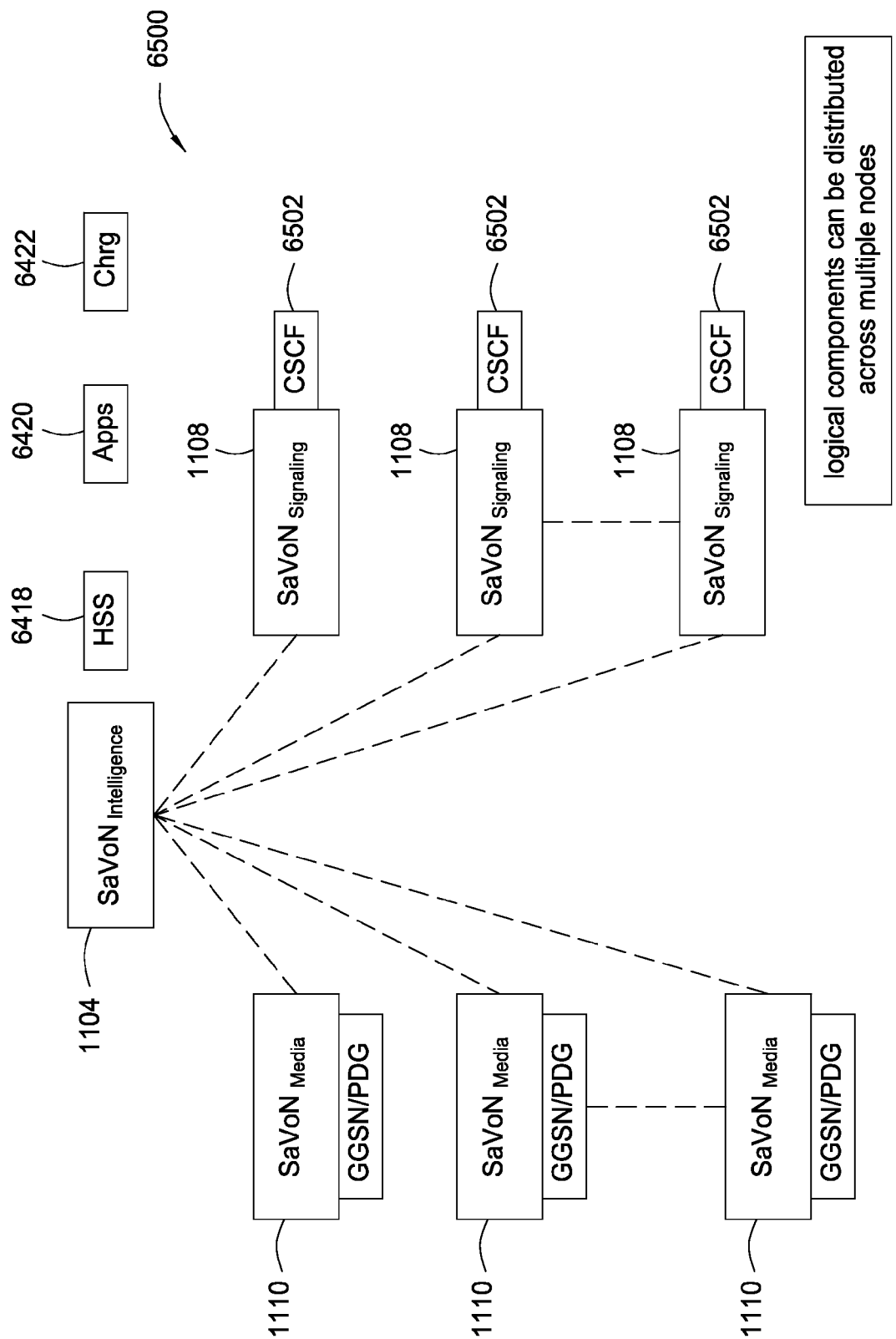
FIG. 65 illustrates a distributed deployment of the protection system in accordance with the present invention.

FIG. 65 illustrates a distributed deployment of the protection system 6500 in accordance with the present invention. Note that Sm 1110, Ss 1108 and Si 1104 are bump-in-the-wire and not additional points of failure in the network. Si 1104 is connected to Ss 1108 and Sm 1110. Each Ss 1108 is also connected to Call Session Control Function ("CSCF") 6502. Each Sm 1110 is also connected to Gateway GPRS Support Node ("GGSN")/PDG 6504. The IMS network 6500 also includes HSS 6418, Applications 6420 and Charging Gateway 6422.

Figure 66A:
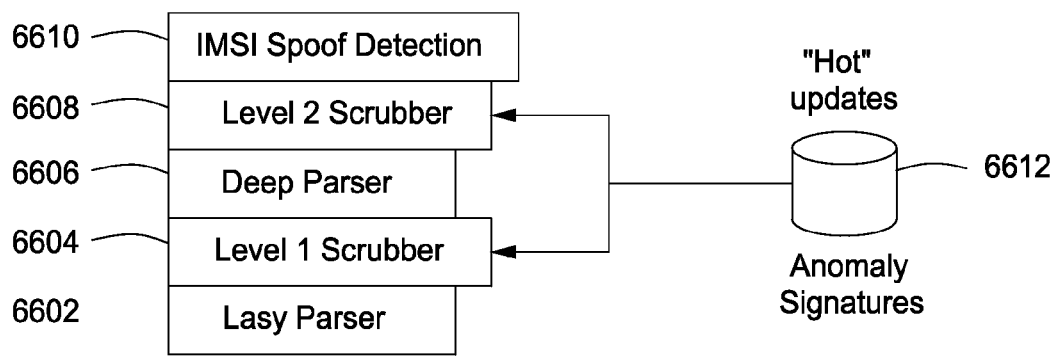
FIG. 66A illustrates IMS deep packet inspection for anomalies in accordance with the present invention.
Figure 66B:
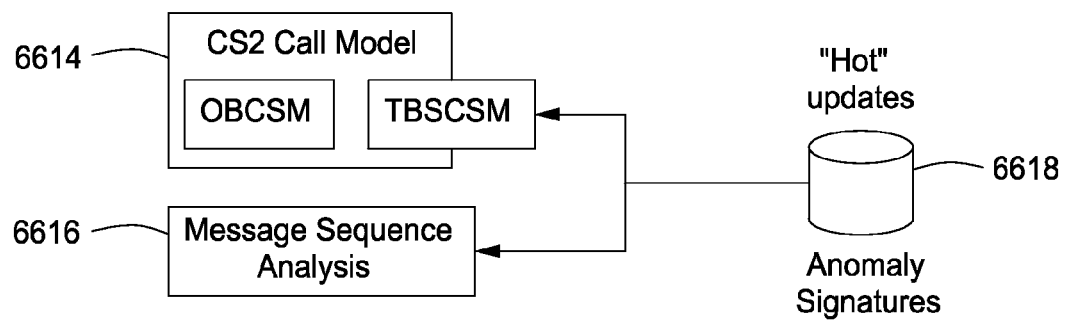
FIG. 66B illustrates an IMS protocol sequence inspection for anomalies in accordance with the present invention.

FIG. 66A illustrates IMS deep packet inspection for anomalies in accordance with the present invention. The present invention inspects the complete IMS Stack, decodes all IMS messages (lazy parser 6602 and deep parser 6606), scrubs malicious message parameters (level 1 6604 and level 2 6608) and provides International Mobile Subscriber Identity ("IMSI") spoof detection 6610. The present invention also provides "hot" updates to stored anomaly signatures 6612. FIG. 66B illustrates IMS protocol sequence inspection for anomalies in accordance with the present invention. The present invention is aware of IMS Call State machine 6614, detects call-by-call anomalies 6616 and detects Man-In-the-Middle attacks. The present invention also provides "hot" updates to stored anomaly signatures 6618.

The present invention operates in the IMS environment substantially as described above with respect to SIP systems. The present invention uses behavioral learning statistically models to detailed usage characteristics of all VoIP network assets (each Subscriber as well as Infrastructure elements). The statistical models are fine tuned over time and any anomalous behavior triggers the verification process. The verification process identifies Stealth and SPAM attacks. These models include call reception parameters, call originating parameters, IPSec tunnel re-initiation parameters, location & mobility behavior parameters, user device protocol message fingerprint, user device boot time behavior, caller Trust Score and called party Credibility Score.

Figure 67:
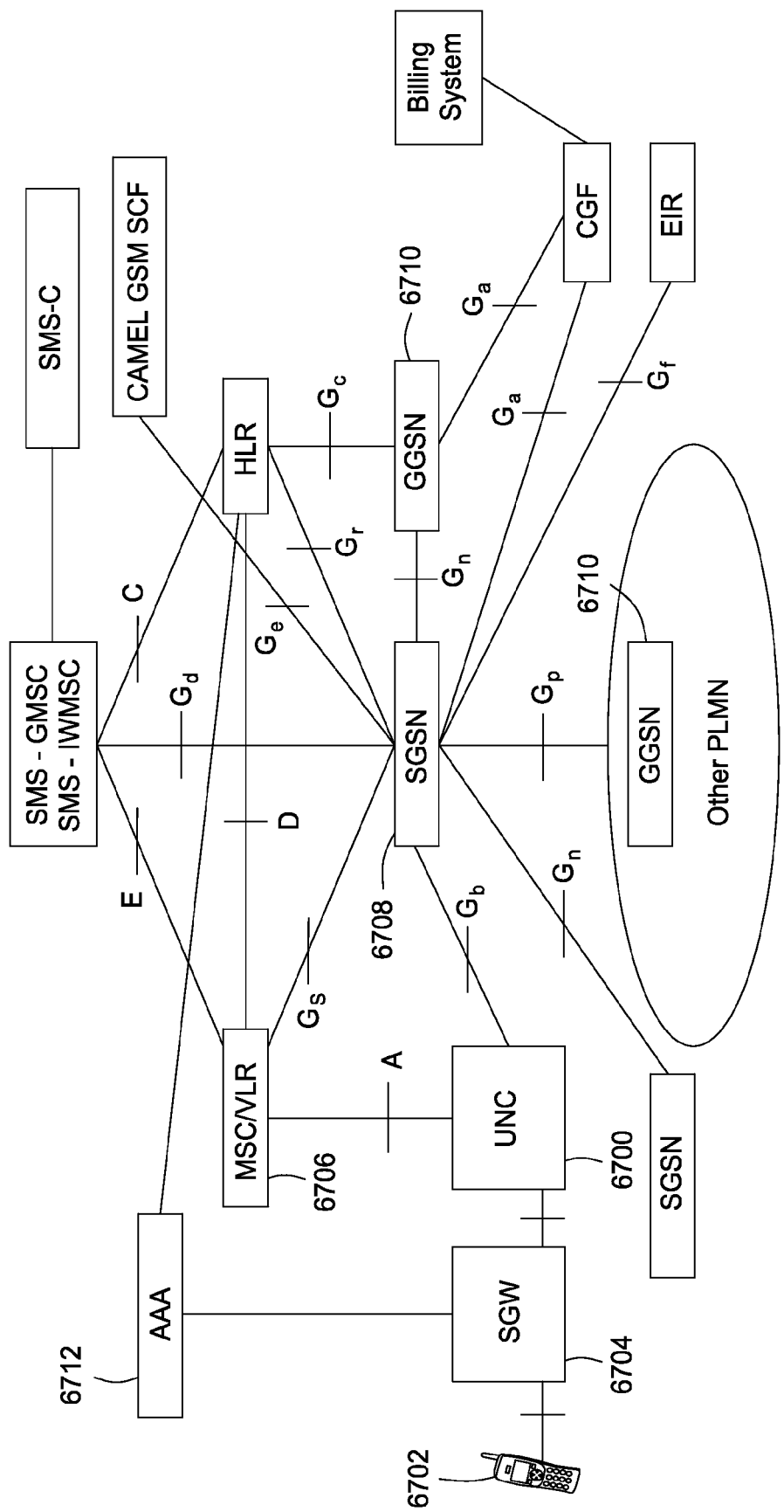
FIG. 67 illustrates a Standard UMA Network.

The present invention will now be described in reference to a UMA network as shown in FIG. 67. Note that some of the similarities between UMA, IMS and SIM will not be repeated. The UMA Network ("UMAN") consists of one or more access points (AP) and one or more UMA Network Controllers ("UNCs") 6700, interconnected through a broadband IP network. The UMAN architecture includes new entities and entities with enhanced functionality, such as the Mobile Station ("MS") 6702, Access Point ("AP") and UMA Network Controller ("UNC") 6700. The AP provides the radio link to the mobile station using unlicensed spectrum. The UNC 6700 appears to the core network as a GERAN base station subsystem ("BSS"). It includes a Security Gateway ("SGW") 6704 that terminates secure remote access tunnels from the MS 6702, providing mutual authentication, encryption and data integrity for signaling, voice and data traffic. A broadband IP network provides connectivity between the AP and the UNC 6700. The IP transport connection extends all the way from the UNC 6700 to the MS 6702, through an AP. A single interface, the Up interface, is defined between the UNC 6700 and the MS 6702. UMA co-exists with the GSM/GPRS Radio Access Network ("GERAN") and interconnection with the GSM Core Network ("CN") via the standardized interfaces defined for GERAN: A-interface for circuit switched services; Gb-interface for packet switched services; and Lb interface for supporting location services. The principle elements of transaction control (e.g., call processing) and user services are provided by the network elements in the core network, namely the MSC/VLR 6706 and the SGSN 6708/GGSN 6710. The AAA server 6712 is used over the Wm interface as defined by 3GPP [TS 29.234]. The AAA server 6712 is used to authenticate the MS 6702 when it sets up a secure tunnel. The UMAN shall support simultaneous CS and PS services. Indication of support of DTM shall be provided through appropriate signaling to the MS 6702.

Figure 68:
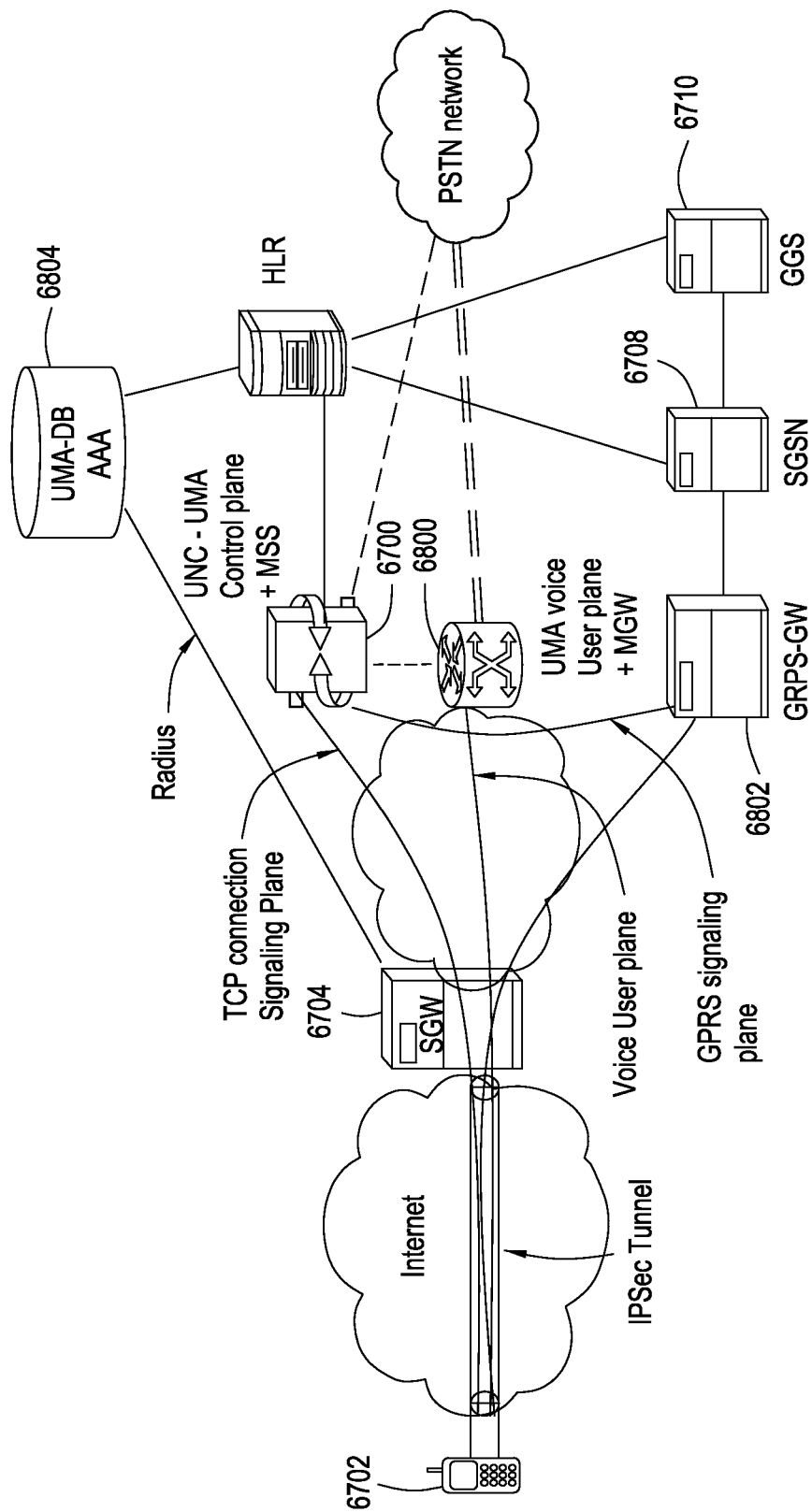
FIG. 68 illustrates a Soft Switch based UMA Network.

FIG. 68 illustrates a Soft Switch based UMA network. The UMA network Controller ("UNC") 6700a supports the UMA signaling to the handset and communicates to the MSS 6700b to control the MGW 6800. The UNC 6700 forwards GRPS related messages to the GRPS gateway 6802. The SGW 6704 authorizes, manages and terminates an IPSEC tunnel from the UMA mobile 6702. The MGW 6800 handles the VoIP traffic from the mobile and performs transcending back to TDM if required. The UMA DB 6804 supports AAA 6712 for the establishment of the IPSEC tunnels and supports stores information about WIFI AP's and authorized subscribers. The GPRS GW 6802 translates GPRS data and signaling from the UMA domain into a standard Gb interface for connection to a SGSN 6708.

UMA/GSM has the following security weaknesses:
1. Active attacks using a "false UMA Network" are possible.
2. Cipher keys and authentication data are transmitted in clear between and within networks.
3. Encryption does not extend far enough towards the core network resulting in the clear text transmission of user and signalling data.
4. Current security framework addresses only
    a. authentication of subscribers for service access,
    b. Encryption at access level for privacy.
    c. Misuse of the protocol for Fraud and malicious intent are not considered in the specs.
5. There is no knowledge or coordination of how a serving network uses security parameters for HLR subscribers roaming in that serving network.
6. There is no knowledge or coordination between SGW UNC and CN, how a MS uses security tunnel is used.
7. This is the capability whereby the intruder puts itself in between the target user and a genuine network and has the ability to eavesdrop, modify, delete, re-order, replay, and spoof signaling and user data messages exchanged between the two parties.
8. Second generation systems do not have the flexibility to upgrade and improve security functionality over time.

The following table lists various hacker modes:

| Mode | Configuration | Attacks |
| --- | --- | --- |
| Mode 1 | PC with network connection with out a SIM. | IPSec tunnel is not required. Launch attacks on local DNS, SGW, AAA, HLR and UMA database launch flood distributed attacks |
| Mode 1a | Computing device with network connection with out a SIM, and having the known IMSI's. | |
| Mode 2 | IPSec tunnel is established using the EAP-SIM with valid SIM. Hacked program is running on the top of the IPsec tunnel. | launch attacks with simple UDP/TCP programs and knowing range of valid IMSI's. SGW, Carrier DNS and UNC Flood attacks Distributed attacks |
| Mode 3 | IPsec tunnel is established using the EAP-SIM with valid SIM. Hacked program is running on the top of the RR layer. | launch attacks on MSC, HLR in stealth mode. |
| Mode 4 | This configuration is a combination of mode 2 and 3. | launch attacks on SGW, UNC, MSC, and HLR. IPsec tunnel is established using the EAP-SIM with valid SIM. Attacker can launch Flood attacks Distributed attacks. |
| Mode 5 | Hacked program is using standard application API provided by the MS to 3$^{rd}$ party applications. | launch attacks targeted towards end users or subscribers, and mostly they are SPAMMING in nature. |

| Mode | Configuration | Attacks |
|---|---|---|
| Mode 6 | IPsec tunnel is established using the EAP-SIM with valid SIM. Hacked program is running on the top of the IPsec tunnel. | launch attacks on SGW, MGW, MSC and GPRS gateway with simple UDP programs. This mode attacker can launch attacks that really disrupt the network. |

A Mode 1 attack is a very simple configuration that includes a PC with network connection without a SIM, or a PC with network connection without a SIM, and having the known IMSI's. In this mode one can launch the attacks with some simple UDP/TCP hacked application programs where: IPSec tunnel is not required; local DNS, SGW, AAA, HLR and UMA database; launch flood attacks; launch distributed attacks. For example:

| Hacked Application |
|---|
| TCP/UDP |
| IP |
| L2 |

Figure 69:
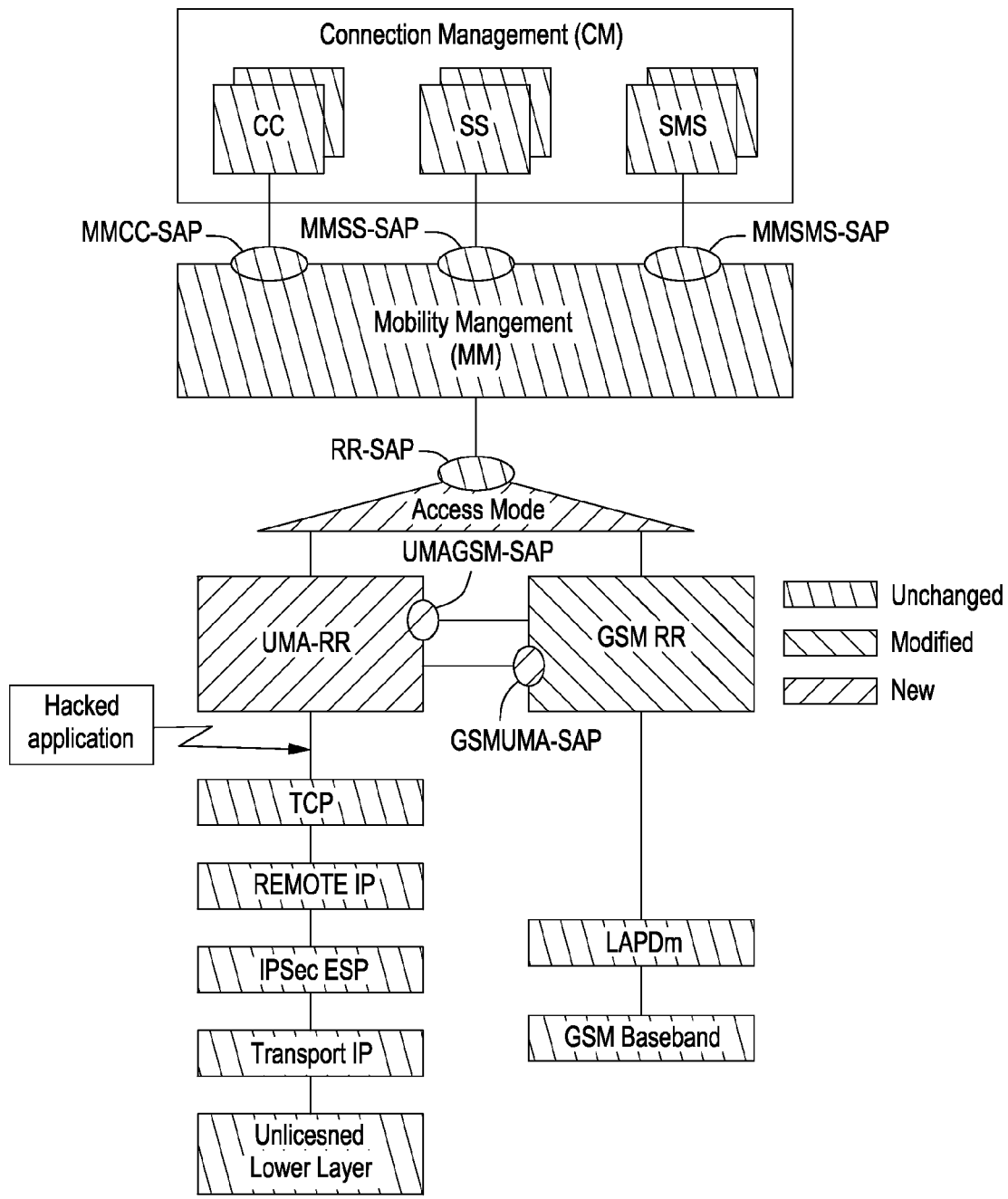
FIG. 69 illustrates a Mode 2 (IP level), Mode 3 (RR level), Mode 4 (IP and RR level) and Mode 5 (Application level) attacker Hacked MS.

FIG. 69 illustrates the UMA hand set or MS signaling plane 6900. The MS architecture includes: The RR-SAP interface to the GSM-MM layer is preserved identically for both GSM and UMA access; an access mode switch 6906 is provided to switch between GSM 6910 and UMA 6908 modes; and UMA-RR 6902 peers with GSM-RR 6904. In a Mode 2—IP level Hacked MS-protocol stack, an IPsec tunnel is established using the EAP-SIM with valid SIM. The hacked program runs on the top of the IPsec tunnel. In this mode, one can launch attacks with simple UDP/TCP programs and knowing range of valid IMSI's. The attacker can launch: SGW, Carrier DNS and UNC; Flood attacks; and Distributed attacks. In a Mode 3 attacker RR level Hacked MS, an IPsec tunnel is established using the EAP-SIM with valid SIM. The Hacked program is running on the top of the RR layer. In this mode, one can launch attacks on MSC, HLR in stealth mode. A Mode 4 attacker IP and RR level Hacked MS is a combination of Mode 2 and 3. In this mode one can launch very sophisticated attacks. In this mode, one can launch attacks on SGW, UNC, MSC, and HLR. IPsec tunnel is established using the EAP-SIM with valid SIM. The attacker can launch Flood attacks and Distributed attacks. In a Mode 5 application level hacked MS, the Hacked program is using standard application API provided by the MS to 3rd party applications. In this mode, one can launch attacks targeted towards end users or subscribers, and mostly they are SPAMMING in nature. In a Mode 6—UDP/RTP level—Hacked MS-protocol stack, an IPsec tunnel is established using the EAP-SIM with valid SIM. Hacked program is running on the top of the IPsec tunnel. In this mode, one can launch attacks on SGW, MGW, MSC and GPRS gateway with simple UDP programs. This mode attacker can launch attacks that really disrupt the network.

Figure 70:
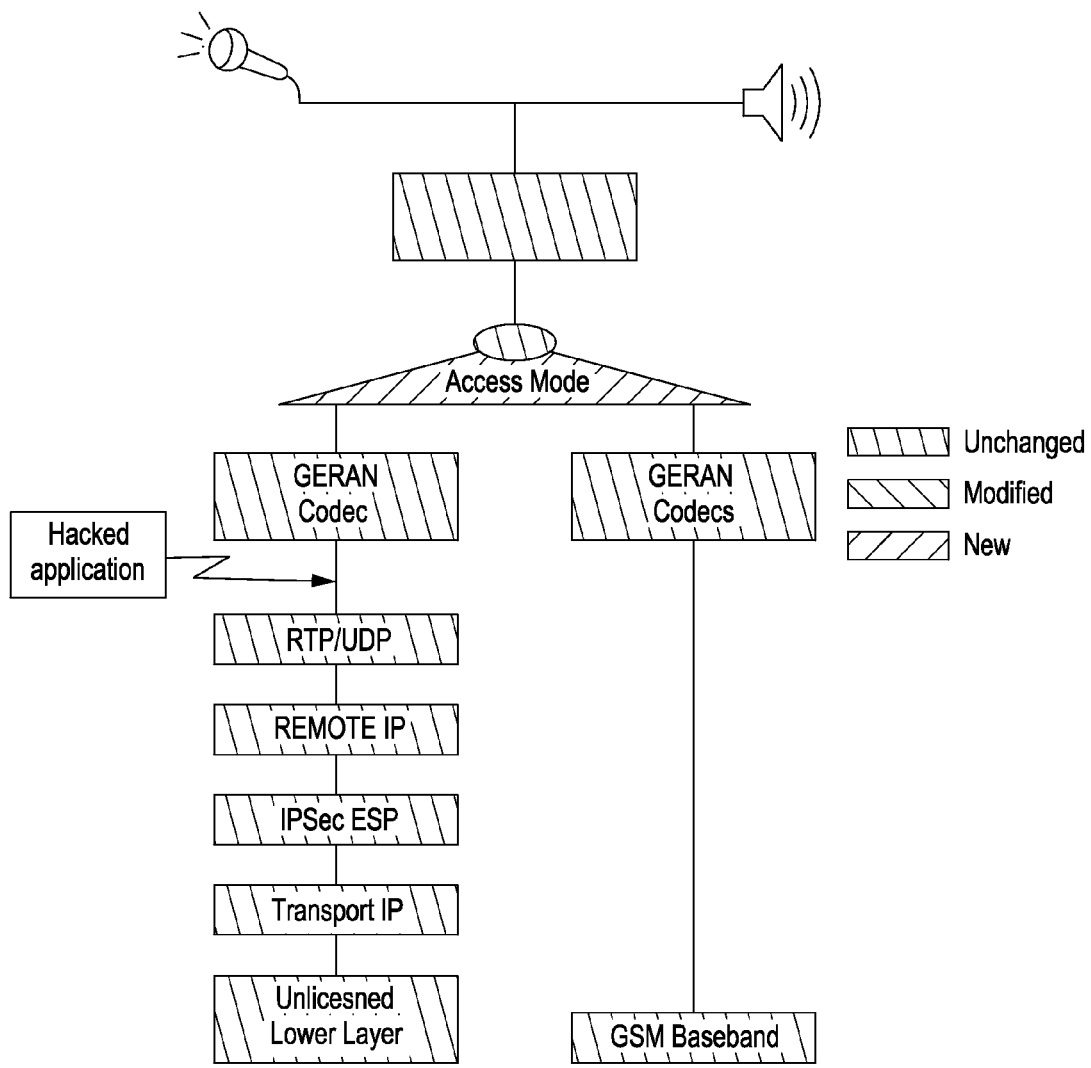
FIG. 70 illustrates a Mode 6 attacker RTP/UDP level Hacked MS.
Figure 71:
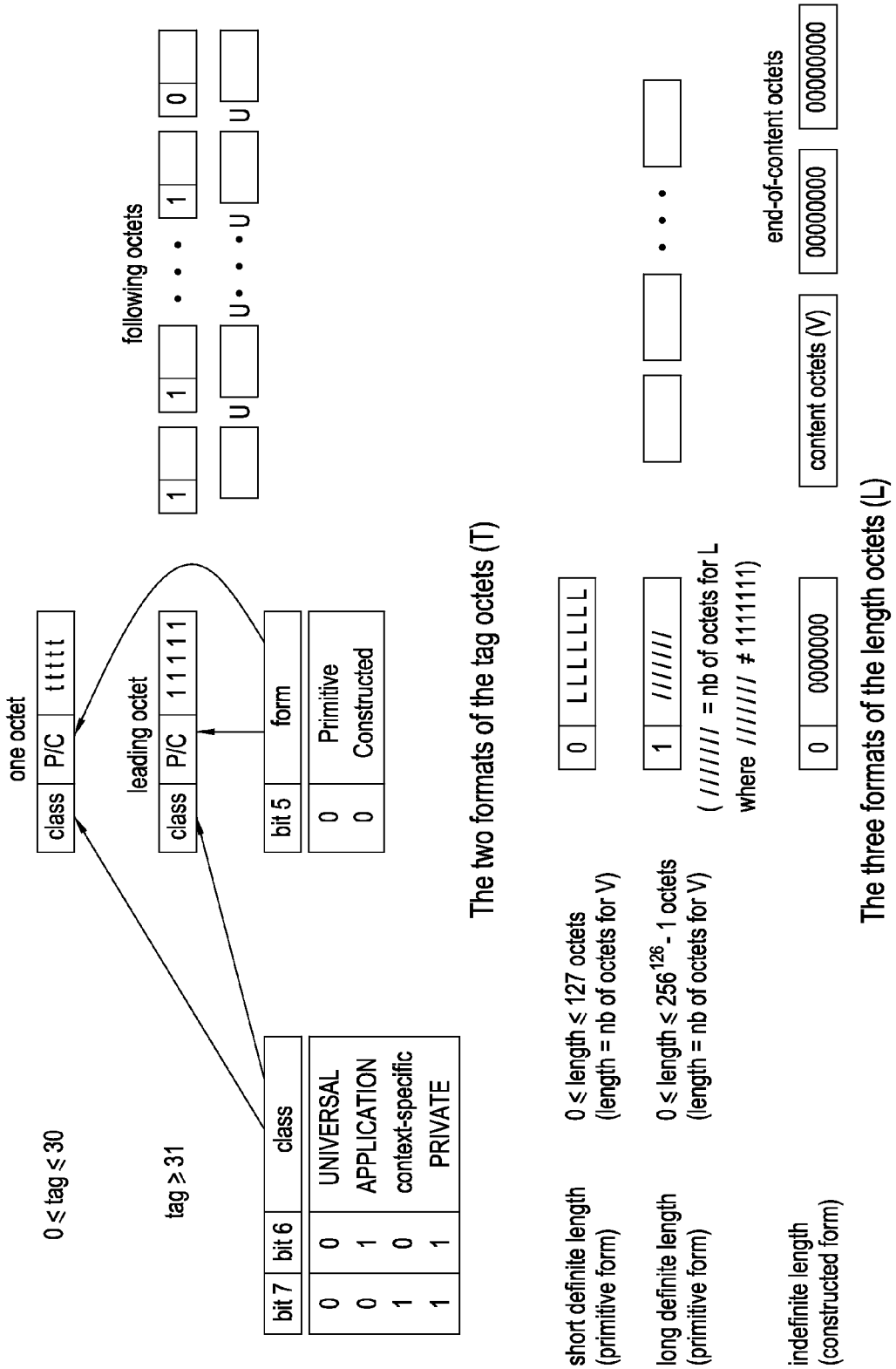
FIG. 71 illustrates BER Encoding in accordance with the present invention.

FIG. 70 illustrates the UMA hand set or MS GSM user plane. Audio flows over the Up interface according to the RTP framing format defined in [RFC 3267] and [RFC 3551]. Use of AMR FR as specified in [TS 26.071] is mandatory when operating in UMA mode. In a Mode 7 Distributed application attack, the attacker intruded in to the carrier network, and has access to authentication vectors, which may include challenge/response pairs, cipher keys and integrity keys. This is most sophisticated mode on the attacker. In this mode attacker can launch any of the attacks described above with out having proper subscription credentials.

The following table provides a comprehensive list of the vulnerabilities, attacker mode to launch attack, and impact of the attack.

| Vulnerability | Attacker Mode* | Impact of the attack | Risk Assessment |
|---|---|---|---|
| 1. Cache Poisoning using local DNS Transaction ID Prediction | Mode 1 | MS | Medium - all the MS's in using the that local DNS are under D/DOS |
| 2. DNS Flooding Creating a DNS Denial of Service Attack | Mode 1 | MS | Medium - all the MS's in using the that local DNS are under D/DOS |
| 3. DNS Man in the Middle Attacks DNS Hijacking | Mode 1 | MS | Major - MS is hijacked |
| 4. IPSec IKEv2 - IKE_SA_INIT flood | Mode 1 | SGW | Major - SGW resources are consumed may lead to D/DOS |
| 5. flooding with EAPOL-Start frames | Mode 1 | SGW AAA UMA DB | Major - SGW, AAA, UMA DB resources are consumed may lead to D/DOS |
| 6. attacks based on cycling through the valid EAP-SIM Identifier space | Mode 1a | SGW AAA UMA DB HLR | Major - SGW, AAA, UMA DB, HLR resources are consumed may lead to D/DOS |
| 7. attacks based on cycling through the EAP-ReAuthentication Identifier space | Mode 1a | SGW AAA | Major - SGW, AAA resources are consumed may lead to D/DOS |
| 8. Spoofed EAP Response frame | Mode 1 | SGW MS | Minor |
| 9. D/DOS attack using malformed EAP frames | mode 1 | SGW | Major - SGW |
| 10. Carrier DNS - D/DOS attack | mode 2 | SGW DNS | Major - New UNC discovery procedures. |
| 11. TCP SYN flooding attack | mode 2 | SGW UNC | major |
| 12. TCP spoofing attack | mode 2 | SGW UNC | major |

| Vulnerability | Attacker Mode* | Impact of the attack | Risk Assessment |
|---|---|---|---|
| 13. MGW - H.248 ADD attack** | mode 6 | MGW MSC | major |
| 14. MGW - H.248 SUBTRACT attack** | mode 6 | MGW MSC | major |
| 15. MGW - H.248 UPDATE attack** | mode 6 | MGW MSC | major |
| 16. MGW - H.248 AUDIT attack** | mode 6 | MGW MSC | major |
| 17. MGW - H.248 ServiceChange attack** | mode 6 | MGW MSC | major |
| 18. MSC - H.248 ServiceChange attack** | mode 6 | MGW MSC | major |
| 19. MGW - RTP stealth attack | mode 6 | MS's in the call | major |
| 20. MGW - RTP Flood attack | Mode 6 | MSs MGW SGW | major |
| 21. MGW - random message | mode 6 | MGW | major |
| 22. URR discovery attack - flood | mode 2 | SGW UNC | major |
| 23. URR register attack - stealth | mode 2 | UNC Subscribers | major |
| 24. URR register attack - flood | mode 2 | SGW UNC Subscribers | major |
| 25. URR discovery attack - flood distributed | mode | SGW UNC | major |
| 26. URR register attack - stealth distributed | mode 2 | UNC Subscribers | major |
| 27. URR register attack - flood distributed | mode 2 | SGW UNC Subscribers | major |
| 28. Malformed URR message | Mode 2 | UNC | major |
| 29. spoofed Location update/IMSI Attach | mode 3 | MSC HLR Subscribers | critical |
| 30. spoofed IMSI detach | mode 3 | MSC HLR Subscribers | critical |
| 31. spoofed call originations | mode 3 | MSC MGW remote subscribers | major |
| 32. Unsolicited page response | mode 3 | MSC | major |
| 33. spoofed Location update/IMSI Attach flood | mode 3 | MSC HLR Subscribers | major |
| 34. spoofed IMSI detach flood | mode 3 | MSC HLR Subscribers | major |
| 35. spoofed E911 call | mode 3 | PSAP | major |
| 36. E911 call flood | mode 3 | MSC PSAP | major |
| 37. E911 call flood - distributed | mode 3 | MSC PSAP | major |
| 38. call origination flood | mode 4 | MSC MGW remote subscribers | major |
| 39. call origination flood - distributed | mode 4 | MSC MGW remote subscribers | major |
| 40. Hijacking the incoming calls- | mode 3 | MSC HLR Subscribers | critical |
| 41. Call forwarding | mode 3 | MSC HLR Subscribers | major |
| 42. supplementary services attack | mode 3 | MSC HLR Subscribers | Critical |
| 43. L3 malformed message attacks | mode 3 | MSC | Major/minor |
| 44. L3 message sequence attacks | mode 3 | MSC | minor |
| 45. Spam call | Mode 5 | subscribers | minor |
| 46. stealth DOS | Mode 5 | Subscribers | minor |
| 47. stealth DDOS | Mode 5 | Subscribers | minor |

-continued

| Vulnerability | Attacker Mode* | Impact of the attack | Risk Assessment |
|---|---|---|---|
| 48. Compromising authentication vectors in the network** | Mode 7 | HLR, MSC, Subscribers | critical |
| 49. GRPS Attach with spoofed IMSI | Mode 3 | HLR, SGSN, Subscribers | Major |
| 50. GRPS Routing area update with spoofed IMSI | Mode 3 | HLR, SGSN, Subscribers | Major |
| 51. GPRS Detach with spoofed IMSI | Mode 3 | HLR, SGSN, Subscribers | Major |
| 52. GPRS PDP context request with spoofed IMSI | Mode 3 | SGSN, GGSN | Major |
| 53. GRPS Attach - flood | Mode 3 | HLR, SGSN, Subscribers | Major |
| 54. GRPS Routing area update - Flood | Mode 3 | HLR, SGSN, Subscribers | Major |
| 55. GPRS Detach - flood | Mode 3 | HLR, SGSN, Subscribers | Major |
| 56. GPRS PDP context request - flood | Mode 3 | SGSN, GGSN | Major |
| 57. GPRS GW - user plane stealth attack | Mode 3 | Subscribers | minor |
| 58. GPRS GW - user plane flood attack | Mode 3 | Subscribers, GRPS GW, SGSN, GGSN | Major |
| 59. GPRS L3 malformed message attacks | Mode 3 | SGSN, GGSN | Major |
| 60. GPRS L3 message sequence attacks | Mode 3 | SGSN, GGSN | Major |
| 61. GRPS Attach with spoofed IMSI - distributed | Mode 3 | HLR, SGSN, Subscribers | Major |
| 62. GRPS Routing area update with spoofed IMSI - distributed | Mode 3 | HLR, SGSN, Subscribers | Major |
| 63. GPRS Detach with spoofed IMSI - distributed | Mode 3 | HLR, SGSN, Subscribers | Major |
| 64. GPRS PDP context request with spoofed IMSI - distributed | Mode 3 | SGSN, GGSN | Major |
| 65. GRPS Attach - distributed flood | Mode 3 | HLR, SGSN, Subscribers | Major |
| 66. GRPS Routing area update - distributed Flood | Mode 3 | HLR, SGSN, Subscribers | Major |
| 67. GPRS Detach - distributed flood | Mode 3 | HLR, SGSN, Subscribers | Major |
| 68. GPRS PDP context request - distributed flood | Mode 3 | SGSN, GGSN | Major |
| 69. GPRS GW - user plane stealth attack distributed | Mode 3 | Subscribers | minor |
| 70. GPRS GW - user plane distributed flood attack | Mode 3 | Subscribers, GRPS GW, SGSN, GGSN | Major |
| 71. SMS flood | mode 4 | MSC remote subscribers | major |
| 72. SMS flood - distributed | mode 4 | MSC remote subscribers | major |
| 73. Hijacking the incoming SMS messages- | mode 3 | MSC HLR Subscribers | critical |
| 74. SMS - malformed message attack | | MSC | Major |
| 75. SMS - Spam | | MSC remote subscribers | major |
| 76. SMS stealth DOS | mode 4 | MSC remote subscribers | major |
| 77. SMS stealth DOS - distributed | mode 4 | MSC remote subscribers | major |
| 78. GPRS SMS flood | mode 4 | MSC remote subscribers | major |
| 79. GPRS SMS flood - distributed | mode 4 | MSC remote subscribers | major |
| 80. GPRS - Hijacking the incoming SMS messages- | mode 3 | MSC HLR Subscribers | critical |
| 81. GPRS SMS - malformed message attack | | MSC | Major |

| | Vulnerability | Attacker Mode* | Impact of the attack | Risk Assessment |
|---|---|---|---|---|
| 82. | GPRS SMS - Spam | | MSC remote subscribers | major |
| 83. | GPRS SMS stealth DOS | mode 4 | MSC remote subscribers | major |
| 84. | GPRS SMS stealth DOS - distributed | mode 4 | MSC remote subscribers | major |

**To launch, some of the attacks listed above required some social engineering.

**To launch, some of the attacks listed above required some social engineering.

The various vulnerabilities of UMA networks will now be described in more detail. One such vulnerability is cache poisoning using DNS Transaction ID prediction:
1. Send a large number of resolution requests each spoofed with different source IP information for www.xyz.com to ns1.sa.com. The logic of sending many requests is that each request will be assigned a unique transaction ID and even though all requests are for the same domain name, each will be processed independently.
2. The ns1.sa.com will send each of these requests to the other DNS servers and eventually ns1.xyz.com as highlighted at the top of this section. Hence the ns1.sa.com.server is awaiting a large number of replies from ns1.xyz.com.
3. The attacker uses this wait stage to bombard ns1.sa.com with spoofed replies from ns1.xyz.com stating that www.xyz.com points to an IP address which is under the attacker's control i.e. false information. Each spoofed reply has a different transaction ID. The attacker hopes to guess the correct transaction ID as used the two name servers.

If the attacker is successful the false information will be stored in ns1.sa.com's cache. Note this is very much a name server to name server attack which will affect clients who use the target name server with false information. The required tools include: PC with IP connection, and hacked program (which is an UDP application) to launch attack. The attack impact includes: false information will be stored in ns1.sa.com's cache. Note this is very much a name server to name server attack which will affect clients who use the target name server with false information. MS will be hijacked.

DNS Flooding Creates a DNS Denial of Service Attack in which DNS servers like other Internet resources are prone to denial of service attacks. Since DNS uses UDP queries for name resolution, meaning a full circuit is never established, denial of service attacks are almost impossible to trace and block as they are highly spoof able. The required tools include: PC with IP connection, and hacked program (which is an UDP application) to launch attack. The attack impact includes: DNS server will be under D/DOS.

In a DNS Man in the Middle Attacks DNS Hijacking, if an attacker is able to insert himself between the client and the DNS server he may be able to intercept replies to client name resolution queries and send false information mapping addresses to incorrect addresses. This type of attack is very much a race condition, in that the attacker needs to get his reply back to the client before the legitimate server does. The required tools are PC with IP connection, and hacked program (which is an UDP application) to launch attack. The attack impact is MS is hijacked. MS will under D/DOS.

In a Carrier DNS-D/DOS attack, the required tools include a MS with IP level hacked stack, and hacked program (which is an UDP application) to launch attack. The attack impact is Carrier DNS will under D/DOS attack.

In an IKE_SA_INIT flood attack, the required tools include a PC with IP connection, and hacked program to launch attack. The attack impact is SGW under attack.

In an EAPOL frame flood attack, a cracker can try to crash the access point by flooding it with EAPOL-Start frames. The way to avoid this attack is to allocate limited resources on receipt of an EAPOL-Start frame. The required tools include PC with IP connection, and hacked program to launch attack. The attack impact is SGW, AAA server UMA Database will be under D/DOS.

In an EAP-SIM authentication flood attack, D/DOS attacks based on cycling through the EAP-SIM Identifier space. An attacker can bring down the SGW/AAA/HLR. The required tools include a PC with IP connection, and hacked program to launch attack. The attack impact is SGW, AAA server UMA Database, HLR will be under D/DOS.

In an EAP-SIM attack, the attacker acts as an authenticator. An attacker may launch denial of service attacks by spoofing lower layer indications or Success/Failure packets, by replaying EAP packets, or by generating packets with overlapping Identifiers. D/DOS attacks against clients based on sending premature EAP Success frames. D/DOS attacks against clients based on spoofing EAP Failure frames. The required tools include PC with IP connection, and hacked program to launch attack. The attack impact includes MS is hijacked. MS will under D/DOS.

Other EAP related attacks include:
D/DOS attack using malformed EAP frames.
An attacker acting as an authenticator may provide incorrect information to the EAP peer and/or server via out-of-band mechanisms (such as via a AAA or lower layer protocol). This includes impersonating another authenticator, or providing inconsistent information to the peer and EAP server.
An attacker may attempt to convince the peer to connect to an untrusted network by mounting a man-in-the-middle attack.
An attacker may attempt to recover the pass-phrase by mounting an offline dictionary attack.

In a TCP SYN attack, the required tools include MS with IP level hacked stack, and hacked program to launch attack. The attack impact is the UNC will be under D/DoS and will run out of UNC resources.

In a TCP flood attack, the required tools include MS with IP level hacked stack, and hacked program to launch attack. The attack impact is the UNC will be under D/DoS and will run out of UNC resources.

In a H.248 ADD attack, a H.248 SUBTRACT attack, a MGW-H.248 UPDATE attack, a H.248 ADD attack and a MGW-H.248 MGW RESET attack respectively, the required tools include MS with IP level hacked stack, and hacked program to launch attack. The attack impact is MGW and MSC/VLR are under D/DoS attack.

In a MGW-RTP attack, RTP packets are sent to the MGW ports. The required tools include MS with IP level hacked stack, and hacked program to launch attack. The attack impact is Target RTP stream will have deteriorated voice quality, which affects both parties in the call.

In Call: Attacker Establish call context Sends RTP packets in violation of the Codec agreement to the Port assigned. Send messages to the RTP packets with random parameters, to disrupt other RTP streams. These packets will degrade the voice quality.

Out of Call: Attacker is UMA registered, and he has the knowledge of the MGW. Send RTP/non RTP packets to the random ports on MGW, to disrupt other RTP streams. These packets will degrade the voice quality.

The present invention provides detection using Sm 1110 in coordination with Ss 1108 will have list of all the active RTP streams and their parameters like src addr/port dest addr/port, codec info etc. This info will be used by the Sm 1110 to filter the RTP traffic from/to the MS. The present invention provides prevention using Sm 1110 to blocks invalid packets in the streams.

In a 50 UMA Spoofed URR-discovery attack, the required tools include MS with IP level hacked stack, and hacked program to launch attack. The attack impact is UNC under Flood D/DOS attack. Also Victim MS may be hijacked.

In a Spoofed UMA URR-Registration attack, the required tools include MS with IP level hacked stack, and hacked program to launch attack. The attack impact is UNC is under Flood D/DOS attack. Also Victim MS may be hijacked.

In a Spoofed Location update/IMSI attack, the required tools include MS with RR level hacked stack, and hacked program to launch attack. The attack impact is MS is hijacked. MS will under D/DOS.

In a Spoofed IMSI Detach attack, the required tools include MS with RR level hacked stack, and hacked program to launch attack. The attack impact is MS is hijacked. MS will under D/DOS.

In a Location update/IMSI flood attack, the required tools include MS with RR level hacked stack, and hacked program to launch attack. The attack impact is UNC, MSC/VLR and HLR will be under D/DOS attack. Also Victim MS may be hijacked.

In a Call origination flood attack, the required tools include MS with RR level hacked stack, and hacked program to launch attack. The attack impact is UNC MSC/VLR and MGW will be under D/DOS attack.

In a Spoofed call independent supplementary service invocation attack, the required tools include MS with RR level hacked stack, and hacked program to launch attack. The attack impact is MSC/VLR, HLR and victim MSs. This attack will affect feature subscription and activation data. Using this attack one can register, deregister, activate, and deactivate for a feature.

In Protocol anomalies/out of sequence message attacks, the required tools include MS with RR level hacked stack, and hacked program to launch attack. The attack impact is UNC and MSC/VLR will be under attack.

In a Transport channel activation flood without PDP context, once the URR-registered, Flood the uMA network with Transport channel Activations to block all the resources in the GPRS GW.

In a Transport channel activation flood within PDP context, Flood the uMA network with Transport channel Activations to block all the resources in the GPRS GW.

Other attacks include Spoofed GMM Routing area Update/GPRS Attach and Spoofed detach.

In a PDP context establishment flood within the PDP user plane data, UDP packets are sent to the GPRS gateway ports (random).

In session: Attacker Establish PDP context (1) sends UDP packets in violation of the QoS agreement to the Port assigned and (2) send messages to the random ports to disrupt other GPRS streams. These messages may be dropped by the GPRS gateway or SGSN, still it consumes GPRS resources.

Out of session: Attacker is UMA registered, and he has the knowledge of the GPRS gateway. Send messages to the random ports to disrupt other GPRS streams these messages may be dropped by the GPRS gateway or SGSN, still it consumes GPRS resources.

The following steps are involved in generating vulnerability exposing messages:

1. Write or acquire a formal interface specification—First acquire an interface specification explaining the valid messages.
   <URR Message>=<Length Indicator><Protocol Discriminator><Skip><Message Type><IE>*<IE><TAG><Length><Value>
2. Design valid-cases—Some representative valid test messages are created (designed) to be used to generate invalid cases. These conform to the specification.
   Example: 0x00 0x16, length=22
   0x00, protocol discriminator=URR_C, skip indicator=0
   0x01, message type=URR_DISCOVERY_REQUEST
   0x01 0x08 . . . , IMSI (10)
   0x02 0x01 0x00, Release Indicator (3)
   0x07 0x02 0x32 0x01, UMA class mark (4)
   0x06 0x01 0x00, Coverage Indicator (3)
3. Define or reuse anomalies—Anomalies are defined as exceptional or unexpected elements that may cause havoc. There can be a separate library of these developed. Each element of the specification can be replaced with anomalous elements.
   Exceptional Element <ee-4bit>=[0x0, 0x1, 0x4, 0x7, 0xf]
4. Insert the anomalies—Now to insert the anomaly to modify the spec, we will replace protocol discriminator with ee-4 bit.
   <URR Message>=<Length Indicator><ee-4 bit><Skip><Message Type><IE>*
5. Design test cases—For designing test cases we replace all the valid parts in our grammar with the elements from a valid test case.
   0x00 0x16, length=22
   <ee-4 bit>
   0x01, message type=URR_DISCOVERY_REQUEST
   0x01 0x08 . . . , IMSI (10)
   0x02 0x01 0x00, Release Indicator (3)
   0x07 0x02 0x32 0x01, UMA class mark (4)
   0x06 0x01 0x00, Coverage Indicator (3)
6. Generate test cases—Finally to generate test cases we will iterate over our designed test case grammar and generate test cases.
   a. 0x00 0x16, length=22
      0x00
      0x01 0x01 0x08 . . . 0x02 0x01 0x00 0x07 0x02 0x32
         0x01 0x06 0x01 0x00 b. 0x00 0x16, length=22
   0x10
   0x01 0x01 0x08 . . . 0x02 0x01 0x00 0x07 0x02 0x32
   0x01 0x06 0x01 0x00
c. 0x00 0x16, length=22
   0x40
   0x01 0x01 0x08 . . . 0x02 0x01 0x00 0x07 0x02 0x32
   0x01 0x06 0x01 0x00
d. 0x00 0x16, length=22
   0x70
   0x01 0x01 0x08 . . . 0x02 0x01 0x00 0x07 0x02 0x32
   0x01 0x06 0x01 0x00
e. 0x00 0x16, length=22
   0xf0
   0x01 0x01 0x08 . . . 0x02 0x01 0x00 0x07 0x02 0x32
   0x01 0x06 0x01 0x00

Register messages are used to expose URR vulnerabilities.

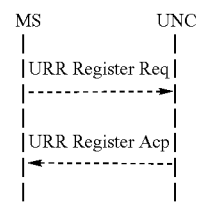

Predefined anomalies are the exceptional elements we substitute to generate vulnerability exploiting messages.

| Name | Description |
|---|---|
| ee-2bit | 2-bit combinations (4) |
| ee-3bit | 3-bit combinations (8) |
| ee-4bit | Some 4-bit combinations (5) |
| ee-7bit | Some 7-bit combinations (5) |
| ee-8bit | Some 8-bit combinations (5) |
| ee-16bit | Some 16-bit combinations (5) |
| ee-32bit | Some 32-bit combinations (5) |
| ee-48bit | Some 48-bit combinations (5) |
| ee-64bit | Some 64-bit combinations (5) |
| ee-cut-pdu | PDU is cut off before it is supposed to end (3) |
| ee-empty | Omitted element (1) |
| ee-fmtstring | Format strings (e.g. %s%s%s or %.4097d) (20) |
| ee-ipv4 | Exceptional IPv4 addresses (10) |
| ee-ipv6 | Exceptional IPv6 addresses (10) |
| ee-fqdn | Exceptional domain name (20) |
| ee-civic-address | Exceptional civic address (20) |
| ee-overflow-backslash | Overflows of "\" up to 128 kbytes (10) |
| ee-overflow-general | 7-bit (0x61) and 8-bit character overflows up to 128 kbytes (10) |
| ee-overflow-null | Overflows of 0x61 and nulls (0x00) mixed (10) |
| ee-length | Exceptional length encodings (8) |
| ee-urr-message-type | Some valid and invalid URR message types (50) |
| ee-urr-ie-id | Some valid and invalid ie ids (80) |

Total anomaly database = 299

The message format for the Register Request Message:

| IEI | Information Element | Presence | Format | Length |
|---|---|---|---|---|
|  | Length Indicator UMA RR_C | M | V | 2 |
|  | Protocol Discriminator | M | V | ½ |
|  | Skip Indicator | M | V | ½ |
|  | URR REGISTER REQUEST message identity | M | V | 1 |
| 1 | IMSI | M | TLV | 10 |
| 2 | UMA Release Indicator | M | TLV | 3 |

-continued

| IEI | Information Element | Presence | Format | Length |
|---|---|---|---|---|
| 7 | UMA Classmark | M | TLV | 4 |
| 3 | AP Radio Identity | C | TLV | 9 |
| 96 | MS Radio identity | M | TLV | 9 |
| 17 | GSM RR/UTRAN RRC State | M | TLV | 3 |
| 6 | GERAN/UTRAN Coverage Indication | M | TLV | 3 |
| 4 | GERAN Cell Identity Location Area | C | TLV | 4 |
| 5 | Identification | C | TLV | 7 |
| 41 | Routing Area Code | C | TLV | 3 |
| 8 | Geographic Location | O | TLV | 9-n |
| 42 | AP location | O | TLV | 7-n |
| 21 | Register Reject Cause | C | TLV | 3 |
| 11 | Redirection Counter | C | TLV | 3 |
| 9 | Last UNC SGW IP address | C | TLV | 7-19 |
| 10 | Last UNC SGW FQDN | C | TLV | 5-258 |
| 97 | Last UNC IP address | C | TLV | 7-19 |
| 98 | Last UNC FQDN | C | TLV | 5-258 |
| 61 | AP Service Name | C | TLV | 4-67 |
| 68 | Registration indicators | C | TLV | 3 |
| 69 | UMA PLMN List | C | TLV | N |
| 73 | 3G Cell Identity | C | TLV | 6 |
| 71 | Required UMA Services | O | TLV | 3 |

Inserted Anomalies

| Information Element | Replacing Anomalies (Full or part) |
|---|---|
| Length Indicator UMA RR_C | ee-empty, ee-length, ee-cut-pdu, ee-16bit (17) |
| Protocol Discriminator | ee-empty, ee-4bit (6) |
| Skip Indicator | ee-empty, ee-4bit (6) |
| URR REGISTER REQUEST message identity | ee-empty, ee-8bit, ee-urr-message-type (56) |
| IMSI | ee-empty, ee-length, ee-cut-pdu, ee-fmtstring, ee-overflow-backslash, ee-overflow-general, ee-overflow-null, ee-urr-ie-id (142) |
| UMA Release Indicator | ee-empty, ee-length, ee-cut-pdu, ee-3bit, ee-8bit (25) |
| UMA Classmark | ee-empty, ee-length, ee-cut-pdu, ee-8bit, ee-16bit (22) |
| AP Radio Identity | ee-empty, ee-length, ee-cut-pdu, ee-4bit, ee-8bit, ee-48bit, ee-urr-ie-id (107) |
| MS Radio identity | ee-empty, ee-length, ee-cut-pdu, ee-4bit, ee-8bit, ee-48bit (27) |
| GSM RR/UTRAN RRC State | ee-empty, ee-length, ee-cut-pdu, ee-3bit, ee-8bit (25) |
| GERAN/UTRAN Coverage Indication | ee-empty, ee-length, ee-cut-pdu, ee-8bit (17) |
| GERAN Cell Identity | ee-empty, ee-length, ee-cut-pdu, ee-fmtstring, ee-overflow-backslash, ee-overflow-general, ee-overflow-null (62) |
| Location Area Identification | ee-empty, ee-length, ee-cut-pdu, ee-fmtstring, ee-overflow-backslash, ee-overflow-general, ee-overflow-null (62) |
| Routing Area Code | ee-empty, ee-length, ee-cut-pdu, ee-fmtstring, ee-overflow-backslash, ee-overflow-general, ee-overflow-null (62) |
| Geographic Location | ee-empty, ee-length, ee-cut-pdu, ee-8bit, ee-ipv4, ee-ipv6 (37) |
| AP location | ee-empty, ee-length, ee-cut-pdu, ee-fmtstring, ee-overflow-backslash, ee-overflow-general, ee-overflow-null, ee-civic-address (82) |
| Register Reject Cause | ee-empty, ee-length, ee-cut-pdu, ee-8bit (17) |
| Redirection Counter | ee-empty, ee-length, ee-cut-pdu, ee-8bit (17) |
| Last UNC SGW IP address | ee-empty, ee-length, ee-cut-pdu, ee-8bit, ee-ipv4, ee-ipv6 (37) |
| Last UNC SGW | ee-empty, ee-length, ee-cut-pdu, ee-fmtstring, ee- |

-continued

| Information Element | Replacing Anomalies (Full or part) |
|---|---|
| FQDN | overflow-backslash, ee-overflow-general, ee-overflow-null, ee-fqdn (82) |
| Last UNC IP address | ee-empty, ee-length, ee-cut-pdu, ee-8bit, ee-ipv4, ee-ipv6 (37) |
| Last UNC FQDN | ee-empty, ee-length, ee-cut-pdu, ee-fmtstring, ee-overflow-backslash, ee-overflow-general, ee-overflow-null, ee-fqdn (82) |
| AP Service Name | ee-empty, ee-length, ee-cut-pdu, ee-fmtstring, ee-overflow-backslash, ee-overflow-general, ee-overflow-null (62) |
| Registration indicators | ee-empty, ee-length, ee-cut-pdu, ee-2bit, ee-8bit (21) |
| UMA PLMN List | ee-empty, ee-length, ee-cut-pdu, ee-8bit, ee-ipv4, ee-ipv6, ee-fmtstring, ee-overflow-backslash, ee-overflow-general, ee-overflow-null (87) |
| 3G Cell Identity | ee-empty, ee-length, ee-cut-pdu, ee-8bit, ee-ipv4, ee-ipv6, ee-fmtstring, ee-overflow-backslash, ee-overflow-general, ee-overflow-null (87) |
| Required UMA Services | ee-empty, ee-length, ee-cut-pdu, ee-8bit (17) |

Total Vulnerability Assessment Test cases generated = 1301

Total Vulnerability Assessment Test cases generated=1301

L3 Vulnerability—use the Setup message to expose layer 3 vulnerabilities.

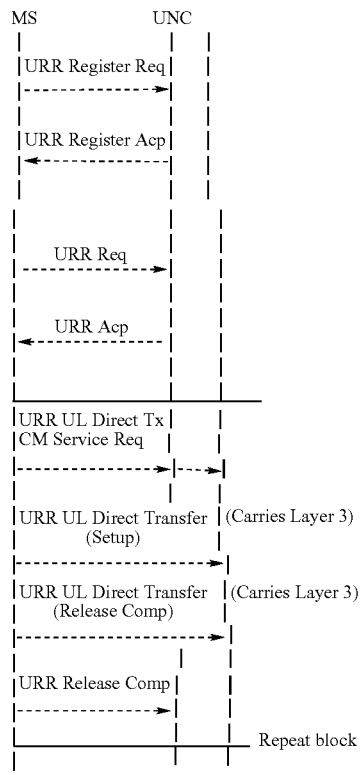

Predefined anomalies—these are the exceptional elements we substitute to generate vulnerability exploiting messages.

| Name | Description |
|---|---|
| ee-2bit | 2-bit combinations (4) |
| ee-3bit | 3-bit combinations (8) |
| ee-4bit | Some 4-bit combinations (5) |
| ee-5bit | Some 5-bit combinations (5) |
| ee-7bit | Some 7-bit combinations (5) |
| ee-8bit | Some 8-bit combinations (5) |
| ee-16bit | Some 16-bit combinations (5) |
| ee-32bit | Some 32-bit combinations (5) |
| ee-48bit | Some 48-bit combinations (5) |
| ee-64bit | Some 64-bit combinations (5) |
| ee-cut-pdu | PDU is cut off before it is supposed to end (3) |
| ee-empty | Omitted element (1) |
| ee-fmtstring | Format strings (e.g. %s%s%s or %.4097d) (20) |
| ee-ipv4 | Exceptional IPv4 addresses (10) |
| ee-ipv6 | Exceptional IPv6 addresses (10) |
| ee-fqdn | Exceptional domain name (20) |
| ee-overflow-backslash | Overflows of "\" up to 128 kbytes (10) |
| ee-overflow-general | 7-bit (0x61) and 8-bit character overflows up to 128 kbytes (10) |
| ee-overflow-null | Overflows of 0x61 and nulls (0x00) mixed (10) |
| ee-overflow-bcd | Overflow bcd and invalid 4 bit bcd (30) |
| ee-length | Exceptional length encodings (8) |
| ee-ext-bit | Exceptional extension bit and overflow (4) |
| ee-L3-message-type | Some valid and invalid L3 message types (40) |
| ee-L3-ie-id | Some valid and invalid ie ids (70) |
| ee-single-octet-ie | Some valid and invalid single octet ie (5) |
| ee-locking-shift | Some valid invalid codeset and invalid ordering (10) |
| ee-ber-tag | ASN.1 BER Tag overflows (5) |
| ee-ber-length | ASN.1 BER Length overflows (10) |
| ee-ber-oid | ASN.1 OID overflows (5) |

Total anomaly database = 333

The message format—The Setup Message covers several Information Elements and is the call initiating message. Hence that is the one we use.

| SETUP message content (mobile station to network direction) | | | | |
|---|---|---|---|---|
| IEI | Information element | Presence | Format | Length |
| | Call control protocol discriminator | M | V | ½ |
| | Transaction identifier | M | V | ½ |
| | Setup Message type | M | V | 1 |
| D- | BC repeat indicator | C | TV | 1 |
| 04 | Bearer capability 1 | M | TLV | 3-16 |
| 04 | Bearer capability 2 | O | TLV | 3-16 |
| 1C | Facility(simple recall alignment) | O | TLV | 2- |
| 5D | Calling party sub-Address | O | TLV | 2-23 |
| 5E | Called party BCD Number | M | TLV | 3-43 |
| 6D | Called party sub-Address | O | TLV | 2-23 |
| D- | LLC repeat indicator | O | TV | 1 |
| 7C | Low layer compatibility I | O | TLV | 2-18 |
| 7C | Low layer compatibility II | O | TLV | 2-18 |
| D- | HLC repeat indicator | O | TV | 1 |
| 7D | High layer compatibility i | O | TLV | 2-5 |
| 7D | High layer compatibility ii | O | TLV | 2-5 |
| 7E | User-user | O | TLV | 3-35 |
| 7F | SS version | O | TLV | 2-3 |
| A1 | CLIR suppression | C | T | 1 |
| A2 | CLIR invocation | C | T | 1 |
| 15 | CC capabilities | O | TLV | 4 |
| 1D | Facility $(CCBS)$ (advanced recall alignment) | O | TLV | 2-? |
| 1B | Facility (recall alignment Not essential) $(CCBS)$ | O | TLV | 2-? |
| 2D | Stream Identifier | O | TLV | 3 |
| 40 | Supported Codecs | O | TLV | 5-n |
| A3 | Redial | O | T | 1 |

FIG. 71 illustrates BER Encoding in accordance with the present invention. Facility IE uses ASN.1 BER encoding to carry supplementary services PDUs. The generic format of BER encoding is recursive TLV (Tag Length Value) i.e. Value can again be another set of TLV. The Protos rules try to exploit the formats of BER encoding of tags and length by overflowing them. (Specially the variable length ones)

Tag encoding: as described in the above figure. If tag value is less than 30 it is encoded in one octet. First two bits are for the class, next bit is for form and last 5 bits contain the value. If the value is greater than 30 then all the lat 5 bits are set to 1 s. The tag continues till an octet with MSB=0 is found. The tag value is concatenation of the 7 LSB in all of these octets.

Length encoding: as described in the figure. If the MSB=0 then length is just one octet, and the length is the value of 7 LSB in the octet. If MSB=1 then the value in the 7 LSB is the number of length octets. The length value is the concatenation of these octets. Lastly if the MSB=1 and 7 LSB=0000000, then there are no length value octets. Instead the content octets have a trailer of two "zero" octets i.e. end-of-content octets=00000000 00000000.

OBJECT IDENTIFIER (OID): Tag is always of universal primitive form and value is 6. Every integer is encoded on a series of octets, only 7 LSB encode the value. If the MSB is encoded as lit implies the integer value continues on next octet. Also the first octet is encoded differently, It is (40*first value+second value).

Inserted Anomalies

| Information Element | Replacing Anomalies (Full or part) |
|---|---|
| Call control protocol discriminator | ee-omit, ee-4bit (6) |
| Transaction identifier | ee-omit, ee-4bit (6) |
| Setup message type | ee-empty, ee-8bit, ee-L3-message-type (46) |
| BC repeat indicator | ee-empty, ee-3bit, ee-4bit, ee-8bit (19) |
| Bearer capability 1 | ee-empty, ee-2bit, ee-3bit, ee-4bit, ee-5bit, ee-8bit, ee-length, ee-cut-pdu, ee-ext-bit, ee-L3-ie-id (113) |
| Bearer capability 2 | ee-empty, ee-2bit, ee-3bit, ee-4bit, ee-5bit, ee-8bit, ee-length, ee-cut-pdu, ee-ext-bit (43) |
| Facility(simple recall alignment) | ee-empty, ee-8bit, ee-length, ee-cut-pdu, ee-ber-tag, ee-ber-length, ee-ber-oid, ee-overflow-general, ee-overflow-null, ee-overflow-backslash, ee-fmtstring (87) |
| Calling party sub-address | ee-empty, ee-3bit, ee-8bit, ee-length, ee-cut-pdu, ee-overflow-general, ee-overflow-null, ee-overflow-backslash, ee-fmtstring (75) |
| Called party BCD Number | ee-empty, ee-3bit, ee-4bit, ee-8bit, ee-length, ee-cut-pdu, ee-overflow-bcd (60) |
| Called party sub-address | ee-empty, ee-3bit, ee-8bit, ee-length, ee-cut-pdu, ee-overflow-general, ee-overflow-null, ee-overflow-backslash, ee-fmtstring (75) |
| LLC repeat indicator | ee-empty, ee-3bit, ee-4bit, ee-8bit (19) |
| Low layer compatibility I | ee-empty, ee-2bit, ee-3bit, ee-4bit, ee-5bit, ee-7bit, ee-8bit, ee-length, ee-cut-pdu, ee-ext-bit, ee-overflow-general, ee-fmtstring (78) |
| Low layer compatibility II | ee-empty, ee-2bit, ee-3bit, ee-4bit, ee-5bit, ee-7bit, ee-8bit, ee-length, ee-cut-pdu, ee-ext-bit, ee-overflow-general, ee-fmtstring (78) |
| HLC repeat indicator | ee-empty, ee-3bit, ee-4bit, ee-8bit (19) |
| High layer compatibility I | ee-empty, ee-2bit, ee-3bit, ee-7bit, ee-8bit, ee-length, ee-cut-pdu, ee-ext-bit, ee-overflow-general, ee-fmtstring (68) |
| High layer compatibility II | ee-empty, ee-2bit, ee-3bit, ee-7bit, ee-8bit, ee-length, ee-cut-pdu, ee-ext-bit, ee-overflow-general, ee-fmtstring (68) |
| User-user | ee-empty, ee-8bit, ee-length, ee-cut-pdu, ee-overflow-general, ee-overflow-null, ee-overflow-backslash, ee-fmtstring (67) |
| SS version | ee-empty, ee-8bit, ee-length, ee-cut-pdu (17) |
| CLIR suppression | ee-empty, ee-3bit, ee-4bit, ee-8bit (19) |
| CLIR invocation | ee-empty, ee-3bit, ee-4bit, ee-8bit (19) |
| CC capabilities | ee-empty, ee-4bit, ee-8bit, ee-length, ee-cut-pdu(22) |
| Facility $(CCBS)$ (advanced recall alignment) | ee-empty, ee-8bit, ee-length, ee-cut-pdu, ee-ber-tag, ee-ber-length, ee-ber-oid, ee-overflow-general, ee-overflow-null, ee-overflow-backslash, ee-fmtstring (87) |
| Facility (recall alignment Not essential) $(CCBS)$ | ee-empty, ee-8bit, ee-length, ee-cut-pdu, ee-ber-tag, ee-ber-length, ee-ber-oid, ee-overflow-general, ee-overflow-null, ee-overflow-backslash, ee-fmtstring (87) |
| Stream Identifier | ee-empty, ee-8bit, ee-length, ee-cut-pdu (17) |
| Supported Codecs | ee-empty, ee-8bit, ee-length, ee-cut-pdu, ee-overflow-general, ee-overflow-null, ee-overflow-backslash, ee-fmtstring (67) |
| Redial | ee-empty, ee-8bit, ee-length, ee-cut-pdu (17) |
| Insert Locking shifts and ies after it | ee-empty, ee-locking-shift (11) |

Total Vulnerability Assessment Test cases generated = 1290

IKEv2 Vulnerability—use the IPSec IKE_SA_INIT message to expose vulnerabilities.

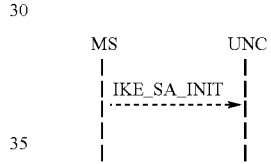

Predefined anomalies—these are the exceptional elements we substitute to generate vulnerability exploiting messages.

| Name | Description |
|---|---|
| ee-2bit | 2-bit combinations (4) |
| ee-4bit | Some 4-bit combinations (5) |
| ee-7bit | Some 7-bit combinations (5) |
| ee-8bit | Some 8-bit combinations (5) |
| ee-16bit | Some 16-bit combinations (5) |
| ee-32bit | Some 32-bit combinations (5) |
| ee-64bit | Some 64-bit combinations (5) |
| ee-cut-pdu | PDU is cut off before it is supposed to end (3) |
| ee-empty | Omitted element (1) |
| ee-length | Exceptional length encodings (8) |
| ee-next-payload | Valid and invalid next payload values (25) |
| ee-version | Exceptional version values (10) |
| ee-exchange-type | Exceptional exchange type values (13) |
| ee-proposal-last | Exceptional values for extending proposal list (3) |
| ee-protocol-id | Exceptional values for protocol (8) |
| ee-transform-type | Exceptional value for transform (10) |
| ee-transform-id | Exceptional value for transform id (15) |
| ee-dh-group | Exceptional Diffie Hellman Group (5) |

Total anomaly database = 135

The Message Format—IKE_SA_INIT Message

```
                     1                   2                   3
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
!                       IKE_SA Initiator's SPI                 !32
!                                                              !64
+-+-+-+-+-+-+-+-+-+-+-+-+-+-+-+-+-+-+-+-+-+-+-+-+-+-+-+-+-+-+-+-+
!                       IKE_SA Responder's SPI                 !96
!                                                              !128
+-+-+-+-+-+-+-+-+-+-+-+-+-+-+-+-+-+-+-+-+-+-+-+-+-+-+-+-+-+-+-+-+
! Next Payload ! MjVer ! MnVer ! Exchange Type !    Flags      !160
+-+-+-+-+-+-+-+-+-+-+-+-+-+-+-+-+-+-+-+-+-+-+-+-+-+-+-+-+-+-+-+-+
!                            Message ID                        !192
+-+-+-+-+-+-+-+-+-+-+-+-+-+-+-+-+-+-+-+-+-+-+-+-+-+-+-+-+-+-+-+-+
!                             Length                           !224
+-+-+-+-+-+-+-+-+-+-+-+-+-+-+-+-+-+-+-+-+-+-+-+-+-+-+-+-+-+-+-+-+
                     1                   2                   3
 0 1 2 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
! Next Payload !C! RESERVED  !         Payload Length          !32
+-+-+-+-+-+-+-+-+-+-+-+-+-+-+-+-+-+-+-+-+-+-+-+-+-+-+-+-+-+-+-+-+
```

IKE SA INIT

IKE SA INIT

| Fields | Length |
|---|---|
| Initiator's SPI | 8 |
| Responder's SPI | 8 |
| Next Payload | 1 |
| Major Version | ½ |
| Minor Version | ½ |
| Exchange Type | 1 |
| Flags | 1 |
| Message ID | 4 |
| Length | 4 |
| Security Association Payload | 4- |
| Key Exchange Payload | 4- |
| Nonce Payload | 4- |
| Generic Payload | |
| Next Payload | 1 |
| Critical | ⅛ |
| Reserved | ⅞ |
| Payload Length | 2 |
| Payload Data | — |

Inserted Anomalies

| Information Element | Replacing Anomalies (Full or part) |
|---|---|
| Initiator's SPI | ee-empty, ee-64bit (6) |
| Responder's SPI | ee-empty, ee-64bit (6) |
| Next Payload | ee-empty, ee-8bit, ee-next-payload (31) |
| Major Version | ee-empty, ee-4bit, ee-version (16) |
| Minor Version | ee-empty, ee-4bit, ee-version (16) |
| Exchange Type | ee-empty, ee-8bit, ee-exchange-type (19) |
| Flags | ee-empty, ee-2bit, ee-8bit (10) |
| Message ID | ee-empty, ee-32bit (6) |
| Length | ee-empty, ee-32bit, ee-length, ee-cut-pdu (17) |
| Security Association Payload | ee-empty, ee-4bit, ee-7bit, ee-8bit, ee-16bit, ee-length, ee-cut-pdu, ee-proposal-last, ee-protocol-id, ee-transform-type, ee-transform-id (63) |
| Key Exchange Payload | ee-empty, ee-7bit, ee-8bit, ee-16bit, ee-length, ee-cut-pdu, ee-dh-group (22) |
| Nonce Payload | ee-empty, ee-7bit, ee-8bit, ee-16bit, ee-length, ee-cut-pdu (27) |

Total Vulnerability Assessment Test cases generated = 239

Current UMA security only addresses privacy & authentication, but does not addresses attacks launched from the end points towards the network and end points. Currently available solutions only address device level security, but certain attacks can not be detected and prevented having the device level security. As a result, the present invention provides a complete and comprehensive network level solution for UMA service providers to detect and prevent attacks, such as those listed below.

| Attacker Mode | DoS Prevention | DDoS Prevention |
|---|---|---|
| Mode 1 - flood | Block offending source IP address/port | Block all offending source IP addresses/ports |
| Mode 1a - flood | Identify and block spoofed IMSI's | Identify and block all spoofed IMSI's |
| Mode 2 | Identify and block offending IMSI | Identify and block offending IMSI |
| Mode 3 | Identify and Block offending IMSI | Identify and block offending IMSI |
| Mode 4 | Identify and block spoofed IMSI | Identify and block offending IMSI |
| Mode 5 | Identify and block offending IMSI | Identify and block offending IMSI |
| Mode 6 | Identify and block offending IMSI | Identify and block offending IMSI |

As previously described, the present invention provides a distributed system, which collect various device and protocol event from the endpoints and network elements and correlated them to detect anomalies and attacks which may not be detected by a single node.

Figure 72:
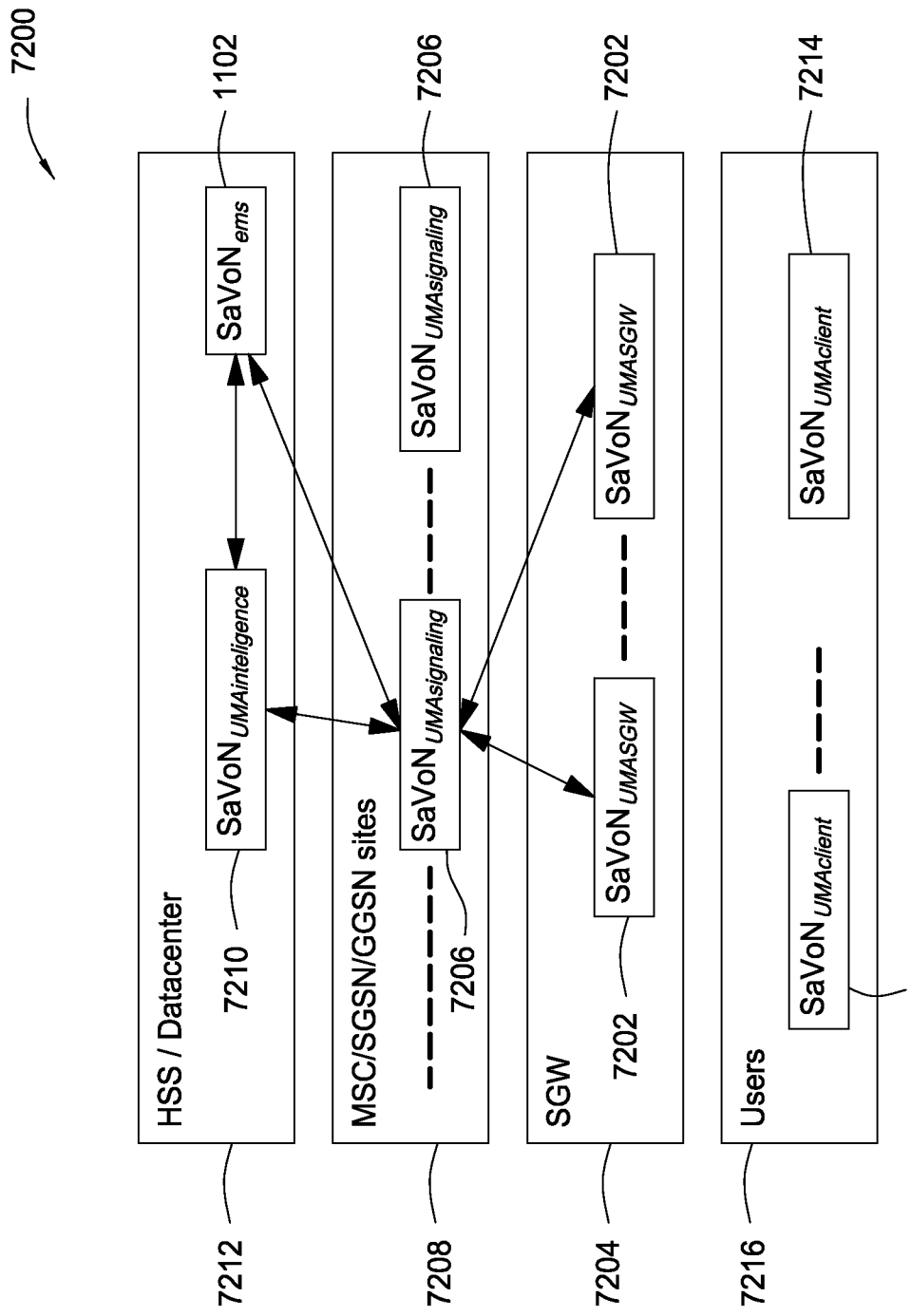
FIG. 72 illustrates the present invention's architecture.
Figure 73:
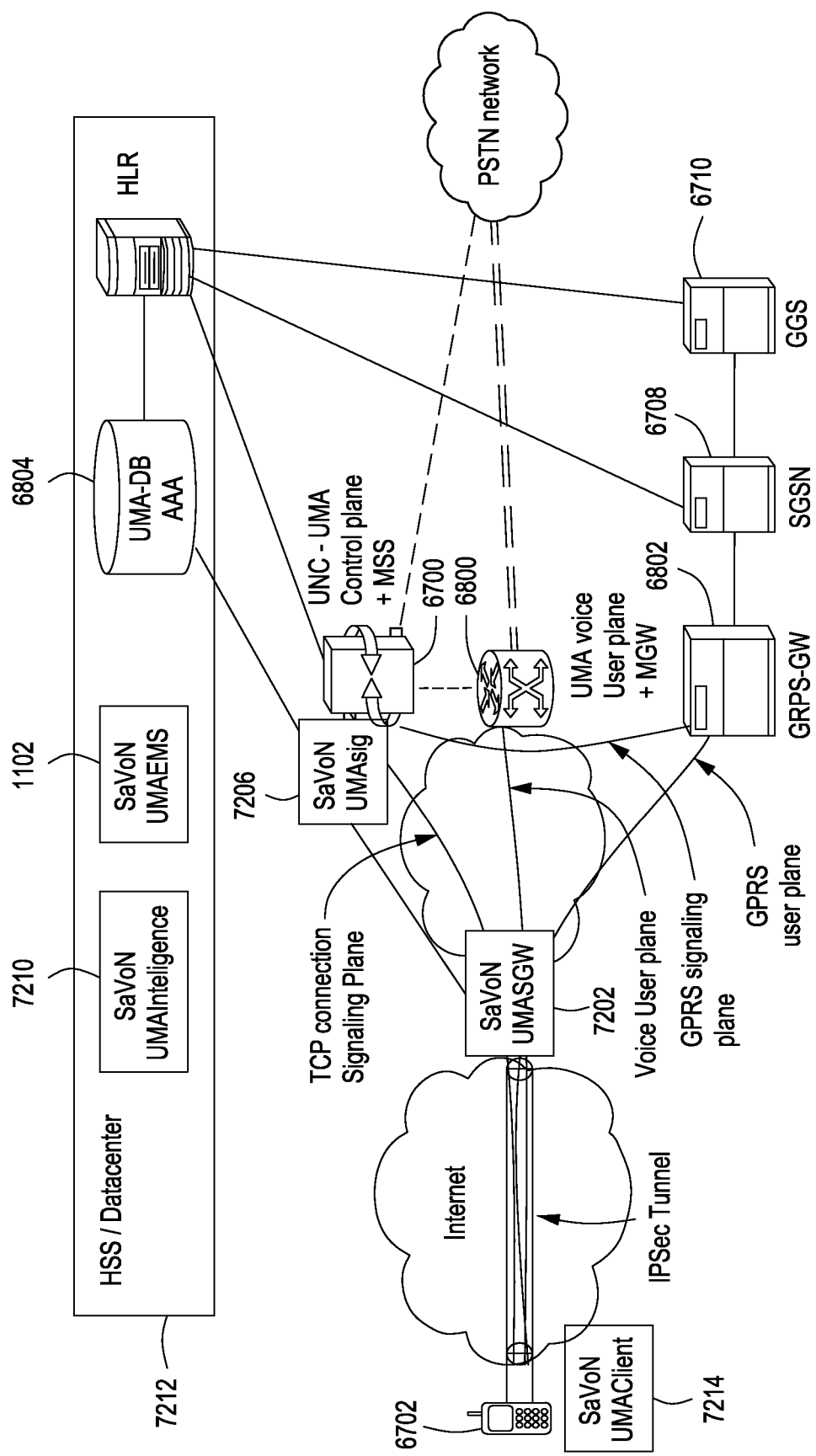
FIG. 73 illustrates the present invention's network wide security solution.

FIG. 72 illustrates the various subsystems 7200 in accordance with the present invention. The Sm 1110 or Sumasgw 7202 is positioned as SGW 7204 in the UMA access network. In addition to all the UMA SGW functions following functions will be performed: detecting RTP/user plane and signaling plane anomalies passively, detecting boot sequence anomalies, capturing, Buffering, Normalizing, and Forwarding device logs, generating presence and location notifications, monitoring media quality and generating alerts. Ss 1108 or Suma signaling 7206 is positioned in path to Core Network 7208 signaling nodes like MSC, SGSN, GGSN, etc. All signaling traffic will pass through it. In each signaling path Suma signaling 7206 will be present actively or passively detecting protocol message sequence anomalies, protecting secured call server and endpoints from Denial of service (D/DOS) and Distributed denial of service (DD/DOS) attacks, real-time SPAM filtering, protocol scrubbing, detecting and blocking spoofed messages, detecting and treating machine dialed calls as per configuration, applying time-of-day based policies and generating alerts for repetitive anomalies. Si 1104 or Sumaintelligence 7210 and Sems 1102 are present in the Network Operations Center (NOC) 7212. Its functionality includes, collecting Incidences from all the present invention's subsystems and other network elements, analyzing and correlating logs for anomaly detection or incidence examination, generating commands for attack mitigation, reducing false alarms by distributed log analysis and maintaining caller trust score data. Sumaclient 7214 is present in the User device 7216. Its main functionality includes monitoring the device activity, generating the device logs, reporting to the Sumaintelligence 7210. Sumaclient 7214 helps in detecting the user hijacking and recovering. As part of the activation procedure Sumaclient 7214 will be configured with Sumaintelligence 7210 system address, and will be updated with SMS based application. Note: Sumaclient 7214 mainly add value in detecting and preventing attacks related hijacking the phone. FIG. 73 illustrates the present invention's network wide security solution showing the Sumaintelligence 7210 and Sems in the HSS/Datacenter 7212, Suma signalling 7206 in the UNC 6700, Sumasgw 7202 in the SGW 6704 and Sumaclient 7214 in user device 6702 (See FIGS. 67 and 68).

Attack detection & prevention Procedure—The present invention maintains a comprehensive state machine to learn, detect and prevent attacks from the end point. When the attack is detected, based on the scope and type of the attack, the present invention prevents the attacks as follows:
1. Unknown attacker—Attack is detected but could not detect the source of the attack. Attacks are prevented by rate limit at the systems level.
2. Unknown attacker (group)—Attack is detected, could not detect the source of the attack but could able to localize to a public IP address. Attacks are prevented by rate limit at the group level or temporarily blocking the source IP addr based on the severity of the attack.
3. Known attacker—Attack is detected, able to detect the source IPaddress/port of the attack but does not have valid SIM. Attacks are prevented by temporarily blocking the source IP addr/port.
4. Known attacker with valid SIM—Attack is detected from a authenticated SIM. Attacks are prevented by permanently blocking the SIM. Administrative intervention is required to unblock the SIM.

Parameters Learned

| Scope | Parameter | Purpose |
|---|---|---|
| System | System capacity | Used for detecting D/DOS attacks - rate limit |
| | Capacity growth rate | Used for detecting D/DOS attacks - rate limit |
| | Session Initiation rate | Used for detecting D/DOS attacks - rate limit |
| | % of new ip addresses seen | Used for detecting D/DOS attacks - rate limit |
| | % Session Initiations failed due to IKE_SA_AUTH timeout | Used for detecting D/DOS attacks - rate limit |
| | % Session Initiations new IMSI | Used for detecting D/DOS attacks - rate limit |
| | % Session Initiations unknown EAP-ReAuthentication ID | Used for detecting D/DOS attacks - rate limit |
| | % Session Initiations using IMSI failed | Used for detecting D/DOS attacks - rate limit |
| | % Session Initiations using EAP-ReAuthentication ID failed | Used for detecting D/DOS attacks - rate limit |
| | % Session Initiations using EAP-ReAuthentication ID resulted in to requesting for IMSI | Used for detecting D/DOS attacks - rate limit |
| | % Session Initiations using EAP-ReAuthentication ID resulted in to requesting for IMSI and failed | Used for detecting D/DOS attacks - rate limit |
| | % Session Initiations dropped due to L3 spoofing | Info |
| Group (All the user behind one public IP address) | Group capacity | Used for detecting D/DOS attacks - rate limiting at the group level |
| | Group Capacity growth rate | Used for detecting D/DOS attacks - rate limiting at the group level |
| | Session Initiation rate | Used for detecting D/DOS attacks - rate limiting at the group level |
| | % Session Initiations failed due to IKE_SA_AUTH timeout | Used for detecting D/DOS attacks - rate limiting at the group level |
| | % Session Initiations new IMSI | Used for detecting D/DOS attacks - rate limiting at the group level |
| | % Session Initiations unknown EAP-ReAuthentication ID | Used for detecting D/DOS attacks - rate limiting at the group level |
| | % Session Initiations using IMSI failed | Used for detecting D/DOS attacks - rate limiting at the group level |
| | % Session Initiations using EAP-ReAuthentication ID failed | Used for detecting D/DOS attacks - rate limiting at the group level |
| | % Session Initiations dropped due to L3 spoofing | Info |
| Endpoint | Maximum allowed L3 sessions | Detecting DOS attacks - rate limiting or blocking IMSI. |
| | session initiation rate | Used for detecting D/DOS attacks - rate limiting based on the source |
| | Ip addresses used | Used for detecting D/DOS attacks - rate limiting based on the source |
| | SGWs - recently used | Detecting distributed attacks. |
| | Re-Auth Id - allocated | Detecting replay attacks or random Re-Auth Id attacks. |
| | TMSI/p-TMSI allocated | Detecting replay attacks or random TMSI/p-TMSI attacks. |
| | % Session Initiations failed due to IKE_SA_AUTH timeout (Should be indexed based on the IP address/port) | Used for detecting D/DOS attacks - rate limiting based on the source |
| | % Session Initiations rejected due to invalid IMSIs (Should be indexed based on the IP address/port) | Used for detecting D/DOS attacks - rate limiting based on the source |
| | % Session Initiations rejected due to invalid ReAuthentication ID (Should be indexed based on the IP address/port) | Used for detecting D/DOS attacks - rate limiting based on the source |
| | % Session Initiations failed due EAP_Reject | Based on the % of the failures block the IMSI temporarily or permanently. |
| | % Session Initiations failed due EAP_Reject for the given IP address/port | Used for detecting D/DOS attacks - rate limiting based on the source |
| | % L3 Session Initiations rejected | Used for detecting DOS |

-continued

| Scope | Parameter | Purpose |
|---|---|---|
| | due to L3 sessions limit. | attacks - rate limiting |
| | % Session Initiations rejected due to L3 spoofing Location update Attach Detach Call attempt Supplementary service (call independent) PDP context establishment | Block the IMSI permanently. |

Above parameters are used for detecting and preventing the attacks.

Figure 74A:
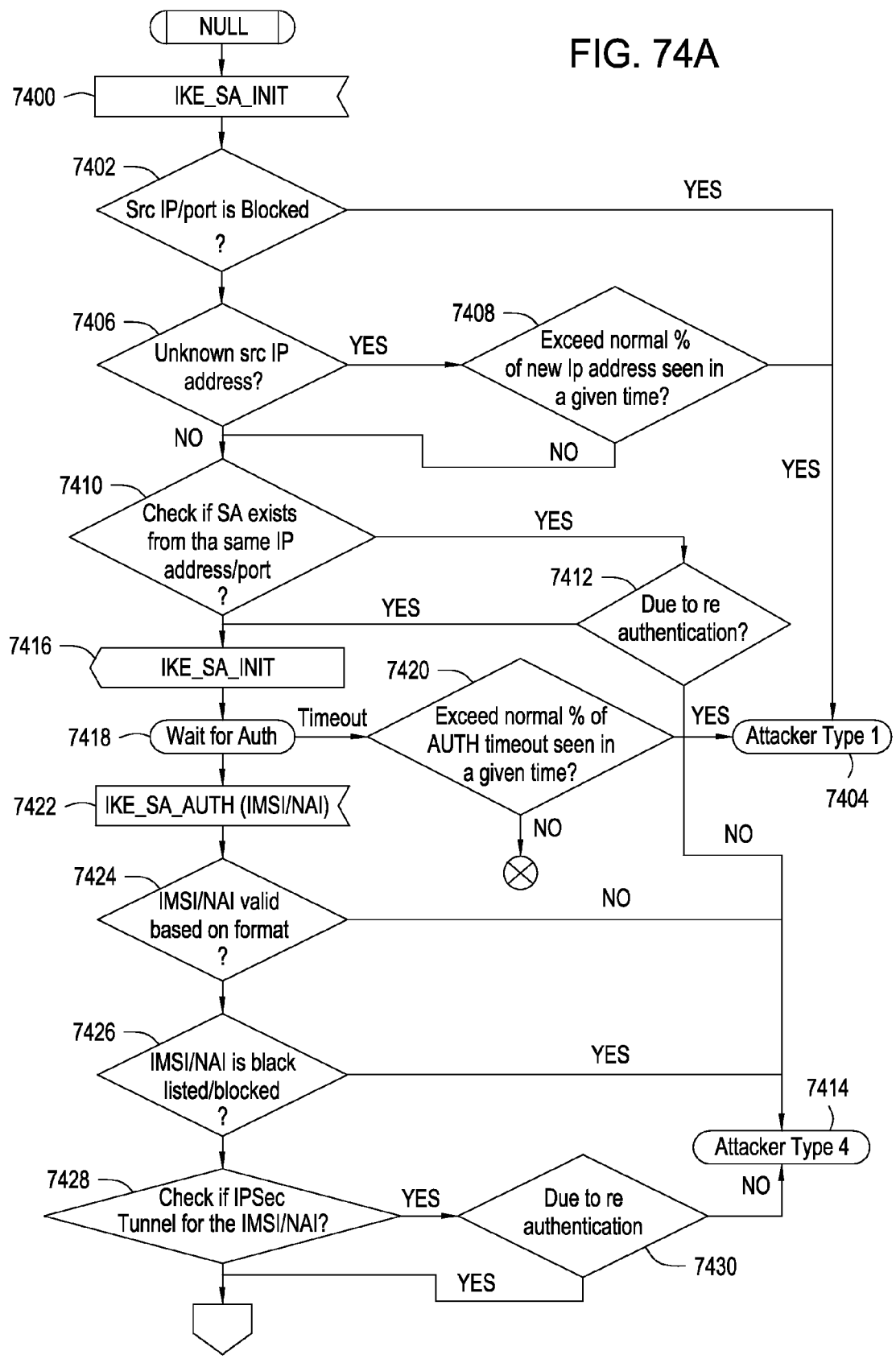
FIGS. 74A and 74B illustrate Authentication and IPSec Tunnel establishment in accordance with the present invention.
Figure 74B:
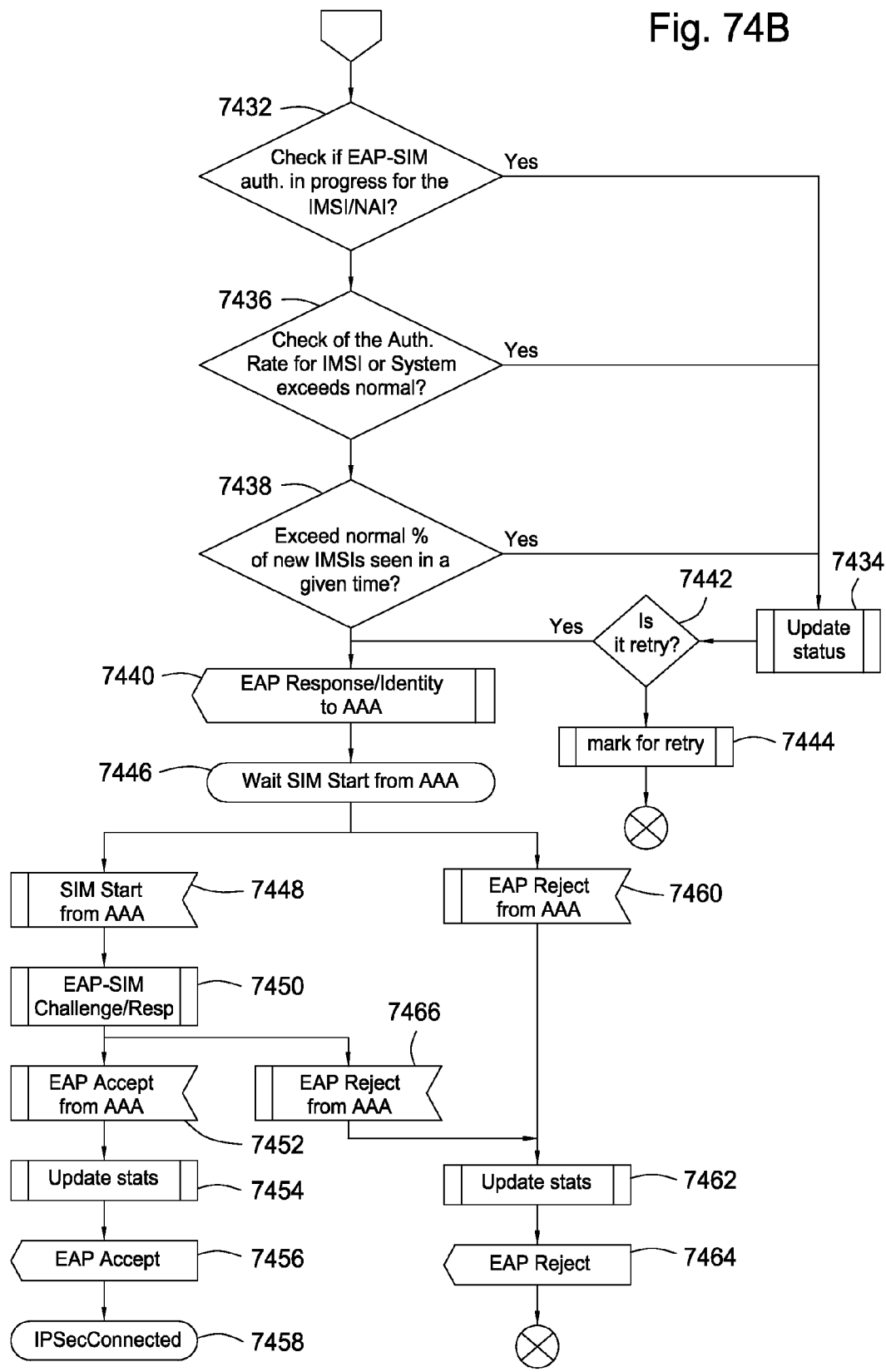

The following flow diagrams provide a detailed procedure for the UMA network in accordance with the present invention: learning parameters (systems level and endpoint level), detecting attacks and preventing Attacks. FIGS. 74A and 74B illustrate Authentication and IPSec Tunnel establishment in accordance with the present invention. An IKE_SA_INIT message is received in block 7400. If the Src IP/port is blocked, as determined in decision block 7402, attacker type 1 is reported in block 7404. If, however, the Src IP/port is not blocked, as determined in decision block 7402, and the Src IP address is unknown, as determined in decision block 7406, and the normal % of new IP addresses seen in a given time is exceeded, as determined in decision block 7408, attacker type 1 is reported in block 7404. If, however, the Src IP address is known, as determined in decision block 7406, or the normal % of new IP addresses seen in a given time is not exceeded, as determined in decision block 7408, and a SA exists from that same IP address/port, as determined in decision block 7410, and it is not due to re-authentication, as determined in decision block 7412, attacker type 4 is determined in block 7414. If, however, a SA dies not exist from that same IP address/port, as determined in decision block 7410, or the same IP address/port is due to re-authentication, as determined in decision block 7412, IKE_SA_INIT is sent in block 7416 and the process waits for authentication in block 7418. If the wait times out and the normal % of authentication timeouts within a given time are exceeded, as determined in decision block 7420, attacker type 1 is determined in block 7404. After IKE_SA_AUTH (IMSI/NAI) in block 7422, if the IMSI/NAI is not valid based on format, as determined in decision block 7424, attacker type 4 is determined in block 7414. If, however, the IMSI/NAI is valid based on format, as determined in decision block 7424, and the IMSI/NAI is black listed or blocked, as determined in decision block 7426, attacker type 4 is determined in block 7414. If, however, the IMSI/NAI is not black listed or blocked, as determined in decision block 7426, and the IPSec Tunnel of the IMSI/NAI exists, as determined in decision block 7428, and it is not due to re-authentication, as determined in decision block 7430, attacker type 4 is determined in block 7414. If, however, the IPSec Tunnel of the IMSI/NAI does not exists, as determined in decision block 7428, or the tunnel exists and it is due to re-authentication, as determined in decision block 7430, and if the EAP-SIM authentication is in progress for the IMSI/NAI, as determined in decision block 7432, the status is updated in block 7434. If, however, the EAP-SIM authentication is not in progress for the IMSI/NAI, as determined in decision block 7432, and the authentication rate for IMSI or System exceeds normal, as determined in decision block 7436, the status is updated in block 7434. If, however, the authentication rate for IMSI or System does not exceeds normal, as determined in decision block 7436, and the normal % of new IMSI seen in a given time is exceeded, as determined in decision block 7438, the status is updated in block 7434. After the status is updated in block 7434, if it is not a retry, as determined in decision block 7442, it is marked for retry in block 7444. If, however, it is a retry, as determined in decision block 7442 or the normal % of new IMSI seen in a given time is not exceeded, as determined in decision block 7438, EAP Response/Identity is sent to AAA in block 7440 and the process waits for SIM Start from AAA in block 7446. Once SIM Start is received from AAA in block 7448, EAP-SIM Challenge/Response is sent in block 7450. Once an EAP Acceptance is received from AAA in block 7452, the status is updated in block 7454 and EAP Acceptance is sent in block 7456 and IPSec is connected in block 7458. If an EAP Rejection is received from the AAA in block 7460 or block 7466, the status is updated in block 7462 and EAP Rejection is sent in block 7464.

Figure 75:
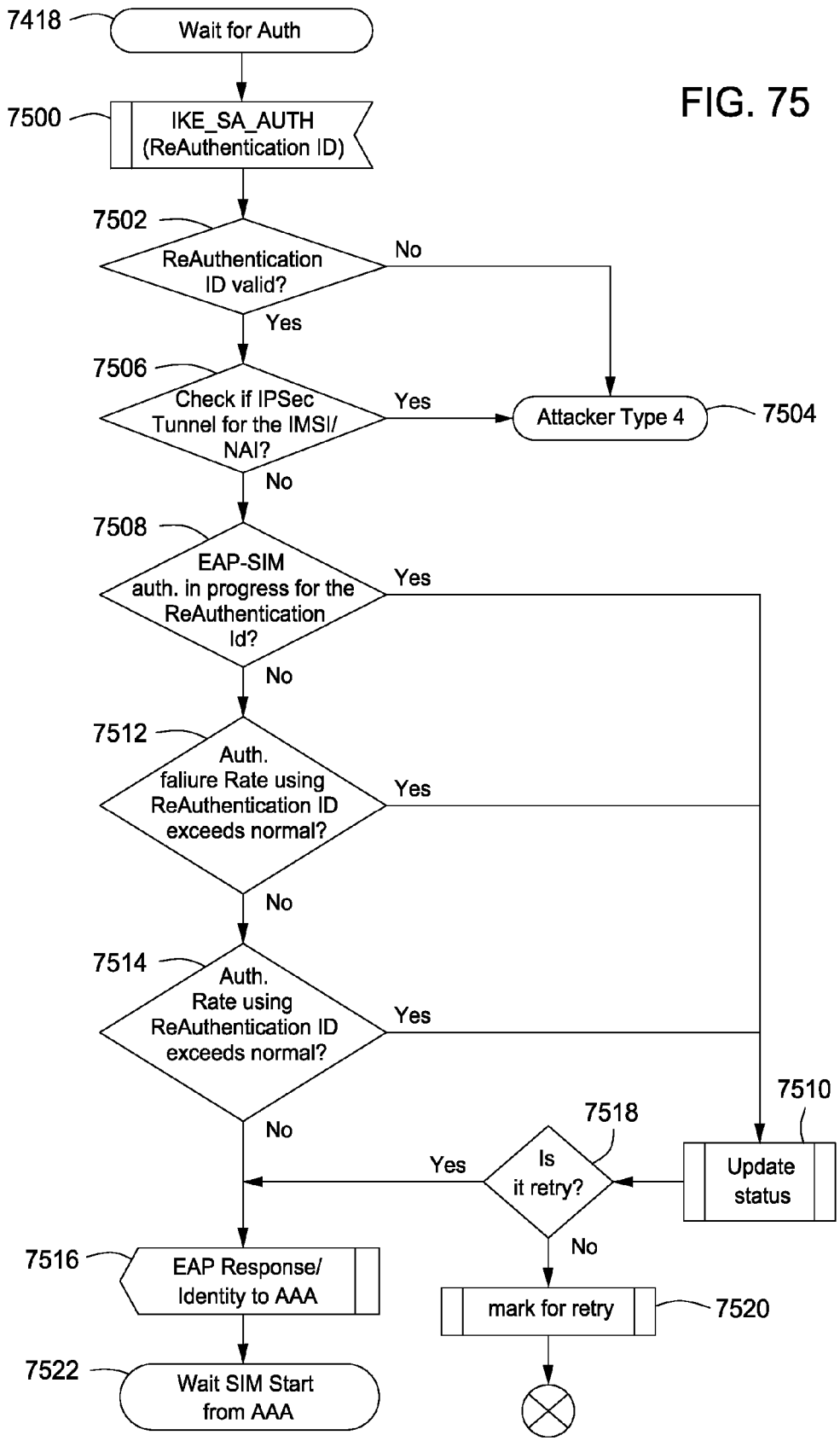
FIG. 75 illustrates Fast Re-Authentication in accordance with the present invention.

FIG. 75 illustrates Fast Re-Authentication in accordance with the present invention. An IKE_SA_AUTH (ReAuthentication ID) is received in block 7500. If the ReAuthentication ID is not valid, as determined in decision block 7502, an attacker type 4 is determined in decision block 7504. If, however the ReAuthentication ID is valid, as determined in decision block 7502, and an IPSec Tunnel for the IMSI/NAI exists, as determined in decision block 7506, an attacker type 4 is determined in decision block 7504. If, however, an IPSec Tunnel for the IMSI/NAI does not exist, as determined in decision block 7506, and the EAP-SIM authentication is in progress for the ReAuthentication ID, as determined in decision block 7508, the status is updated in block 7510. If, however, the EAP-SIM authentication is not in progress for the ReAuthentication ID, as determined in decision block 7508, and the authentication failure rate using ReAuthentication ID exceeds normal, as determined in decision block 7512, the status is updated in block 7510. If, however, the authentication failure rate using ReAuthentication ID does not exceed normal, as determined in decision block 7512, and the authentication rate using ReAuthentication ID exceeds normal, as determined in decision block 7514, the status is updated in block 7510. After the status is updated in block 7510, if it is not a retry, as determined in decision block 7518, it is marked for retry in block 7520. If, however, it is a retry, as determined in decision block 7518 or the authentication rate using ReAuthentication ID does not exceeds normal, as determined in decision block 7514, EAP Response/Identity is sent to AAA in block 7516 and the process waits for SIM Start from AAA in block 7522.

Figure 76A:
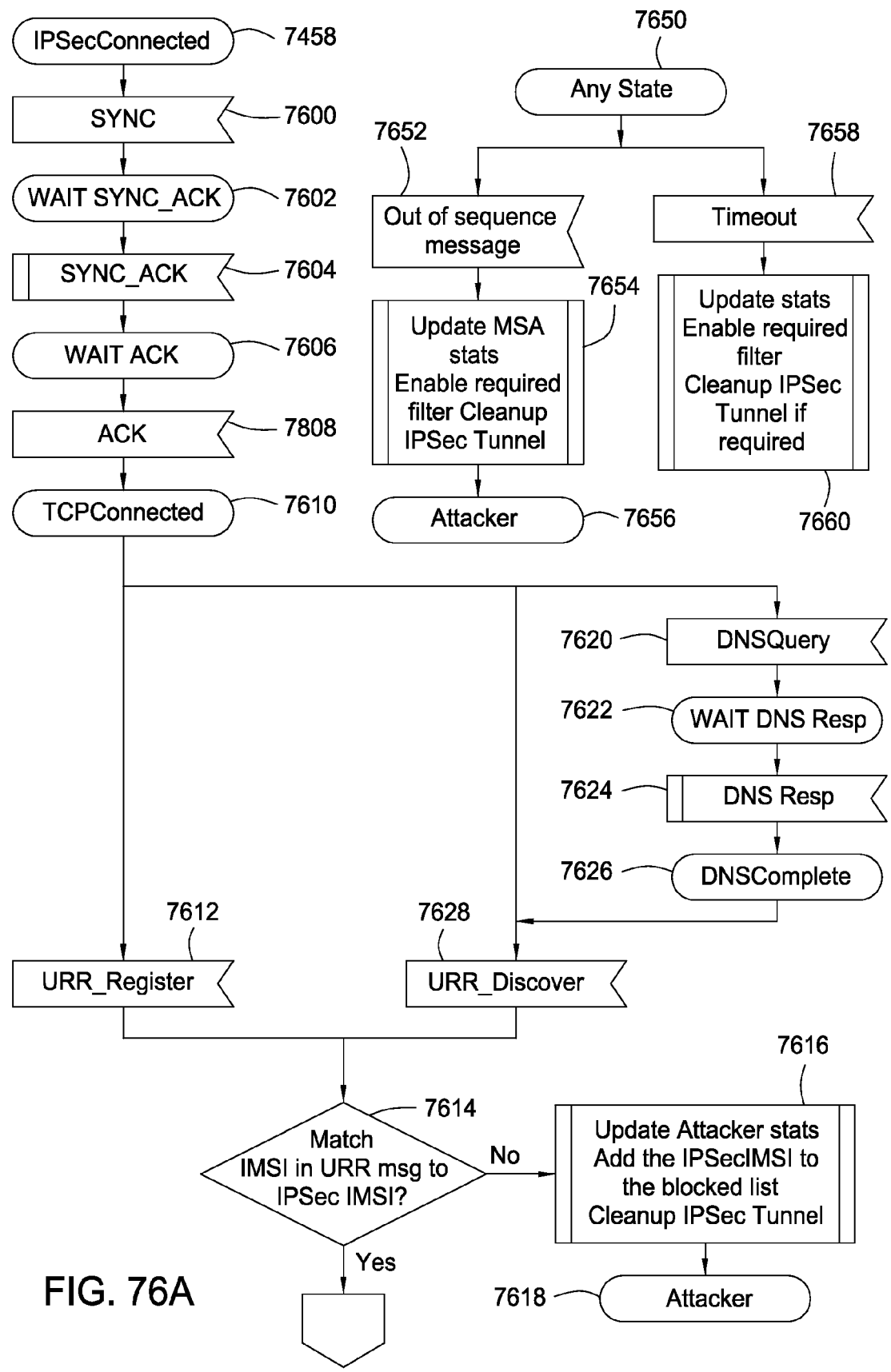
FIGS. 76A and 76B illustrate URR Registration in accordance with the present invention.
Figure 76B:
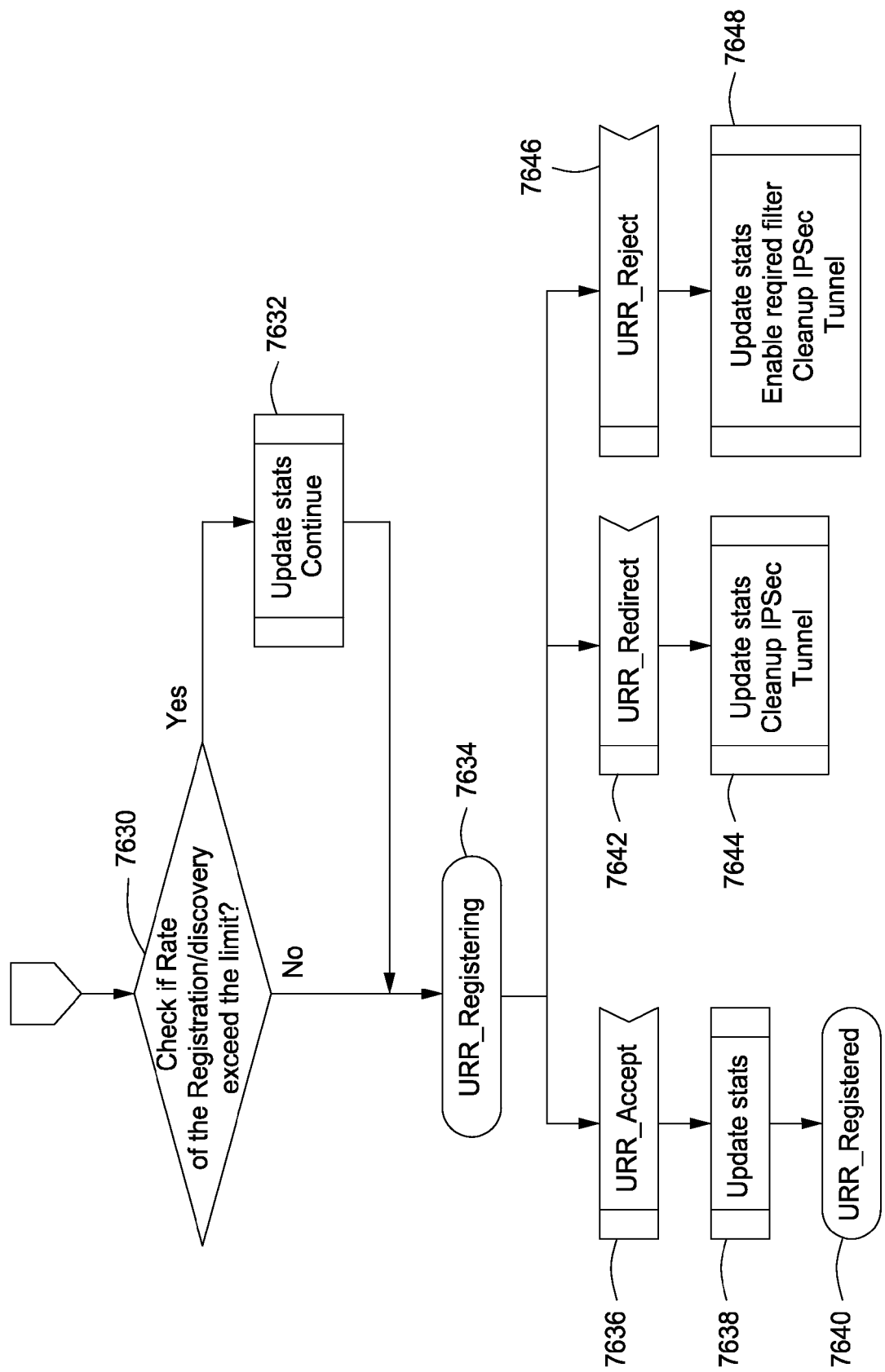

FIGS. 76A and 76B illustrate URR Registration in accordance with the present invention. Once the IPSec is connected in block 7458, a SYNC message is received in block 7600 and the process waits for SYNC_ACK in block 7602. Once SYNC_ACK is received in block 7604, the process waits for ACK in block 7606. Once ACK is received in block 7608, the TCP connection is established in block 7610. Thereafter, when URR_Register is received in block 7612, if the IMSI in the URR message does not match the IPSec IMSI, as determined in decision block 7614, the attacker stats are updated, the IPSec IMSI is added to the blocked list and the IPSec Tunnel is cleaned up in block 7616, and the attacker is determined in block 7618. If a DNSQuery is received in block 7620, the process waits for DNS Response in block 7622. Once the DNS Response is received in block 7624, DNS is complete in block 7626. When a URR_Discover is received in block 7628, if the IMSI in the URR message does not match the IPSec IMSI, as determined in decision block 7614, the attacker stats are updated, the IPSec IMSI is added to the blocked list and the IPSec Tunnel is cleaned up in block 7616, and the attacker is determined in block 7618. If, however, the IMSI in the URR message matches the IPSec IMSI, as determined in decision block 7614, and the rate of registration/discovery exceeds the limit, as determined in decision block 7630, the stats are updated in block 7632. Thereafter, or if the rate of registration/discovery does not exceed the limit, as determined in decision block 7630, URR Registering in block 7634. If a URR_Accept is received in block 7636, the stats are updated in block 7638 and URR_Registered in block 7640. If a URR_Redirect is received in block 7642, the stats are updated in block 7644 and the IPSec Tunnel is cleaned up in block 7644. If a URR Reject is received in block 7646, the stats are updated, the required filter(s) are enabled and the IPSec Tunnel is cleaned up in block 7648. Now referring to any state in block 7650, if an out of sequence message is received in block 7652, the MSA stats are updated, the required filter(s) are enabled and the IPSec Tunnel is cleaned up in block 7654 and the attacker is determined in block 7656. If a timeout is received in block 7658, the stats are updated, the required filter(s) are enabled and the IPSec Tunnel is cleaned up (if required) in block 7660.

Figure 77:
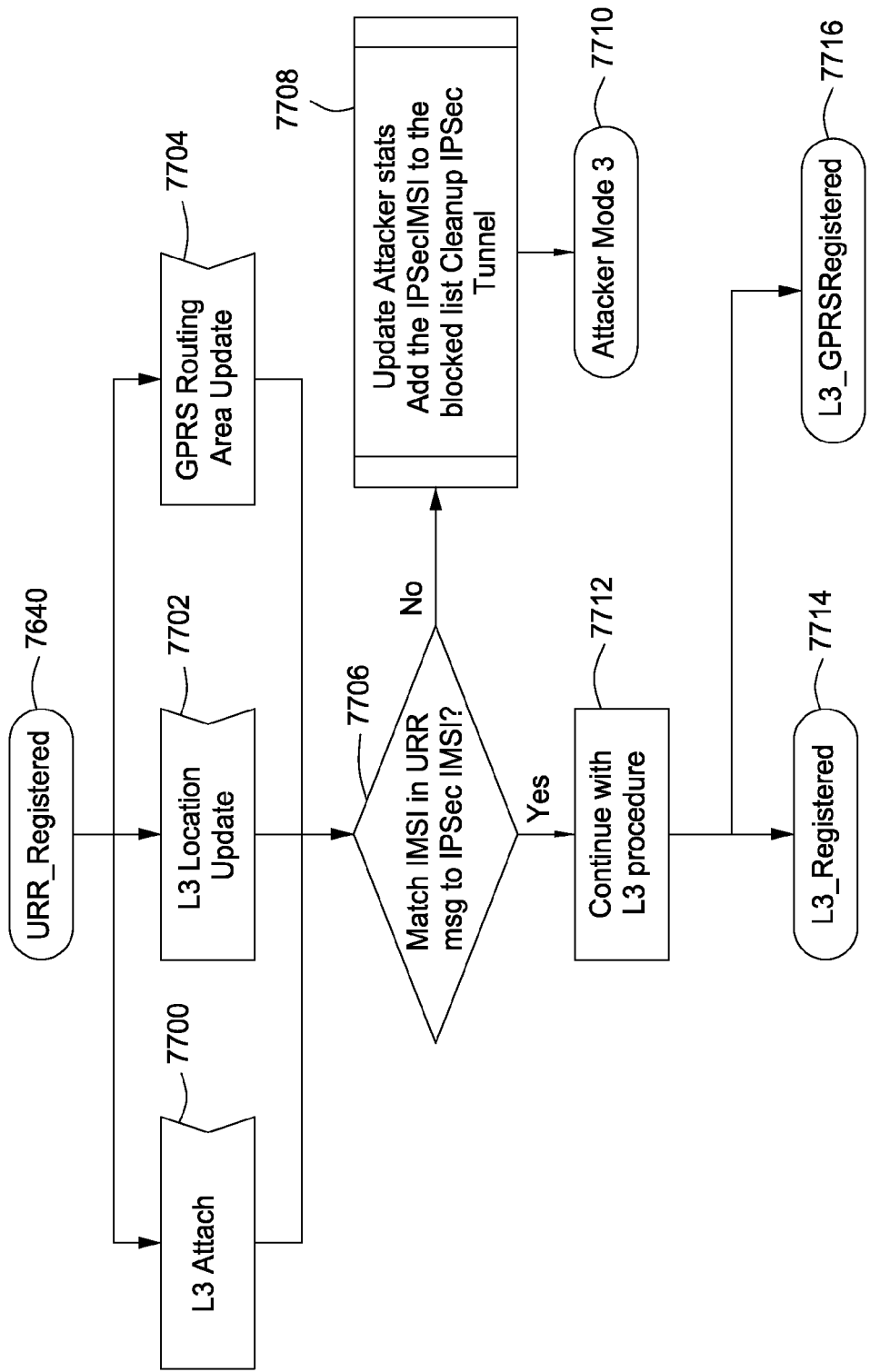
FIG. 77 illustrates Attach/Location or Routing area update in accordance with the present invention.

FIG. 77 illustrates Attach/Location or Routing area update in accordance with the present invention. After URR_Registered in block 7640, if L3 Attach is received in block 7700, L3 Location Update is received in block 7702 or GPRS Routing Area Update is received in block 7704, if the IMSI in the URR message does not match the IPSec IMSI, as determined in decision block 7706, the attacker stats are updated, the IPSec IMSI is added to the blocked list and the IPSec Tunnel is cleaned up in block 7708, and the attacker is determined in block 7710. If, however, the IMSI in the URR message matches the IPSec IMSI, as determined in decision block 7706, the L3 procedure is continued in block 7712 and L3_Registered in block 7714 or L3_GPRSRegistered in block 7716.

Figure 78:
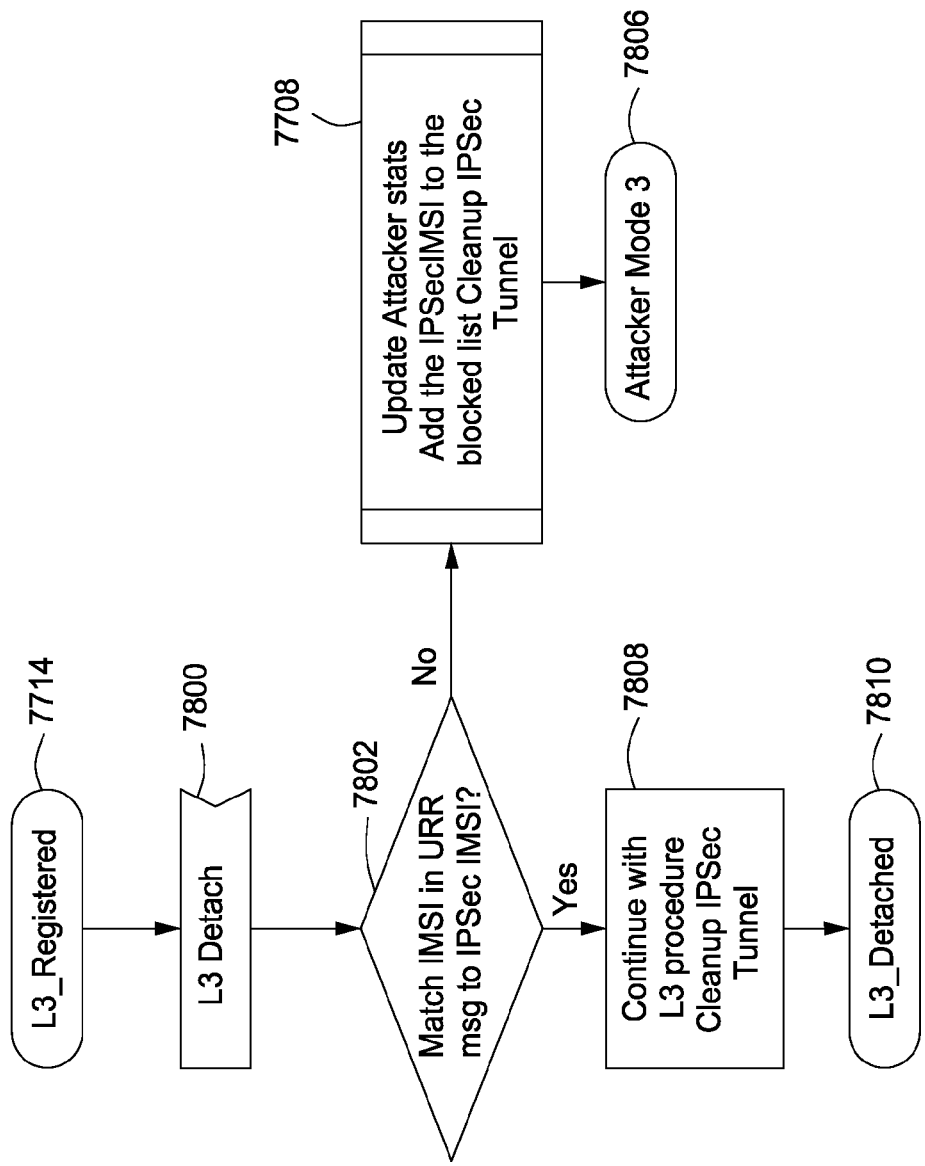
FIG. 78 illustrates Detach in accordance with the present invention.

FIG. 78 illustrates Detach in accordance with the present invention. After L3_Registered in block 7714, if L3 Detach is received in block 7800 and the IMSI in the URR message does not match the IPSec IMSI, as determined in decision block 7802, the attacker, stats are updated, the IPSec IMSI is added to the blocked list and the IPSec Tunnel is cleaned up in block 7804, and the attacker is determined in block 7806. If, however, the IMSI in the URR message matches the IPSec IMSI, as determined in decision block 7802, the L3 procedure is continued and the IPSec Tunnel is cleaned up in block 7808, and L3_Detached in block 7810.

Figure 79:
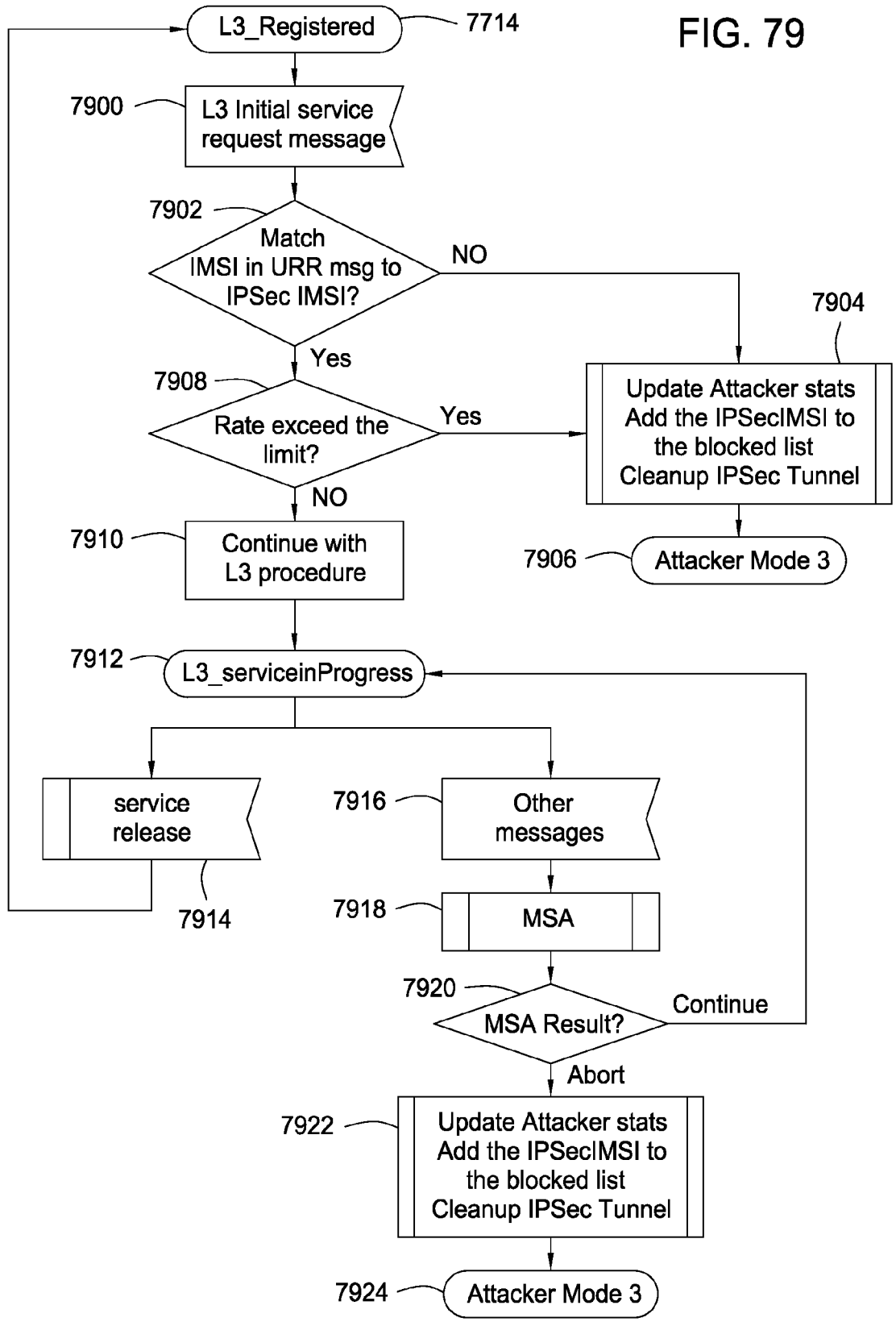
FIG. 79 illustrates Layer3 services in accordance with the present invention.

FIG. 79 illustrates Layer 3 services in accordance with the present invention. This flow will be used for all the Layer 3 procedures, like Call attempts, page response, Call independent supplementary services. After L3_Registered in block 7714, if L3 Initial service request message is received in block 7900 and the IMSI in the URR message does not match the IPSec IMSI, as determined in decision block 7902, the attacker stats are updated, the IPSec IMSI is added to the blocked list and the IPSec Tunnel is cleaned up in block 7904, and the attacker mode 3 is determined in block 7906. If, however, the IMSI in the URR message matches the IPSec IMSI, as determined in decision block 7902, and the rate limit is exceeded, as determined in decision block 7908, the attacker stats are updated, the IPSec IMSI is added to the blocked list and the IPSec Tunnel is cleaned up in block 7904, and the attacker mode 3 is determined in block 7906. If, however, the rate limit is not exceeded, as determined in decision block 7908, the L3 procedure is continued in block 7910 and L3_ServiceInProgress in block 7912. If Service Release is received in block 7914, the process loops back to L3_Registered in block 7714 and continues as previously described. If other messages are received in block 7916, MSA is invoked in block 7918. If the MSA result is to continue, as determined in decision block 7920, the process loops back to L3_ServiceInProcess in block 7912 and continues as previously described. If, however, the MSA result is Abort, as determined in decision block 7920, the attacker stats are updated, the IPSec IMSI is added to the blocked list and the IPSec Tunnel is cleaned up in block 7922, and the attacker mode 3 is determined in block 7924.

Figure 80:
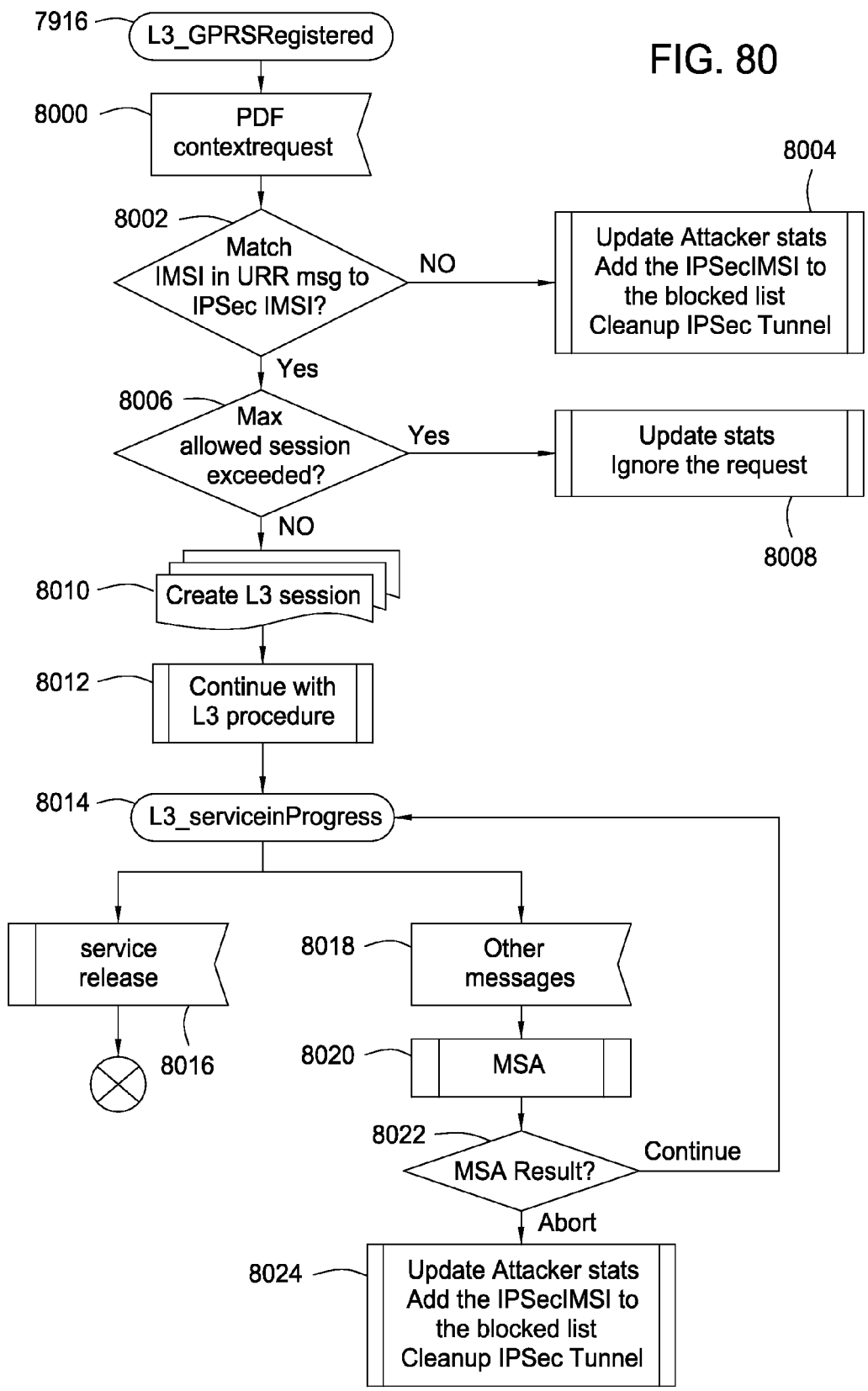
FIG. 80 illustrates GPRS-PDP context in accordance with the present invention.

FIG. 80 illustrates GPRS-PDP context in accordance with the present invention. After L3_GPRSRegistered in block 7716, if PDP context request is received in block 8000 and the IMSI in the URR message does not match the IPSec IMSI, as determined in decision block 8002, the attacker stats are updated, the IPSec IMSI is added to the blocked list and the IPSec Tunnel is cleaned up in block 8004. If, however, the IMSI in the URR message matches the IPSec IMSI, as determined in decision block 8002, and the maximum allowed session is exceeded, as determined in decision block 8006, the stats are updated and the request is ignored in block 8008. If, however, the maximum allowed session is not exceeded, as determined in decision block 8006, a L3 session is created in block 8010 and the L3 procedure is continued in block 8012 and L3_ServiceInProcess in block 8014. If Service Release is received in block 8016, the process continues. If other messages are received in block 8018, MSA is invoked in block 8020. If the MSA result is to continue, as determined in decision block 8022, the process loops back to L3_ServiceInProcess in block 8014 and continues as previously described. If, however, the MSA result is Abort, as determined in decision block 8022, the attacker stats are updated, the IPSec IMSI is added to the blocked list and the IPSec Tunnel is cleaned up in block 8024.

Figure 81:
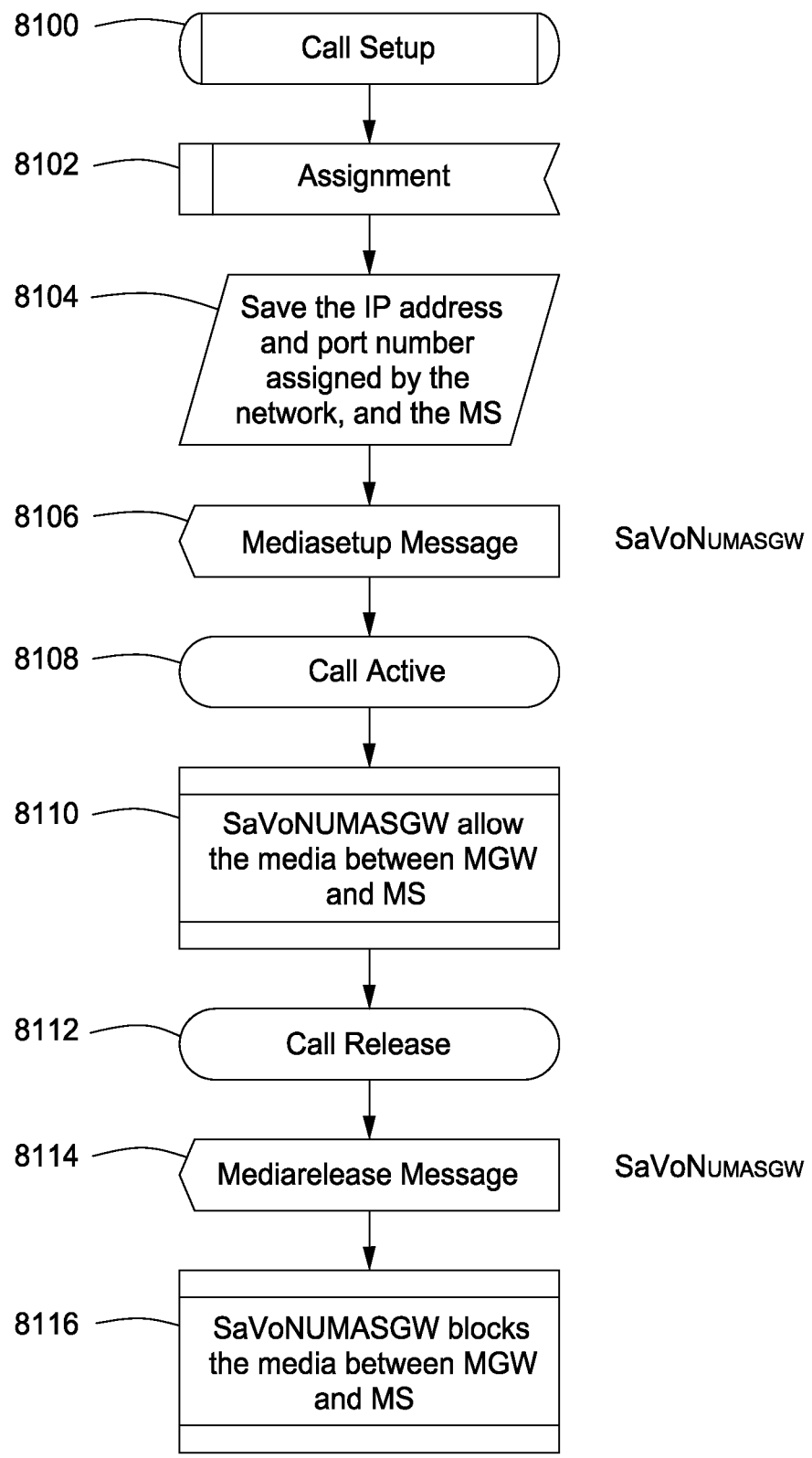
FIG. 81 illustrates Media setup in accordance with the present invention.

FIG. 81 illustrates Media setup in accordance with the present invention. Call setup occurs in block 8100 and an Assignment is received in block 8102. The IP address and port number assigned by the network and the MS are saved in block 8104. A Mediasetup message is received in block 8106 and the call is active in block 8108. The Sumasgw allows the media between the MGW and the MS in block 8110. The call is released in block 8112, a Mediarelease Message is received in block 8114 and the Sumasgw blocks the media between the MGW and MS in block 8116.

Figure 82:
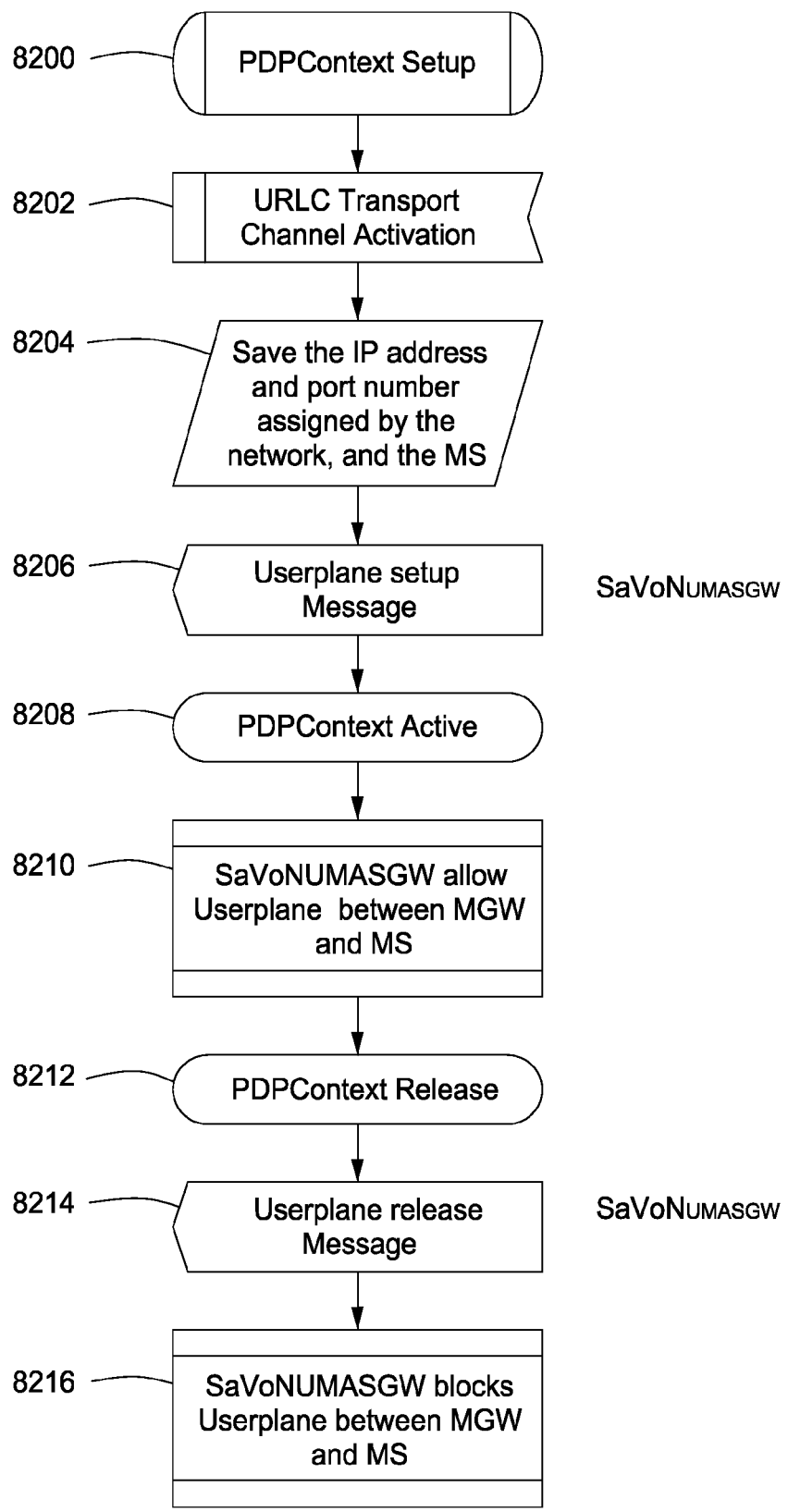
FIG. 82 illustrates GPRS User plane setup in accordance with the present invention.

FIG. 82 illustrates GPRS User plane setup in accordance with the present invention. PDPContext setup occurs in block 8200 and URLC Transport Channel Activation is received in block 8202. The IP address and port number assigned by the network and the MS are saved in block 8204. A Userplane setup message is received in block 8206 and the PDPContext is active in block 8208. The Sumasgw allows the userplane between the MGW and the MS in block 8210. The PDPContext is released in block 8212, a Userplane Release Message is received in block 8214 and the Sumasgw blocks the media between the MGW and MS in block 8216.

Figure 83:
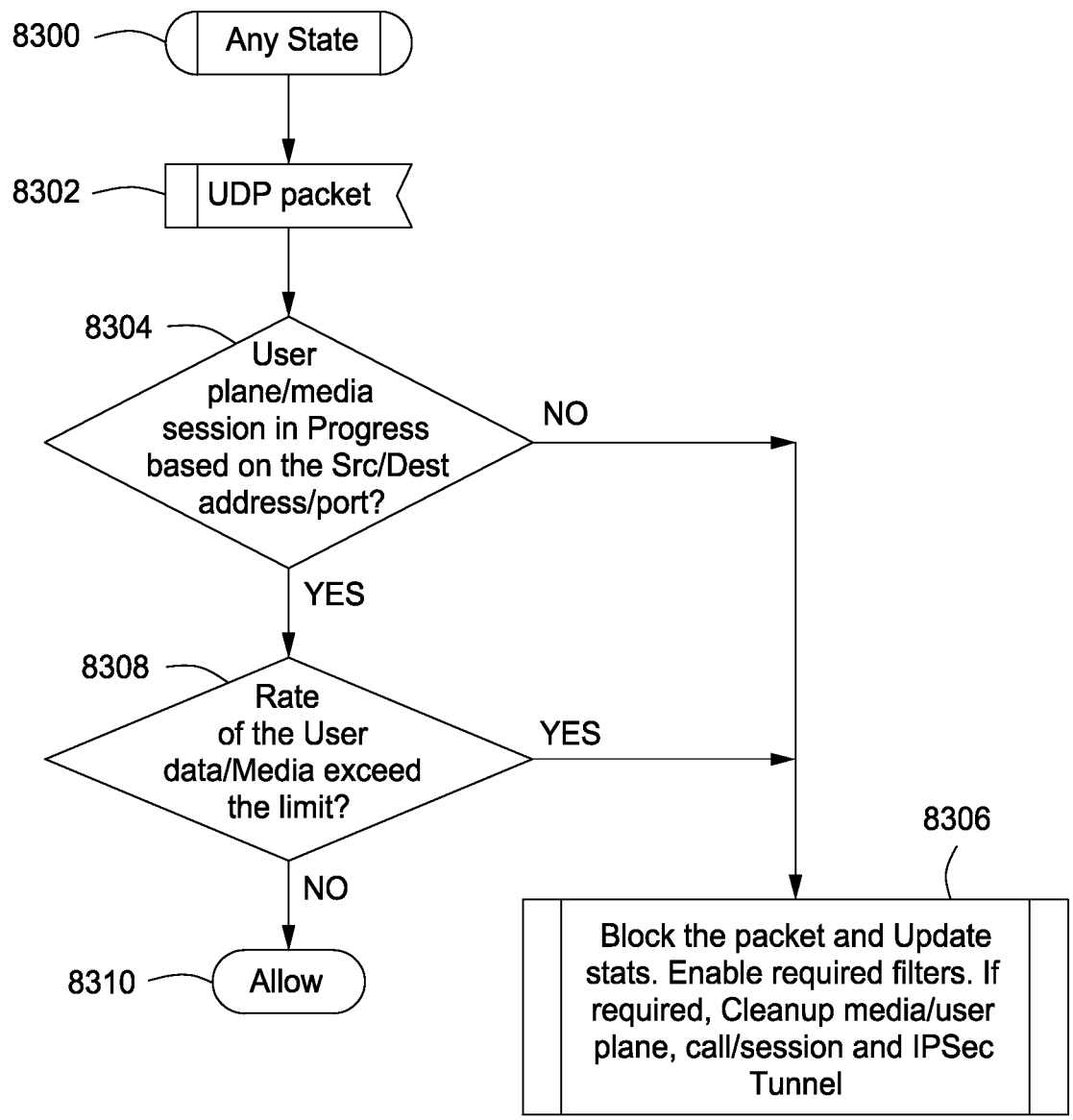
FIG. 83 illustrates Media/User plane data filtering in accordance with the present invention.

FIG. 83 illustrates Media/User plane data filtering in accordance with the present invention. During any state in block 8300, when a UDP packet is received in block 8302 and the user plane/media session in progress is not based on the Src/Dest address/port, as determined in decision block 8304, the packet is blocked, the stats are updated, the required filter(s) are enabled, and the media/user plane, call/session and IPSec Tunnel are cleaned up, if required, in block 8306. If, however, the user plane/media session in progress is based on the Src/Dest address/port, as determined in decision block 8304, and the rate of the user data/media exceeds the limit, as determined in decision block 8308, the packet is blocked, the stats are updated, the required filter(s) are enabled, and the media/user plane, call/session and IPSec Tunnel are cleaned up, if required, in block 8306. If, however, the rate of the user data/media does not exceed the limit, as determined in decision block 8308, the packet is allowed in block 8310.

Figure 84:
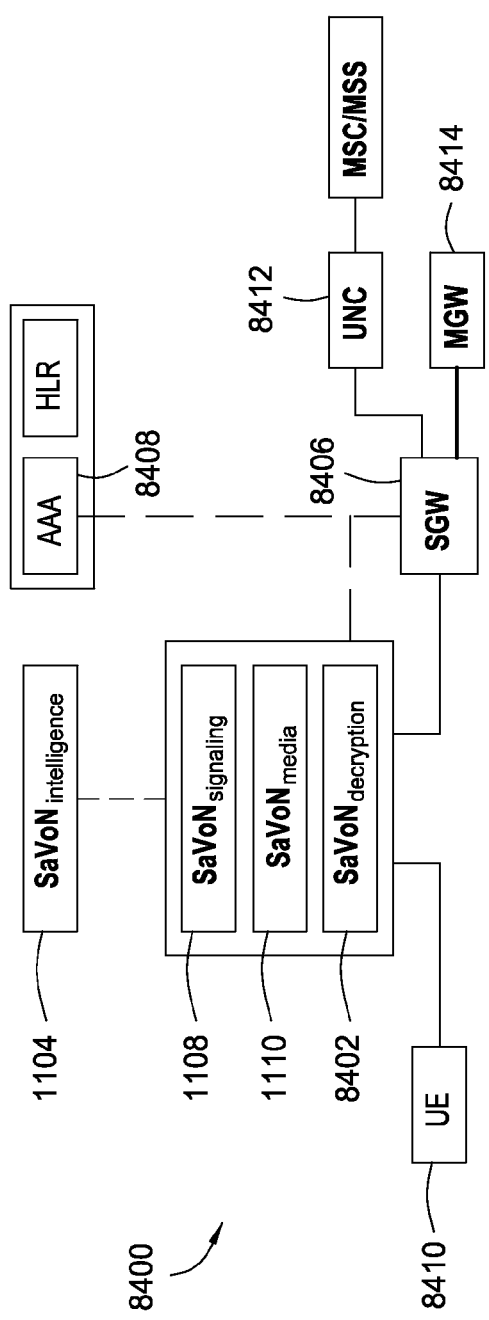
FIG. 84 illustrates a UMA architecture in accordance with one embodiment of the present invention.

FIG. 84 illustrates a UMA architecture 8400 in accordance with one embodiment of the present invention. Sdecryption 8402 is connected between UE 8410 and SGW 8406. SGW in connected to UNC 8412 and MGW 8414. Sdecryption 8402 is primarily responsible for IPsec tunnel establishment, IPSec tunnel decryption, releasing the IPSec tunnel if any anomaly is detected, finding the IMSI to IPSec IP address mapping, and providing API to Ss 1108/Sm 1110 to get the info. The knowledge required is SGW's Deffie Hallman private key to monitor the IKEv2 signaling on UDP port 500/4500. Kc value for the IpSec tunnel. Sdecryption 8402 will have the capability to sniff the traffic between SGW 8406 and AAA 8408 to get the auth results and Kc value, and then pass the decrypted messages to Sm 1110/Ss 1108. The API to Ss 1108/Sm 1110 blocks/releases a IPsec tunnel.

Figure 85:
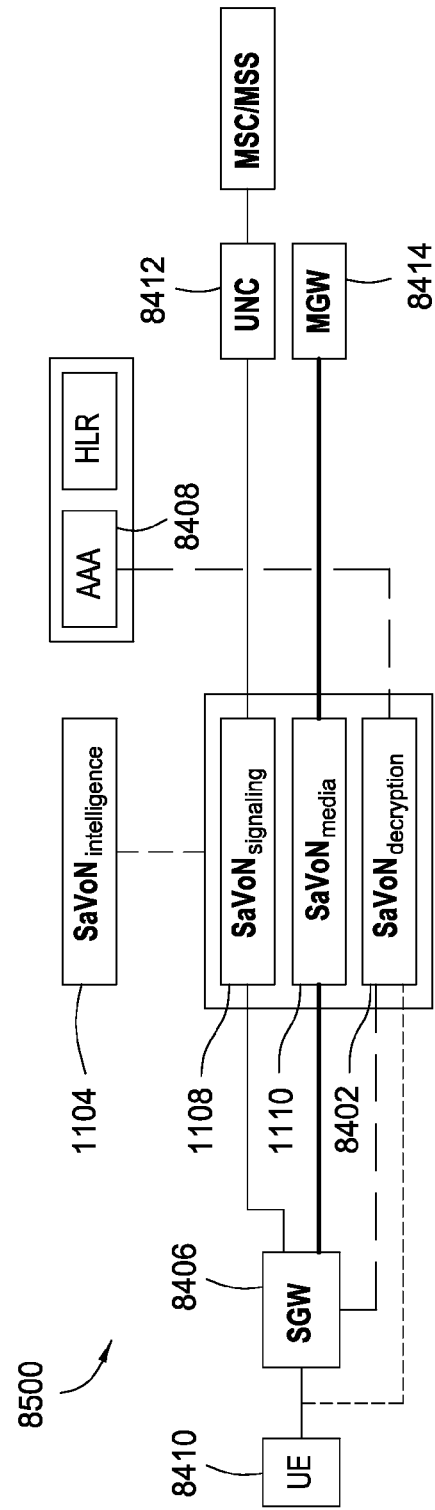
FIG. 85 illustrates a UMA architecture in accordance with another embodiment of the present invention.

FIG. 85 illustrates a UMA architecture in accordance with another embodiment of the present invention. Sdecryption 8402 is connected to SGW 8406 and AAA 8408. UE is connected to SGW 8406, which is also connected to Sm 1110 and Ss 1108. Sm 1110 is connected to MGW 8414. Ss 1108 is connected to UNC 8412. Sdecryption 8402 is primarily responsible for many of the functions as previously described. Sdecryption 8402 will get the auth results and Kc value, and then pass the decrypted messages to Sm 1110/Ss 1108.

The present invention is a massively scaleable security system, supporting starting from 1000 up to 200,000 Session per system. Its system scalability starting from 30 sessions/sec to 300 sessions/sec. The present invention also provides Carrier Grade Reliability—99.999% availability, redundant architecture with a platform proven through numerous commercial deployments. The platform is fully redundant with no single point of failure. A mated hot standby card backs each active processor card in the call server. Active and standby cards communicate over Ethernet and can be deployed in different geographic locations. The present invention's Element Management system (Sems 1102) offers fully integrated. OAM&P platform for the system's elements. Provisioning and monitoring of both elements can be managed from the EMS, eliminating potential inconsistencies and errors between different system elements. This significantly reduces the operational burden and eliminates unnecessary system management complexity.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method for protecting one or more communications devices comprising the steps of:
   receiving a communication at a first processor communicably coupled to the one or more communications devices via a network;
   filtering the received communication using the first processor wherein the first processor executes three or more stages selected from the group comprising a media protection and filtering plane, a policy-based filtering plane, a signature-based filtering plane, a protocol anomaly detection and filtering plane, and a behavioral learning-based filtering plane;
   either allowing or blocking the received communication using the first processor based on the selected stages;
   wherein the media protection and filtering plane blocks the received communication whenever the communication falls outside one or more communication media-based parameters comprising signaling media integrity, media validation and anomaly detection;
   wherein the policy-based filtering plane blocks the received communication whenever one or more user defined media and time policies are violated;
   wherein the signature-based filtering plane blocks the received communication whenever the received communication matches one or more known attack signatures;
   wherein the protocol anomaly detection and filtering plane blocks the received communication whenever the received communication violates one or more protocol policies comprising a protocol misuse policy, a protocol message scrubbing policy, and a device specific policy;
   wherein the behavioral learning-based filtering plane uses a probability analysis to detect anomalies based on one or more learned parameters and resolve probable false alarms into a correct decision to either block or allow the received communication; further comprising:
   one or more media subsystems having a second processor communicably and securely connected to one or more signaling subsystems and deployed as a security and monitoring interface between the network and the one or more communications devices; and
   an element management system (EMS) subsystem having a third processor communicably and securely connected to the one or more signaling subsystems; or
   a verify subsystem having a fourth processor communicably and securely connected to the one or more signaling subsystems.

2. The method as recited in claim 1, wherein the stages further comprise an authentication plane and an encryption plane.

3. The method as recited in claim 1, wherein the stages are applicable to one or more protocols including SIP, IMS, UMA, H.248, H.323, RTP, CSTA/XML or a combination thereof.

4. The method as recited in claim 1, wherein the method is implemented in one or more subsystems including the one or more signaling subsystems, the one or more media subsystems, an intelligence subsystem, the EMS subsystem, the verify subsystem or a combination thereof.

5. The method as recited in claim 1, wherein the stages are implemented within a single device or are distributed across the network.

6. The method as recited in claim 1, wherein the method is implemented within a SIP network, a UMA network, an IMS network or a combination thereof.

7. The method as recited in claim 1, wherein the denied communication comprises a DoS attack, blended attack, VoIP SPAM or a combination thereof.

8. A non-transitory computer readable medium for protecting one or more communications devices comprising program instructions when executed by a first processor causes the first processor to perform the steps of:
   receiving a communication at the first processor communicably coupled to the one or more communications devices via a network;
   filtering the received communication using three or more stages selected from the group comprising a media protection and filtering plane, a policy-based filtering plane, a signature-based filtering plane, a protocol anomaly detection and filtering plane and a behavioral learning-based filtering plane;
   either allowing or blocking the received communication based on the selected stages;
   wherein the media protection and filtering plane blocks the received communication whenever the received communication falls outside one or more communication media based parameters comprising signaling media integrity, media validation and anomaly detection;
   wherein the policy-based filtering plane blocks the communication whenever one or more user defined media and time policies are violated;
   wherein the signature-based filtering plane blocks the received communication whenever the received communication matches one or more known attack signatures;
   wherein the protocol anomaly detection and filtering plane blocks the received communication whenever the received communication violates one or more protocol policies comprising a protocol misuse policy, a protocol message scrubbing policy and a device specific policy;
   wherein the behavioral learning-based filtering plane uses a probability analysis to detect anomalies based on one or more learned parameters and resolve probable false alarms into a correct decision to either block or allow the received communication; further comprising:
   one or more media subsystems having a second processor communicably and securely connected to one or more signaling subsystems and deployed as a security and monitoring interface between the network and the one or more communications devices; and
   an element management system (EMS) subsystem having a third processor communicably and securely connected to the one or more signaling subsystems; or
   a verify subsystem having a fourth processor communicably and securely connected to the one or more signaling subsystems.

9. The computer readable medium as recited in claim 8, wherein the stages further comprise an authentication plane and an encryption plane.

10. The computer readable medium as recited in claim 8, wherein the stages are applicable to one or more protocols including SIP, IMS, UMA, H.248, H.323, RTP, CSTA/XML or a combination thereof.

11. The computer readable medium as recited in claim 8, wherein the program instructions are executed by one or more processors within one or more subsystems including the one or more signaling subsystems, the one or more media subsystems, an intelligence subsystem, the EMS subsystem, the verify subsystem or a combination thereof.

12. The computer readable medium as recited in claim 8, wherein the stages are implemented within a single device or are distributed across the network.

13. A system for protecting one or more communications devices comprising:
   a network communicably coupled to the one or more communications devices;
   one or more signaling subsystems having a first processor deployed as a security and monitoring gateway between the one or more communications devices and the network;
   an intelligence subsystem having a second processor communicably and securely connected to the one or more signaling subsystems;
   wherein the first processor of the one or more signaling subsystems receives a communication, filters the received communication using three or more stages selected from the group comprising a media protection and filtering plane, a policy-based filtering plane, a signature-based filtering plane, a protocol anomaly detection and filtering plane and a behavioral learning-based filtering plane, and either allows or denies the received communication based the selected stages;
   wherein the media protection and filtering plane blocks the received communication whenever the received communication falls outside one or more communication media based parameters comprising signaling media integrity, media validation and anomaly detection;
   wherein the policy-based filtering plane blocks the received communication whenever one or more user defined media and time policies are violated;
   wherein the signature-based filtering plane blocks the received communication whenever the received communication matches one or more known attack signatures;
   wherein the protocol anomaly detection and filtering plane blocks the received communication whenever the received communication violates one or more protocol policies comprising a protocol misuse policy, a protocol message scrubbing policy and a device specific policy;
   wherein the behavioral learning-based filtering plane uses a probability analysis to detect anomalies based on one or more learned parameters and resolve probable false alarms into a correct decision to either block or allow the received communication; further comprising:
   one or more media subsystems having a third processor communicably and securely connected to the one or more signaling subsystems and deployed as a security and monitoring interface between the network and the one or more communications devices; and
   an element management system (EMS) subsystem having a fourth processor communicably and securely connected to the one or more signaling subsystems; or
   a verify subsystem having a fifth processor communicably and securely connected to the one or more signaling subsystems.

14. The system as recited in claim 13, wherein the stages further comprise an authentication plane and an encryption plane.

15. The system as recited in claim 13, wherein the stages are applicable to one or more protocols including SIP, IMS, UMA, H.248, H.323, RTP, CSTA/XML or a combination thereof.

16. The system as recited in claim 13, wherein the stages are implemented within a single device or are distributed across the network.

17. The system as recited in claim 13, wherein the system is implemented within a SIP network, a UMA network, an IMS network or a combination thereof.

18. The system as recited in claim 13, wherein the denied communication comprises a DoS attack, blended attack, VoIP SPAM or a combination thereof.

\* \* \* \* \*